(12) United States Patent
Ghassabian

(10) Patent No.: US 11,503,144 B2
(45) Date of Patent: Nov. 15, 2022

(54) SYSTEMS TO ENHANCE DATA ENTRY IN MOBILE AND FIXED ENVIRONMENT

(71) Applicant: Benjamin Firooz Ghassabian, Marseilles (FR)

(72) Inventor: Benjamin Firooz Ghassabian, Marseilles (FR)

( * ) Notice: Subject to any disclaimer, the term of this patent is extended or adjusted under 35 U.S.C. 154(b) by 0 days.

(21) Appl. No.: 15/412,023

(22) Filed: Jan. 22, 2017

(65) Prior Publication Data
US 2020/0228638 A1 Jul. 16, 2020

Related U.S. Application Data

(63) Continuation of application No. 14/146,125, filed on Jan. 2, 2014, now abandoned, which is a continuation of application No. 10/553,575, filed as application No. PCT/US2004/012082 on Apr. 19, 2004, now abandoned.

(60) Provisional application No. 60/463,844, filed on Apr. 18, 2003, provisional application No. 60/466,594, filed on Apr. 30, 2003, provisional application No. 60/468,028, filed on May 5, 2003, provisional application No. 60/474,447, filed on May 30, 2003, provisional application No. 60/475,533, filed on Jun. 3, 2003, provisional application No. 60/482,706, filed on Jun. 26, 2003, provisional application No. 60/482,998, filed on Jun. 27, 2003, provisional
(Continued)

(51) Int. Cl.
| | |
|---|---|
| *H04M 1/02* | (2006.01) |
| *G06F 3/01* | (2006.01) |
| *G06F 3/04886* | (2022.01) |
| *G06F 3/0482* | (2013.01) |

(52) U.S. Cl.
CPC .......... *H04M 1/0266* (2013.01); *G06F 3/011* (2013.01); *G06F 3/017* (2013.01); *G06F 3/0482* (2013.01); *G06F 3/04886* (2013.01); *G06F 2203/04803* (2013.01)

(58) Field of Classification Search
CPC .......... H04M 1/0266; H04M 1/72436; H04M 1/72454; H04M 1/0268; H04M 1/233; H04M 1/6058; H04M 2250/22; H04M 2250/70; H04M 2250/74; G06F 3/011; G06F 3/017; G06F 3/0482; G06F 3/04886; G06F 2203/04803; G06F 1/1626; G06F 1/1652; G06F 2203/0331; G06F 1/163; G06F 1/1656; G06F 1/1679; G06F 1/1684; G06F 1/1686; G06F 1/1698; G06F 3/0237; G06F 3/03547; G06F 3/04883; G06F 2203/0381
USPC ....................................... 455/575.1
See application file for complete search history.

(56) References Cited

U.S. PATENT DOCUMENTS

| | | | | |
|---|---|---|---|---|
| 6,035,180 A | * | 3/2000 | Kubes ................. | G06F 3/03547 455/575.1 |
| 6,751,487 B1 | * | 6/2004 | Rydbeck ............. | H04M 1/0214 379/433.04 |

(Continued)

*Primary Examiner* — Ankur Jain

(57) ABSTRACT

A mobile phone device includes a housing having a substantially rectangular shape wherein its height dimension substantially corresponds to a distance between an ear and a mouth of a user and wherein its width dimension is less than its height dimension. A display unit is integrated within the front surface of the mobile phone device. The display unit substantially entirely covers the front surface of the mobile phone device. The mobile phone device does not include a physical key on the front surface.

20 Claims, 82 Drawing Sheets

Related U.S. Application Data application No. 60/500,602, filed on Sep. 5, 2003, provisional application No. 60/504,331, filed on Sep. 19, 2003, provisional application No. 60/510,885, filed on Oct. 14, 2003, provisional application No. 60/536,564, filed on Jan. 14, 2004, provisional application No. 60/552,968, filed on Mar. 11, 2004, provisional application No. 60/557,140, filed on Mar. 26, 2004, provisional application No. 60/496,702, filed on Aug. 20, 2003.

(56) References Cited

U.S. PATENT DOCUMENTS

| | | | |
|---|---|---|---|
| 8,228,292 B1 * | 7/2012 | Ruiz | G06F 1/1626 |
| | | | 345/156 |
| 8,693,188 B2 * | 4/2014 | Holman, IV | G06F 1/1622 |
| | | | 361/679.56 |
| 2002/0167488 A1 * | 11/2002 | Hinckley | G06F 1/169 |
| | | | 345/156 |
| 2006/0264243 A1 * | 11/2006 | Aarras | G06F 1/1643 |
| | | | 455/566 |
| 2009/0197635 A1 * | 8/2009 | Kim | G06F 3/048 |
| | | | 455/550.1 |
| 2010/0216512 A1 * | 8/2010 | Aghaei | H04M 1/0241 |
| | | | 455/566 |
| 2013/0169549 A1 * | 7/2013 | Seymour | G06F 3/04842 |
| | | | 345/173 |
| 2017/0193489 A1 * | 7/2017 | Jeon | H04M 1/7253 |

* cited by examiner

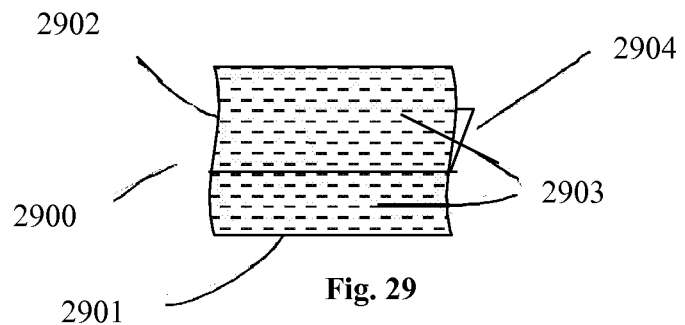
Fig. 29
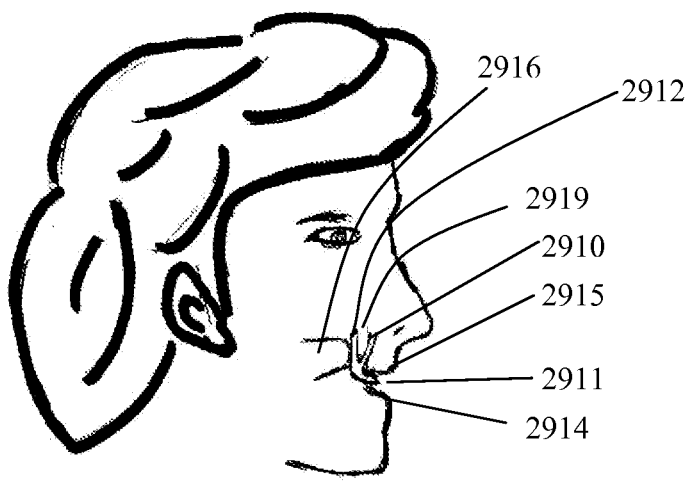
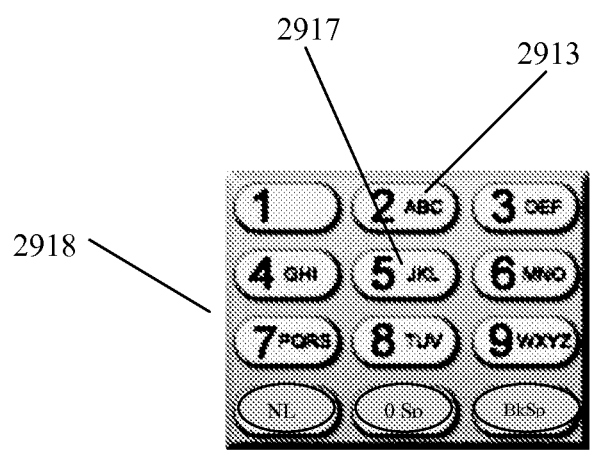
Fig. 29a

| Words Dictionary (by characters) | Corresponding keys to press in a telephone-type numeric keypad | Corresponding phoneme sets | Corresponding speech models in the memory |
|---|---|---|---|
| And | 263 | and | #n |
| " | " | " | " |
| Ball | 2255 | bôl | #n+i |
| Dancing | 3262464 | Dansing | #n+j |
| Enter | 36837 | Enter | " |
| " | " | " | " |
| Trying | 879464 | Trĩing | n+k |
| Tea | 832 | Tē | #n+l |
| Teabag | 832224 | Tēbag | " |
| Tee | 833 | Tē | #n+l |
| Young | 96864 | Yung | " |
| Zen | 936 | Zen | #n+m |

Fig. 34

| A<br>Speech/phonemes at the beginning of a syllable in a word | B<br>Characters sets having pronunciation at least substantially similar to the phonemes set of A | C<br>words having portions (e.g. syllables) with starting:<br>phoneme-sets of A or characters sets of B |
|---|---|---|
| ta | ta, | tap, tango |
| tā | ta, tai, | take, tailor |
| tā | tas, | taste |
| tô | ta, tau | talk, taupe |
| top | top | Top |
| te | te | tent |
| ti | ti | tilt |
| tip | tip | tippet |
| tĩ | ti, tie, ty | re-tire ("ti" in the beginning of the middle syllable), tiebreak, type |
| tē | t, tee, tea, ty | t, teeth, team, security |
| tōō | to, too, two | to, tooth, two |
| trĩ | tri, try | tried, re-try |
| thi | thi, thir, thirst | thin, thirst, thirst |
| thrō | thro | throw |
| ing | in | trying |

Fig. 37

3801
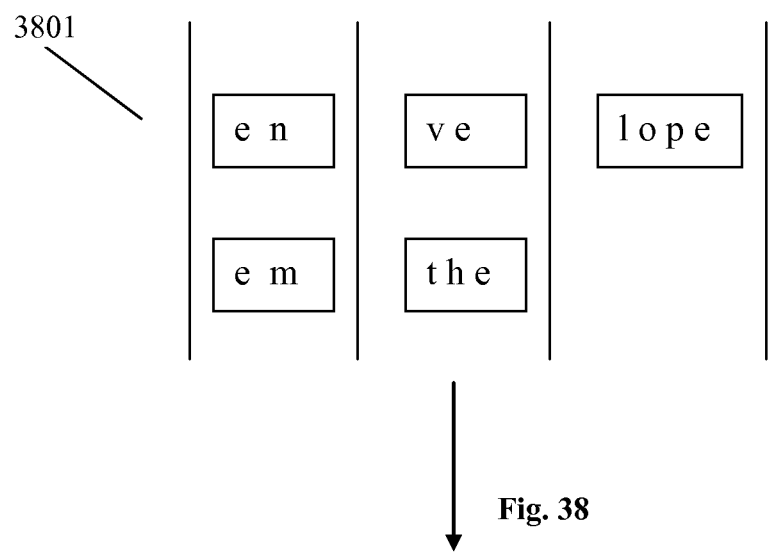
Fig. 38
3802
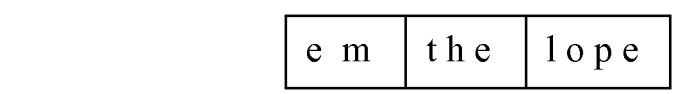
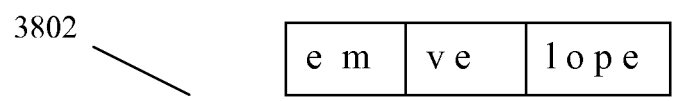
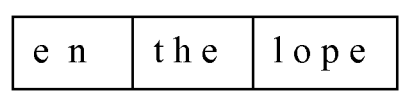
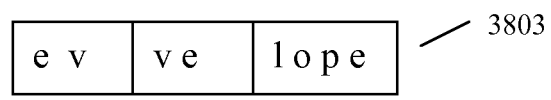
3803
Fig. 39

| Phoneme-Set | Consonant | Vowel | Consonant | Word | Number of Key Presses |
|---|---|---|---|---|---|
| T | | | | | |
| t, | t | | | thir-s-t | 3 |
| ta | t | a | | ta-riff | 2 |
| tab, tac, ..... | t | a | b | tab-let | 2 |
| tā | t | ā | | s-ta-ble | 3 |
| tār, ..... | t | ā | r | s-tair | 2 |
| te | t | e | | te-nan-t | 3 |
| tem, ter, .... | t | e | m | tem-pe-ra-ture | 4 |
| tē, | t | ē | | tea-bag | 2 |
| tēch, tēm,.... | t | ē | ch | teach-ing | 2 |
| ti | t | i | | mul-ti-tude | 3-4 |
| til, tip, ..... | t | i | l | un-til | 2 |
| to | t | o | | to-ma-to | 3 |
| tor, | t | o | r | tor-na-do | 3 |
| tu | t | u | | s-tu-dy | 3 |
| tuf, tud, ..... | t | u | d | s-tuff/s-tuf-f | 2-3 |
| tōō | t | ōō | | to | 1 |
| tōōd, tōōl, ..... | t | ōō | l | un-der-s-tood | 4 |
| tyōōn | t | yōō | n | tune/tu-ne | 1-2 |
| U | | | | | |
| yōō | | yōō | | u-ni-ver-sal | 4 |
| yōōz | | yōō | z | use/u-se | 1-2 |
| un, um, ul, .... | | u | n | un-der | 2 |
| V | | | | | |
| Similar principles as for "T" | | | | | |
| TH | | | | | |
| Similar principles as for "T" | | | | | |

Fig. 40

| Phoneme-Set | Consonant | Vowel | Word | Number of Key Pressees |
|---|---|---|---|---|
| T | | | | |
| t | t | | thi-r-s-t | 4 |
| ta | t | a | ta-ri-f-f | 4 |
| tā | t | ā | s-ta-b-le | 4 |
| te | t | e | te-na-n-t | 4 |
| tē, | t | ē | tea-ba-g | 3 |
| ti | t | i | mu-l-ti-tu-de | 5 |
| to | t | o | to-ma-to | 3 |
| tu | t | u | s-tu-dy | 3 |
| tōō | t | ōō | to | 1 |
| tyōō | t | yōō | tu-ne | 2 |
| | | | | |
| U | vowel | consonant | | |
| yōōz | yōō | | u-se | 2 |
| un, um, ul, …. | u | n | un-de-r | 3 |
| | | | | |
| V | | | | |
| Similar principles as for "T" | | | | |
| | | | | |
| TH | | | | |
| Similar principles as for "T" | | | | |

— 4101 (pointing to "tea-ba-g  3" row)

Fig. 41

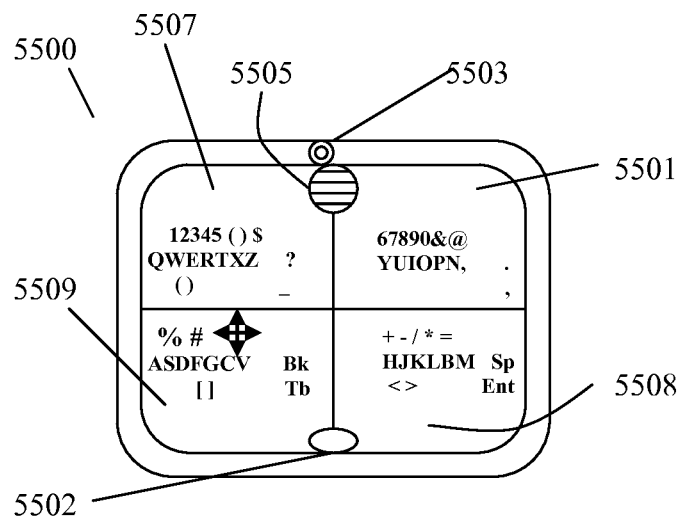
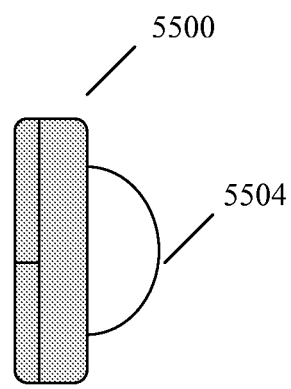
Fig. 55a   Fig. 55b
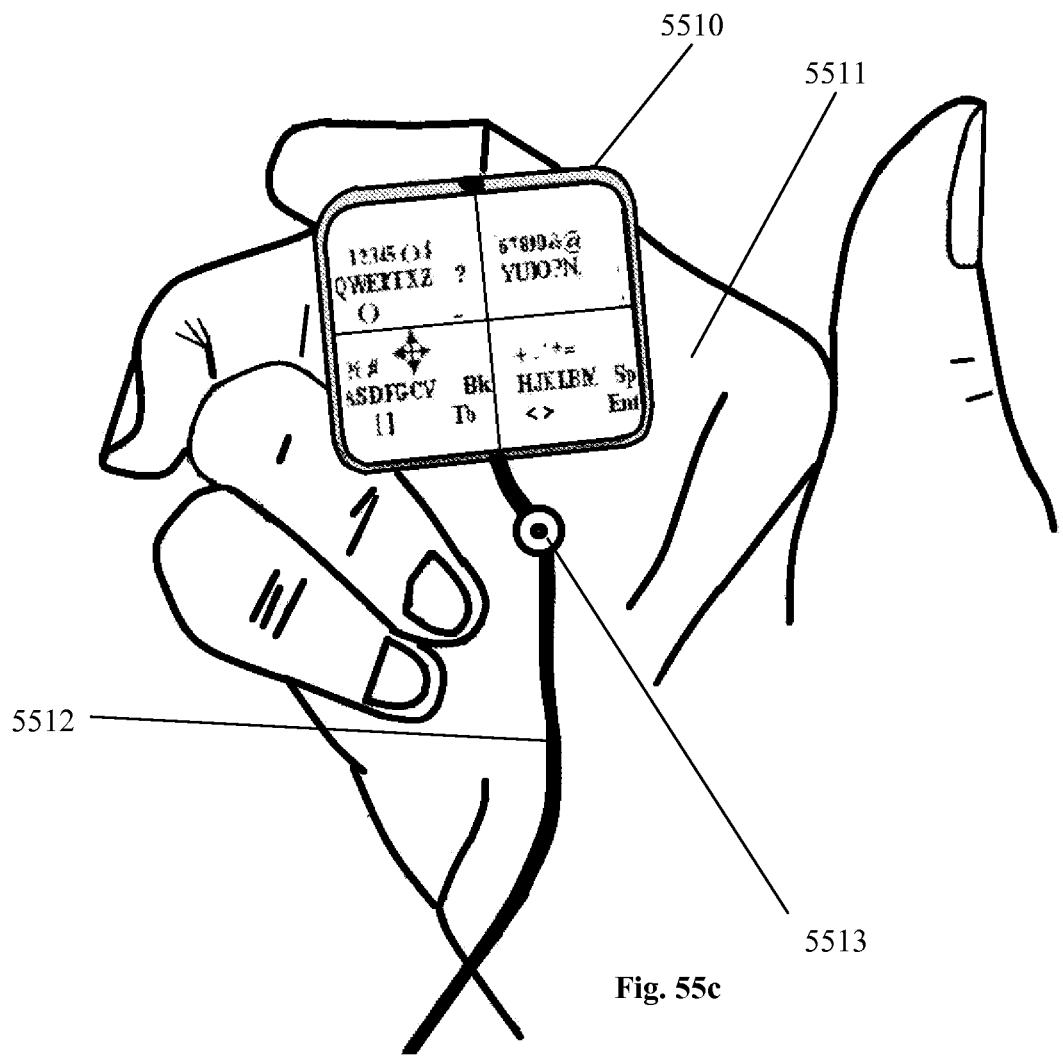
Fig. 55c

SYSTEMS TO ENHANCE DATA ENTRY IN MOBILE AND FIXED ENVIRONMENT

RELATED APPLICATIONS

This application is a continuation of U.S. patent application Ser. No. 14/146,125, filed Jan. 2, 2014, which is a continuation of U.S. patent application Ser. No. 10/553,575, filed Sep. 26, 2006, which is a national phase application of PCT Patent Application PCT/US2004/012082, filed Apr. 19, 2004, and claims the benefit of priority from U.S. Provisional Application Nos. 60/463,844, filed on Apr. 18, 2003; 60/466,594, filed on Apr. 30, 2003; 60/468,028, filed on May 5, 2003; 60/474,447, filed on May 30, 2003; 60/475,533, filed on Jun. 3, 2003; 60/482,706, filed on Jun. 26, 2003; 60/482,998, filed on Jun. 27, 2003; 60/496,702, filed on Aug. 20, 2003; 60/500,602, filed on Sep. 5, 2003; 60/504,331, filed on Sep. 19, 2003; 60/510,885, filed on Oct. 14, 2003; 60/536,564, filed on Jan. 14, 2004; 60/552,968, filed on Mar. 11, 2004; and 60/557,140, filed on Mar. 26, 2004, the entirety of which are incorporated herein by reference.

FIELD OF THE INVENTION

This application relates to a system and method for entering characters. More specifically, this application relates to a system and method for entering characters using keys, voice or a combination thereof.

BACKGROUND OF THE INVENTION

Typical systems and methods for electronically entering characters include the use of standard keyboards such a QWERTY keyboard and the like. However, as modern electronic devices have become smaller, new methods have been developed in order to enter desired characters.

On such method is to use a multi-press system on a standard telephonic numeric keypad, whereby multiple alphanumeric characters are assigned to the same key. One drawback with such a system is that it requires multiple pressing of single keys in order to enter certain characters, thereby increasing the overall number of key presses, slowing the character entry process.

A second method to accommodate the entering of characters on the ever smaller devices has been to simply miniaturize the standard QWERTY keypad onto the devices. However, such miniaturized keypads are often clumsy and do not afford sufficient space between the keys, causing multiple key presses when only a single press is desired.

Yet another attempt to accommodate the entering of characters on smaller electronic devices, is the use of voice recognition software. Such methods have been in use for some time, but suffer from a number of drawbacks. Most notably, voice recognition software suffers from the inability to distinguish homonyms, and often requires significant advance input for the system to recognize a particular speaker, their mannerisms and speech habits. Also, voice recognition software, in attempting to alleviate these problems, has grown large and requires a good deal of processing, not particularly suitable for the limited energy and processing capabilities of smaller electronic devices, such a mobile phones and text pagers.

OBJECTS AND SUMMARY OF THE INVENTION

It is the object of the present invention to overcome the drawbacks associated with the prior art, and provide a system and method for entering characters that is fast, reliable, and does not require large amounts of set up and energy/processing expenditures.

To this end, the present invention is directed to a data input system having a keypad defining a plurality of keys, where each key contains at least one symbol of a group of symbols. The group of symbols are divided into subgroups having at least one of alphabetical symbols, numeric symbols, and command symbols, where each subgroup is associated with at least a portion of a user's finger.

A finger recognition system is provided, in communication with at least one key of the plurality of keys, where the at least one key has at least a first symbol from a first subgroup and at least a second symbol from a second subgroup, where the finger recognition system is configured to recognize the portion of the user's finger when the finger interacts with the key so as to select the symbol on the key corresponding to the subgroup associated with the portion of the user's finger.

BRIEF DESCRIPTION OF THE DRAWINGS

FIG. 29 illustrates a mouthpiece, in accordance with one embodiment of the present invention;

FIG. 29a illustrates a keypad and mouthpiece combination, in accordance with one embodiment of the present invention;

FIG. 34 illustrates a voice recognition chart, in accordance with one embodiment of the present invention;

FIG. 37 illustrates a voice recognition chart, in accordance with one embodiment of the present invention;

FIG. 38 illustrates a voice recognition chart, in accordance with one embodiment of the present invention;

FIG. 39 illustrates a voice recognition chart, in accordance with one embodiment of the present invention;

FIG. 40 illustrates a voice recognition chart, in accordance with one embodiment of the present invention;

FIG. 41 illustrates a voice recognition chart, in accordance with one embodiment of the present invention;

FIG. 55a illustrates a keypad, in accordance with one embodiment of the present invention;

FIG. 55b illustrates a keypad, in accordance with one embodiment of the present invention;

FIG. 55c illustrates a keypad on the user's hand, in accordance with one embodiment of the present invention;

FIG. 62b illustrates a keypad and display, in accordance with one embodiment of the present invention;

FIG. 63a illustrates a keypad and display, in accordance with one embodiment of the present invention;

FIG. 63b illustrates a keypad and display, in accordance with one embodiment of the present invention;

FIG. 63c illustrates a keypad and display, in accordance with one embodiment of the present invention;

FIG. 63d illustrates a keypad and display, in accordance with one embodiment of the present invention;

FIG. 63e illustrates a keypad and display on a headset, in accordance with one embodiment of the present invention;

FIG. 64a illustrates a keypad and display, in accordance with one embodiment of the present invention;

FIG. 64b illustrates a foldable keypad and display, in accordance with one embodiment of the present invention;

FIG. 65a illustrates a keypad and display, in accordance with one embodiment of the present invention;

FIG. 65b illustrates the back side of a keypad and display, in accordance with one embodiment of the present invention;

FIG. 65c illustrates a keypad and display, in accordance with one embodiment of the present invention;

FIG. 66 illustrates a plurality of keypads and displays connected through a main server/computer, in accordance with one embodiment of the present invention;

Figure 67:
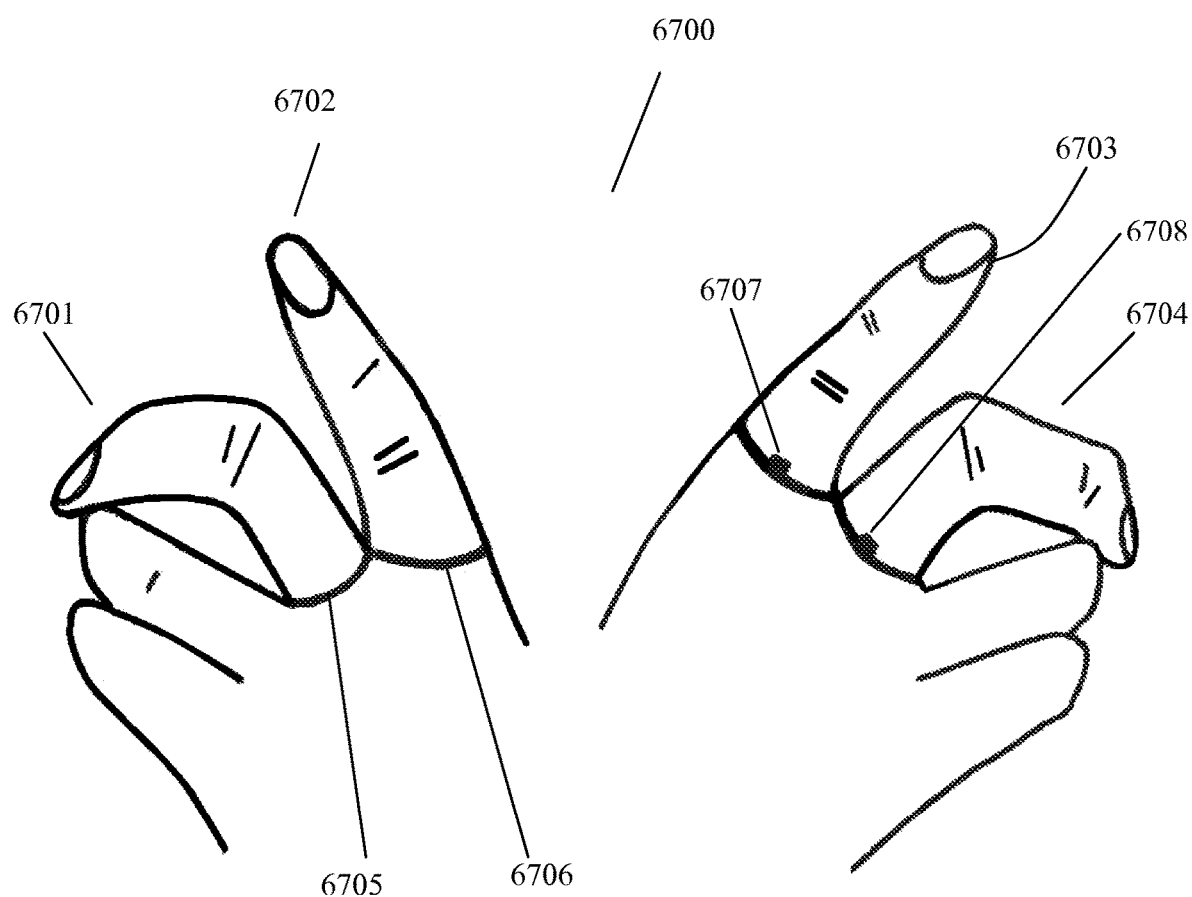
Figure 68:
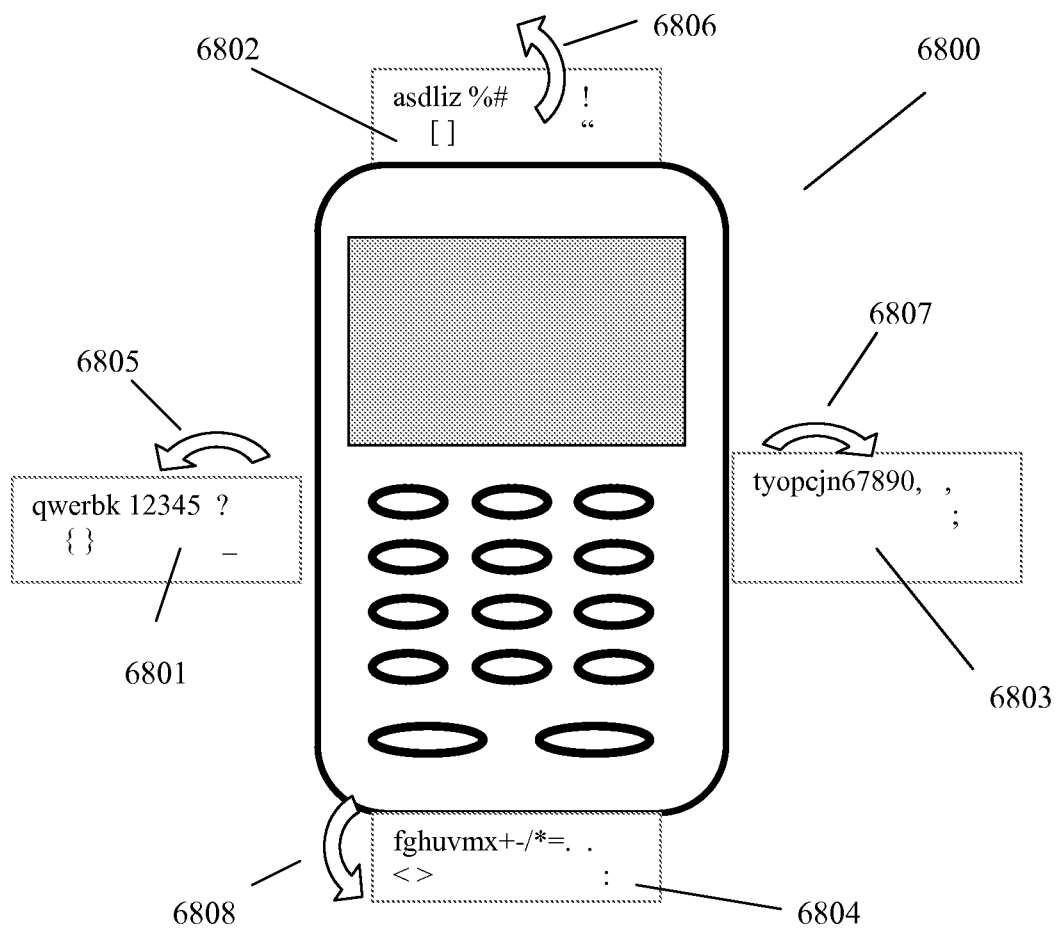
Figure 68A:
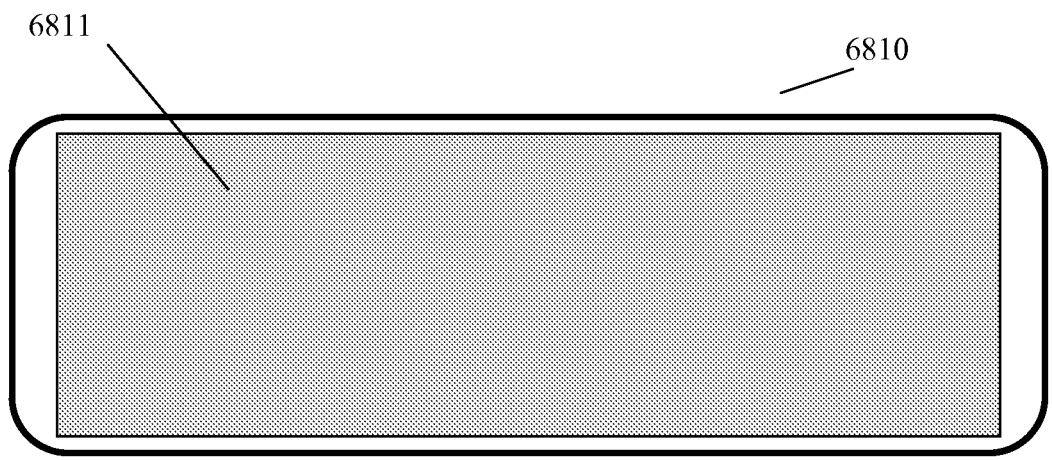
Figure 69:
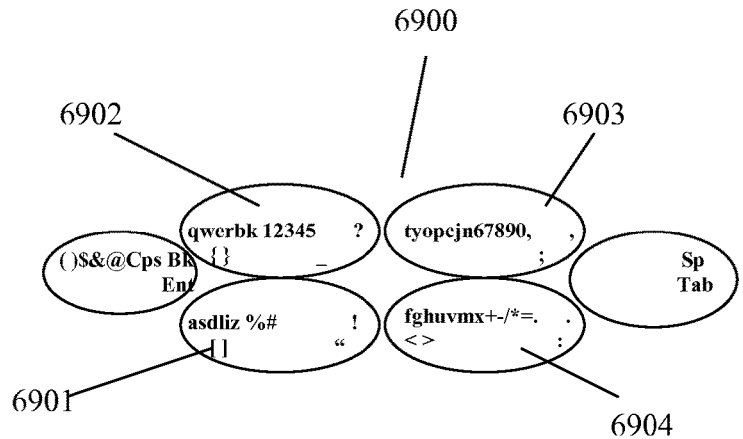
Figure 69A:
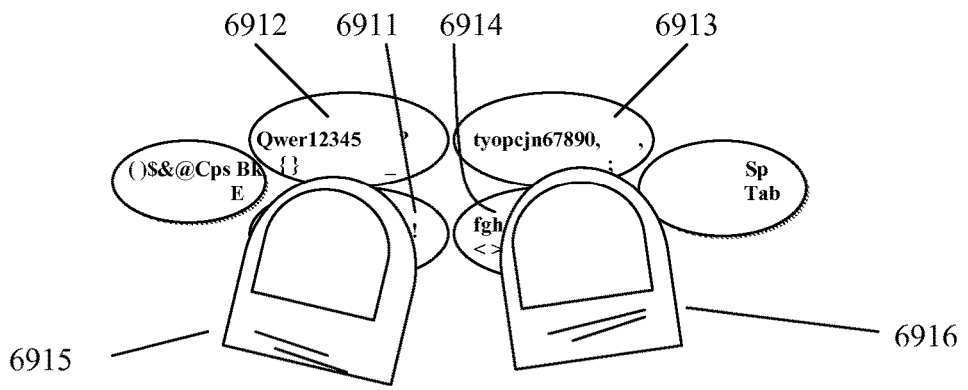
Figure 69B:
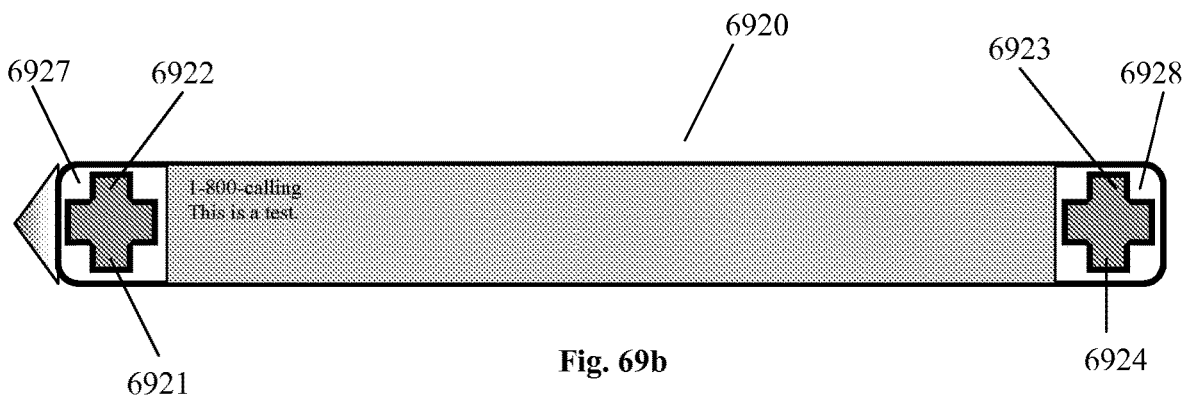
Figure 70A:
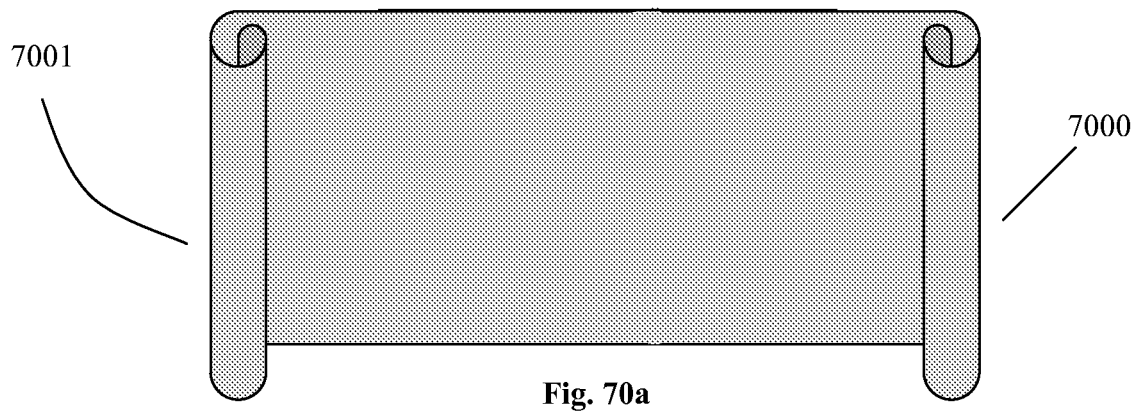
Figure 70B:
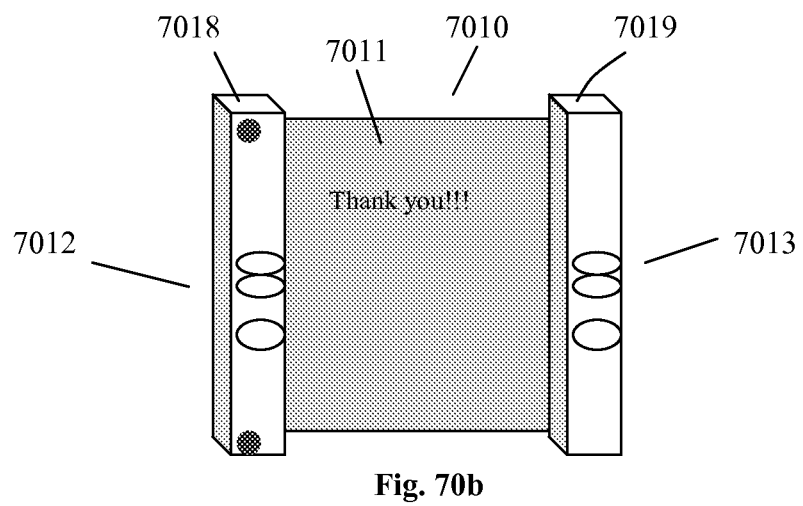
Figure 70C:
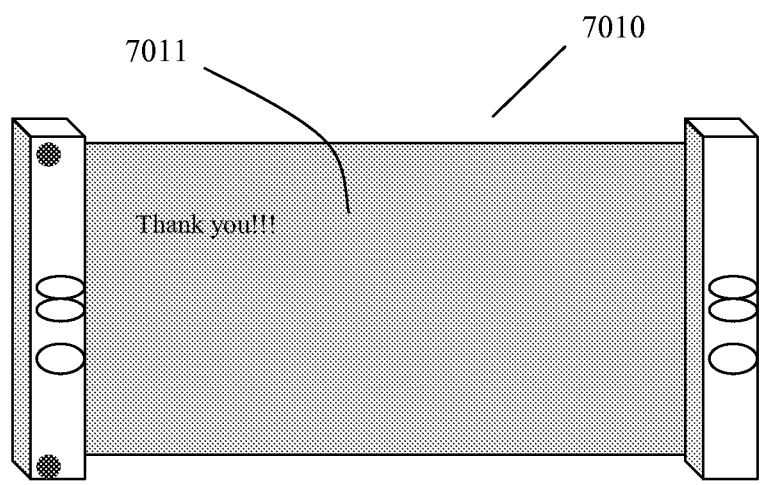
Figure 70D:
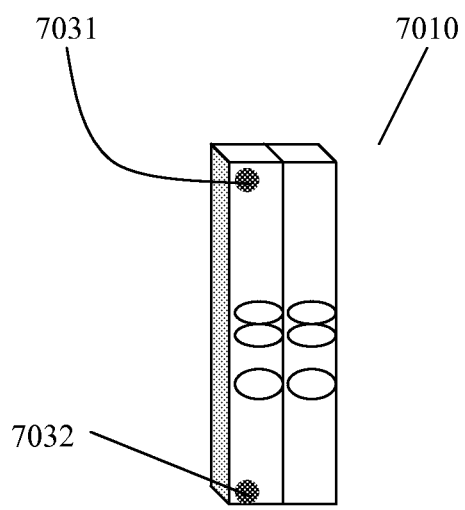
Figure 70E:
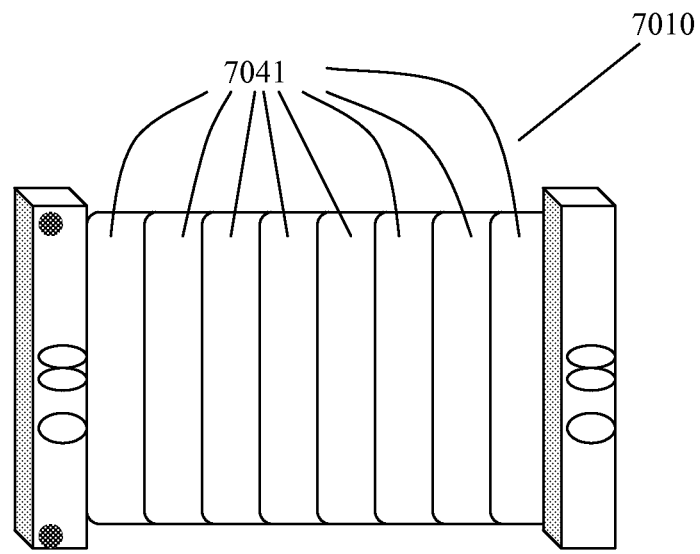
Figure 70F:
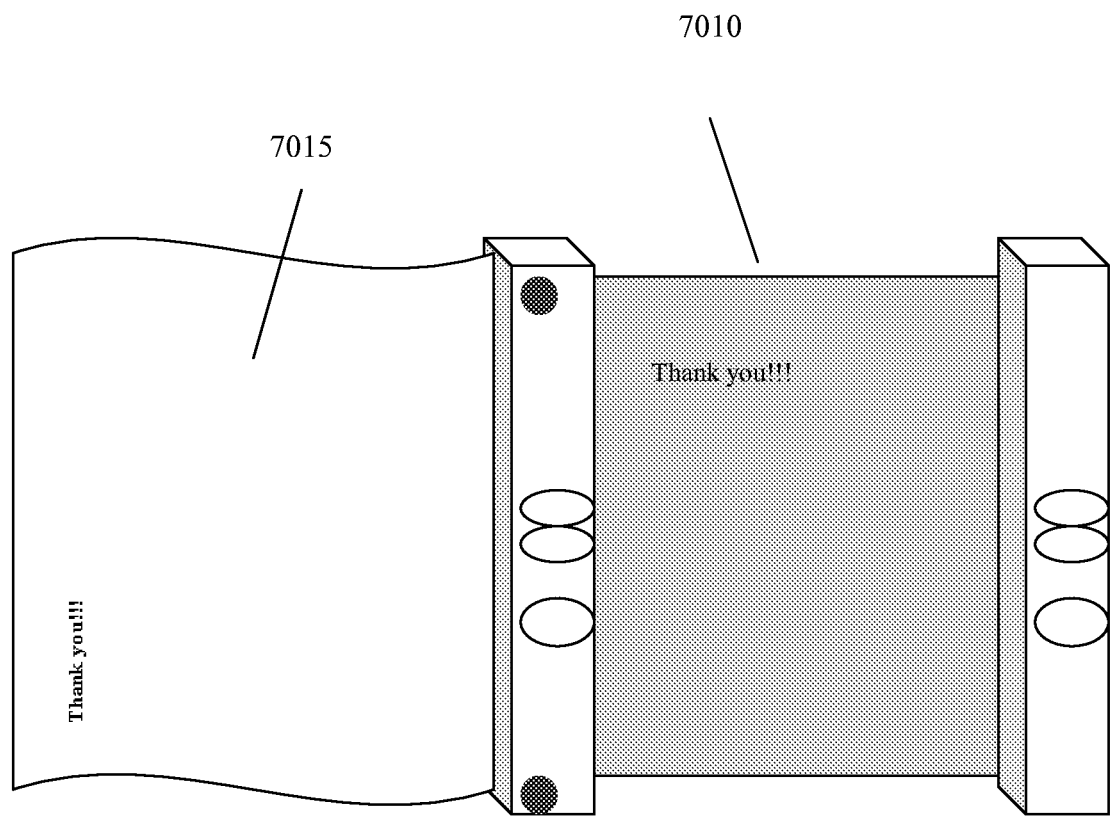
Figure 70G:
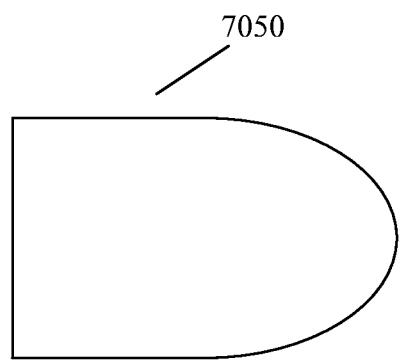
Figure 70H:
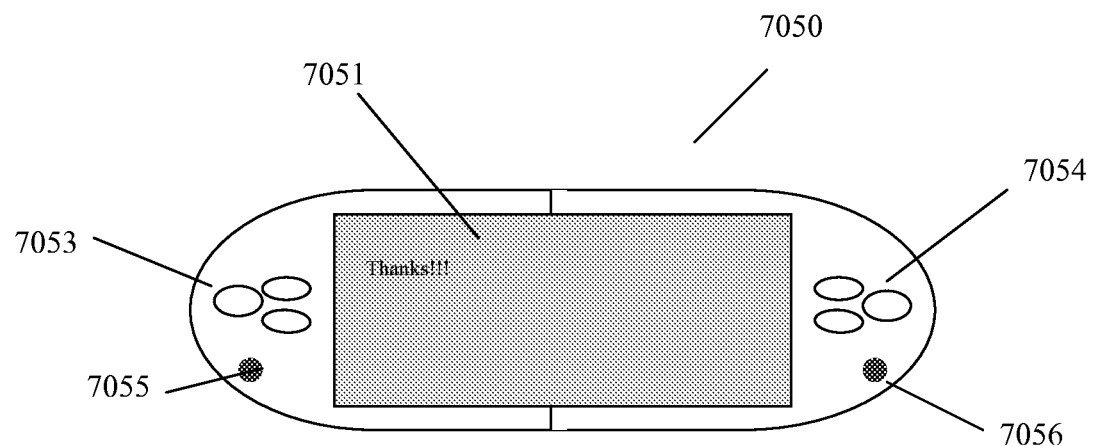
Figure 71A:
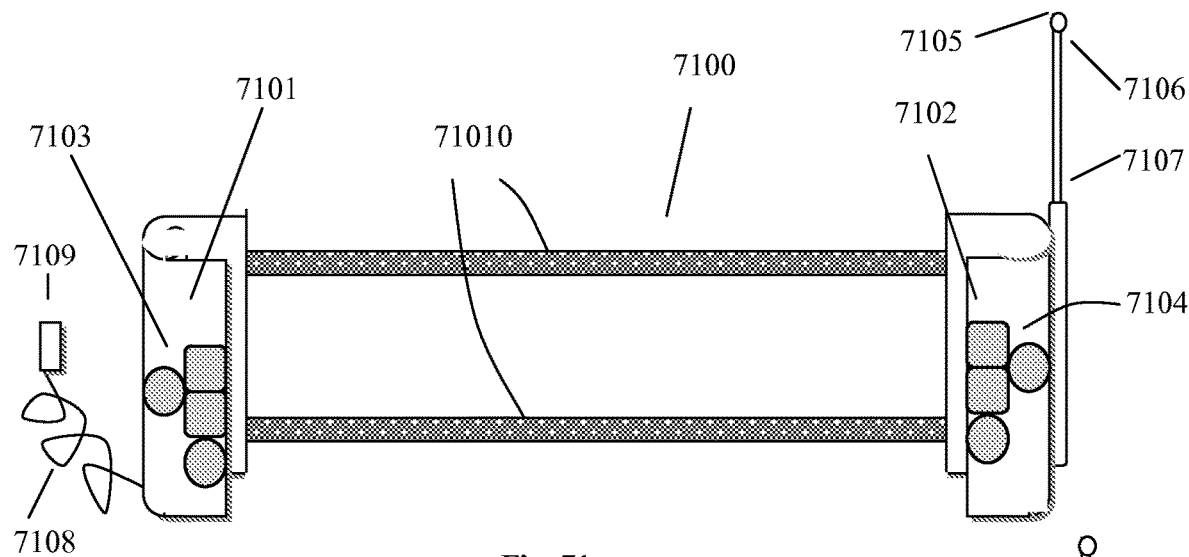
Figure 71B:
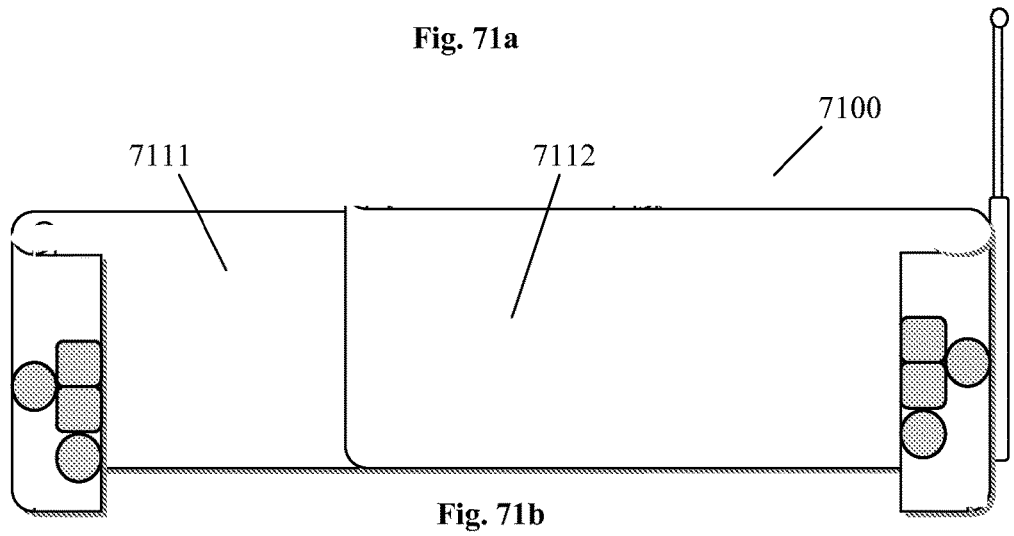
Figure 71C:
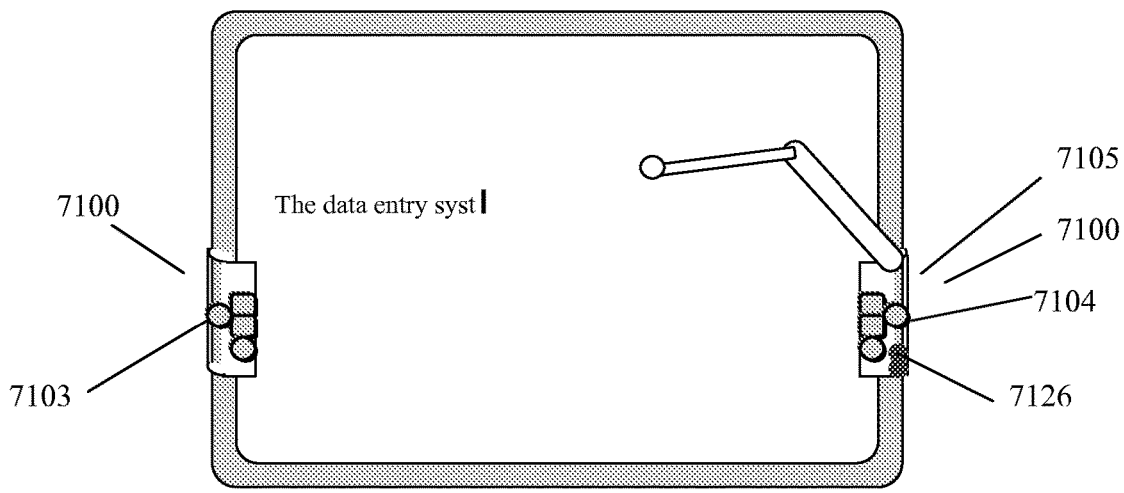
Figure 72A:
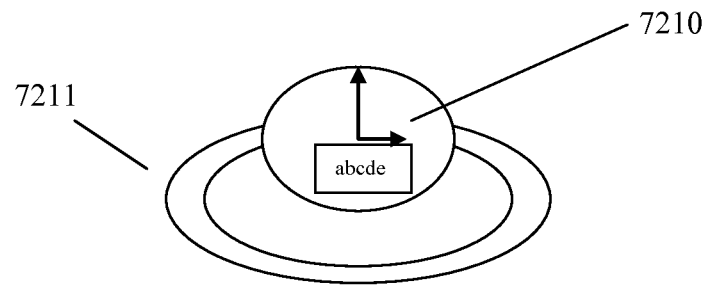
Figure 72B:
Figure 72C:
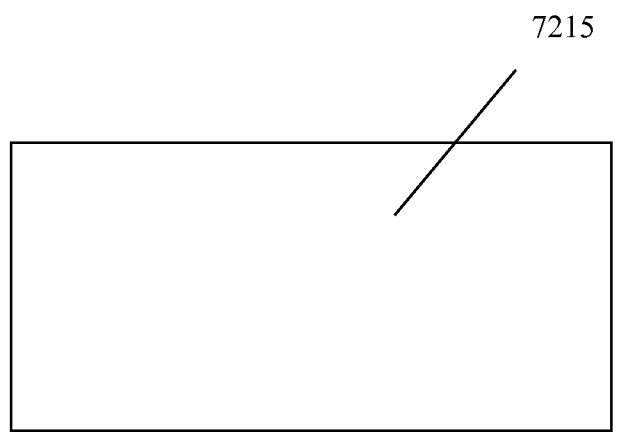

FIG. 67, illustrates a keypad in the form of ring sensors, in accordance with one embodiment of the present invention;

FIG. 68 illustrates a keypad and display, in accordance with one embodiment of the present invention;

FIG. 68a illustrates a display, in accordance with one embodiment of the present invention;

FIG. 69 illustrates a keypad, in accordance with one embodiment of the present invention;

FIG. 69a illustrates a keypad, in accordance with one embodiment of the present invention;

FIG. 69b illustrates a keypad and display, in accordance with one embodiment of the present invention;

FIG. 70a illustrates a flexible display, in accordance with one embodiment of the present invention;

FIG. 70b illustrates a flexible display with keypad, in accordance with one embodiment of the present invention;

FIG. 70c illustrates a flexible display with keypad, in accordance with one embodiment of the present invention;

FIG. 70d illustrates a closed collapsible display with keypad, in accordance with one embodiment of the present invention;

FIG. 70e illustrates an open collapsible display with keypad, in accordance with one embodiment of the present invention;

FIG. 70f illustrates a flexible display with keypad and printer, in accordance with one embodiment of the present invention;

FIG. 70g illustrates a closed foldable display with keypad, in accordance with one embodiment of the present invention;

FIG. 70h illustrates an open foldable display with keypad, in accordance with one embodiment of the present invention;

FIG. 71a illustrates a flexible display with keypad and antenna, in accordance with one embodiment of the present invention;

FIG. 71b illustrates a flexible display with keypad and antenna, in accordance with one embodiment of the present invention;

FIG. 71c illustrates a display with keypad and extendable microphone, in accordance with one embodiment of the present invention;

FIG. 72a illustrates a wristband of an electronic device, in accordance with one embodiment of the present invention;

FIG. 72b illustrates a detached flexible display in a closed position, in accordance with one embodiment of the present invention; and FIG. 72c illustrates a detached flexible display in an open position, in accordance with one embodiment of the present invention.

DETAILED DESCRIPTION OF THE PREFERRED EMBODIMENT

The invention described hereafter relates to method of configuration of symbols such as characters, punctuation, functions, etc. (e.g. symbols of a computer keyboard) on a small keypad having a limited number of keys, for data entry in general, and for data and/or text entry method combining voice/speech of a user and key interactions (e.g. key presses) on a keypad, in particular. This method facilitates the use of such a keypad.

Figure 1:
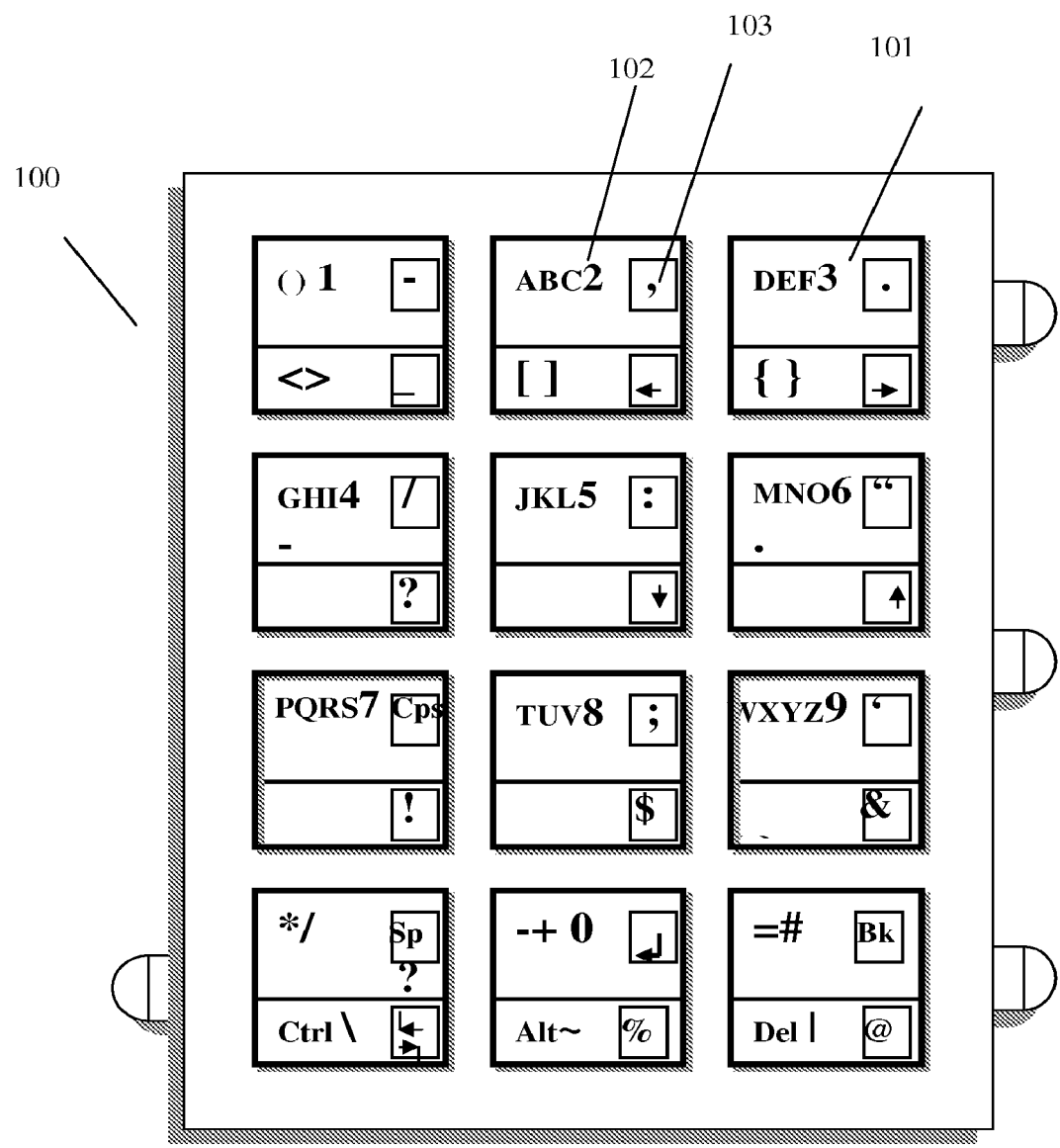
FIG. 1 illustrates a keypad, in accordance with one embodiment of the present invention.

FIG. 1, shows an example of an integrated keypad 100 for a data entry method using key presses and voice/speech recognition systems. In this example, the keys of the keypad may respond to one or more type of interactions with them. Said interactions may be such as:

pressing a key with a specific finger or a portion of a finger (using a finger recognition system)

a single tap (e.g. press) on a key or a double tap (e.g. two consecutive presses with short time interval) on a key.

a slight pressure (or a touch) on a key, or a heavy pressure on a key a short time interaction with a key (e.g. a short time pressing of a key) or a longer time pressing of a key etc. . . .

To each of said interactions or to any combination of them with the keys of the keypad, a group of symbols on said keypad may be assigned. For example, the symbols shown on the top side of the keys of the keypad 100, may be assigned to a single pressure on the keys of the keypad. If a user, for example presses the key 101, the symbols "DEF3." may be selected. In the same example, the symbols configured on the bottom side of the keys of the keypad 100, may be assigned for example, to a double tap on said keys. If a user, for examples double taps on the key 101, then the symbols "{ }'" are selected.

Same selection may also be possible with other interactions such as those described before depending on the system implemented with the keys of the keypad. For example, a slight press (or a touch) on the key 101, could select the symbols configured on the top side of said key, and a heavier pressure on the same key, could select the symbols configured on the bottom side of said key.

As described, when a user interacts with a key, a recognition system candidates the symbols on said key which are assigned to said type of interaction. For example, if a user touches or slightly presses the key 102, the system candidates the symbols, "A", "B", "C", "2", and ",". To select one of said candidated symbols, said user may speak, for example, either said symbol or a position appellation of said symbol on said key. For this purpose a voice/speech recognition systems is used.

If the user does not speak, a predefined symbol among those candidated symbols, may be selected as default. In this example, the punctuation "," shown in a box 103 is selected. To select one of the other candidated symbols, for example the letter "B", the user may speak said letter.

In the same example, if the user presses heavily the key 102, then the symbols "[", "]", and """ may be candidated. As described above, if the user does not speak, a predefined symbol among those selected by said pressing action, may be selected as default. In this example, the punctuation """ is selected. Also in this example, to select a desired symbol among the two other candidated symbols "[", or "]", the user may use different methods such as speaking said desired symbol, and/or speaking its position relating to the other symbols, and/or speaking its color (if each symbol has a different color), and/or any predefined appellation (e.g. a predefined voice or sound generated by a user) assigned to said symbol. For example, if the user says "left", then the character "[" is selected. If the user says "right", then the character "]" is selected.

Of course, instead of using a voice/speech, a behavior of a user combined with a key interaction may select a symbol. For example, a user may press the key 102 heavily and swipe his finger towards a desired symbol.

Figure 2:
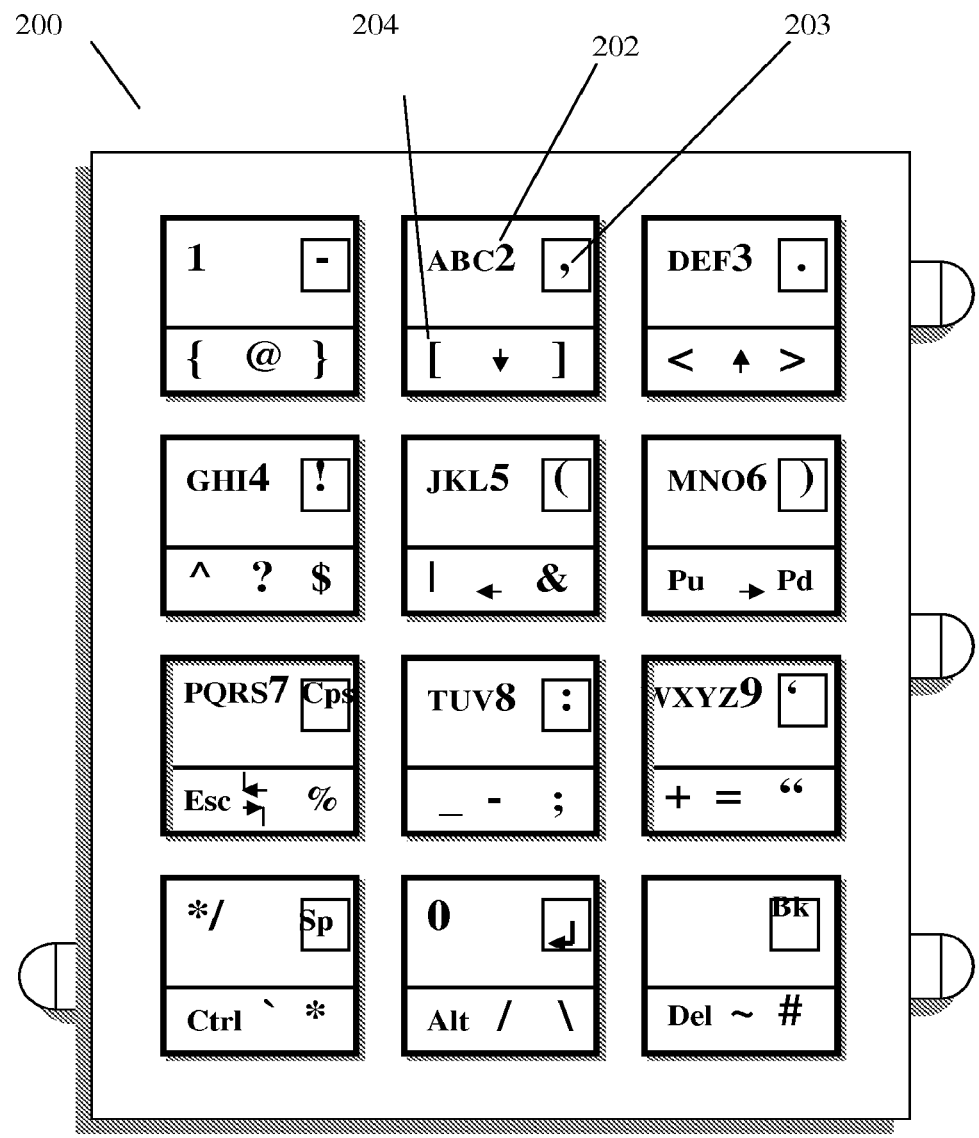
FIG. 2 illustrates a keypad, in accordance with one embodiment of the present invention.

The above-mentioned method of data entry may also be applied to a keypad having keys responding to a single type of interaction with said keys (e.g. a standard telephone keypad having). As shown in FIG. 2, a keypad 200 having keys responding to a single interaction with said keys. When a user presses a key all of the symbols on said key are candidated by the system. For example, if the user presses the key 202, then the symbols, "A", "B", "C", "2", ",", "[", " ", and "]" are canditated.

In this example, if the user does not speak, the system may select a predefined default symbol. In this example, punctuation "," 203 is selected.

Still in the same example, to select a desired symbol among the said candidates, the user may either speak a desired symbol, or for example, speak a position appellation of said symbol, on said key or relating to other symbols on said key, or any other appellation as described before. For example, a symbol among those configured on the top of the key (e.g. "A", "B", "C", or "2"), may be selected by speaking it. On other hand, for example, one of the symbols configured on the bottom side of the key, (e.g. "[", " ", or "]") may be selected by speaking its position relative, for example, to the two other symbols on the bottom side of said key, by saying for example, "left", "middle", or "right". For example, to select "[" 204, the user may press the key 202 and say "left".

As mentioned, the keys the keypad of FIG. 1, may respond to at least two predefined types of interactions with them. Each type of interaction with a key of said keypad may candidate a group of said characters on said key.

As described before, during a data entry such as writing a text, different interactions with the keys (e.g. one tap, double tap) and different user behavior (e.g. speaking, not speaking) combined with said key interactions, may be required. Although the data entry method of this invention is a quick and easy data entry, a good configuration of the symbols on the keys of the keypad of this invention, may result a still easier and quicker data entry system. This method will be described hereafter.

Figure 3:
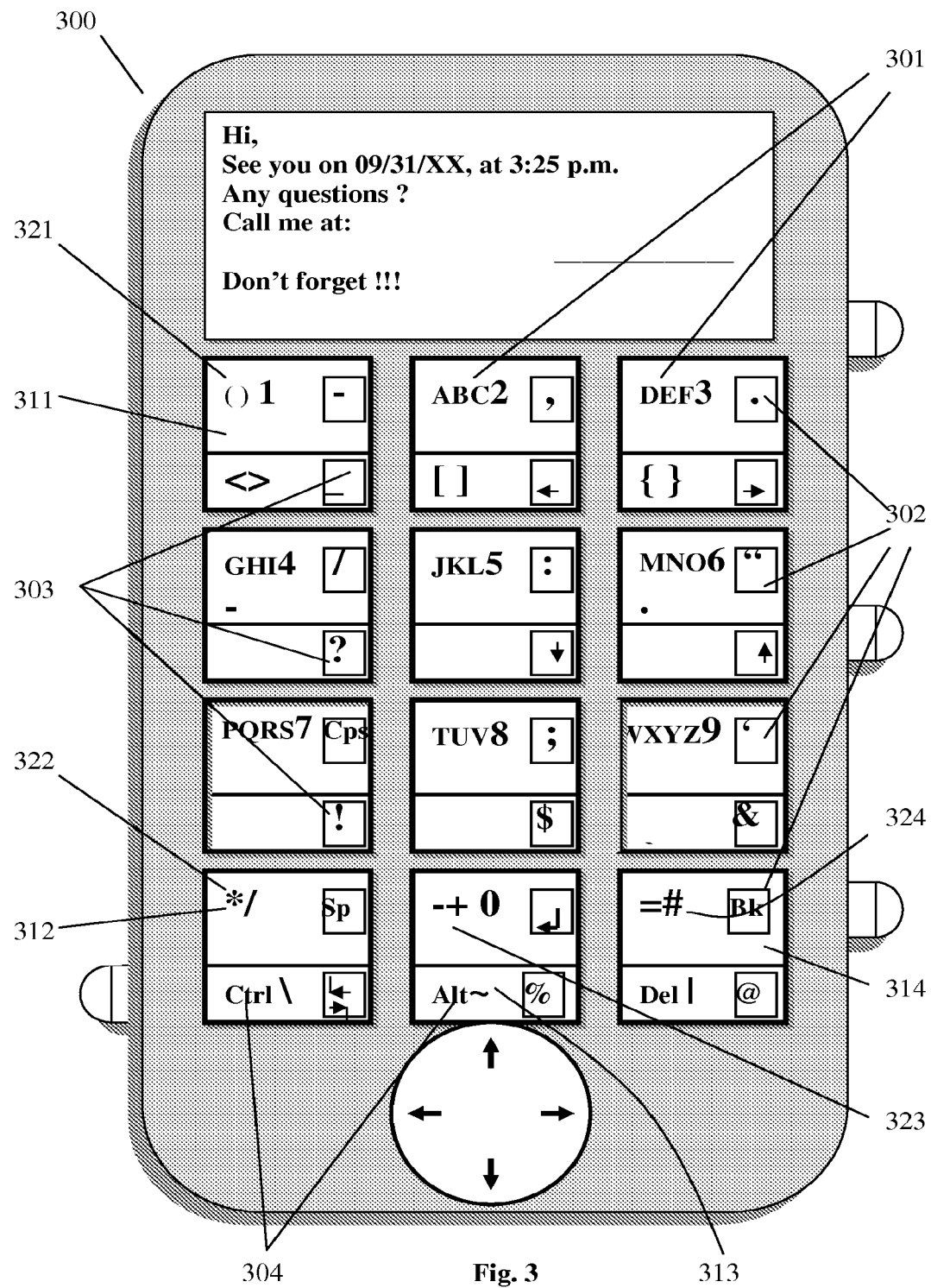
FIG. 3 illustrates a keypad with display, in accordance with one embodiment of the present invention.

According to one embodiment, as shown in FIG. 3, a number of symbols (e.g. symbols on a computer keyboard) are physically divided into at least two groups and arranged on a telephone keypad keys by their order of priority (e.g. frequency of use, familiarity of the user with existing arrangement of some symbols such as letters and digits on a standard telephone keypad, etc.), as follow:

First Group Assigned to a First Type of Interaction with a Keys

A) a First Subgroup Using Voice/Speech

Digits 0-9, and letters A-Z may be placed on the keys of a keypad according to standard configuration and assigned to a first type of interaction (e.g. a first level of pressure) with said keys. A desired symbol among them may be selected by interacting (e.g. said first type of interaction) with a corresponding key and naturally speaking said symbol. In FIG. 3 said symbols (e.g. 301) are configured on the top side of the keys.

Letters and digits may frequently be used during, for example, a text entry. They both, may naturally be spoken while, for example, tapping on corresponding keys. Therefor, for faster and easier data entry, they preferably may be assigned to a same type of interaction with the keys of a keypad.

b) A Second Subgroup not Using Voice/Speech

At least part of the other symbols (e.g. punctuation, functions, etc.) which are frequently used during a data (e.g. text) entry may be placed on the keys (one symbol per key) of the keypad and be assigned to said first type of interaction (e.g. a single tap) with said keys. As default, a desired symbol may be selected by only said interaction with corresponding key without the use of speech/voice. In FIG. 3 said symbols (e.g. 302) are configured in boxes on the top side of the keys.

Of course, said symbols may also be selected by speaking them while interacting with a corresponding key, but because speaking this kind of symbols (e.g. punctuation, functions) is not always a natural behavior, it is preferable to not to speak them.

At Least a Second Group Assigned to at Least a Second Type of Interaction with at Least One Key At least part of the remaining symbols may be assigned to at least a second type of interaction with said keys of said keypad. They may be divided into two groups as follow:

c) A Third Subgroup not Using Voice/Speech

A third subgroup comprising the remaining frequently used symbols and the ones which are difficult and/or not natural to pronounce, may be placed on said keys of said keypad (one symbol per key) and assigned to a second type of interaction (e.g. double tap, heavier pressure level, two keys pressed simultaneously, a portion of a finger by which the key is touched, etc.) with said keys.

As default, a desired symbol may be selected by only said interaction with a corresponding key without the use of speech/voice. In FIG. 3 said symbols (e.g. 303) are configured in boxes on the bottom side of the keys. Of course, said symbols may also be selected by speaking them while interacting with a corresponding key, but because speaking this kind of symbols (e.g. punctuation, functions) is not always a natural behavior, it is preferable to not to speak them.

d) At Least a Fourth Subgroup Using Voice/Speech

A fourth subgroup comprising at least part of remaining symbols may also be assigned to said second type of interaction with the keys of said keypad and be combined with a user's behavior such as voice. In FIG. 3 said symbols (e.g. 304) are configured on the bottom side of the keys. Said symbols may be selected by said second type of interaction with a corresponding key and use of voice/speech in different manners such as:

the symbols being selected by naturally pronouncing their appellation the symbols being selected by naturally speaking their position relative to each other on a key or their position while using them in a text (e.g. "<", ">" in this example, said symbols do not belong to said second type of interaction, this is only an example), by saying for example, "left, right, open, close, etc."

the symbols which are very rarely used (they are very few) and/or are difficult to pronounce (e.g. 304). For a fast and easy data entry method, said symbols may also be selected by speaking their position on a key, or relative to each other on said key. Of course they may be selected by using other speech such a pronouncing them.

e) Others

If needed, other symbols such as "F1-F12", etc. may be provided on the keys of the keypad and assigned a type of interaction. For example, they may be assigned to said second type of interaction (with or without using speech), or be assigned to another kind of interaction such as pressing two keys simultaneously, triple tagging on corresponding key(s), using a switch to enter to another mode, etc.

More Considerations to Enhance the Keypad and the Use of it

Because Digits 0-9, and letters A-Z may be placed on the keys of a keypad according to standard configuration and be assigned to a first type of interaction (e.g. a first level of pressure, a single tap, etc.) with said keys combined with speech, some keys such as 311, 312, 313, and 314, may contain at most one symbol (e.g. digit 1 on the key 311, or digit 0 on the key 313) used in said configuration. Thus, for better use of said keys, some easy and natural to pronounce symbols 321-324 may be added on said keys and be assigned to said first type of interaction. for example, a user can select the character "(" by using a first type of interaction with key 311 and saying, for example, "left", or "open". To select the character ")" the user may use the same first type of interaction with said key 311 and say for example, "right" or "close". This is a quick, and more importantly a natural speech for said symbols. Because the number of candidated symbols on said keys 311-314, assigned to said first type of interaction does not exceed the ones on the other keys, the voice recognition system may still have a similar degree of accuracy as for the other keys.

Also, some symbols may be used in both modes (interactions with the keys). Said symbols may be configured more than once on a keypad (e.g. either on a single key or on different keys) and be assigned to a first and/or to a second type of interaction with corresponding key(s).

FIG. 3, illustrates a preferred embodiment of this invention for a computer data entry system. The keys of the keypad 300 respond to two or more different interaction (such as different levels of pressures, single or double tap, etc.) on them. As shown, a number of symbols, such as alphanumerical characters, punctuations, functions, and PC command are distributed among said keys as follow:

Mode 1

First group—Letters A-Z and digits 0-9 are the symbols which are very frequently used during a data entry such as writing a text. They may easily and most importantly, naturally, be pronounced while pressing corresponding keys. Therefor they are arranged together on the same side on the keys, belonging to a same type of interaction (e.g. a first mode) such as a single tap (e.g. single press) on a key, and are selected by speaking them.

Second group—Characters such as punctuations, and functions which are very frequently used during a data entry such as writing a text, may belong to a same type of interaction which is used for selecting said letters and digits (e.g. said first mode). This is to stay, as much as possible, with a same type of interaction with the keys while entering data. Each key may only have one of said characters of said second group. This group of symbols may be selected by only pressing a corresponding key, without using voice. For better distinction, they are shown in boxes on the top (e.g. same side as for the letters and the digits) of the keys.

Mode 2

Other symbols of said number of symbols are shown on the bottom side of the keys of the keypad. They are assigned to a second type of interaction (e.g. double tap) with said keys.

Third group—The default symbols (e.g. those which require an interaction with a key and may not require use of voice) are shown in boxes. Said symbols comprise characters, punctuations, functions, etc., which are less currently used by users.

Fourth group—Finally the symbols which are rarely used in a data entry, and are not spelled naturally, are in this example, located at the left side on the bottom side of the keys. They may be selected by corresponding interaction (e.g. double tapping) with corresponding key and either (e.g. almost simultaneously) pronouncing them, or calling them by speaking a predefined speech or voice assigned to said symbols (e.g. "left, right", or "blue, red" etc.).

By using a keypad having keys corresponding to different type of interaction with them (preferably two types, to not complicate the use of the keys) and having some symbols which do not require speech (e.g. defaults), when a key of said keypad is interacted, either a desired key is directly interacted (e.g. default), or the candidated symbols to be selected by a user behavior such as voice/speech are minimal. This augments the accuracy of voice recognition system.

For example, when a user slightly presses a key, the system selects the symbols on the top of said key among those symbols situated on said key. If the user simultaneously uses a voice, then the system selects those symbols requiring voice among said selected symbols. This procedure of reducing the number of candidates and requiring voice recognition technology to select one of them, is used to have a data entry with high accuracy through a keypad having a limited number of keys. The reducing procedure is made by user natural behaviors, such as pressing a key and/or speaking.

Figure 4:
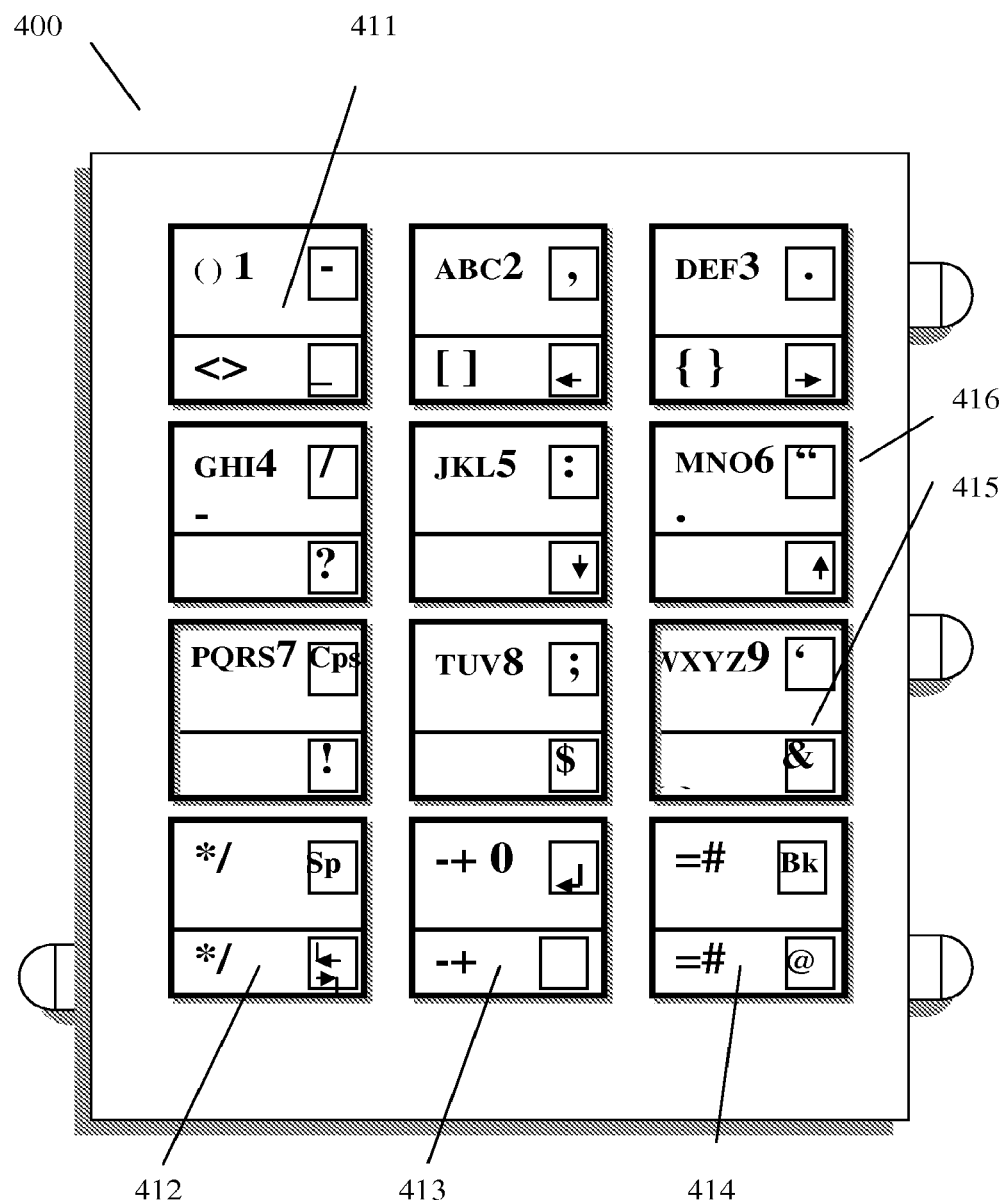
FIG. 4 illustrates a keypad, in accordance with one embodiment of the present invention.
Figure 5:
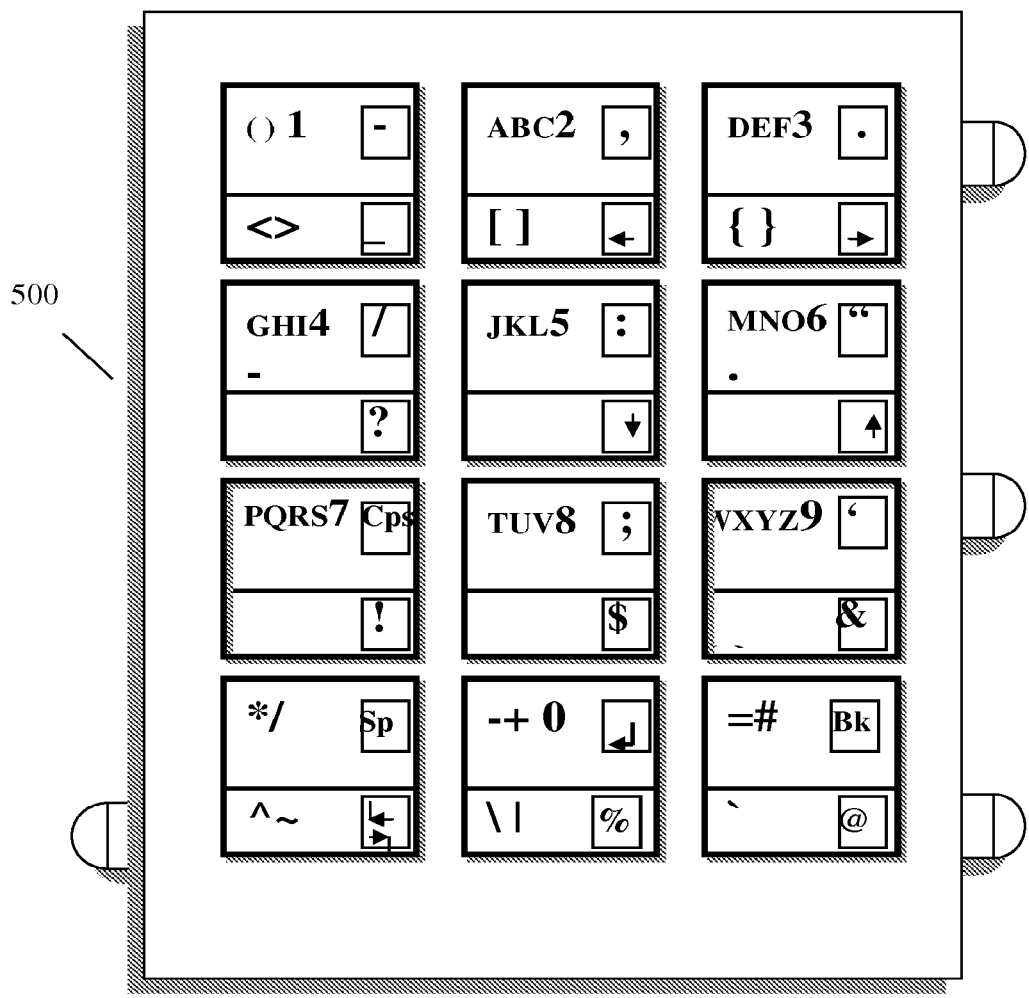
FIG. 5 illustrates a keypad, in accordance with one embodiment of the present invention.

As shown in FIG. 4, the keys 411, 412, 413, and 414, have up to one symbol (shown on the top side of said keys) requiring voice interaction and assigned to a first type of interaction with said keys. On the other hand, same keys on the bottom side contain two symbols which require a second type of interaction with said keys and also requires voice interaction. Said two symbols may be used more frequently (e.g. in an arithmetic data entry or when writing a software, etc.) than the other symbols belonging to same category. In this case and to still minimize the user errors while interacting with keys (e.g. pressing), said symbols may also been assigned to said first type of interaction with said keys. The total of the candidated symbol remains low. A user may press said key as he desires and speak.

Additional arrangements may be provided on above-mentioned keypad to facilitate its use by a user. For example, "-" and "_", """ and """, or ";" and ":" may be configured as default symbols on a same key 411, or on two neighboring keys 415, 416. Also "Sp" and " " (e.g. Tab), may also be considered as default symbols and been configured on the same key 412, each responding to a different type of interaction (e.g. pressing level) with said key. For example, by pressing once the key 412, the character "Sp" is selected. By double tapping the same key, the "tab" function is selected.

While interacting with a key (e.g. pressing a key once or double tagging on it), by not releasing said key, a symbol corresponding to said interaction (including speech if needed) may be selected and repeated until the key is released. For example, by double tapping on the key 415 and keeping the key pressed after the second tap and not speaking, the default symbol (e.g. "&") assigned to said interaction is selected and repeated until the user releases said key. To enter the letter "X" and repeating it, the user may for example, press the corresponding key 415 (without releasing it) and say "X". The letter "X" will be repeated until the user releases said key.

Also, for a more familiar look of the keypad, letters, digits, and characters such as "#" and "*", may be placed on said keys according to a standard telephone keypad configuration.

Figure 6:
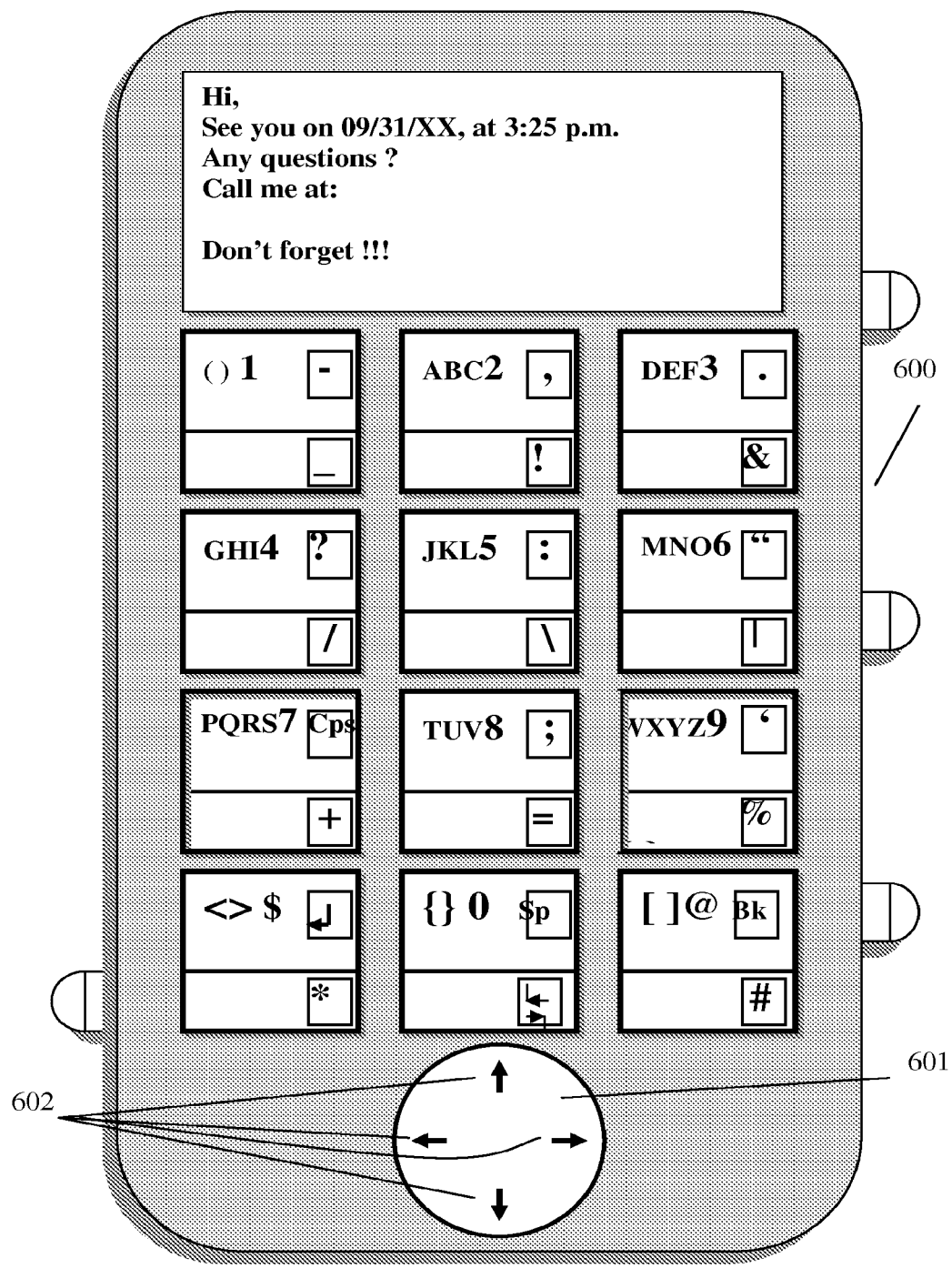
FIG. 6 illustrates a keypad with display, in accordance with one embodiment of the present invention.

Additional keys separately disposed from the keys of said keypad may be used to contain some of said symbols or additional symbols. In the example of FIG. 6, the cursor is navigated in different directions by at least one key separately disposed from the keys of the keypad 600. A single key 601, may be assigned to all directions 602. The user may, for example, press said key and say "up, down, left, or right to navigate the cursor in corresponding directions. The key 601, may also be a multi-directional key (e.g. similar to those used in video games, or in some cellular phones to navigate in the menu). The user may press on the top, right, bottom, or left side of the key 601, to navigate the cursor accordingly. Also a plurality of additional keys may be assigned, each to for example, to at least a symbol such as " ".

Said additional keys may be the existing keys on an electronic device. For example, in a cellular phone, in addition to the twelve keys of a standard telephone keypad, additional function keys such as menu key, or on/of key etc., are provided. at least some of those keys may be used as additional data entry keys, containing a number of symbols, while the system is, for example, in a text entry mode. This frees some spaces on the standard telephone keypad keys. The freed spaces may permit a better accuracy of voice recognition system and/or a more user friendly configuration of the symbols on the keys of the keypad.

The above-mentioned method of configuration and the examples shown before are only shown as examples. Of course many other configurations of the symbols and different assignment to different user interactions with the keys may be considered. For example, a key may not have a default symbol or on a key, there may be no symbols which are assigned to a voice/speech.

Also not all of the keys of the keypad may respond to a same kind of interaction. For example, a first key of a keypad may respond to two levels of pressure while another key of the same keypad may respond to a single or double tap on it.

FIGS. 1-7 show different configurations of the symbols on the keys of keypads.

The above-mentioned data entry system permits a full data entry such as a full text data entry through a computer keypad. By inputting, one by one, characters such as letters, punctuation marks, functions, etc, words, and sentences may be inputted.

This will have a great impact on telecommunication market permitting to enhance many applications and methods already in use. Some of them are listed hereafter. It is understood that any combination of the above-mentioned interactions may be used for inputting a desired symbol.

According to one embodiment of the invention, the user uses voice/speech to input a desired symbol such as a letter without other interaction such as pressing a key. The user may use the keys of the keypad (e.g. single press, double press, triple press, etc) to enter symbols such as punctuations without speaking them.

It is understood that the data entry method described in this application may be applied to all other languages such as Chinese, Koreans, Japanese, Etc.

Correction and Repeating of Symbols

Different methods may be used to correct an erroneously entered symbol. As mentioned, to enter a symbol, a user for example, may press a corresponding key and speak said desired symbol configured on said key. It may happen that the voice/speech recognition system misinterprets the user's speech and the system selects a non-desired symbol configured on said key.

For example, if the user:

a) recognizes an erroneously entered symbol before entering a next desired symbol (e.g. the cursor is positioned after said erroneous symbol, next to it), he then may proceed a correction procedure explained hereafter;

b) recognizes an erroneously entered symbol after entering at least a next symbol, he first may navigate in the text by corresponding means such as the key 101 (FIG. 1), or 202 (FIG. 2), having navigation functions, and positions the cursor after said erroneous symbol next to it. He, then, proceeds to a correction procedure explained hereafter;

After positioning the cursor after said erroneous symbol, next to it, the user may re-speak either said desired symbol or its position appellation without re-pressing said corresponding key. If the system again selects the same deleted symbol, it will automatically reject said selection and selects a symbol among remaining symbols configured on said key, wherein either its appellation or its position appellation corresponds to next highest probability corresponding to said user's speech. If still an erroneous symbol is selected by the system, the procedure of re-speaking the desired symbol by the user and the selection of the next symbol among the remaining symbols on said key with highest probability, may continue until said desired symbol is selected by the system.

It is understood that in a data entry system using a keypad having keys responding, for example, two levels of pressure, when correcting, the recognition system may first proceed to select a symbol among those belonging to the same group of symbols belonging to the pressure level applied for selecting said erroneous symbol. If none of those symbols is accepted by the user, then the system may proceed to select a symbol among the symbols belonging to the other pressure level on said key.

Figure 7:
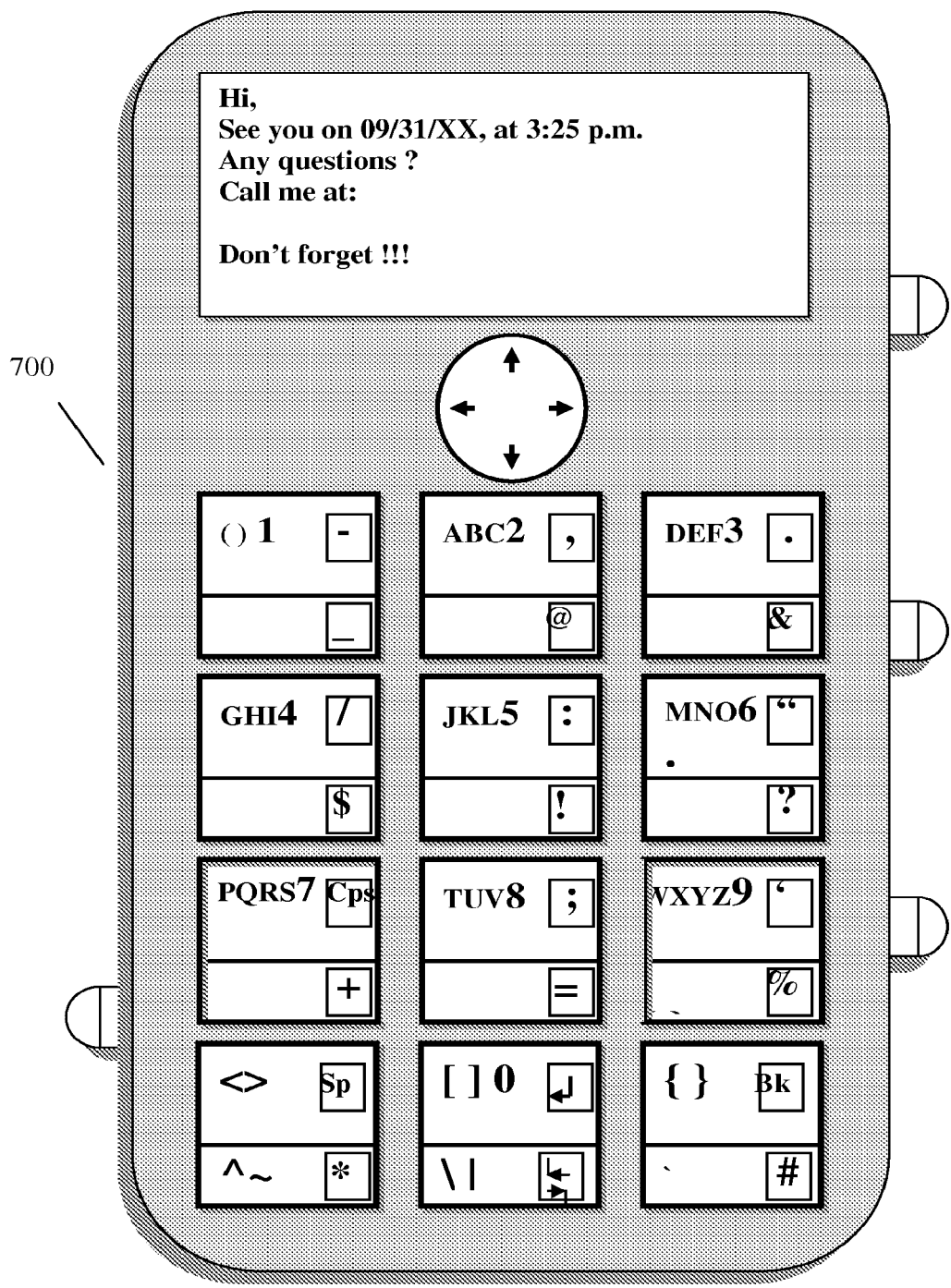
FIG. 7 illustrates a keypad with display, in accordance with one embodiment of the present invention.
Figure 7A:
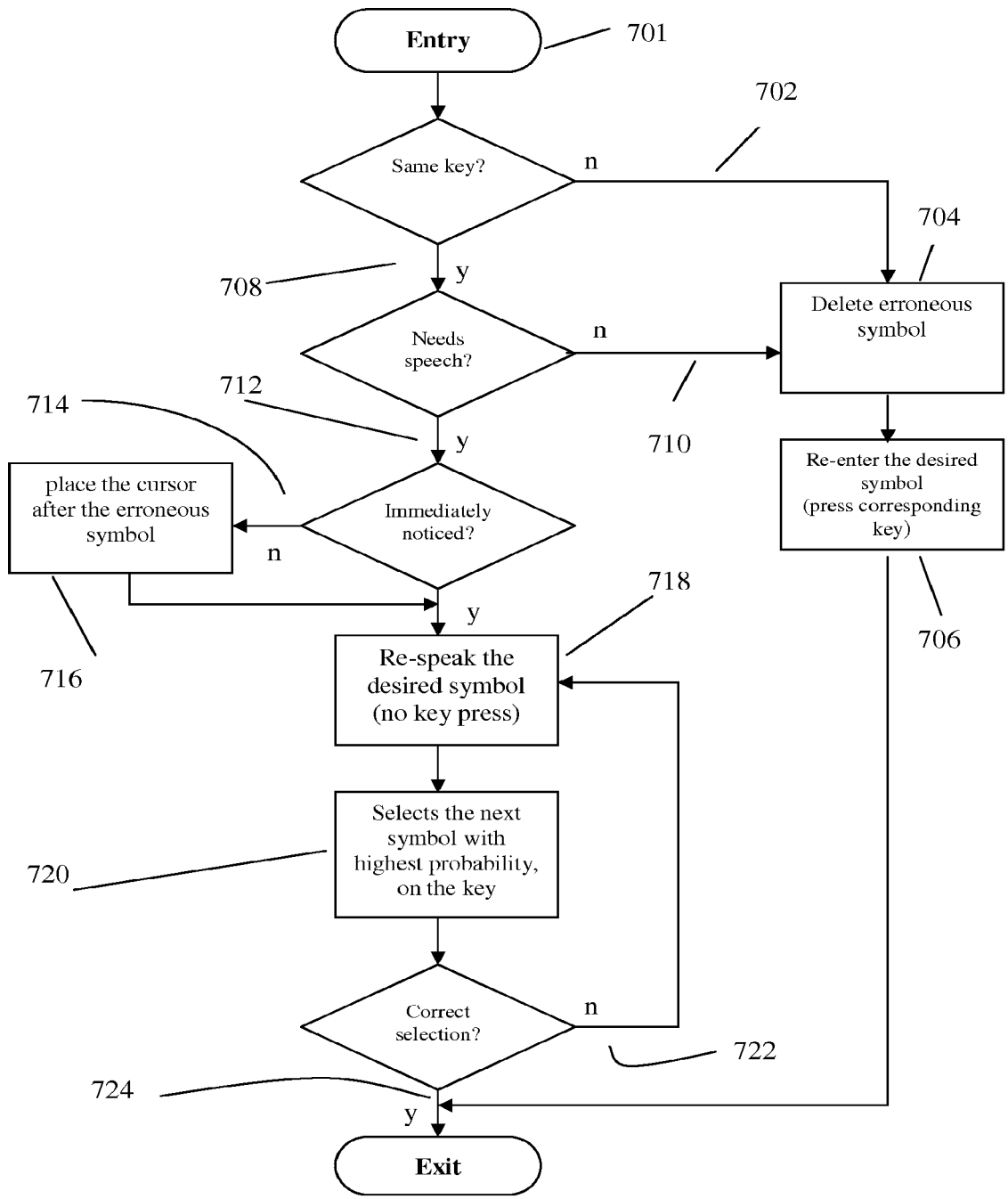
FIG. 7a illustrates a flow chart for making corrections, in accordance with one embodiment of the present invention.

FIG. 7*a*, shows a flowchart corresponding to an embodiment of a method of correction. If for any reason a user wants to correct an already entered symbol, he may enter this correction procedure.

Correction procedure starts at step 701. If the replacing symbol is not situated on the same key as the to-be-replaced symbol 702, then the user deletes the to-be-replaced symbol 704, and enters the replacing symbol by pressing a corresponding key and if needed, with added speech 706 and exits 724.

If the replacing symbol is situated on the same key as the to-be-replaced symbol 708, and the replacing symbol does not require speech 710, then the system proceeds to steps 704 and 706, and acts accordingly as described before, and exits 724.

If the replacing symbol is situated on the same key as the to-be-replaced symbol 708, and the replacing symbol does require speech 712, two possibilities are considered:

a) the cursor is not situated after the to-be-replaced symbol 714. In this case the user positions the cursor after the to-be-replaced symbol, next to it 716, and proceeds to next step 718;

b) the cursor is situated after the to-be-replaced symbol 714 (e.g. the user recognizes an erroneously entered symbol, immediately). In this case the user proceeds to next step 718;

At the step 718, the user speaks the desired symbol without pressing a key. By not pressing a key and only speaking, the system understands that a symbol belonging to a key which is situated before the cursor must be replaced by another symbol belonging to the same key. The system then, will select a symbol among the rest of the symbols (e.g. excluding the symbols already selected) on said key with highest probability corresponding to said speech 720. If the new selected symbol is yet a non-desired symbol 722, the system (and the user) re-enters at the step 718. If the selected symbol is the desired one the system exits the correction procedure 724.

Of course, instead of the above-mentioned method, a conventional method of correcting a symbol may also be provided. for example, to correct an already entered symbol, the user may simply, first delete said symbol and then re-enter a new symbol by pressing a corresponding key and if needed, with added speech.

The text entry system, may also be applied to a word level (e.g. the user speaks a word and types it by using a keypad). A same text entry procedure may combine word level entry (e.g. for words contained in a data base) and character level entry. Therefore the correction procedure described above, may also be applied for a word level data entry.

For example, to enter a word a user may speak said word and press the corresponding keys. If for any reason such as disambiguity between two words having closed pronunciation and similar key presses, the recognition system selects a non-desired word, then the user may re-speak said desired word without re-pressing said corresponding keys. The system then, will select a word among the rest of candidates words corresponding to said key presses (e.g. excluding the words already selected) with highest probability corresponding to said speech. If the new selected word is yet not the desired one, the user may re-speak said word. this procedure may be repeated until either said desired word is selected by the system or there is no other candidate word. in this case, the user can enter said desired word by character by character entry system such as the one explained before.

It is understood that in word level, when correcting, the cursor should be positioned after said to-be-replaced word. For this purpose and for avoiding the ambiguity with character correction mode, when modifying a whole word (word correcting level), the user may position the cursor after said to-be-replaced word wherein at least one space character separates said word and said cursor. This is because for example, if a user wants to correct the last character of an already entered word, he should locate the cursor immediately after said character. By positioning the cursor after at least one space after the word (or at the beginning of the next line, if said word is the last word of the previous line), and speaking without pressing keys, the system recognizes that the user may desire to correct the last word before the cursor. For better result, it is understood that if the to-be-replaced word contains a punctuation mark (e.g. "." "?" "," etc.), the cursor may be replaced after an space after the punctuation mark. This is because in some cases the user may desire to modify an erroneous punctuation mark which must be situated at the end of a word. For this purpose the user may position the cursor next to said punctuation mark.

To avoid accidental corrections (e.g. the cursor is positioned somewhere in the text and someone speaks without intending a data entry), different methods may be applied. For example, a pause or non-text key may be used while a user desires for example, to rest during a text entry. Another solution is that after the cursor is positioned in a location in a text, after a laps of time (for example two seconds) no correction of the last word or character before the cursor is accepted by the system. If a user desires to correct said word or said character he may, for example, navigate said cursor (at least one move to any direction) and bring it back to said desired position. After the cursor is repositioned in the desired location, the time will be counted from the start and the user should start correcting said word or said character before said laps of time is expired.

Repeating a Symbol

To repeat a desired symbol, the user, first presses the corresponding key and if required either speaks said symbol, or he speaks the position appellation of said symbol on its corresponding key or according to other symbols on said key. The system then selects the desired symbol. The user continues to press said key without interruption. After a predefined laps of time, the system recognizes that the user indents to repeat said symbol. The system repeats said symbol until the user stops pressing said key.

It should be noted that the above described method of correction and repeating of key symbol can be used in conjunction with any method of entry including but not limited to single/double tap, pressure sensitive keys, keys pressed simultaneously, keys pressed on only a portion thereof etc.

Telephone Directory

To make a phone call, instead of dialing a number, a user may enter a to-be-called destination by any information such as name (e.g. person, company, etc.) and if necessary enter more information such as the said to-be-called party address, etc. A central directory, may automatically direct said call to said destination. If there are more than one telephone lines assigned to a said destination (e.g. party), or there are more than one choice for said desired information entered by the user, a corresponding selection list (e.g. telephone numbers, or any other predefined assignments assigned to said telephone lines) may be transmitted to the caller's phone and displayed for example, on the display unit of his phone. Then the user may select a desired choice and make the phone call.

The above-mentioned method of calling (e.g. dialing), may permit to eliminate the need of calling a party (e.g., a person) by his/her telephone number. Therefor may eliminate (or at list reduces) the need of remembering phone numbers, carrying telephone books, or using an operator's aid.

Interactive Directories Using Voice/Speech

Voice directories are more and more used by companies, institutions, etc. This method of interaction with another party is a very time consuming and frustrating procedure for the users. Many people, by hearing a voice directory on the other side of the phone, disconnect the communication. Even when a person tries to interact with said system, it frequently happens that after spending plenty of time, the caller does not succeed to access a desired service or person. The main reason for this ambiguity is that when listening to a voice directory indication, many times a user must wait until all the options are announced. He (the user), many times does not remember all choices which were announced. He must re-listen to those choices.

Also many times the voice directory demands a data to be entered by a user. This data entry is limited in variation because of either the limited number of keys of a telephone keypad or the complexity of entering symbols through it.

The above-mentioned data entry method permits a fast visual interaction with a directory. The called party may transmit a visual interactive directory to the caller and the caller may see all choices almost instantly, and respond or ask questions using his telephone keypad (comprising the above-mentioned data entry system) easily and quickly.

Voice Mails

Voice mails may also be replaced by text mails. This method is already in use. The advantage of the method of data entry described above is evident when a user has to answer or to write a massage to another party. The data entry method of the invention is also dramatically enhances the use of massaging systems through mobile electronic devices such as cellular phones. One of the most known use is in the SMS.

The number of electronic devices using a telephone-type keypad is immense. The data entry method of this invention permits a dramatically enhanced data entry through the keypads of said devices. Of course this method is not limited to a telephone-type keypad. It may be used for any keypad wherein at least a key of said keypad contains more than one symbol.

Multi-Sectioned Keypad

The size of a keypad using the above-mentioned data entry method, may still be minimized by using a keypad having multiple sections. Said keypad may be minimal in size (e.g. as large as the largest section, for example as large as of the size of an adult user's fingertip or the size of a small keypad key) in a closed position, and maximized as desired when the keypad is in open position (depending on the number of sections used and/or opened).

Theoretically, in closed position, the keypad may even have the size of a key of said keypad.

Figure 8:
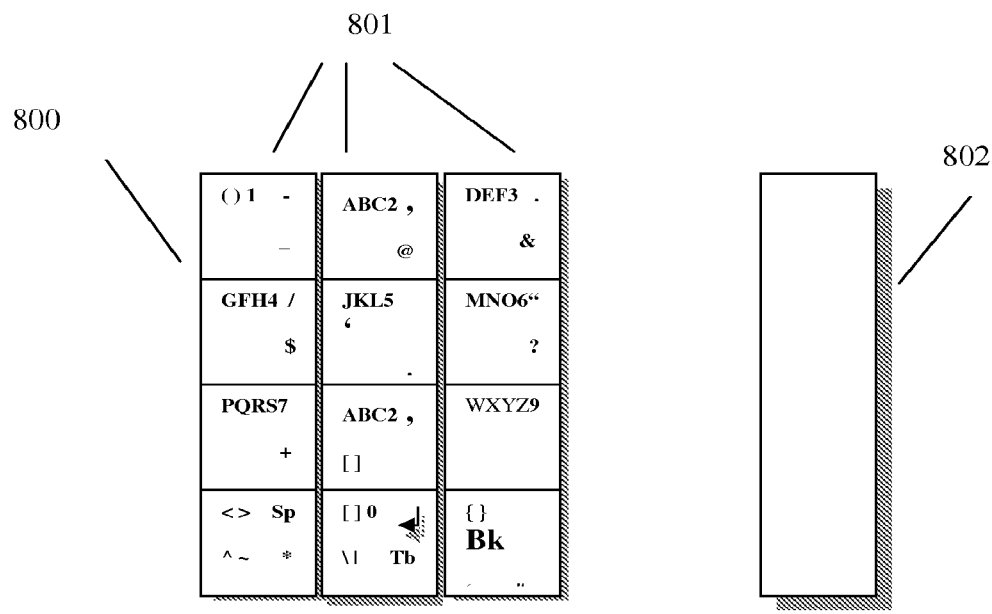
FIG. 8 illustrates a foldable keypad, in accordance with one embodiment of the present invention.

FIG. 8 shows one embodiment of said keypad 800 containing at least three sections 801, wherein each of said sections contains one column of the keys of a telephone keypad. When said keypad is in open position, a telephone-type keypad 800 is provided. In closed position 802 said keypad may have the width of one of said sections.

Figure 9:
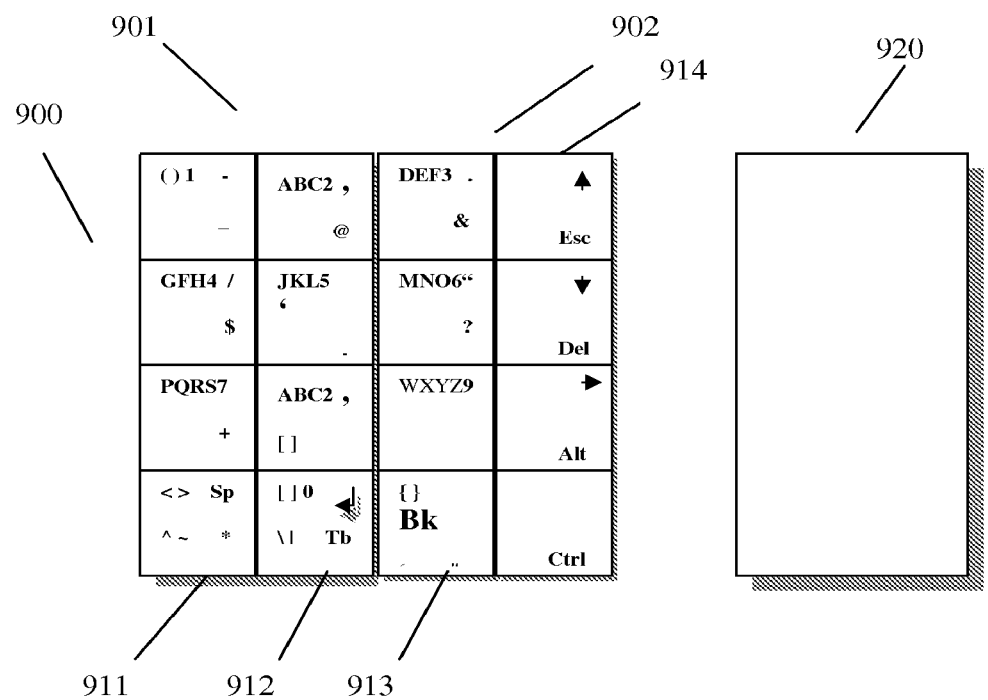
FIG. 9 illustrates a foldable keypad, in accordance with one embodiment of the present invention.

Another embodiment of said keypad is shown in FIG. 9. Said keypad 900 contains at least two sections 901-902 wherein a first section 901 contains two columns 911-912 of the keys of a telephone-type keypad, and a second section 902 of said keypad contains at least the third column 913 of said telephone-type keypad. When said keypad is in open position, a telephone-type keypad is provided. Said keypad, may also have an additional column 914 of keys arranged on said second section. In closed position 920 said keypad may have the width of one of said sections.

Figure 10:
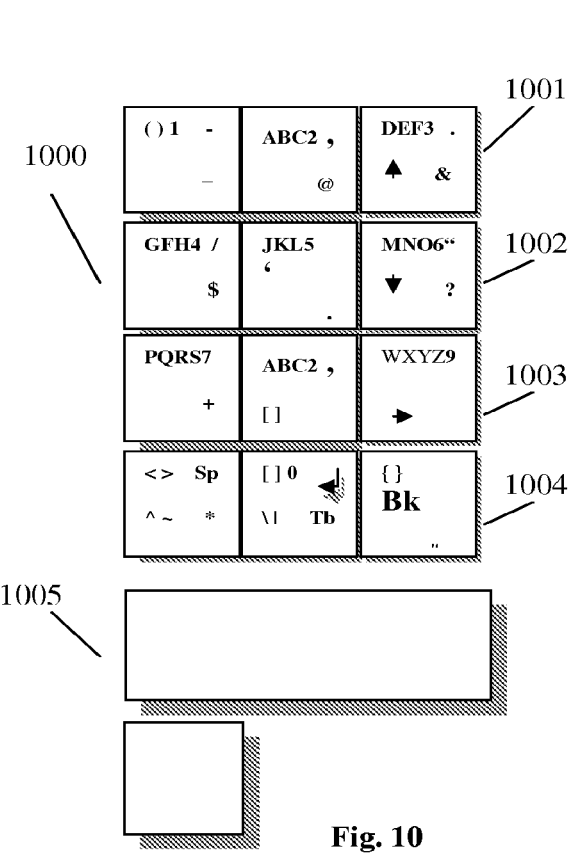
FIG. 10 illustrates a foldable keypad, in accordance with one embodiment of the present invention.

As shown in FIG. 10, another embodiment of said keypad 1000 contains at least four sections 1001-1004 wherein each of said sections contains one row of the keys of a telephone keypad. When said keypad is in open position, a telephone-type keypad is provided. In closed position 1005 the length of said keypad may the size of the width of one row of the keys of said keypad.

Figure 11:
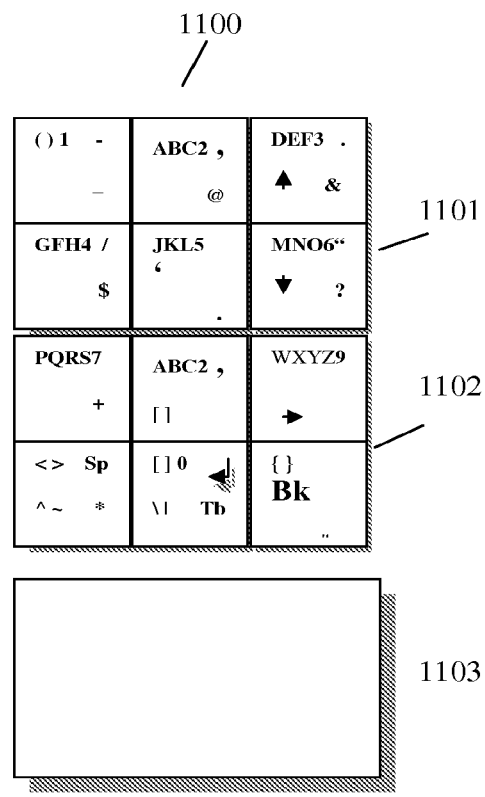
FIG. 11 illustrates a foldable keypad, in accordance with one embodiment of the present invention.

FIG. 11 shows another embodiment of said keypad 1100 containing at least two sections 1101-1102 wherein a first section contains two rows of the keys of a telephone-type keypad, and a second section of said keypad contains the other two rows of said telephone-type keypad. When said keypad is in open position, a telephone-type keypad is provided. In closed position 1103, the length of the keypad may be as the size of the width of one row of the keys of said keypad.

The above-mentioned multi-sectioned keypad has already been described in patent applications already filed by the inventor.

By using the above-mentioned data entry method through a multi-sectioned keypad as described, a miniaturized easy to use full data entry keypad may be provided. Such keypad may be used in many device, specially those having a limited size.

Of course, the above-mentioned symbol configuration may be used on said multi-sectioned keypad.

Figure 12:
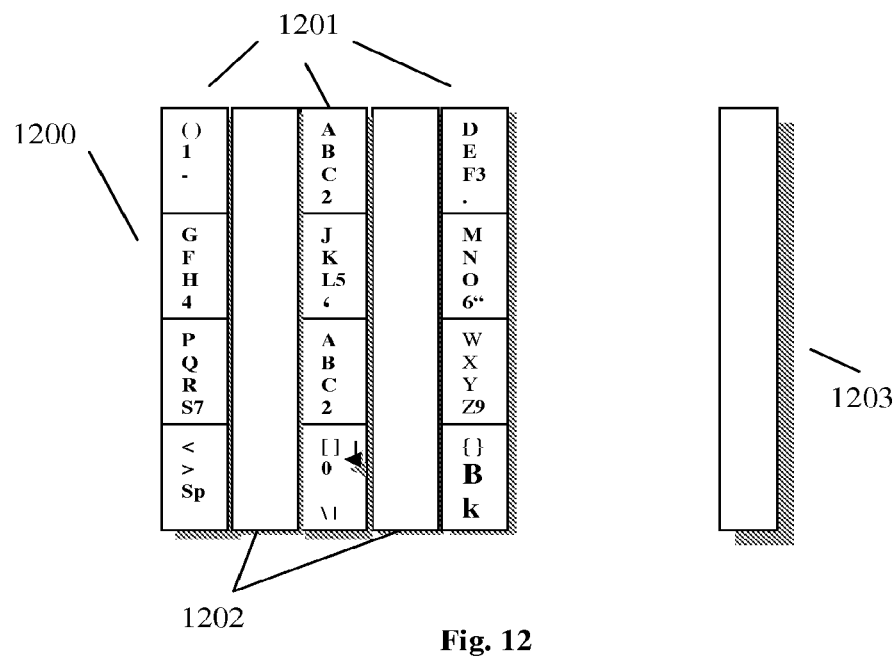
FIG. 12 illustrates a foldable keypad, in accordance with one embodiment of the present invention.

FIG. 12 shows another embodiment of a multi-sectioned keypad 1200. The distance between the sections having keys 1201 may be increased by any means. For example, empty (e.g. not containing keys) sections 1202, may be provided between the sections containing keys. This will permit more enlarged the distance between the sections when said keypad is in open position. On other hand, it also permits to have a still thinner keypad in closed position 1203.

A Data Entry Device Having Integrated Keypad and Mouse or Point and Click Device To enhance the data entry method through a keypad in general and through the keypad of this invention in particular, a point and click system, hereinafter a mouse, can be integrated in the back side of an electronic device having a keypad for data entry in its front side.

Figure 13:
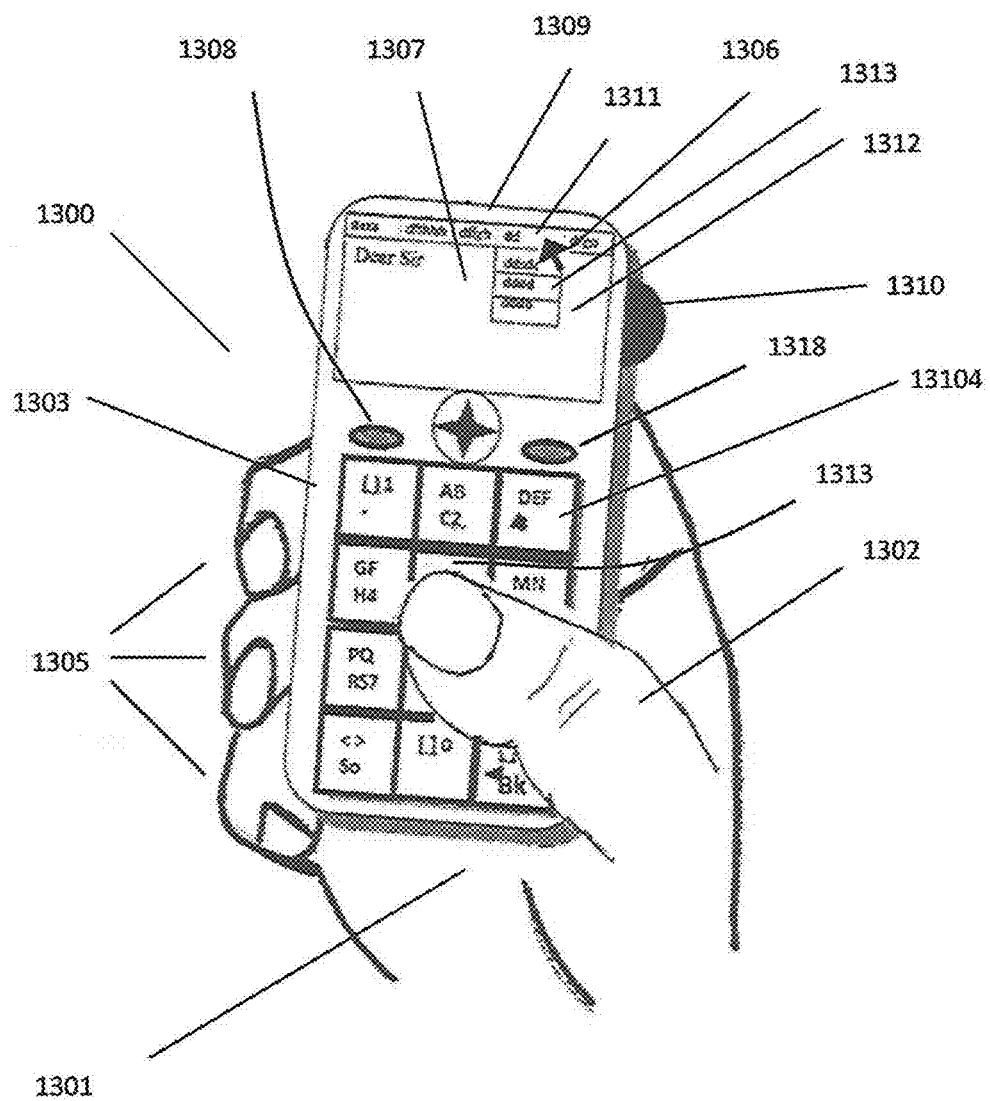
FIG. 13 illustrates a keypad with display, in accordance with one embodiment of the present invention.

FIG. 13, shows an electronic device such a cellular phone 1300 wherein a user holds in palm of his hand 1301. Said user may use only one hand to hold said device 1300 in his hand and in the same time manipulate its keypad 1303 located in front, and a mouse or point and click device (not shown) located on the backside of said device. The thumb 1302 of said user may use the keypad 1303, while his index finger 1304 may manipulate said mouse (in the back). Three other fingers 1305 may help holding the device in the user's hand.

The mouse or point and click device integrated in the back of said device may have similar functionality to that of a computer mouse. Also several keys (e.g. two keys) of either the telephone-type keypad or among the additional keys of said device may be assigned to the mouse click functions. for example, keys 1308 and 1318 may function with the integrated mouse of said device 1300 and have the similar functionality of the keys of a computer mouse. Said keys may have the same functionality as the keys of a computer mouse. For example, by manipulating the mouse, the user may navigate a Normal Select (pointer) indicator 1306 on the screen 1307 of said device and position it on a desired menu 1311. As for a computer mouse, said user then, for example, may tap (click) or double tap (double click) on a predefined key 1308 of said keypad (which is assigned to the mouse) to for example, select or open said desired menu 1311 which is pointed by said Normal Select (pointer) indicator 1306.

Because the display of mobile devices such as cellular phones has a small size, a rotating button 1310 may be provided in said device to permit to a user to, for example rotate the menu lists. For example, after a desired menu 1311 appears on the screen 1307, a user may use the mouse to bring the Normal Select (pointer) indicator on said desired menu and select it by using a predefined key such as one of the keys 1313 of the telephone-type keypad 1303 or one of the additional keys 1308 on said device, etc.

As for a computer, then the user may press said key to open the related menu bar 1312. To select a function 1313 of said menu bar 1312, the user may maintain said key pressed and after bringing the Normal Select (pointer) indicator 1306 on said function, by releasing said key, said function may be selected.

Other functionalities similar to those of a computer may be provided by using said keypad and said mouse.

Also, instead of using said keys assigned to a mouse, a user may use a predefined voice/speech or other predefined behavior(s) to replace the functions of said keys. For example, after positioning the Normal Select (pointer) indicator 1306 on an icon, instead of pressing a key, the user may say "select" or "open" to select or open the application represented by said icon.

Figure 14:
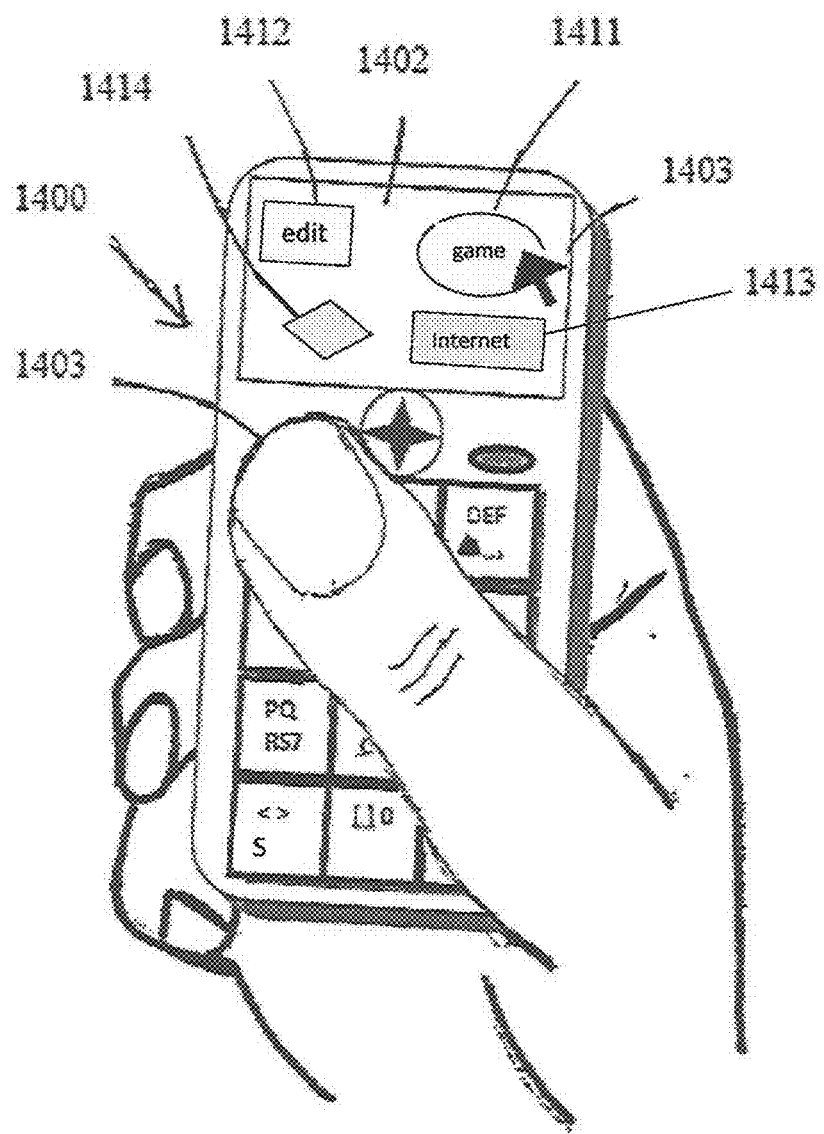
FIG. 14 illustrates a keypad with display, in accordance with one embodiment of the present invention.

FIG. 14, shows an electronic device such as a mobile phone 1400. A plurality of different icons 1411-1414 representing different applications, are displayed on the screen 1402 of said device. To select and/or open one of the applications, as for computers, by using a mouse, a user may bring the a Normal Select (pointer) indicator 1403, on a desired icon 1411. Then said user may select said icon by for example pressing once, a predefined key 1404 of said keypad. To open the application represented by said icon, the user, for example, may double tap on a predefined key 1404 of said keypad.

Figure 15:
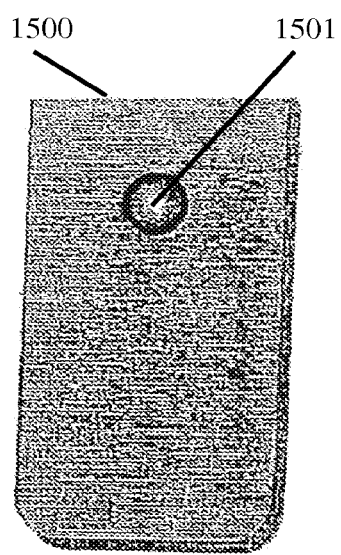
FIG. 15 illustrates a keypad with a mouse, in accordance with one embodiment of the present invention.

The mouse integrated in the backside of an electronic device may be of any type. For example, FIG. 15 shows the backside of an electronic device 1500 such as the ones shown in FIGS. 13-14. The mouse 1501, is similar to a conventional computer mouse. It may be manipulated, as described, with a user's finger. It may also be manipulated like a conventional computer mouse, by laying the device on a surface such as a desk and swiping said mouse on said surface.

Figure 16:
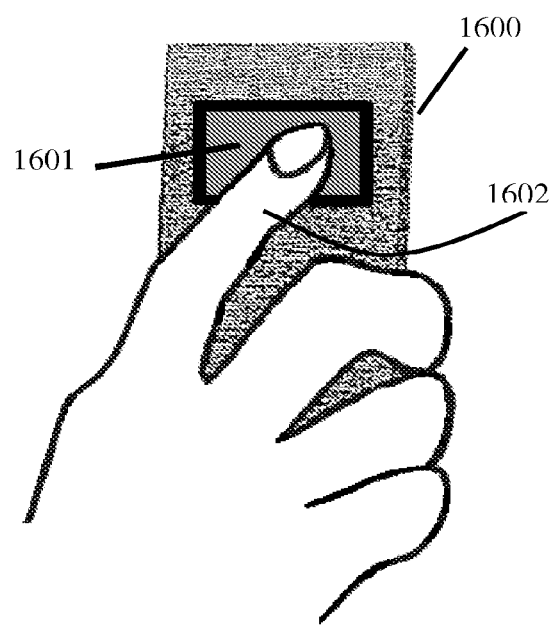
FIG. 16 illustrates a keypad with a mouse, in accordance with one embodiment of the present invention.

FIG. 16, shows another conventional type of mouse (a sensitive pad) integrated on the backside of an electronic device 1600 such as the ones shown in FIGS. 13-14. The mouse 1601, is similar to a conventional computer mouse. It may be manipulated, as described, with a user's finger. in this example, preferably as described before, while holding the device in the palm of his hand, the user uses his index finger 1602 to use (e.g. to manipulate) said mouse. Accordingly to this position, the user uses his thumb (not shown) to manipulate the keys of a keypad (not shown) which is located in the front side (e.g. other side) of said device.

Mobile devices should preferably, be manipulated by only one hand. This is because while the users are in motion (e.g. being in a bus or in a train) the users may use the other hand for other purposes such as holding a bar while standing in a train or using one hand to hold a newspaper or a briefcase).

By implementing the mouse in the back of a device such as a mobile phone, the user may manipulate said device and to enter data with one hand. He can use simultaneously, both, the keypad and the mouse of said device.

Of course, if he desires, said user can use his both hands to manipulate said device and its mouse.

Another method of using said device is to dispose it on a surface such as on a desk and slide said device on said surface in a same manner as a regular computer mouse and enter the data using said keypad.

It is understood that the any type of mouse including the ones described before, may be integrated in any part of a mobile device. For example, a mouse may be located in the front side of said device. Also said mouse may be located on a side of said device and being manipulated simultaneously with the keypad by fingers explained before.

It should be noted that a mouse has been used through out this discussion, however any point and click data entry device such as stylus computer integrated in an electronic device and combined with a telephone-type keypad is within the contemplation of the present invention.

External Integrated Data Entry Unit

Also, an external integrated data entry unit comprising a keypad and mouse may be provided and used in electronic devices requiring data entry means such as keyboard (or keypad) and/or mouse. There may be provided an integrated data entry unit having the keys of a keypad (e.g. a telephone-type keypad) in front of said unit and a mouse being integrated within the back of said unit. Said data entry unit may be connected to a desired device such as a computer, a PDA, a camera, a TV, a fax machine, etc.

Figure 19:
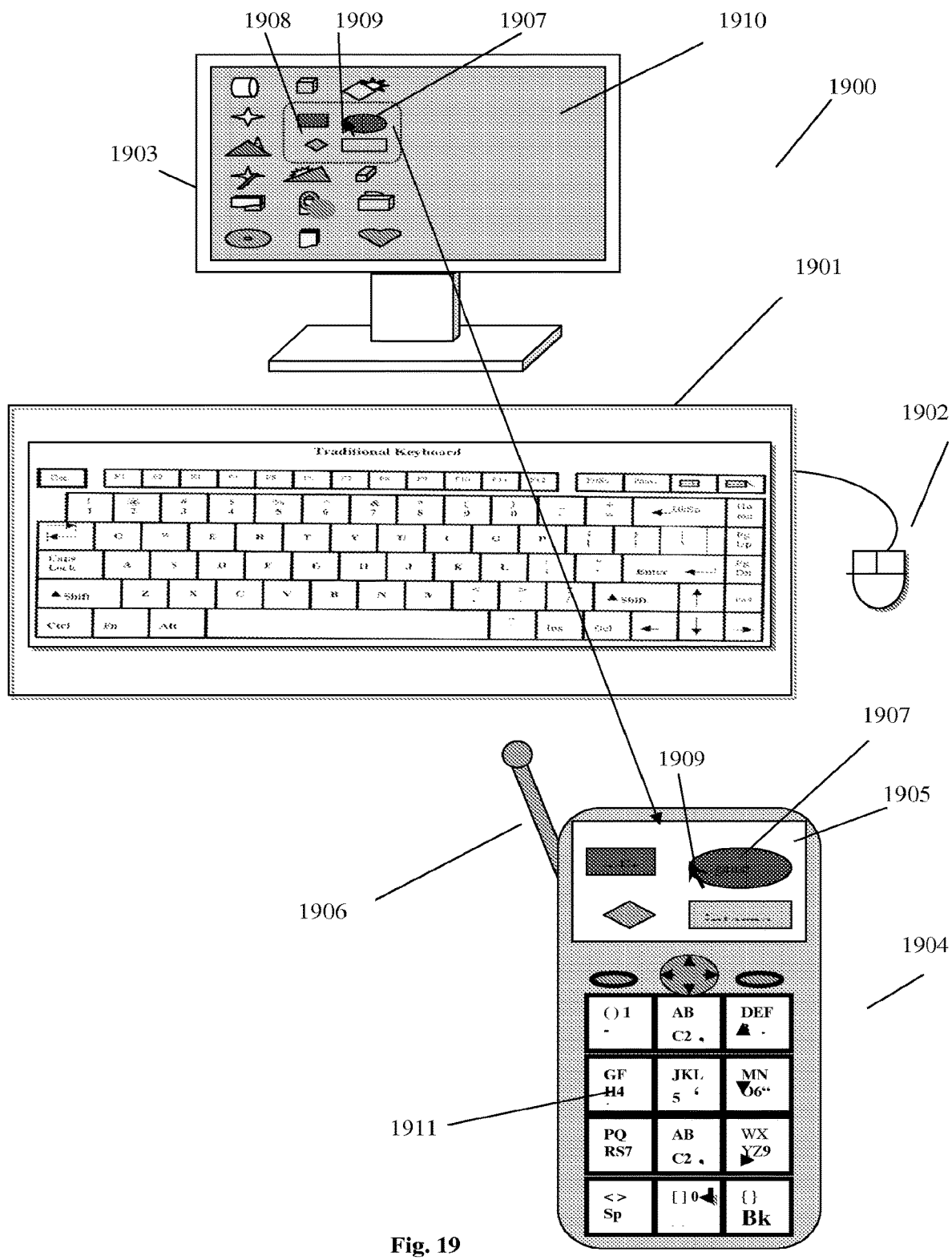
FIG. 19 illustrates a keypad with a display and PC, in accordance with one embodiment of the present invention.

FIG. 19 shows a computer 1900 comprising a keyboard 1901, a mouse 1902, a monitor 1903 and other computer accessories (not shown). In some circumstances (e.g. when a user does not desire to sit down on a desk chair in front of a monitor and he prefers, for example, to lie down on his bed while interacting with said computer) instead of a large keyboard and/or corresponding mouse a user may utilize a small external integrated data entry unit. There may be provided an external data entry unit 1904 containing features such as keypad keys 1911 positioned on the front side of said data entry unit, a microphone which may be an extendable microphone 1906, a mouse (not shown) integrated within the back side of said data entry unit (described before). Said data entry unit may be (wirelessly or by wires) connected to said electronic device (e.g. said computer 1900). An integrated data entry system such as the one described before (e.g. using voice recognition systems combined with interaction of keys by a user) may be integrated either within the said electronic device (e.g. said computer 1900) or within said data entry unit 1904. Also a microphone may be integrated within said electronic device (e.g. computer). Said integrated data entry system may use one or both microphones located on said data entry unit or within said electronic device. (e.g. computer).

For a better view of while interacting, specially when interacting from far with an electronic device such as said computer 1900, a display unit 1905 may be integrated within said a entry unit such as said integrated data entry unit 1904 of this invention. When interacting from far with a monitor 1903 of said electronic device 1900, a user may have a general view of the display 1910 of said monitor 1903. A closed area 1908 around the arrow 1909 or another area selected by using the mouse on the display 1910 of said monitor 1903 may simultaneously be shown on said display 1905 of said data entry unit 1904. The size of said area 1908 may be defined by manufacturer or by the user. Preferably the size of said area 1908 may be closed to the size of the display 1905 of said data entry unit 1904. This may permit a closed and/or if desired a real size view of the interacting area 1908 to the user (e.g. by seeing said area on the data entry screen 1905). While having a general view of the display 1910 of the monitor 1903, a user may have a particular closed view of the interacting area 1908 which is simultaneously shown on the display 1905 of said data entry unit 1904. For example a user may use the keypad mouse (not shown, in the back of the keypad) to navigate the arrow 1909 on the computer display 1910. Simultaneously said arrow 1909 and the area 1908 around said arrow 1909 on said computer display 1910 may be shown on the keypad display 1905.

For an interaction such as opening a file, a user may for example, navigate an arrow 1909 on the screen 1910 of said computer an position it on a desired file 1907. Said navigated areas 1908 and said file 1907 may be seen on said data entry screen 1905. By having the display 1905 of said data entry unit 1904 closed to his eyes, a user can clearly see his interactions on the display 1905 of said data entry unit 1904 while having a general view on a large display 1910 of said electronic device 1900 (e.g. computer).

It is understood that said interaction area 1908 may be defined and vary according to different needs or definitions. For example, said interacting area may be the area around an arrow 1909 wherein said arrow is in the center of said area or said area is the area at the right, left, top, bottom, etc. of said arrow or any area on the screen of said monitor, regardless of the location of said arrow on the display of said monitor).

Figure 20:
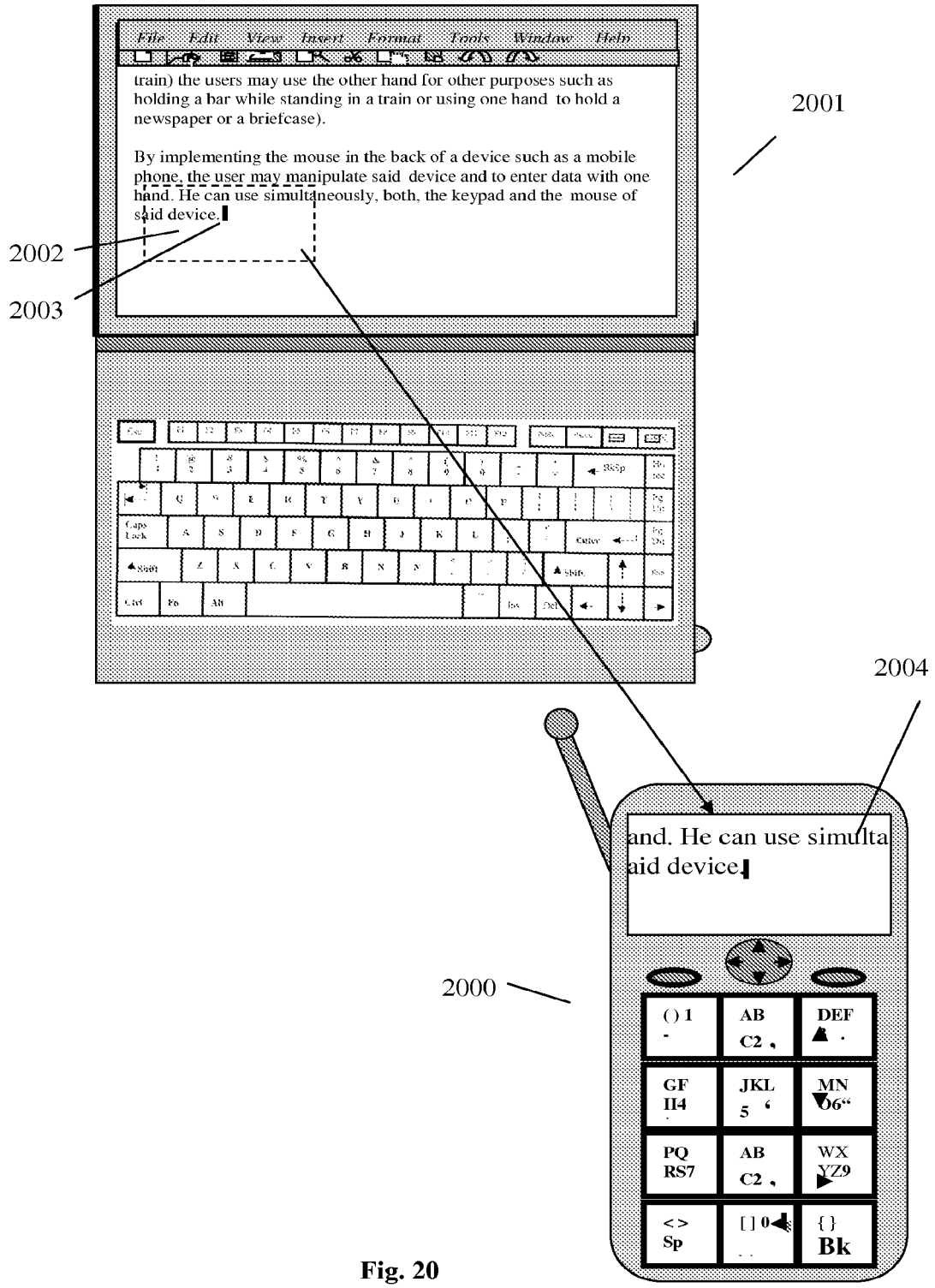
FIG. 20 illustrates a keypad with a display and PC, in accordance with one embodiment of the present invention.

FIG. 20 shows a data entry unit 2000 such as the one described before being connected to a computer 2001. During a data entry such as a text entry, the area 2002 around the interacting point 2003 (e.g. cursor) is simultaneously shown on the keypad display 2004.

Figure 21A:
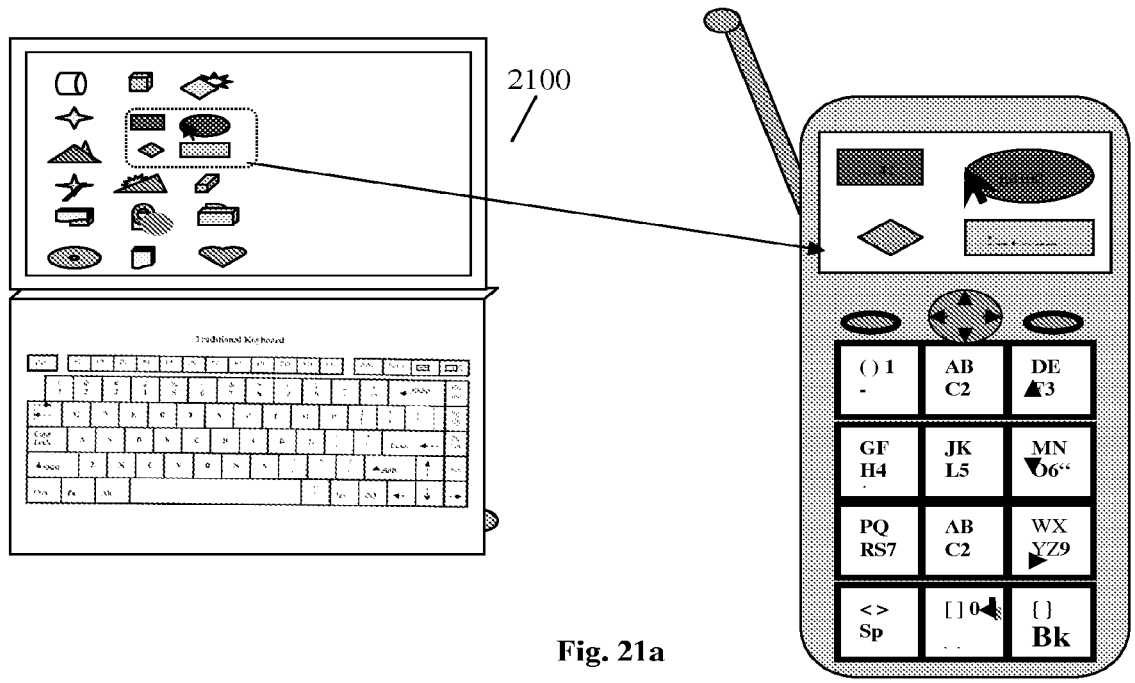
FIG. 21a illustrates a keypad with a display and laptop computer, in accordance with one embodiment of the present invention.
Figure 21B:
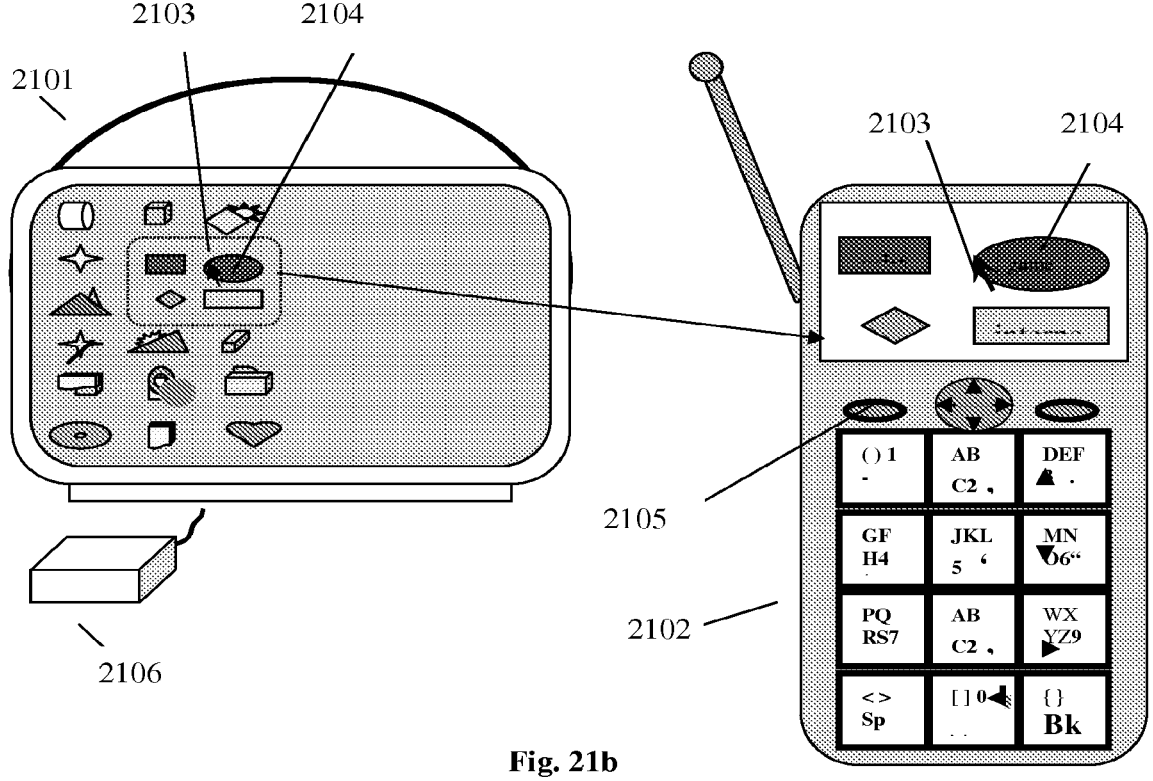
FIG. 21b illustrates a keypad with a display and a display screen, in accordance with one embodiment of the present invention.

FIGS. 21a-21b show an example of different electronic devices which may use the above described data entry unit. FIG. 21a shows a computer 2100 and FIG. 21b shows a TV 2101. The data entry unit 2102 of said TV 2101 may also operate as a remote control of said TV 2101. For example, by using the mouse (not shown) situated in the back side of said data entry unit 2102, a user may locate a selecting arrow 2103 on the icon 2104 representing a movie or a channel and opening it by double tapping (double clicking) on a key 2105 of said data entry unit. Of course said data entry unit 2102 of said TV may also be used for data entry such as internet through TVs or sending massages through TVs, cable TVs, etc. In this case the integrated data entry system of this invention may be integrated within for example, the TV's modem 2106.

Extendable Microphone

An extendable and/or rotatable microphone may be integrated in electronic devices such as cellular phones. Said microphone may be a rigid microphone being extended towards a user's mouth.

With the advancement of the technology, new input systems and devices are coming to the market to permit easy interacting with instruments. Many of those input systems use voice/speech recognition system wherein a user speaks the data or commands to be input. Because it is a natural way to input data, voice recognition system is becoming very popular. Computers, telephones, toys, and many other instruments are equipped with this different kinds of data entry system using voice recognition systems.

Although this is a good method of input, it has an important shortcoming. It is not a discrete method of input. A user, usually, does not want others to hear what he speaks, and in the other hand people do not like other people's loud speaking.

To overcome (or at least reduce) significantly this problem, the user must speak quietly. To not cause misinterpretation of user's voice/speech by a voice recognition system, the microphone must be closed to user's mouth.

It is the subject of this invention to provide instruments using a user's voice as data, with a microphone extending from said instruments towards the user's mouth.

There are many advantages using such a microphone. One advantage of such a microphone is that by extending said microphone towards said user's mouth and speaking closed into it the voice/speech recognition system may better distinguish and recognize said voice/speech. Another advantage is that by positioning said microphone close to user's mouth (e.g. next to the mouth), a user may speak silently (e.g. whisper) into it. This permits an almost silent and a discrete data entry. Still, another advantage of said microphone is that because of being integrated in corresponding electronic device, in order to keep said microphone in a desired position (e.g. close to a user's mouth), a user may not have to hold said microphone by his hand(s). Also, said user does not have to carry said microphone separately from said electronic device.

By combining the features such as the enhanced keypad of the invention, the mouse, the extendable microphone and the data entry method in a manner such as the manners explained before, either in an electronic device or as an external unit to be connected to an electronic device, a completely enhanced data entry system may be provided. A user, may for example, by only using one hand, hold an electronic device such as a data entry device (e.g. mobile phone, PDA, et.), use all of the features such as the enhanced keypad, integrated mouse, and the extendable microphone, etc., and in the same time by using his natural habitudes (e.g. pressing keys of the keypad and in needed, speaking) provide a quick, easy, and specially natural data entry.

One of the most important applications of the extendable microphone is when the data entry systems of mobile communication devices combine use of keypad and voice/speech recognition system. In this method a user interacts with a key (for example by pushing it), and in the same time he may speak for example, a symbol on said key. In order to press a key containing a desired symbol, the user may need to see the keypad. He also may need to see the data on a display of the device. In the other hand, the user may prefer to speak said symbols quietly. The extendable microphone permits to position the mobile phone far from eyes, enough to see that keypad, and in the same time to have the microphone closed to the mouth, permitting to speak quietly.

As they many people are used to, they may hold their mobile phone in one hand, while pressing the keys of the keypad with a thumb of the same hand. The second hand may be used to either hold said hand around the microphone to reduce the outside noise, or to keep the microphone in an optimal relationship with the mouth.

If the microphone of an instrument is wireless, or the member connecting it with the instrument is made from non-rigid materials, the user may hold the microphone in a manner to position it at the palm side of his hand, between two fingers. Then by positioning the palm o said hand around the mouth he can significantly reduce the outside noise while speaking.

It is understood that the user interface containing the data entry unit and the display, of an electronic device using a user's voice to input data, may be of any kind. For example, instead of a keypad it may contain a touch sensitive pad, or it may be equipped only with a voice recognition system without the need of a keypad.

Figure 18A:
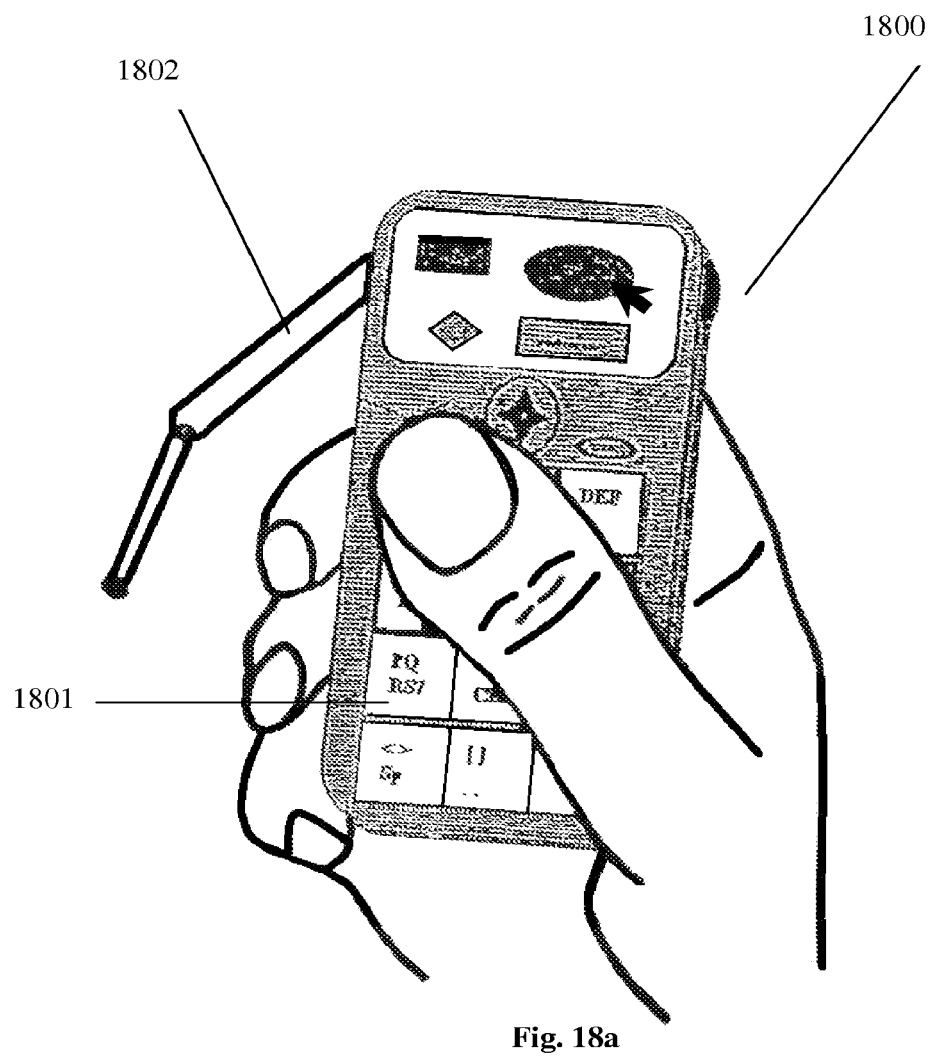
FIG. 18a illustrates a keypad with a microphone, in accordance with one embodiment of the present invention.

FIG. 18a, shows according to one embodiment of the invention, an electronic device 1800 such as a cellular phone or a PDA. As shown, the keypad 1801 is located in the front side of said device 1800. A mouse (not shown) is located in the backside of said device 1800, An extendable microphone 1802 is also integrated within said device. Said microphone may be extended and positioned in a desired position (e.g. next to the user's mouth) by a user. Said device may also contain a data entry method as described before. By using only one hand, a user may proceed to a quick and easy data entry with a very high accuracy. Positioning said microphone next to user's mouth, permits a better recognition of the voice/speech of the user by the system. Said user, may also speak silently (e.g. whisper) into said microphone. This permits an almost silent data entry.

Figure 18B:
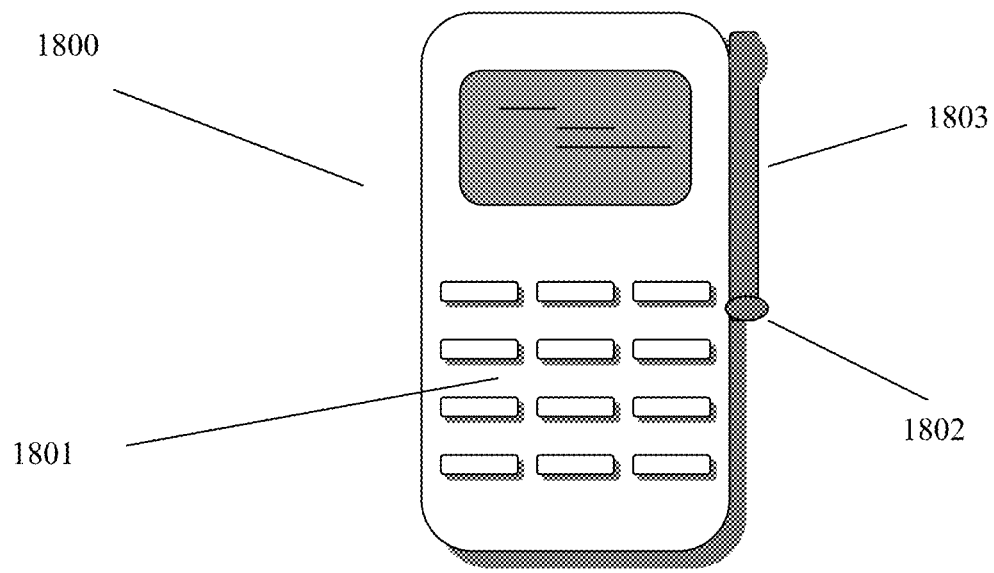
FIG. 18b illustrates a keypad with a microphone, in accordance with one embodiment of the present invention.
Figure 18C:
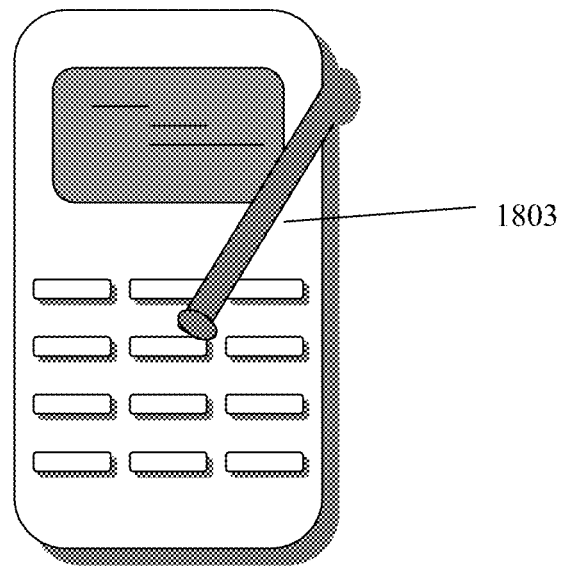
FIG. 18c illustrates a keypad with a microphone, in accordance with one embodiment of the present invention.

In alternative embodiments of the present invention FIGS. 18b to 18c, show a mobile phone 1800 having a keypad 1801 and a display unit. The mobile phone is equipped with a pivoting section 1803 with a microphone 1802 installed at its end. By extending the microphone towards his mouth, the user may speak quietly into the phone and in the same time being capable to see the display and keypad 1801 of his phone and eventually use them simultaneously while speaking to microphone 1802.

Figure 18D:
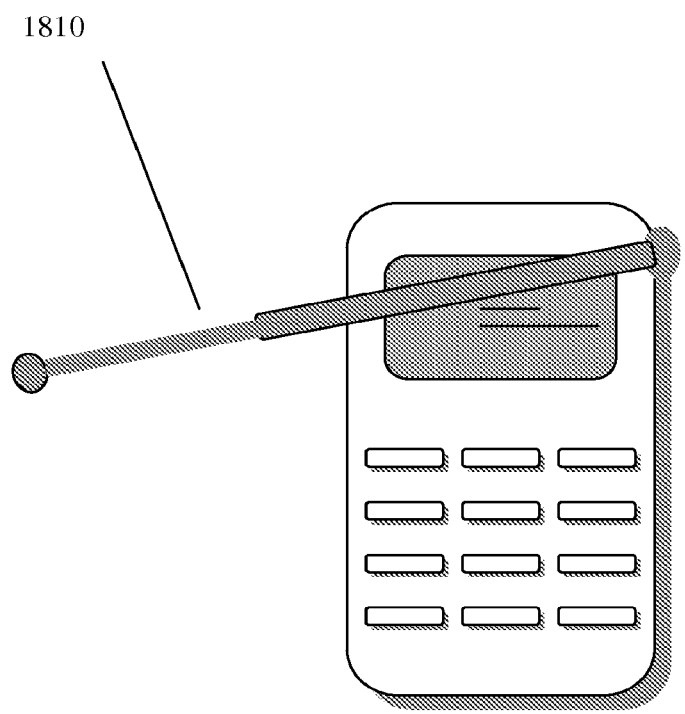
FIG. 18d illustrates a keypad with a microphone, in accordance with one embodiment of the present invention.

FIG. 18d, shows a rotating extendable microphone 1810 to permit a user to position the instrument at a convenient relationship to him, and in the same time by rotating and extending the microphone accordingly, to bring microphone 1810 close to his mouth or to a desired location. It must be noted that the member connecting the microphone to the instrument may have at least two sections, being extended/retracted according to each other and to the instrument. They may have folding, sliding, telescopically and other movement for extending or retracting.

Figure 18E:
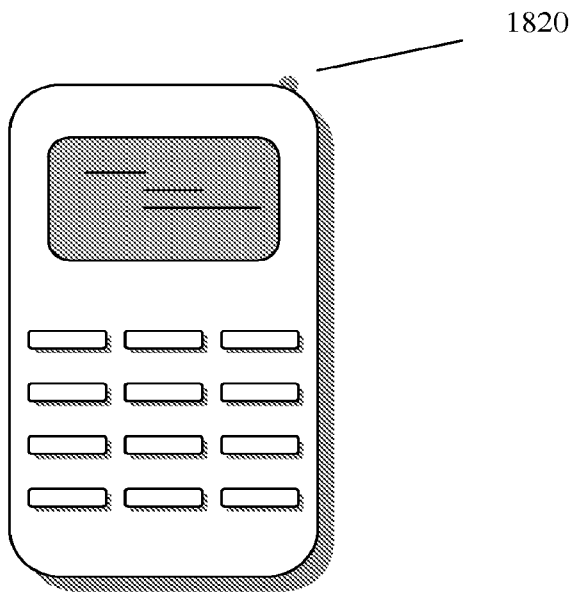
FIG. 18e illustrates a keypad with an antenna, in accordance with one embodiment of the present invention.
Figure 18F:
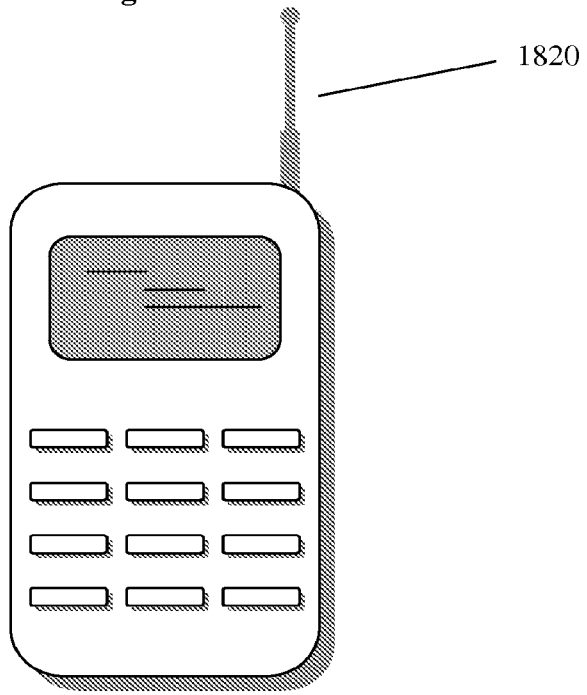
FIG. 18f illustrates a keypad with an antenna, in accordance with one embodiment of the present invention.

FIGS. 18e and 18f, shows an integrated rotating microphone 1820 being telescopically extendable. In this embodiment, the extendable section comprising microphone 1820 may be located in the instrument. When desired, a user may pull this section out and extend it towards his mouth. Microphone 1820 may also be used, when it not pulled out.

Figure 18G:
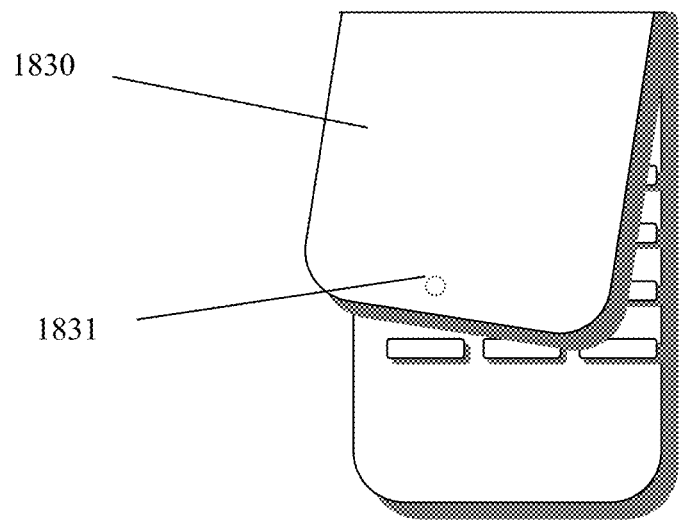
FIG. 18g illustrates a keypad with a microphone, in accordance with one embodiment of the present invention.
Figure 18H:
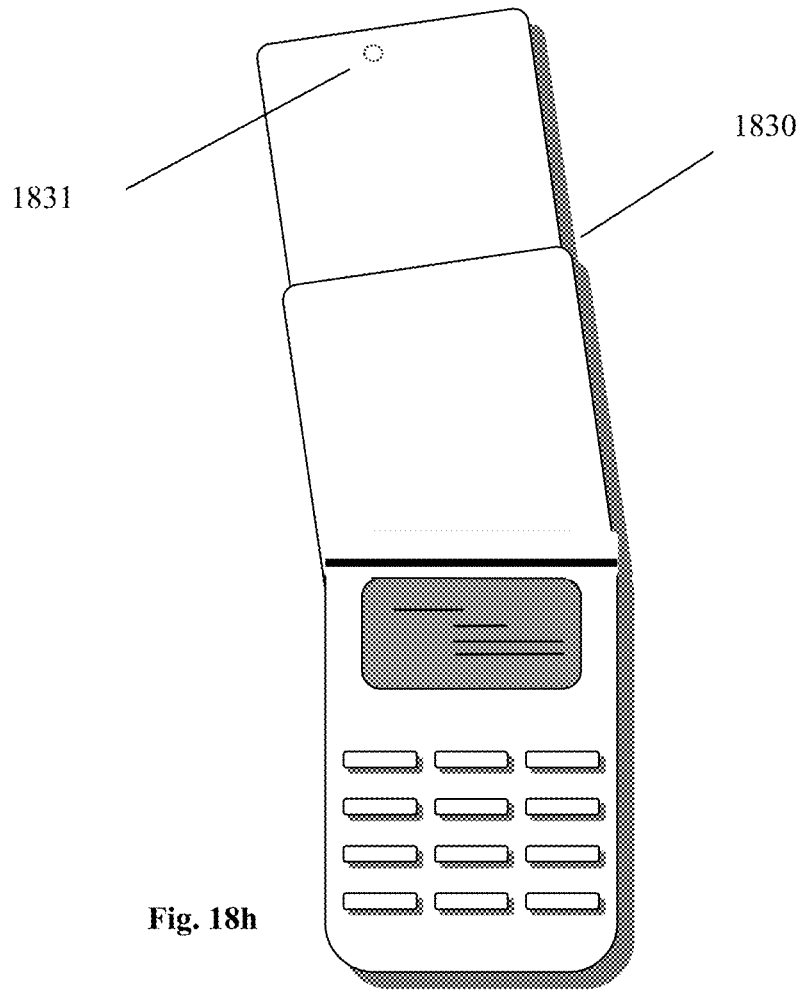
FIG. 18h illustrates a keypad with a microphone, in accordance with one embodiment of the present invention.

According to another embodiment of the invention as shown in FIGS. 18g and 18h, the extending member 1830 containing a microphone 1831, may be a section of a multi-sectioned device. This section may be used as the cover of said device. The section comprising the microphone 1831 may itself been multi-sectioned to be extendable and/or adjustable as desired.

Figure 18I:
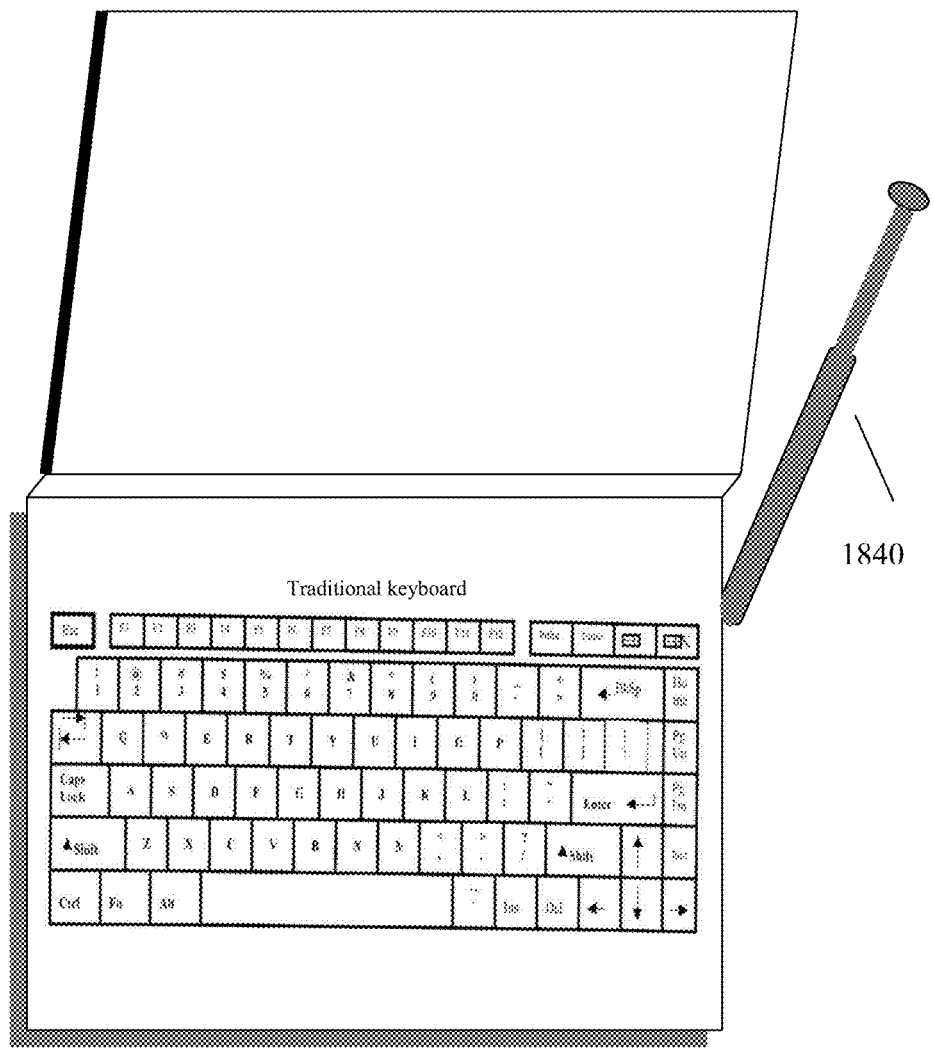
FIG. 18i illustrates a keyboard with a microphone, in accordance with one embodiment of the present invention.

According to embodiment shown in FIG. 18i, an extendable microphone 1840 as described before, may be installed in a computer or similar devices.

Also, according to another embodiment of the invention, a microphone of an instrument may be attached to a user's ring, or itself being shaped like a ring, and be worn by said user. This microphone may be connected to said instrument, either wirelessly or by wire. When in use, the user approaches his hand to his mouth and speaks.

It is understood that instruments shown in the drawings are shown as example. The extendable microphone may be installed in any instrument. It may also be installed at any location on extending section.

In communication devices, the extending section comprising the microphone may be used as the antenna of said instruments. In this case the antennas may be manufactured as sections described, and contain integrated microphones.

It must be noted that in addition to at least an extendable microphone, an instrument may comprise at least one additional regular microphone, wherein said microphones may be used separately or simultaneously with said extendable microphone.

It must be noted that the extendable member comprising the microphone may be manufactured with rigid materials to permit positioning the microphone in a desired position without the need of keeping it by hand. For better manipulation, the section comprising the microphone may also be manufactured by semi rigid or soft materials.

It must be noted that any extending/retracting methods such as unfolding/folding methods may be used.

As described before, the integrated keypad and/or the mouse and/or the extendable microphone of this invention may also be integrated within a variety of electronic devices such as a PDA, a remote control of a TV, and a large variety of other electronic devices. For example, by using said integrated keypad and mouse within remote control of a TV, a user may point on an icon, shown on the TV screen relating to a movie and select said movie by using a predefined key of said remote control.

Also, as described, said integrated keypad and/or mouse and/or extendable microphone may be manufactured as a separated device and to be connected to said electronic devices.

Of course said keypad, alone or integrated with said mouse and/or said extendable microphone, may be combined with a data and text entry method such as the data entry method of this invention.

Figure 17:
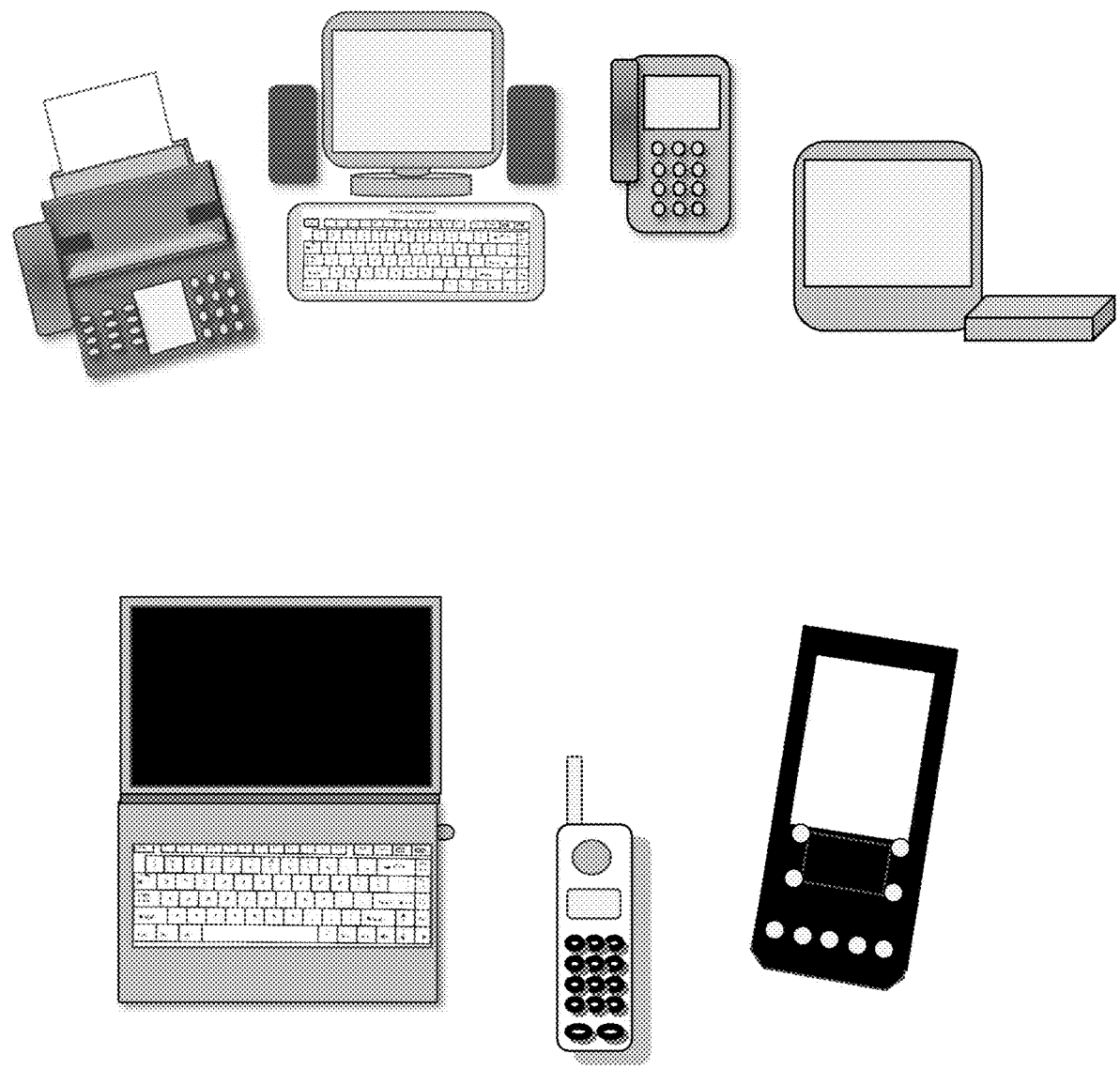
FIG. 17 illustrates a number of devices to use with the keypad, in accordance with one embodiment of the present invention.

FIG. 17 shows some of the electronic devices which may use the enhanced keypad, the enhanced mouse, the extendable microphone, and the data entry method of this invention.

An electronic device may contain at least one or more of the features of this invention. It may, for example, contain all of the features of the invention as described.

Data Entry Through a Land Line Phone

The data entry method described before, may also be used in land-lined phones and their corresponding networks. As known, each key of a telephone keypad generates a predefined tone which is transmitted through the land line networks. There are twelve predefined tones assigned to twelve keys of telephone keypads. By using, a land line telephone and its keypad, for the purpose of a data entry such as entering text, there may be the need of additional tones to be generated. To each symbol, there may be assigned a different tone so that the network will recognize a symbol according to the generated tone assigned to said symbol.

A Wrist-Worn Multi-Sectioned Data Entry Unit

Figure 22A:
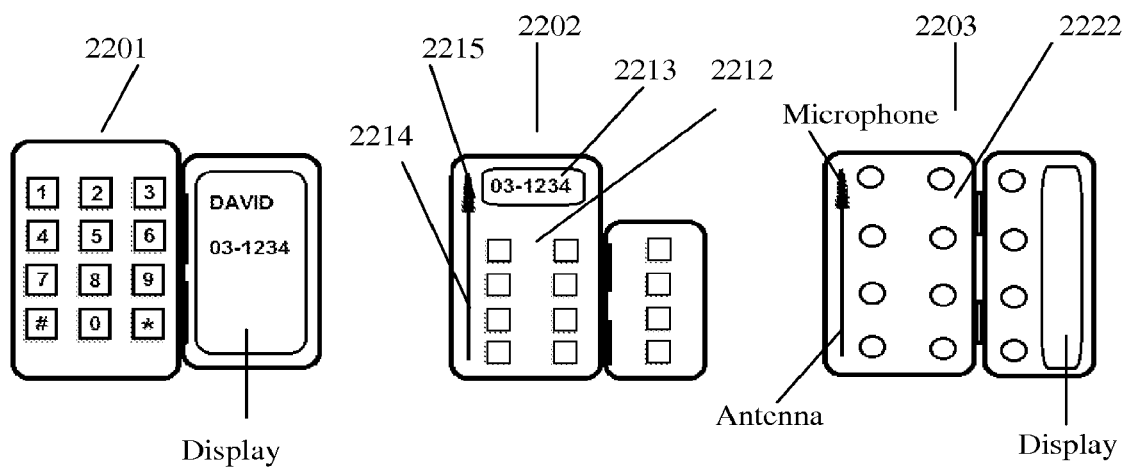
FIG. 22a illustrates a keypad with a foldable display, in accordance with one embodiment of the present invention.

FIG. 22a shows as example, different embodiments of a data entry units 2201-2203 of this invention as described before. To reduce the size of said data entry unit a multi-sectioned data entry unit 2202-2203 which may have a multi-sectioned keypad 2212-2222 as described before, may be provided. said multi-sectioned data entry unit may have some or all of the features of this inventions. It may also have an integrated data entry system described in this application. As example, the data entry unit 2202 comprises a display 2213 an antenna 2214 (may be extendable), a microphone 2215 (may be extendable), a mouse integrated in the beck of said data entry unit (not shown).

An embodiment of a data entry unit of this invention may be carried on a wrist. It may be integrated within a wrist worn device such as a watch or within a bracelet such as a wristwatch band. Said data entry unit may have some or all of the features of the integrated data entry unit of this invention. This will permit to have a small data entry unit attached to a user's wrist. Said wrist-worn data entry unit may be used as a data entry unit of any electronic device. By connecting his wrist-worn data entry unit to a desired electronic device, a user for example, may open his apartment door, interact with a TV, interact with a computer, dial a telephone number, etc. A same data entry unit may be used for operating different electronic devices. For this purpose, an access code may be assigned to each electronic device. By entering (for example, through said data entry unit) the access code of a desired electronic device a connection between said data entry unit and said electronic device may be established.

Figure 22B:
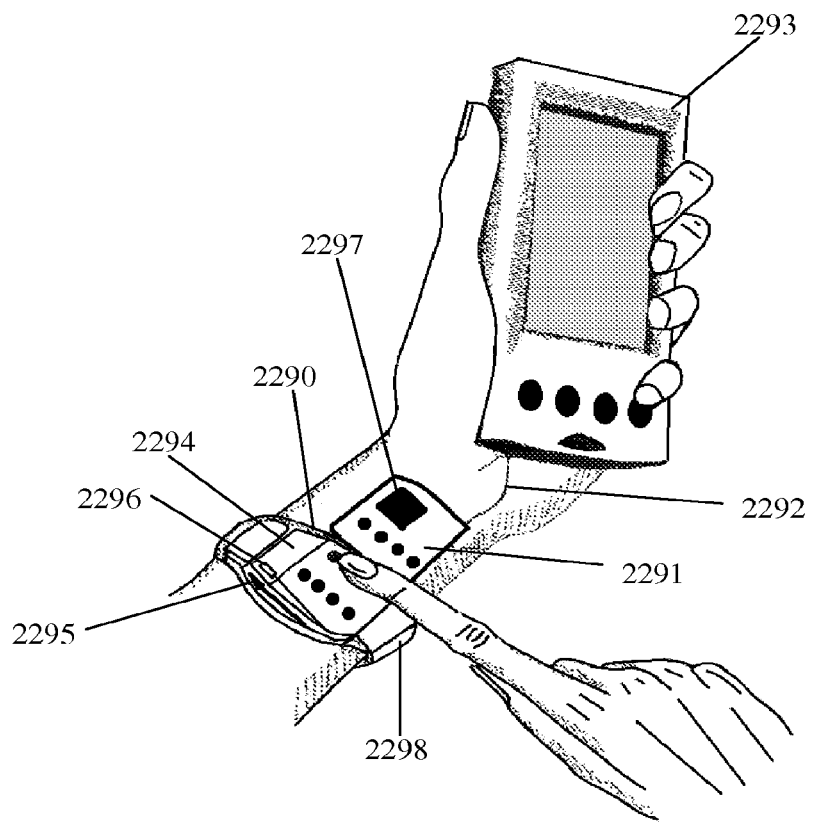
FIG. 22b illustrates a wrist mounted keypad and a remote display, in accordance with one embodiment of the present invention.

FIG. 22b shows an example of a wrist-worn data entry unit 2290 (e.g. multi-sectioned data entry unit having a multi-sectioned keypad 2291) of this invention (in open position) connected (wirelessly or through wires 2292) to a hand-held device such as a PDA 2293. Said multi-sectioned data entry unit 2290 may also comprise additional features such as some or all of the features described in this application. In this example, there are provided a display unit 2294 an antenna 2295, a microphone 2296 and a mouse 2297.

Figure 23A:
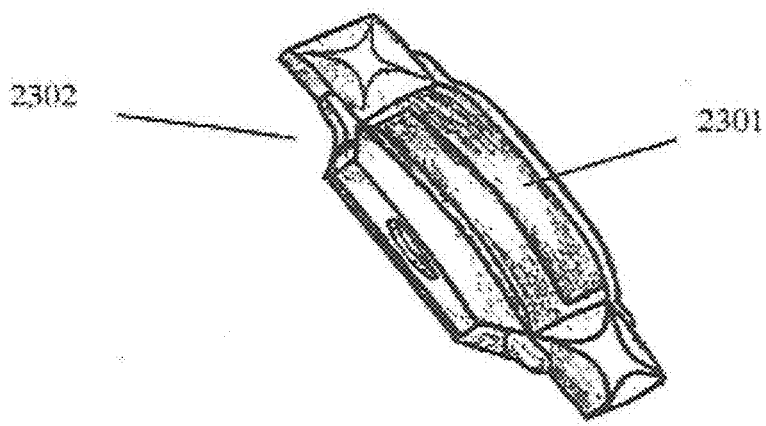
FIG. 23a illustrates a wrist mounted keypad and foldable display, in accordance with one embodiment of the present invention.
Figure 23B:
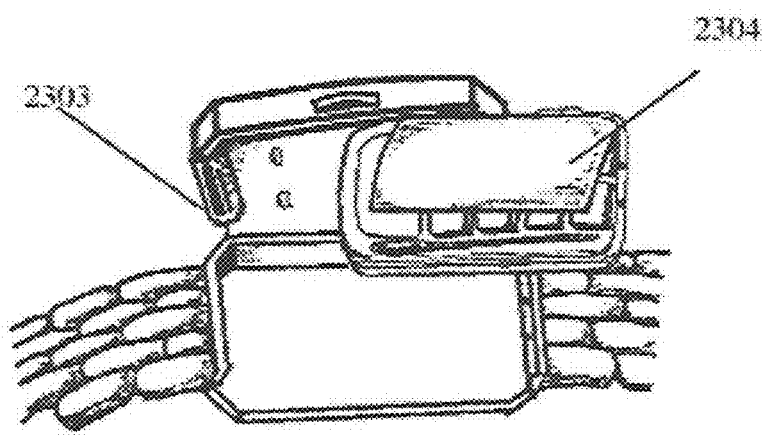
FIG. 23b illustrates a wrist mounted keypad and foldable display, in accordance with one embodiment of the present invention.
Figure 23C:
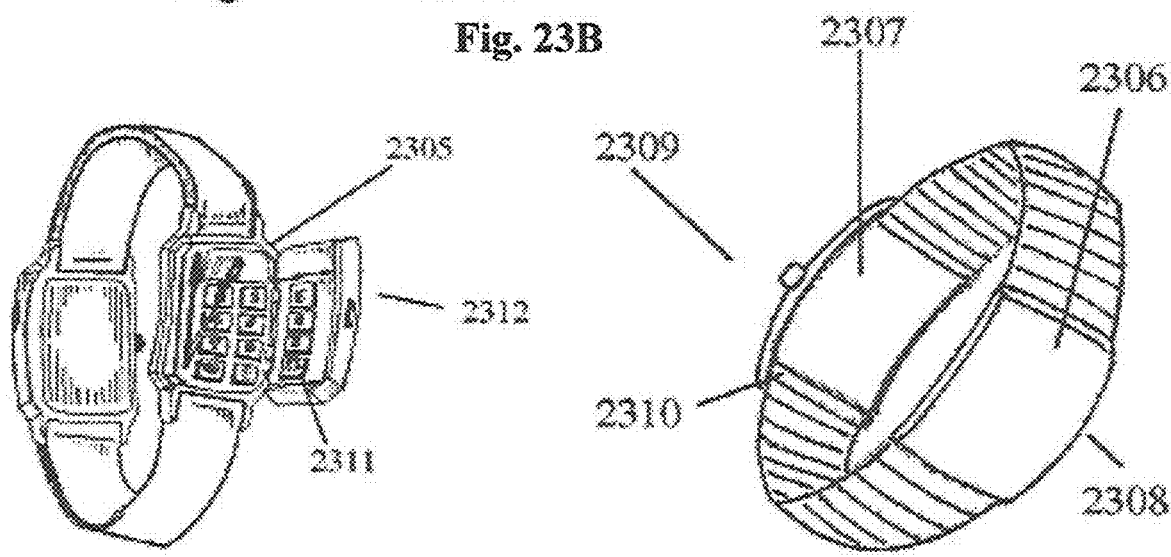
FIG. 23c illustrates a wrist mounted foldable keypad, in accordance with one embodiment of the present invention.

It is understood that said multi-sectioned keypad may be detached from the wrist worn device/bracelet 2298. For this purpose different detachment/attachment known to people skill in the art may be provided. For example, as shown in FIG. 23a, a housing 2301 for containing said data entry device may be provided within a bracelet 2302. FIG. 23b shows said housing 2303 in open position. A detachable data entry unit 2304 may be provided within said housing 2301. FIG. 23c shows said housing in open position 2305 and in close position 2306. In open position (e.g. when using said data entry unit), part of the elements 2311 (e.g. part of the keys and/or display, etc) of said data entry unit may lye down within the cover 2312 of said housing.

According to one embodiment of the invention, a device such as a wristwatch 2307 may be provided in the opposite side on the wrist within the same bracelet. For example, there may be provided a wristwatch band having a housing to contain a data entry unit. Said wristwatch band may be attached to any wrist device such as a wristwatch, a wrist camera, etc. The housing of the data entry device may be located on one side 2308 of a wearer's wrist and the housing of said other wrist device may be located on the opposite side 2309 of said wearer's wrist. To attach said wristband to a device such as a wristwatch the traditional wristwatch band attachment means 2310 (e.g. bars) may be provided.

The above mentioned wristband housing may also be used to contain any other wrist device. for example, instead of containing a data entry unit, said wrist housing may be adapted to contain a variety of electronic devices such as a wristphone.

There may be a lot of advantages when using a wrist-worn data entry unit of this invention. for example, a user may carry an electronic device in for example, his pocket, and having a display unit (may be flexible) of said electronic device in his hand. The interaction with said electronic device may be provided through said wrist-worn data entry unit. In another example, the wrist-worn data entry unit of this invention may be used to operate an electronic news display (PCT Patent Application No. PCT/US00/29647, filed on Oct. 27, 2000, regarding an electronic news display is incorporated herein by reference).

Thus, while is shown and described and pointed out fundamental novel features of the inventions as applied to alternative embodiments thereof, it will be understood that various omissions and substitutions and changes in the form and details of the disclosed invention may be made by those skilled in the art without departing from the spirit of the invention. It is to be understood that the drawings are not necessarily drawn to scale, but that they are merely conceptual in nature. For example, instead of providing a separate pressure system to each key of a keypad, a single pressure sensitive system (e.g. a pressure sensitive pad) may be provided with all of them (e.g. a single large pad above or under the keys). Also a user may interact with a key by other means than his fingers. For example, said user may use a pen to press a key.

The data entry method of this invention may also use other data entry means. For example, instead of assigning the symbols to the keys of a keypad, said symbols may be assigned to other objects such as the fingers (or portions of the fingers) of a user. These subjects and the data entry method mentioned in this application, have already been described in detail in the incorporated reference PCT Patent Application, No PCT/US00/29647, filed on Oct. 27, 2000.

Extendable Display Unit

Figure 24A:
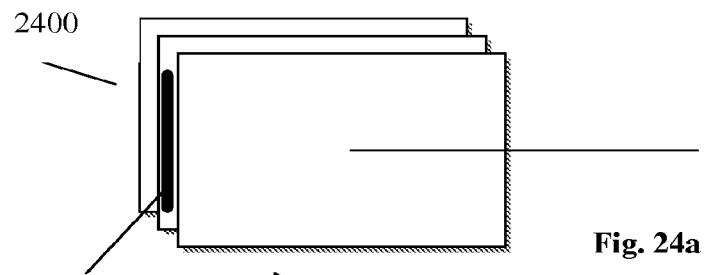
FIG. 24a illustrates a keypad with foldable display, in accordance with one embodiment of the present invention.

According to one embodiment of the invention an extendable display unit may be provided within an electronic device such as data entry unit of the invention or within a mobile phone. FIG. 24a shows an extendable display unit 2400 in closed position. This display unit may be made of rigid and/or semi rigid materials and may be folded or unfolded for example by corresponding hinges 2401, or being telescopically extended or retracted, or having means to permit it being expanded and being retracted by any method.

Figure 24B:
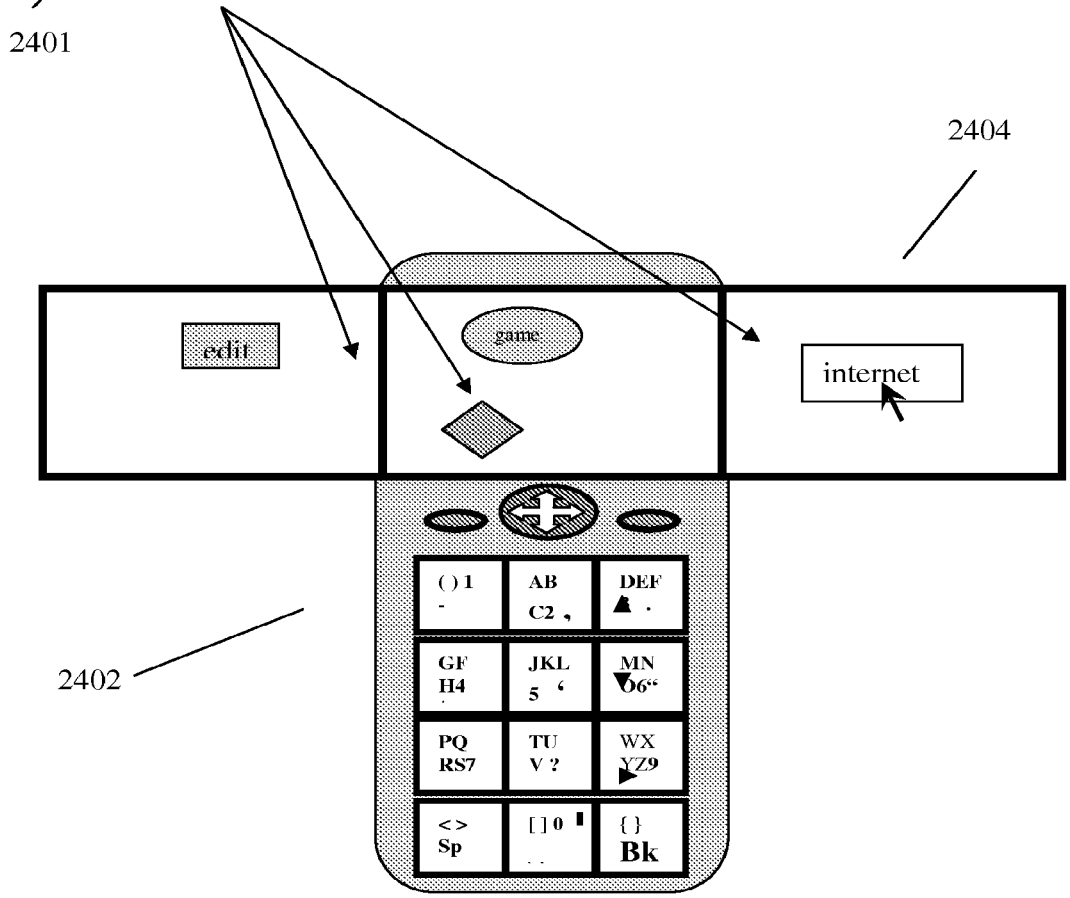
FIG. 24b illustrates a keypad with foldable display, in accordance with one embodiment of the present invention.

FIG. 24b shows a mobile computing device 2402 such as a mobile phone having said extendable display 2404 of this invention, in open position, When open, said extended display unit may have the width of an A4 standard paper permitting the user to see and work on a real width size of a document while, for example, said user in writing a letter with a word processing program or browsing a web page.

Figure 25A:
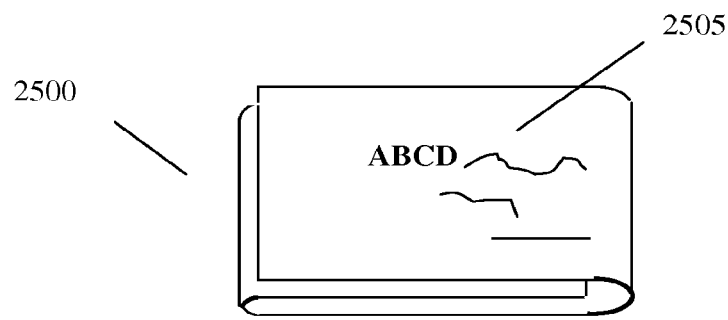
FIG. 25a illustrates a keypad with foldable display, in accordance with one embodiment of the present invention.

The display unit of the invention may also be made from flexible materials. FIG. 25a shows a flexible display unit 2500 in closed position.

It is understood that the display unit of the invention may also display the information on at least part of it's other (e.g. exterior} side 2505. This is important because in some situations a user may desire to use the display unit without expanding it.

Figure 25B:
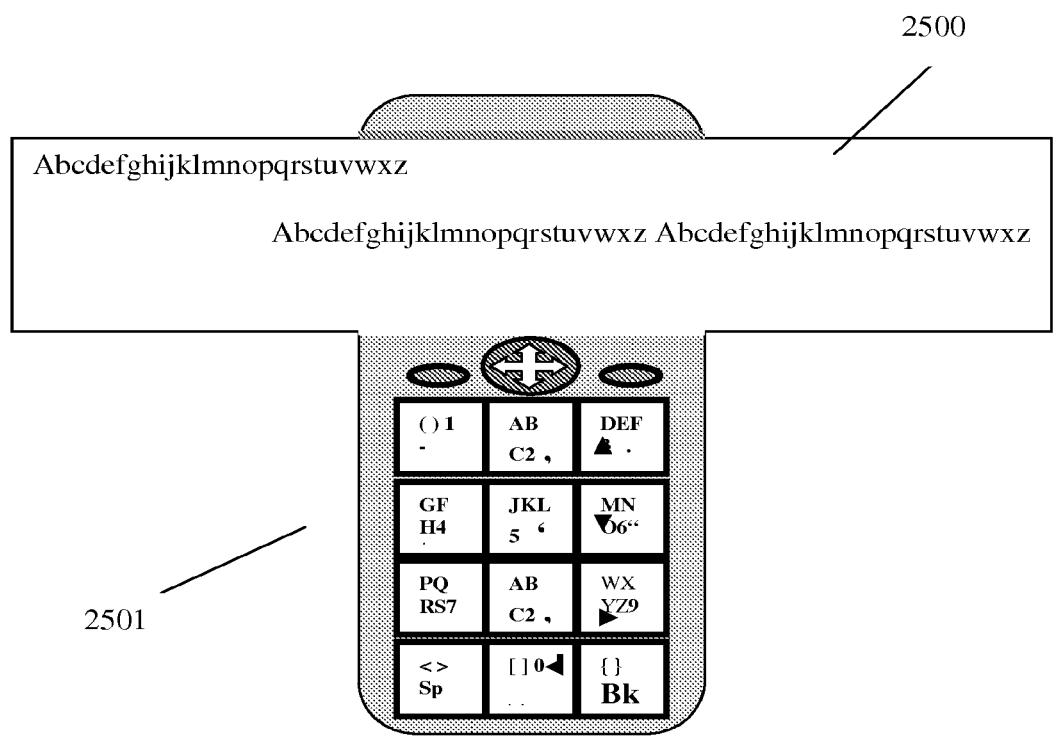
FIG. 25b illustrates a keypad with foldable display, in accordance with one embodiment of the present invention.

FIG. 25b shows an electronic device 2501 having flexible display unit 2500 of the invention, in open position.

By having an electronic device such as the data entry unit of the invention, a mobile phone, a PDA, etc., having at least one of the enhanced features of the invention such as an extendable/non extendable display unit comprising a telecommunication means as described before, a mouse of the invention, an extendable microphone, an extendable camera, a data entry system of the invention, a voice recognition system, or any other feature described in this application, a complete data entry/computing device, which may be held and manipulated by one user's hand, may be provided. This is very important because as is well known that in mobile environment computing/data entry at least one of the user's hand must be free.

Extendable Camera

As described for extendable microphone, an electronic device may also be equipped with an extendable camera. For example, for the data entry system of the invention combining keys presses and lip reading (instead or in addition to voice/speech of the user) an extendable camera may be provided in corresponding electronic device or data entry unit.

Figure 26:
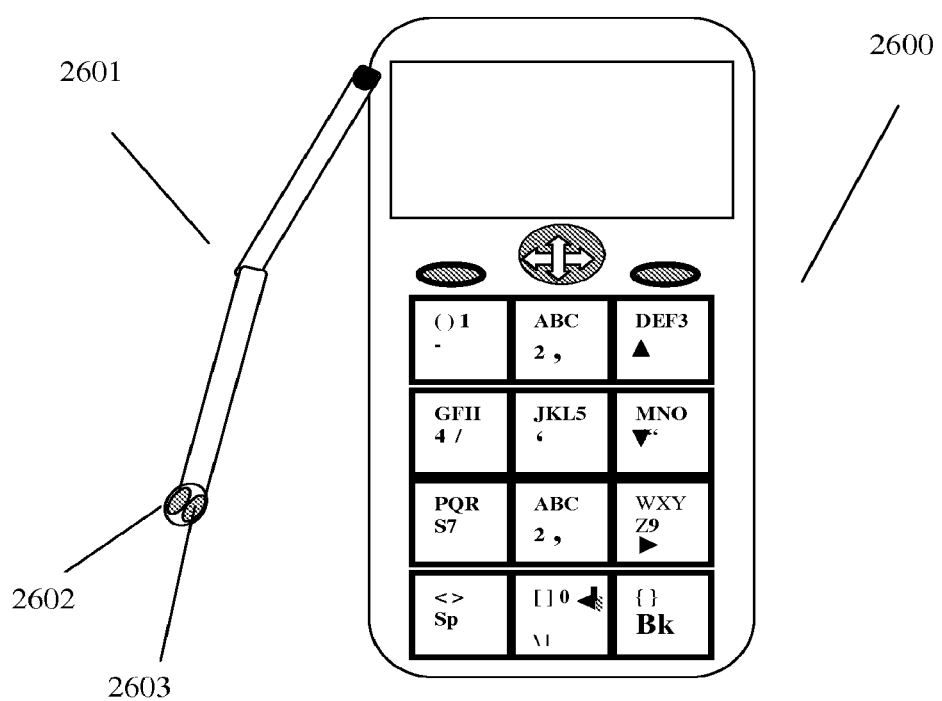
FIG. 26 illustrates a keypad with an extension arm, in accordance with one embodiment of the present invention.

FIG. 26 shows a mobile computing device 2600 equipped with a pivoting section 2601. Said pivoting section may have a camera 2602 and/or a microphone 2603 installed at, for example, its end. By extending the camera towards his mouth, the user may speak to the camera and the camera may transmit images of the user's lips for example, during data entry of the invention using combination of key presses and lips. The user, in the same time may be capable to see the display and the keypad of his phone and eventually use them simultaneously while speaking to the camera. Of course the microphone installed on the extendable section may transmit the user's voice to the voice recognition system of the data entry system.

The extendable section 2601 may contain an antenna, or itself being the antenna of the electronic device.

Also, the extendable microphone and/or camera of the invention may be detachably attached to an electronic device such as a mobile telephone or a PDA. This is because in many situations manufacturers of electronic devices (such as mobile phones) do not desire to modify their hardware for new applications.

Figure 27:
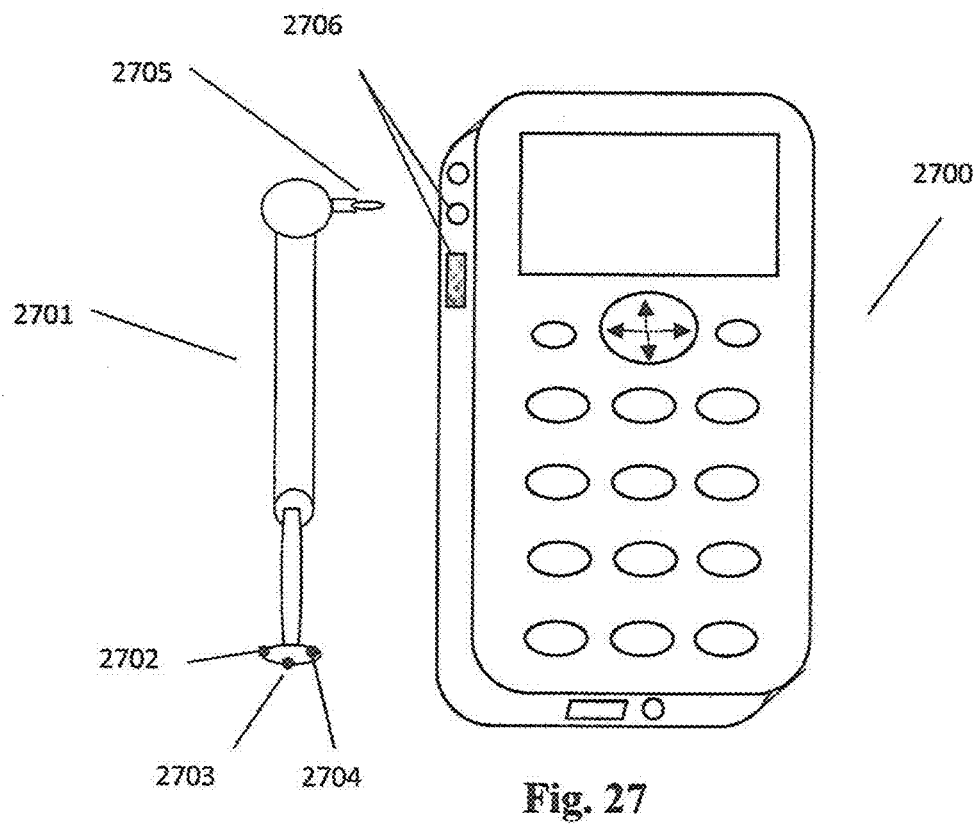
FIG. 27 illustrates a keypad with an extension arm, in accordance with one embodiment of the present invention.

According to one embodiment of the invention, the external pivoting section comprising the microphone and/or a camera may be a separate unit being detachably attached to the corresponding electronic device. FIG. 27 shows a detachable unit 2701 and an electronic instrument 2700, such as a mobile phone, being in detached position. The detachable unit 2701 may comprise any one of a number of component, including but not limited to, a microphone 2702, a camera 2703, a speaker 2704, an optical reader (not shown) or other components necessary to be closed to the user for better interaction with the electronic instrument. The unit may also comprise at least one antenna or itself being an antenna. The unit may also comprise attachment and/or connecting means 2705, to attach unit 2701 to electronic device 2700 and to connect the components available on the unit 2701 to electronic instrument 2700. For attaching and connecting purposes, attachment and connecting means 2705 may be adapted to use the ports 2706 available within an electronic device such as a mobile phone 2700 or a computer, the ports being provided for connection of peripheral components such as a microphone, a speaker, a camera, an antenna, etc. It is understood that ports 2706 may be the standard ports such as a microphone jack or USB port, or any other similar connection means available in electronic instruments. In this case, the attachment/connecting means may, for example, be standard connecting means which plug into corresponding port(s) available within the electronic instrument.

Figure 27A:
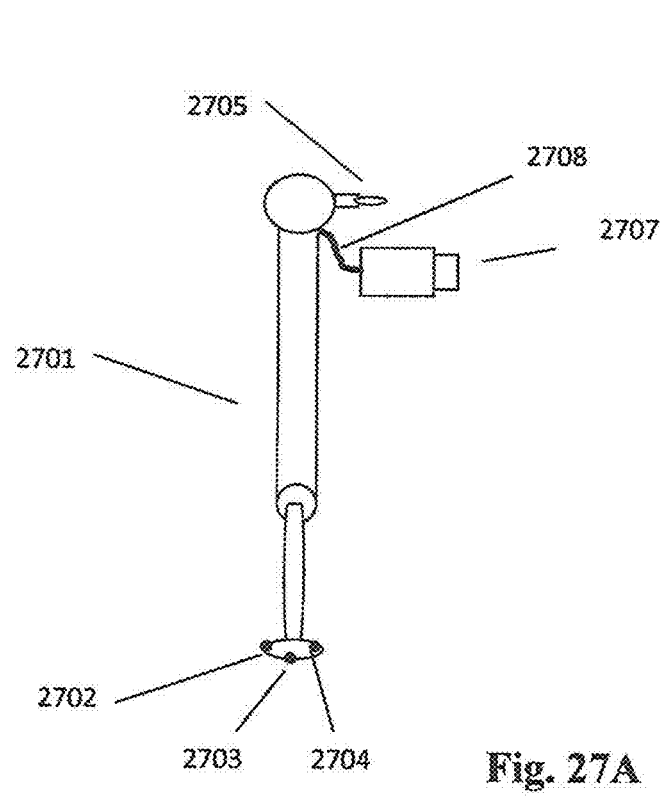
FIG. 27a illustrates a keypad with an extension arm, in accordance with one embodiment of the present invention.

It is understood that the attachment and/or connecting means of the external unit may be provided to have either mechanical attaching functionality or electrical/electronic connecting functionality or both. As shown in FIG. 27a, for example, the external unit 2701 may comprise a pin 2705 fixedly positioned on the external unit for mechanically attaching the external unit to the electronic instrument. The pin may also electrically/electronically connect for example, the microphone component 2702 available within the unit 2701 to the electronic instrument shown before. In addition to the pin, the external unit may contain another connector 2707 such as a USB connector, connected by wire 2708 to for example, a camera 2703 installed within the external unit 2701. In this case, the connector 2707 may only electronically/electrically connect the unit 2701 to the electronic instrument.

For better mechanical attachment more that one port may be used by attachment and connecting means of the external unit. For example, the attachment and connecting means may comprise two attachment means, such as two pins fixedly positioned on the external unit wherein a first pin plugs into a first port of the electronic instrument corresponding to for example an external microphone, and a second pin plugs into the port corresponding to for example an external speaker.

Figure 27B:
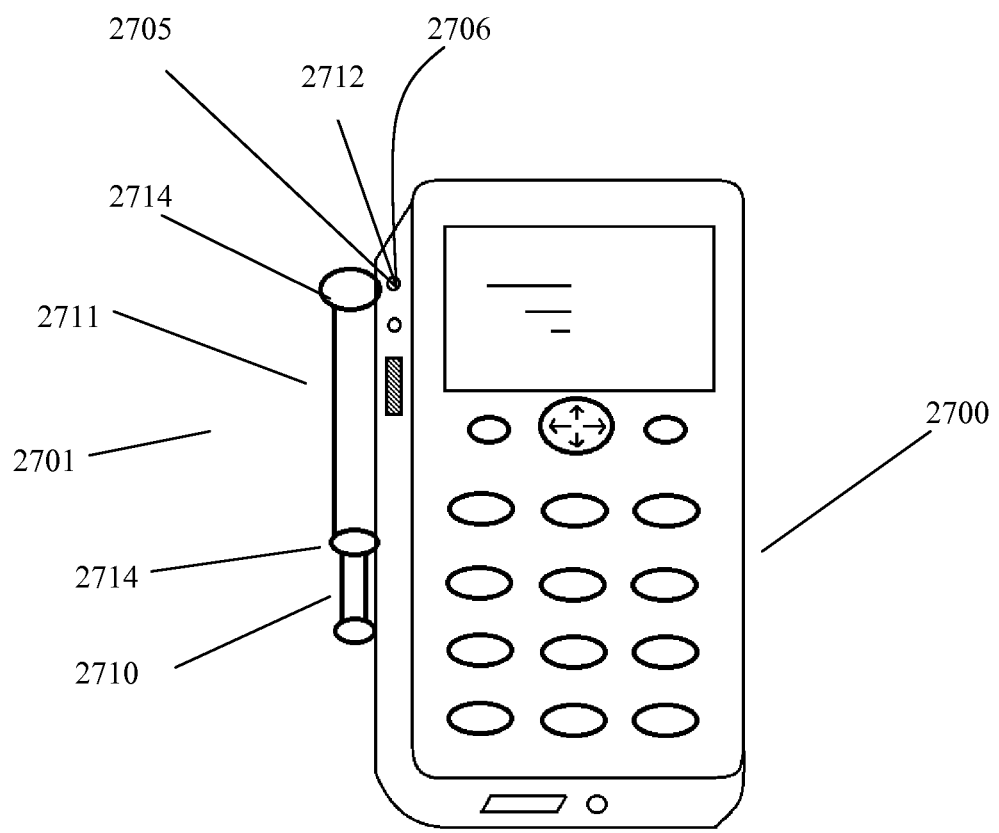
FIG. 27b illustrates a keypad with an extension arm, in accordance with one embodiment of the present invention.

FIG. 27b shows the detachable external unit 2701 and the electronic instrument 2700 of the invention, in attached position.

After attaching the external unit 2701 to the electronic instrument 2700 (for example, by plugging the pin 2705 into corresponding port 2706) the user may adjust the external unit 2701 in a desired position by extending and rotating movements as described before in this application for extendable microphone and camera. Again, it must be noted that the detachable unit of the invention may have characteristics similar to those of the extendable section of the invention as described before for the external microphone and camera in this application. For example, the detachable unit 2701 of the invention may be multi-sectioned having at least two sections 2710-2711, wherein each section having movements such as pivoting, rotating and extending (telescopically, foldable/unfoldable), relating to each other and to the external unit. Attaching sections 2712-2714 may be used for these purposes.

The detachable unit as described permits to add external/peripheral components to an electronic instrument and use them as they were part of the original instrument. This firstly permits to use the unit without holding the components in hand or attaching it to user's body (e.g. a headphone which must be attached to user's head) and secondly, it permits to add the components to the electronic instrument without obliging the manufacturers of the electronic instruments (such as mobile phones) to modify their hardware.

The data entry method of this invention may also use other data entry means. For example, instead of assigning the symbols to the keys of a keypad, said symbols may be assigned to other objects such as the fingers (or portions of the fingers) of a user. Also instead of (or in addition to) voice/speech input, the system may recognize the data input by reading (recognizing the movements of) the lips of the user in combination with/without key presses. The user may press a key of the keypad and speak a desired letter among the symbols on said key. By recognizing the movements of the user's lips speaking said letter combined with said key press, the system may easily recognize and input the intended letter.

Also as mentioned, example given in method of configuration described in this application were showed as samples. Variety of different configurations and assignment of symbols may be considered depending on data entry unit needed. The principle in this the method of configuration is to define different group of symbols according to different factors such as frequency of use, natural pronunciation, natural non-pronunciation, etc, and assign them accordingly assigning them priority rates. The highest priority rated group (with or without speaking) is assigned to easiest and most natural key interaction (e.g. a single press). This group also includes the highest ranked non-spoken symbols. Then the second highest priority is assigned to second less easier interaction (e.g. double press) and so on.

Figure 28:
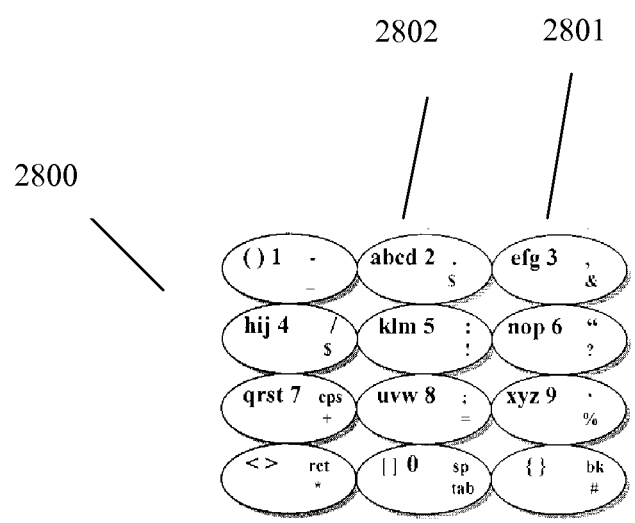
FIG. 28 illustrates a keypad, in accordance with one embodiment of the present invention.

With continuous reference to data entry system described before, the assignment of symbols to the keys of a keypad may be made in manner to still more enhance the recognition by voice/speech or lip-reading systems. FIG. 28 shows a keypad 2800 wherein letter symbols having closed pronunciation are assigned to the keys of said keypad in a manner to avoid ambiguity between them. As shown, letters having closed pronunciations "c" & "d", "j" & "k", "m" & "n", "v" & "t", are separated and placed on different keys. This will help the speech recognition system to more easily recognize said letters. For example, to select the letter "c", a user may press the key 2801 and says "c". To select the letter "d", the user presses the key 2802 and says "d". Other letters having closed pronunciations such as "b" & "p", "t" & "d", "f" & "s", are also assigned to different keys.

Embedded speech recognition systems for small devices are designed to use memory as less as possible. Separating symbols having resembling pronunciation and assigning them to different keys, dramatically simplifies the recognition algorithms resulting the use of less memory.

With continuous reference to FIG. 28, as shown, the configuration of letters is provided in a manner to maintain the letters a-z in continuous order (e.g. a, b, c . . . z). Configuration of symbols on the keypad 2800 is made in a manner to keep it as similar as possible to a standard telephone-type keypad. It is understood that this order may be changed if desired.

Also, separation of resembling lip-articulated symbols may help lip-reading (lip recognition) systems to more easily recognize them. For example, assigning letters "j" & "k" to different keys will dramatically ease their recognition.

It is understood that for recognizing a spoken symbol such as a letter, more than one image of user's lips at different times during speaking said letter may be provided to lip recognition/reading system.

Lip reading (recognition) system of the invention may use any image-producing and image-recognition processing technology for recognition purposes. For example, as mentioned before, a camera may be used to receive image(s) of user's lips while said user is saying a symbol such as a letter and is pressing the key corresponding to said symbol on the keypad. Other image producing and/or image capturing technologies may also be used. For example, instead of a camera, a projector and receiver of means such as light or waves may be used to project said means to the user's lips (and eventually, face) and receives back said means providing a digital image of user's lips (and eventually user's face) while said user is saying a symbol such as a letter and pressing the key corresponding to said symbol on the keypad.

The data entry system of the invention which combines key press and user behavior (e.g. speech) may use different behavior (e.g. speech) recognition technologies. For example, in addition to movements of the lips, the pressing action of the user's tongue on user's teeth may be detected for better recognition of the speech.

According to one embodiment of the invention, as shown in FIG. 29, instead of (or in addition to) a camera, the lip reading system of the invention may use a touch/press sensitive component 2900 removably mounted on user's denture and/or lips. Said component may have sensors 2903 distributed within its surface to detect a pressure action on any part of it permitting to measure the size, location, pressure measure, etc., of the impact between the user's tongue and said component. Said component may have two sections. A first section 2901 being placed between the two lips (upper and lower lips) of said user and a second 2902 section being located on the user's denture (preferably the upper front denture). An attaching means 2904 permits to attach/fix said component on user's denture.

FIG. 29a shows a sensitive component 2910 as described hereabove, being mounted on a user's denture 2919 in a manner a section 2911 of the component is located between the upper and lower lips of said user (in this figure, the component, the user's teeth and tongue are shown outside user's body). Said user may press the key 2913 of the keypad 2918 which contains the letters "abc", and speak the letter "b". By saying "b" the lips 2914-2915 of the user press said sensitive section 2911 between the lips. The system recognizes that the intended letter is the letter "b" because saying the two other letters (e.g. "ab") do not require pressing the lips on each other. If the user presses the key 2913 and pronounces the letter "c", then the tongue 2916 of the user will slightly press the inside portion 2912 of the denture section of the component located on the front user's upper denture. The system will recognize that the intended symbol is the letter "c", because other letters on said key (e.g. "bc") do not require said pressing action on said portion of the component. If the user presses the key 2913 and says the letter "a", then no pressing action will be applied on said component. Then the system recognizes that the intended letter is the letter "a". In other example, if the user presses the key 2917 and says the letter "j" the tongue of the user presses the inside upper portion of the denture section of the component. If the user presses the key 2917 and says the letter "l", then the tongue of the user will press almost the whole inside portion of the denture section of the component. In this case, almost the whole sensors distributed within the inside portion of the denture section of the component will be pressed and the system recognizes that the intended letter is the letter "l".

The above-mentioned lip reading/recognition system permits a discrete and efficient method of data input with high accuracy. This data entry system may particularly be used in sectors such as the army, police, or intelligence.

Hereafter an example of a letter input recognition system through a telephone-type keypad, according to one embodiment of this invention: TABLE-US-00001 ABC key A B C no pressure lip section pressed upper inside portion of the denture section is slightly pressed DEF key D E F whole inside denture no pressure lip section pressed section is pressed GHI key G H I upper inside portion upper inside of portion no pressure of the denture section of the denture section is strongly pressed is slightly pressed JKL key J K L upper inside portion no pressure whole inside denture of the denture section is pressed is slightly pressed MNO key M N O lip section pressed whole inside denture no pressure section pressed PQRS key P Q R S lip section pressed lip section pressed no pressure upper inside (on sides) portion of the denture section is slightly pressed TUV key T U V whole inside denture lip section pressed lip section pressed section is pressed (on sides) WXYZ key W X Y Z (zed) lip section pressed upper inside portion no pressure whole inside of denture section portion of the is pressed denture is pressed It must be noted that the table above is only shown as an example to show the easiness of distinguishing the letters by saying a desired letter (while using the described hardware) and pressing the corresponding key. It is understood that other distinguishing parameters such as the timing of the pressure on the hardware (e.g. when saying "g" or saying "h", both being on the same key and maybe having similar pressure levels) based on this system may be taken in consideration by the recognition system and people skilled in the art. Also, saying other symbols such as numbers (e.g. 0-9) by the user and recognizing them may be considered by the above-mentioned system.

In addition, the sensitive component of the invention may be connected to processing device (e.g. a cellphone) wirelessly or by means wires. If it is connected wirelessly, the component may contain a transmitter for transmitting the pressure information. The component may further comprise a battery power source for powering its functions, As described before, the invention combines key presses and speech for improved recognition accuracy. In one embodiment, a grammar is made on the fly to allow recognition of letters corresponding only to the key presses.

Usually, during data (e.g. text) entry by voice/speech, a microphone/transducer perceives the user's voice/speech and transmits it to a processor of a desired electronic device for recognition process by a voice/speech recognition system. A great obstacle (specially, in the mobile environment) for an efficient speech to data/text conversion by the voice/speech recognition systems is the poor quality of the inputted audio, said poor quality being caused by the outside noise. It must be noted that the microphone "hears" everything without distinction.

Many efforts have been made by researchers to distinguish and eliminate an outside noise from a desired audio. Until now those efforts have permitted to only partially reduce the outside noise but still much more work must be done to achieve an acceptable result. Unfortunately, the current noise cancellation/reduction technologies also reduce the quality of the desired audio, making said audio inappropriate for recognition by the voice/speech recognition systems.

To reduce (or even completely eliminate) the outside noise during data entry into an electronic device by voice/speech input, without degrading the quality of said voice/speech input, an ear-integrated microphone/transducer unit positioned in a user's ear, can be provided. Said microphone/transducer may also permit a better reception quality of the user's voice/speech, even if said user speaks low or whispers.

As is well known, when humans speak, the bone vibrations caused by, and corresponding to, said speech are conducted to ear resulting the air vibrations corresponding to said speech in the inner ear and in the ear canal.

According to one method, said air vibrations may be perceived by an ear-integrated microphone positioned in the ear, preferably in the ear canal. According to another method, said ear bone vibrations, themselves, may be perceived from the inner ear by an ear-integrated transducer positioned in the ear.

Figure 30:
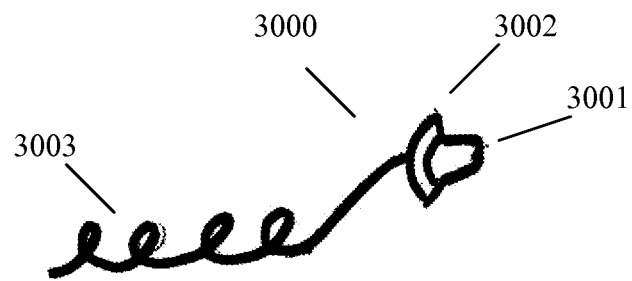
FIG. 30 illustrates an earpiece, in accordance with one embodiment of the present invention.

FIG. 30 shows a microphone/transducer unit 3000 designed in a manner to be integrated within a user's ear in a manner that the microphone/transducer component 3001 locates inside the user's ear (preferably, the uses ear canal).

Preferably, in addition to microphone/transducer component 3001, said unit 3000 may also have hermetically isolating means 3002 wherein when said microphone 3001 is installed in a user's ear (preferably, in the user's ear canal), said hermetically isolating means 3002 may isolate said microphone from the outside (ear) environment noise, permitting said microphone 3001 to only perceive the user's voice/speech formed inside the ear. The outside noise which is a major problem for voice/speech recognition systems will dramatically be reduced or will even be completely eliminated.

The user may adjust the level of hermetically isolation as needed. For example, to cancel the speech echo in the ear canal said microphone may be less isolated from outside ear environment by slightly extracting said microphone unit from said user's ear canal. The microphone unit may also have integrated isolating/unisolating level means.

Said microphone/transducer 3001 may be connected to a corresponding electronic device, by means of wires 3003, or by means of wireless communication systems. The wireless communication system may be of any kind such as bluetooth, infra-red, RF, etc The above-mentioned, ear integrated microphone/transducer may be used to perceive the voice/speech of a user during a voice/speech-to-data (e.g. text) entry system using the data entry system of the invention combining key press and corresponding speech, now named press-and-speak (KIKS) technology. By pressing a key and saying the desired symbol (e.g. a letter) assigned to said key, as described before, the voice/speech recognition system tries to match said speech to one of speech patterns of only few symbols assigned to said key. In this case, even if an ear-integrated microphone/transducer has lower quality audio perception than a standard microphone, the quality of spoken symbols perceived by said ear-integrated microphone/transducer will still be fair enough to permit the voice/speech recognition system to easily recognize a spoken symbol among said few symbols on that key.

Figure 31:
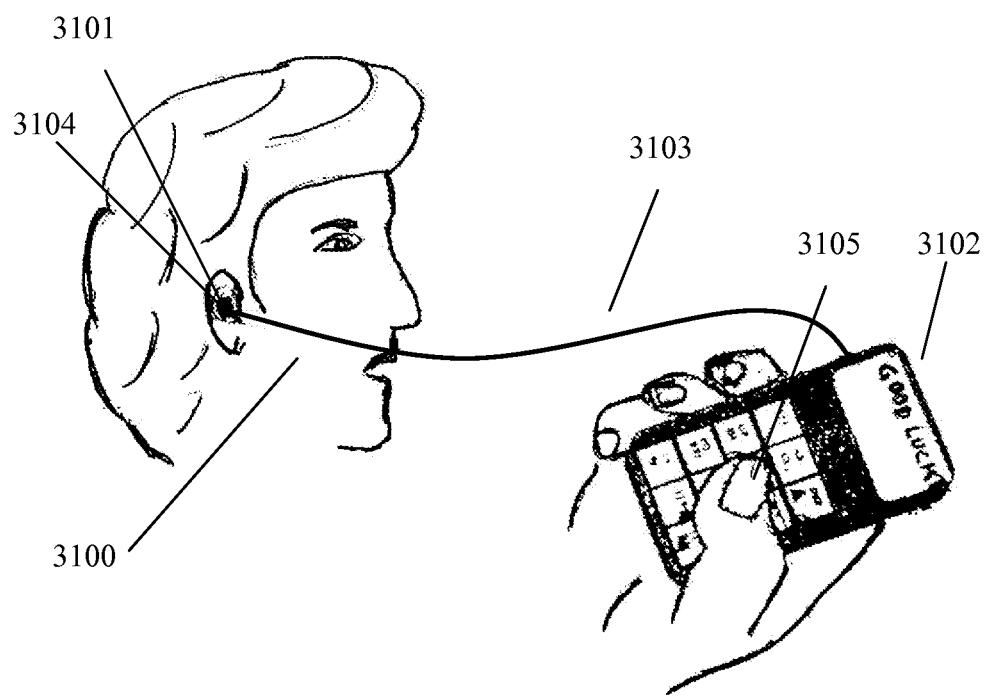
FIG. 31 illustrates an earpiece and keypad combination, in accordance with one embodiment of the present invention.

According to one embodiment of the invention, as shown in FIG. 31, an ear-integrated microphone 3100 may be provided and be connected to a mobile electronic device such as a mobile phone 3102. As shown, the microphone 3101 is designed in a manner to be positioned into a user's ear canal and perceive the user's speech/voice vibrations produced in the user's ear when said user speaks. Said speech may then be transmitted to said mobile phone 3102, by means of wires 3103, or wirelessly.

By being installed in the user's ear and having hermetically isolating means 3104, said microphone 3101 will only perceive the user's voice/speech. The outside noise which is a major problem for voice/speech recognition systems will dramatically be reduced or even completely be eliminated. As mentioned before, the level of isolation may be adjustable, automatically, or by the user.

For example, when a user presses a key 3105 and speaks the letter "k" which is located on said key, the vibrations of said speech in the user's ear may be perceived by said ear-integrated transducer/microphone and be transmitted to a desired electronic device. The voice/speech recognition system of the invention has to match said speech to already stored speech patterns of a few symbols located on said key (e.g. in this example, "J, K, L, 5"). Even if the quality of said speech is not good enough (e.g. because the user spoke low), said speech could be easily matched with the stored pattern of the desired letter.

As just noted, another advantage of this system is that the user may speak low or even whisper. Because on one hand, the microphone is installed in the use's ear and directly perceives the user's voice without being disturbed by outside noise, and on the other hand the recognition system tries to match a spoken symbol to only few choices, even if a user speaks low, whispers, the quality of the user's voice will still be good enough for use by the voice/speech recognition system. For the same reasons the recognition system may be user-independent. Of course, training the system with the user's voice (e.g. speaker dependent method) will cause greatly better recognition accuracy rate by the recognition system.

In addition to the microphone/transducer, the ear-integrated unit may also contain a speaker located beside the microphone/transducer and also being integrated within the user's ear for listening purposes.

Figure 32:
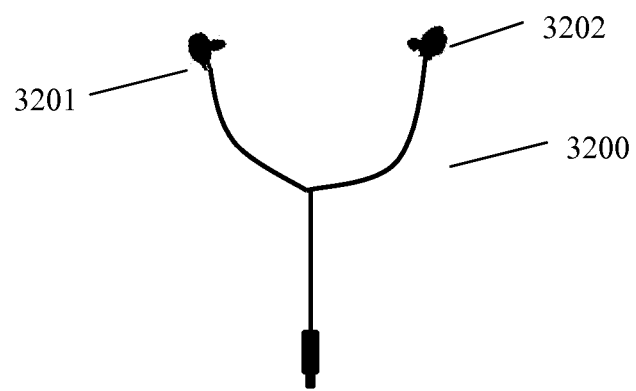
FIG. 32 illustrates an earpiece, in accordance with one embodiment of the present invention.

According to one embodiment of the invention, as shown in FIG. 32, an ear-integrated microphone and speaker 3200 can be provided in a manner that the microphone 3201 installs in a first user's ear (as described here-above) and the speaker 3202 installs in a second user's ear.

The above specifications should not be construed as limiting the scope of the invention but merely describing some of the preferred embodiments of the invention many variations are be considered within the scope of the present invention. For example, in the example of the ear-integrated unit of the FIG. 32, both ears may be provided by both, microphone and speaker components. In another example, when said ear-integrated unit is wirelessly connected to a corresponding electronic device, a buttery power source may be provided within said ear-integrated unit. Also for better speech reception quality, the ear-integrated microphone unit of the invention may also comprise at least an additional standard microphone situated outside of the ear (for example, on the transmitting wire). The inside ear microphone combined with the outside ear microphone may provide more audio signal information to the speech/voice recognition system of the invention. it must also be noted that the data entry system of the invention may use any microphone or transducer using any technology to perceive the inside ear speech vibrations.

As previously mentioned, a method of general data entry combining key press and speech (e.g. according to a user's voice or lip movements) has been explained in PCT application PCT/US00/29647, filed on Oct. 27, 2000.

As described in said application, by pressing a key and speaking or not speaking a desired symbol such as a character among a group of symbols assigned to said key, said desired symbol may be selected. For example, for entering the word "morning" through a standard telephone-type keypad 3300 (see FIG. 33) a user may.

press the key 3308 and say 'm'
press the key 3308 and say 'o';
press the key 3306 and say 'r';
press the key 3308 and say 'n';
press the key 3303 and say 'i';
press the key 3308 and say 'n';
press the key 3303 and say 'g'.

By speaking a word, letter by letter (or symbol by symbol), and pressing the corresponding keys, said word may be inputted.

The data entry system described in PCT/US00/29647 may permit a keyboard having reduced number of keys (e.g. telephone keypad) to act as a full-sized PC keyboard (e.g. one pressing action per symbol).

Word by Word Data Entry System

To enhance the above-mentioned data entry system, a word level data entry system has been proposed in said PCT application. In said application, there was described that a user can enter a word by speaking said word and pressing the keys corresponding to the letters constituting said word.

The speech of each word in a language may be constituted of a set of phonemes(s) wherein said set of phoneme(s) comprises one or more phonemes. FIG. 34 shows as an example, a dictionary of words 3400 wherein for each entry (e.g. word) 3401, its character set (e.g. its corresponding chain of characters) 3402, relating key press values 3403 (e.g. using a telephone keypad such as the one shown in FIG. 33), phoneme set 3404 corresponding to said word, and speech model 3405 (to eventually be used by a voice/speech recognition system) of said phoneme set are shown.

According to one method of speech (e.g. voice) recognition, when a user speaks a word, his speech may be compared with memorized speech models, and one or more best matched models will be selected by the system. According to another method of speech recognition, when a user, for example, speaks a word, his speech may be recognized based on recognition of a set of phonemes constituting said speech.

Then the word(s) (e.g. character sets) corresponding to said selected speech model(s) or phoneme-set may be selected by the system. If the selection contains one word, said word may become the final selection. If the selection comprises more than one word, then said words may be presented to the user (e.g. in a list printed at the display) and the user may select one of them by for example pressing a "select" key.

The above-mentioned method of recognition of words based on their speech is described only as an example. It is understood that other methods of recognition by speech may be considered by the people skilled in the art.

Recognizing a word based on its speech only, is not an accurate system. There are many reasons for this. For example, many words may have substantially similar, or confusing, pronunciations. Also factors such as the outside noise may result ambiguity in a word level data entry system. Inputting arbitrary words by voice requires complicated software, taking into account a large variety of parameters such as accents, voice inflections, user intention, or noise interaction. For these reasons speech recognition systems are based on recognition of phrases wherein for example, words having similar pronunciations may be disambiguated in a phrase according to the context of said phrase. Speech recognition systems based on recognition of phrases, also, require large amount of memory and CPU use, making their integration in small devices such as mobile phones, impossible at this time.

The press and speak technology invented by this inventor and described in different PCT and US patent applications, may solve the above-mentioned problems. In addition to/combination with a character by character entry system as described in said applications, a word-level data entry technology of the invention may provide the users of small/mobile/fixed devices with a natural quick (word by word) text/data entry system.

As mentioned, in the PCT application PCT/US00/29647, there was described that a user may speak a word while pressing the keys corresponding to the letters constituting said word. There was also mentioned that for this purpose a word dictionary data base may be used. According to that and by referring to the FIG. 33, as an example, when a user speaks the word "card" and presses the corresponding keys (e.g. keys 3302, 3302, 3306, 3309 of the telephone-type keypad), the system may select from a dictionary database (e.g. such as the one shown in FIG. 34), the words corresponding to said key presses. In this example, the same set of key presses may also correspond to other words such as "care", "bare", "base", "cape", and "case". The system then, may compare the user's speech (of the word) with the speech (memorized models or phoneme-sets) of said words which correspond to the same key presses and if one of them matches said user's speech, the system selects said word. If speech of non of said words matches the user's speech, the system then, may select the word (or words), among said words, that its (their) speech best match(es) said user's speech.

According to this method, the recognition system will select a word among only few candidates (e.g. 6 words, in the example above). As result the recognition becomes easy and the accuracy of the speech recognition system dramatically augments, permitting a general word-level text entry with high accuracy. It must also be noted that speaking a word while typing it is a human familiar behavior.

According to another embodiment of the invention, for entering a word, a user may press few (e.g. one, two, and if needed, more) keys corresponding to the characters of at least a portion of said word, (preferably, the beginning) and (preferably, simultaneously) speak said word. According to said key presses and said speech, the system may recognize the intended word. For this purpose, according to one method, for example, the system may first select the words of the dictionary database wherein the corresponding portion characters of said words correspond to said key presses, and compares the speech of said selected words with the user's speech. The system, then selects one or more words wherein their speech best matches with said user's speech. Selecting the words existing in a dictionary of words database according to at least few key presses corresponding to at least the beginning characters of said words, dramatically reduces the number of said selected words to be compared with the user's speech. This permits a very high accuracy of the input of a desired word. According to another method, for example, the system may first select the words of the dictionary wherein their speech best match said user's speech. The system then, may evaluate said at least the beginning characters (evaluating to which key presses they belong) of (the character sets constituting) said words with said user's corresponding key presses to finally select the character set(s) which match said user's key presses.

In the above-mentioned embodiments, if the selection contains one word, said word may become the final selection. If the selection comprises more than one word, then said words may be presented to the user (e.g. in a list printed at the display) and the user may select one of them by for example pressing a "select" key. It is understood that the systems of inputting a word by combination of key presses and speech and selection of a corresponding word by the system as just described, are demonstrated as examples. Obviously, for the same purpose, other systems based on the principles of the data entry systems of the invention may be known and considered by people skilled in the art.

The above-mentioned methods of speaking a word and pressing the keys corresponding to the characters constituting at least part of said word, and comparing said key presses with the key presses corresponding to the letters of the words in a dictionary of words, requires the use of a substantial amount of memory. Having stored the phoneme sets/speech (e.g. models) of all of the words available in a language, a database of the chain of characters corresponding to said words available in one or more languages, and also having a data base of the key presses corresponding to said words available in said dictionary data base require large amount of memory.

Also, as described in the prior applications, according to data entry system of the invention a symbol, such as a punctuation mark, may be assigned to a key of the keypad and be inputted as default by pressing said key without speaking a speech. In the word level data entry system of the invention as described before, a user may finish to speak a word before finishing to enter all of its corresponding key presses. This may confuse the recognition system because the last key presses not covered by user's speech may be considered as said default characters. There are some solutions to overcome this problem. For example, a user may first speak a word and then press the corresponding keys. This may indicate to the system that the set of key presses accruing after the speech, correspond to said speech.

In another example, the system may exit the text mode and enter into another mode (e.g. special character mode) such as a punctuation/function mode, by a predefined action such as, for example, pressing a mode key. According to this example, in said text mode, the system may consider all of the key presses as being corresponding to the last speech. By pressing a key while the system is in a special character mode, a symbol such as a punctuation mark may be entered at the end (or any other position) of the word, also indicating to the system the end of said word.

As explained in said PCT applications, to a key of a keypad at least one special character such as punctuation marks, space character, or a functions, may be assigned. By a single press on a key of said keypad without speaking, a symbol such as a punctuation mark on said key may be inputted. A double press on the same key without speech may provide another (e.g. punctuation mark) symbol assigned to said key.

Data Entry System Based on Sub-Speeches

There must be considered that when a user speaks a word while typing it, he naturally, may break said speech of said word into one or more sub-speech portions (e.g. while he types the letters corresponding to each sub-speech) according to for example, the syllables of said speech. For example, while typing the word "morning" using a keyboard such as a keypad, the user may naturally, first say a first sub-speech, "mor" and/while he presses the corresponding keys. Then the user may pronounce a following sub-speech, "ning" and type the corresponding keys. For easier demonstration, in this application, the word "sub-speech" is used for the speech of a portion of the speech of a word. For example, the word "perhaps", may be spoken in two sub speeches "per" and "haps". Also for example, the word "pet" may be spoken in a single sub-speech, "pet".

Also, for example, for entering the word "playing", the user may first pronounce the phonemes corresponding to the first syllable (e.g. "ple") while typing the keys corresponding to the letters "pla", and then pronounce the phonemes corresponding to the second syllable (e.g. "ying") while typing the set of characters "ying".

It must be noted that one user may divide a word into portions differently from another user. Accordingly, the sub-speech and the corresponding key presses, for each portion may be different. After completing the data (e.g. key press and sub-speech) entry of all portions of said word by said users, the final results will be similar.

In the above-mentioned example, said another user may pronounce the first portion as "pl a" and press the keys of corresponding character set, "play". He then, may say "ing' and press the keys corresponding to the chain of characters, "ing". Also for example, a third user may enter the word "playing" in three sequences of sub-speeches and key presses. Said user may say, "ple", "yin", and "g" (e.g. spelling the character "g" or pronouncing the corresponding sound) while typing the corresponding keys. It is understood that the most natural way of dividing a word in different sequences of speech and key presses is that each sequence of speech correspond to a syllable of said word. Therefore, it must be noted that even though in many paragraphs of this application we note a syllable as a portion/sequence of a word, the data entry system of the invention applies to any form of division of a word in one or more portions.

According to the above-mentioned principles, for example, the word "trying' may be pronounced in two portions (e.g. syllables) "tr", and "ing". Also for example, the word "playground" may be divided and inputted in two portions (e.g. according to its two syllables), "pl a", and "ground" (e.g. in many paragraphs of this application, phonemes (e.g speech sounds) are demonstrated by corresponding characters according to Webster's dictionary).

As it is shown in the examples above, part of the speech of different words in one (or more) languages may have similar pronunciations (e.g. being composed by a same set of phonemes). For example, the words, "trying", and "playing" have common sub-speech portion "ing" (or "ying") within their speech.

Figure 35:
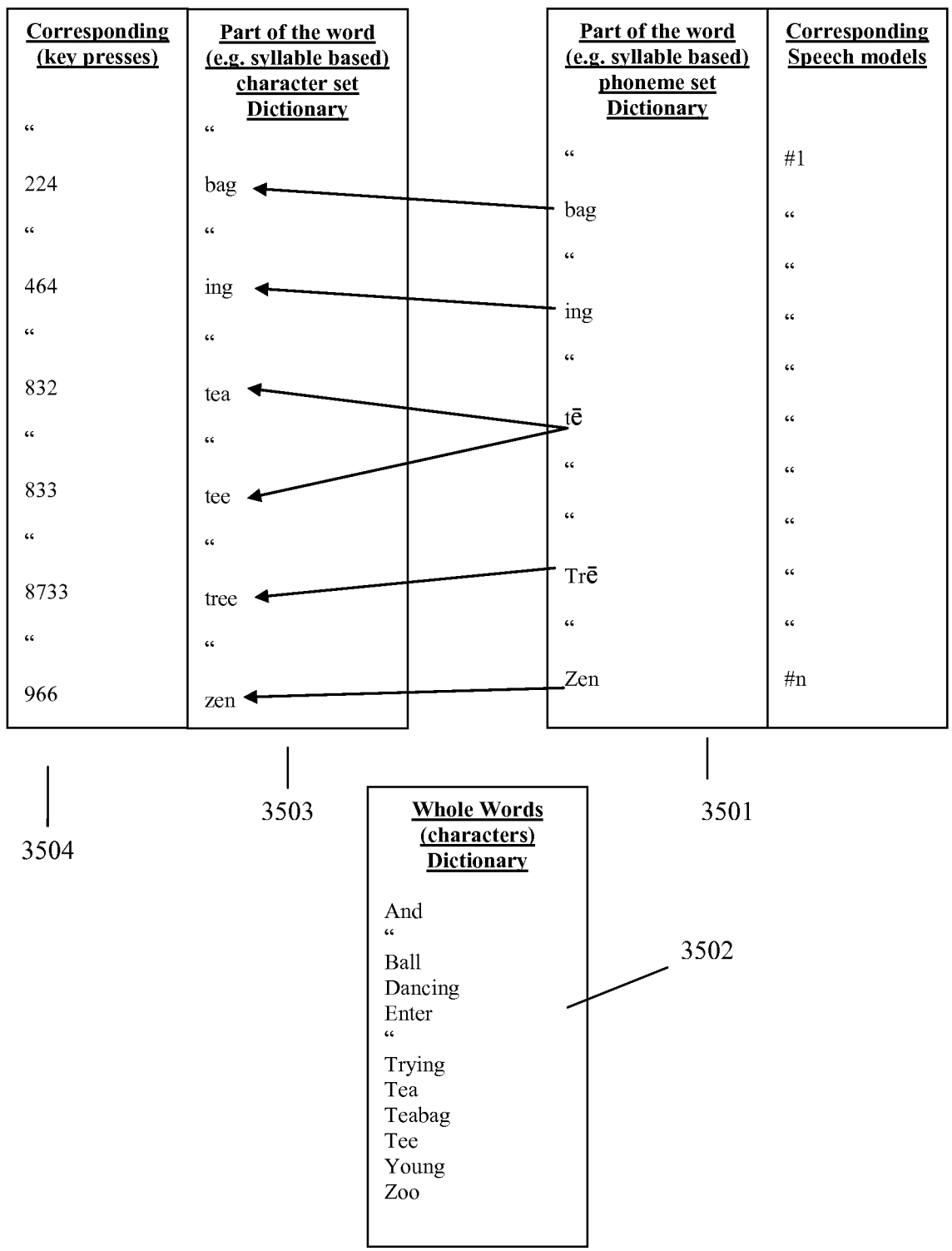
FIG. 35 illustrates a voice recognition chart, in accordance with one embodiment of the present invention.

According to the above-mentioned principles, there may be created a method of data entry wherein by considering/memorizing predefined sets of phonemes/speech-models corresponding to sub-speeches of a word and considering at least part of the key presses corresponding to the character-sets assigned to corresponding sets of phonemes/speech-models, recognition of entire words in a press and speak data entry system of the invention may become effective. FIG. 35 shows an exemplary dictionary of phoneme-sets (e.g. sets of phonemes) 3501 corresponding to sub-speeches of a whole words dictionary 3502, and a dictionary of character sets 3503 corresponding to the phoneme-sets of said phoneme-set dictionary 3501, also comprising a dictionary of key press values (according to a telephone keypad) 3504 corresponding to said dictionary of character sets 3503 corresponding to said dictionary of phoneme-sets 3501. According to different embodiments of the invention, one or more of these data bases may be used by the data entry system of the invention.

Because in many cases, a same phoneme set (or sub-speech model) may be used in order to recognize different words (having the same sub-speech pronunciation in their speech), less memorized phoneme-sets/speech-models are required for recognition of entire words available in one or more dictionary of words, reducing the amount of the memory needed. This will result in assignment of reduced number of phoneme-sets/character-sets to the corresponding keys of a keyboard such as a telephone-type keypad and will, dramatically, augment the accuracy of the speech recognition system (e.g. of an arbitrary text entry).

Figure 36:
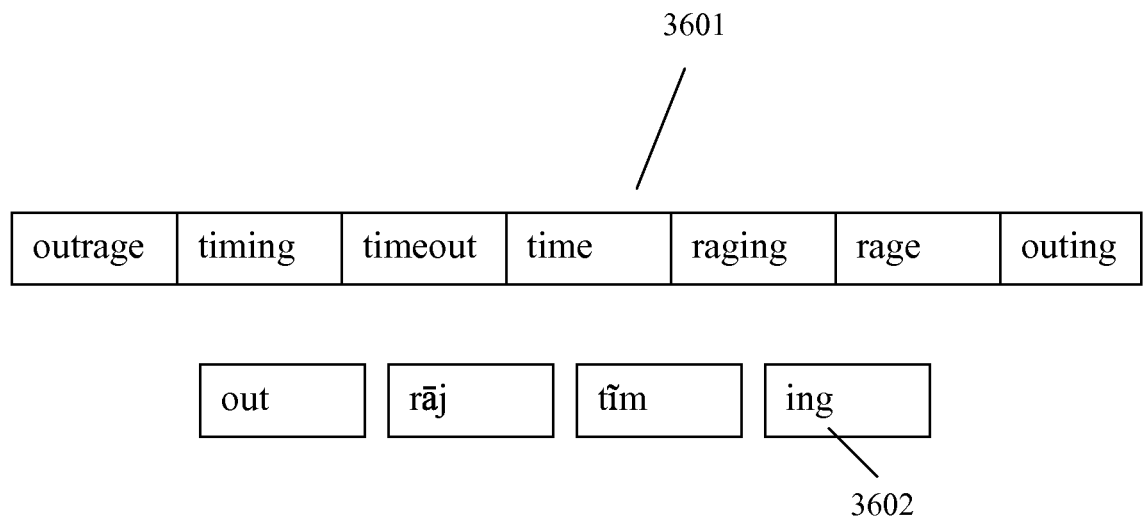
FIG. 36 illustrates a sample voice recognition, in accordance with one embodiment of the present invention.

FIG. 36 shows exemplary samples of words of English language 3601 having similar speech portions 3602. As shown, four short phoneme sets 3602, may produce the speech of at least seven entire words 3601. It is understood that said phoneme sets 3602 may represent part of speech of many other words in English or other languages, too.

Based on the above-mentioned principles, a natural press and speak data entry system using reduced number of phoneme sets for entering any word (e.g. general dictation, arbitrary text entry) through a mobile device having limited size of memory (e.g. mobile phone, PDA) and limited number of keys (e.g. telephone keypad) may be provided. The system may also enhance the data entry by for example, using a PC keyboard for fixed devices such as personal computers. In this case, (because a PC keyboard has more keys), still more reduced number of phoneme sets will be assigned to each key, augmenting the accuracy of the speech recognition system. Hereafter, different detailed embodiments of the invention are described.

All Keys—at Least Part of the Phonemes

According to one embodiment of the invention, a user may divide the speech of a word into different sub-speeches wherein each sub-speech may be represented by a phoneme-set corresponding to a chain of characters (e.g. a character-set) constituting a corresponding portion of said word. By speaking each phoneme set and/while pressing the keys corresponding to the letters corresponding to said phonemes-set/character-set and repeating (in order, from first to last) this procedure for all of (or at least part of) said sub-speeches, said entire word (e.g. in form of a chain of characters) may be inputted.

Figure 33:
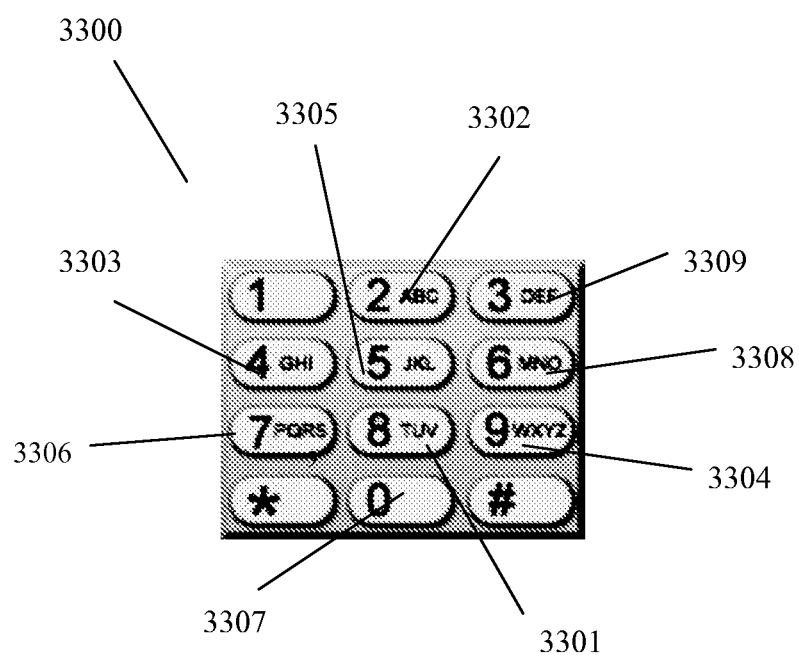
FIG. 33 illustrates a keypad, in accordance with one embodiment of the present invention.

As shown in FIG. 33, for example, the letter "t" is located on the key 3301 of the keypad 3300. To said key different sets of phonemes such as "t e", "ti", "ta", "to", etc. (in this example, said phoneme-sets correspond to character-sets starting with said letter "t), and/or corresponding speech models may be assigned (see table of FIG. 37). Pronouncing "t e" may correspond to different sets of letters such as "tea", "tee", or even "the" (for example, if the user is not an American/English native). As an example, to produce the word "teabag" a user may press the "t" key 3301 and say "t e" and continue to press the remaining keys corresponding to the remaining letters, "ea". According to one method, the system may compare the speech of the user with the speech (e.g. models) or phoneme-sets assigned to the first pressed key (in this example, "t" key 3301). After matching said user's speech to one (or more) of said phoneme-sets/speech-models assigned to said key, the system selects on or more of the character-set(s) assigned to said phoneme set(s)/speech-model(s). As mentioned, in this example, a same speech may correspond to two different sets of characters, one corresponding to the letters "tea" (e.g. key presses value 832) and the other corresponding to letters "tee" (e.g. key presses value 833). The system compares (e.g. the value of) the keys pressed by the user with the (e.g. values of) the key presses corresponding to the selected character sets and if one of them matches the user key presses the system chooses it to eventually being inputted/outputted. In this example the letters "tea" may be the final selection for this stage. An endpoint (e.g. end of the word) signal such as a space key press may inform the system that the key presses and speech for the current entire word are ended.

It must be noted that a phoneme-set (e.g. "tak"), representing a chain of characters (e.g. tac), may preferably be assigned to the same key that another phoneme (e.g. "t"), representing the first character (e.g. "t") of said chain of characters is assigned. Also, a single phoneme (e.g. "th"), represented by a chain of letters (e.g. "th"), and representing a chain of characters (e.g. "th"), may preferably be assigned to the same key that another phoneme (e.g. "t"), representing the first character (e.g. "t") of said chain of characters is assigned.

In the above-mentioned example, the selection is not final (e.g. so the user does not provide said end-point). The user then may press the key 3302 corresponding to the letter "b" (e.g. the first character in the following syllable in the word) and says "bag" and continue to press the remaining keys corresponding to the remaining letters "ag". The system proceeds like before and selects the corresponding character set, "bag". The user now, signals the end of the word by for example, pressing a space key.

By saying "t e" and pressing the keys 3301, 3309, 3302 (e.g. key values "8, 3, 1") and then saying "bag" and pressing the keys 3302, 3302, 3303 (e.g. key values "1, 1, 4"), the word "teabag" may be produced. As noticed, the word "teabag" is produced by speech and key presses without having its entire speech model/phoneme-set in the memory. In fact the speech model/phoneme-set of the word "teabag" was produced by two other sub-speech models/phoneme-sets (e.g. "t e" and "bag") available in the memory, each representing part of said speech model/phoneme-set of the entire word "teabag" and together producing said entire speech model/phoneme-set. The speech models/phoneme-sets of "t e" or "bag" may be used as part of the speech-models/phoneme-sets of other words such as "teaming" or "Baggage", respectively.

Although in this embodiment, the recognition accuracy is very high, it may happen that sometimes the final selection is an erroneous word which does not exist in the dictionary data base. For this reason, according to one embodiment of the invention, before inputting/outputting said word, the system may compare the final selection with the words of a dictionary of the word of the desired language. If said selection does not match a word in said dictionary, it may be rejected.

Also, according to one method, while pressing the corresponding keys of a portion of a word and speaking it, the user may speak in a manner that his speech covers said corresponding key presses during said entry. This will have the advantage that the user's speech at every moment corresponds to the key being presses simultaneously, permitting easier recognition of said speech. On the other hand, at the end of the entry of a word, a user may press any key without speaking. This may inform the system that the word is entirely entered (e.g. pressing a key and not speaking may be assigned to characters such as punctuation marks, PC functions, etc). This matter has already been explained in the PCT applications that have already been filed by this inventor.

After completion of the recognition procedures described above, if the selected output comprises more than one word, according to one embodiment, said words may be presented to the user (e.g. in a list printed at the display) and the user may select one of them by for example pressing a "select" key.

It must be noted that in some cases, recognizing part of the phonemes of one or more sub-speeches of a word (preferably, those at the beginning of said sub speeches), may be enough for recognition of the corresponding word in the press and speak data entry system of the invention.

According to one embodiment of the invention instead of considering all of the phonemes corresponding to a sub-speech of a word, only a few phonemes, (preferably those at the beginning of said sub-speech) may be considered and, preferably, assigned to the key(s) corresponding to the first letter of the character set(s) corresponding to said phoneme set. Said phoneme set may be used for the recognition purposes by the press and speech data entry system of the invention. According to this method, the number of the speech-models/phoneme-sets necessary for recognition of many entire words may dramatically be reduced. In this case, to each key of a keyboard such as a keypad, only few phoneme sets will be assigned permitting easier recognition of said phoneme sets by the voice/speech recognition system.

By using a speech recognition system for evaluation of all/few (preferably the beginning) characters of each sub-speech (preferably, the first sub-speech) of a word along with consideration of all of the key presses corresponding to all of the characters of said word, a word in a language may be recognized by the data entry system of the invention.

As mentioned before, different sets of phonemes (or speech models) according to sub-speeches of the words in a language may be considered and, preferably, memorized. Each of said sets of phonemes may correspond to a portion of a word at any location within said word. Each of said sets of phonemes may correspond to one or more sets (e.g. chain) of characters having similar/substantially-similar pronunciation. Said phoneme-sets may be assigned to the keys according to the first character of their corresponding character-sets. For example, the phoneme-set "t e", representing the character-sets "tee" and "tea", may be assigned to the key 3301 also representing the letter "t". If a phoneme-set represents two chains of characters each beginning with a different letter, then said phoneme-set may be assigned to two different keys each representing the first letter of one of said chain of characters. For example, for enhancing the accuracy of the voice recognition system of the invention, to the phoneme-set "and", character-sets "and" and "hand" having substantially similar pronunciations may be assigned. In this case, said phoneme-set may be assigned to two different keys, 3302, and 3303 representing the letters "a" and "h", respectively. It is understood that when pressing the key 3302 and saying "hand", the corresponding character-set, preferably, will be "and", and when pressing the key 3303 and saying "hand", the corresponding character-set, preferably, will be "hand".

FIG. 37 shows an exemplary table showing some of the phoneme sets that may occur at the beginning (or anywhere else) of a syllable of a word starting with the letter "t". The last row of the table also shows an additional example of a phoneme set and a relating character set for the letter "i".

Although phoneme sets having more phonemes (e.g. longer phoneme-sets such as, taps, t ake, t ast, etc.) may be considered, modeled, and memorized to help recognition of a word, in this embodiment wherein the user presses substantially all of the keys corresponding to the letters of a word, evaluating/recognizing few beginning characters of one or more portions (e.g. syllables) of said word by combining the voice/speech recognition and also using dictionary of words database and relating databases (such as key presses values) as shown in FIG. 35, may be enough for producing said word. Obviously, when needed, longer phoneme sets may also be used for better recognition and disambiguity.

As an example, by considering FIG. 33 and also using the table of the FIG. 37, to produce the word "title", a user may press the key 3301 corresponding to the letter "t" and say "t" and then press the remaining key presses corresponding to remaining letters "itle". At the end of the word the user may press for example, an end-of-the-word key such as a space key. As shown in said table, to the phoneme set "t", character sets such as "ti, ty, tie" are assigned. The first letter "t" is obviously, selected. Second letter will be "i", because of pressing the key 3303 (e.g. "y" is on the key 3304). The next key pressed is the key 3301 relating to the letter "t". In this case the character set "tie" possibility is rejected. So "ti" will be definitively selected. The system now considers "ti" along with the remaining key presses (values) 8 (e.g. "t, u, v"), 5 (e.g. "g, h, i"), and 3 (e.g. "d, e, f"). Comparing these input with a dictionary of words having corresponding key presses data base may reveal that the only word corresponding to these input is the word "title". The system then selects the word "title".

For better recognition, the user may speak more than one sub-speech of a word while pressing the corresponding keys. In this case, the system may consider said input by speech to better recognize the characters corresponding to said more than one sub-speech of said word.

By typing a word (having one or more portions/syllables) through a keyboard/keypad and speaking said word partially/entirely, in almost every case, recognition of few beginning characters of at least one of said portions/syllables (preferably, the first portion/syllable) of said word by the speech recognition system (helped by the evaluation of the corresponding key presses), combined with the evaluation of the key presses corresponding to the rest of the characters of said word, will produce said word.

In another example, to enter the word "taken" which comprises two sub-speeches/syllables, "t a" and "ken", when typing the first character "t" (key 3301), the user says "t a" and then presses the rest of the keys (e.g. "a") corresponding to the rest of the characters of the first syllable. The user then naturally proceeds to the next syllable and says "ken" while pressing the key 3305 corresponding to letter "k" and continues to press the remaining keys of said next syllable corresponding to the letters "en". He then may press, for example, a space key to inform the system of the end of data entry.

After completion of the recognition procedures described above, if the selected output comprises more than one word, said words may be presented to the user (e.g. in a list printed at the display) and the user may select one of them by for example pressing a "select" key.

Shortcut: Less Key Presses Combined with at Least Part of the Phonemes

Small mobile, electronic devices having keypads with limited number of keys are commonly used worldwide. Users press the keys of said keypads by using the fingers (e.g. thumb, forefinger) of one hand. Even in a the above-mentioned data entry systems wherein each symbol is entered by a single pressing action on a corresponding key, the speed of data entry is slower than the speed of the data entry using a PC keyboard wherein the users usually use the fingers of both hands to press the keys of the keyboard.

To enhance the data entry system of the invention and to permit quicker data (e.g. text) entry, a macro-level data/text entry system have been proposed in the PCT application PCT/US00/29647. In said PCT application, there was mentioned that macros (e.g. a chain of letters/characters) can be assigned to a key of a keypad and inputted by a single pressing action combined with/without voice/speech. By assigning at least part of the characters of a word to a single key press an entire word may be inputted by few key presses. By applying this method within the press and speak data entry methods of the invention, a quick data entry for mobile environment/small devices may be provided. In this method, the number of key presses are usually less than the number of the characters of a word (except for the single characters and some words such as out-of-dictionary-words, which may require character by character entry).

As mentioned before, phoneme-sets corresponding to at least a portion of the speech (including one or more syllables) of words of one or more languages may be assigned to different predefined keys of a keypad. Also, as mentioned before, each of said phoneme-sets may represent at least one character-set in a language. As mentioned before, a phoneme-set representing a chain of character such as letters (e.g. a character-set), may preferably be assigned to the same key that another phoneme representing the first character of said chain of characters is assigned.

According to a preferred embodiment of the invention, a user may press the key(s) corresponding to, preferably, the first letter of a portion of a word while, preferably simultaneously, speaking said corresponding portion. For this purpose a user may divide a word to different portions (e.g. according to, for example, the syllables of the speech of said word). Speaking each portion/syllable of a word is called "sub-speech", in this application. It is understood that the phoneme-sets (and their corresponding character-sets) corresponding to said divided portions of said word must be available within the system.

According to this embodiment, for example, to enter the word "tiptop" which may be divided in two sub-speeches (e.g. in this example, according to its syllables) "tip" and "top", the user may first press the key 3301 (e.g. phoneme/letter "t" is assigned to said key) and (preferably, simultaneously) say "tip" (e.g. the first sub-speech of the word "tiptop"), then he may press the key 3301 and (preferably, simultaneously) say "top" (e.g. the second sub-speech of the word "tiptop"). Using the exemplary table in the FIG. 37, set of characters "tip" is assigned to the set of phonemes "tip"

and to the letter "t" on the key 3301. When the user presses the key 3301 and says "tip", the system compares the speech of the user with all of the phoneme sets/speech models which are assigned to the key 3301. After selecting one (or more) of said phoneme sets/models which best match said user's speech, the system selects the character sets which are assigned to said selected set(s) of phonemes. In the current example, only one character set (e.g. tip) was assigned to the phoneme set "tip". The system then proceeds in the same manner to the next portion (e.g. sub-speech) of the word, and so on. In this example, the character set "top" was the only character set which was assigned to the phoneme set "top". The system selects said character set. According to one embodiment of the invention, after selecting all of the character sets corresponding to all of the sub-speeches/phoneme-sets of the word, the system then may assemble said character sets (e.g. an example of assembly procedure is described in the next paragraph) providing different groups/chains of characters. The system then may compares each of said group of characters with the words (e.g. character sets) of a dictionary of words data base available in the memory. For example, after selecting one of the words of the dictionary which best matches to one of said groups of characters, the system may select said word as the final selection. In this example, after entering the second portion/syllable, the user presses for example, a space key, or another key without speaking to inform the system that the word wad entirely entered (e.g. pressing a key and not speaking may be assigned to characters such as punctuation marks, PC functions, etc). This matter has already been explained in the PCT applications that have already been filed by this inventor.). The system assembles the character sets 'tip' and "top' and produces a group of characters "tiptop". If desired, the system then compares said group of characters with the words available in a dictionary of words data base of the system (e.g. an English dictionary) and if one of said words matches said group of characters the system inputs/outputs said word. In this example, the word "tiptop' exists in an English dictionary of the system. Said word is finally inputted/outputted.

FIG. 38 shows a method of assembly of selected character sets of the embodiments. For example, when a user tried to enter the word "envelope" in three sequences by using an embodiment of the invention, the system selected one to two character sets 3801 for each portion. As shown in FIG. 39, the system then may assemble said character sets according to their respective position within said word, providing different group of characters 3802. Said group of characters 3802 will be compared with the words of the dictionary of words of the system and the group(s) of characters which match(es) one or more of said words will be finally selected and inputted. In this example, the character set 3803 (e.g. envelope"), is the only character set which matches a word in said dictionary. Said word is finally selected.

As mentioned, in some cases, the speech recognition system may select more than one phoneme set/speech model for the speech of all/part (e.g. a syllable) of a word. For example, if a user having a "bad" accent tries to enter the word "teabag" according the current embodiment of the invention, he first presses the key 3301 and simultaneously says "t e". The system may not be sure whether the user said "t e", or "th e", both assigned to said key. In this case the system may select different character sets corresponding to both phoneme sets. By using the same procedure, the user then enters the second portion of the word. In this example, only one character set, "bag", was selected by the system. The user finally, presses a space key. The system, then may assemble (in different arrangements) said character sets to produce different group of characters and compare each of said group of characters with the words of a dictionary of words data base. In this example the possible group of characters may be:

"teebag"
"teabag"
"thebag"

The only group of characters that matches a word in a dictionary of words in for example, English language, is the word "teabag". This word may be considered as the final selection.

As just demonstrated, it may happen that the system selects more than one character set for each/some phoneme sets of a word. In this case, more than one group of characters may be assembled. Therefore, probably, more than one word of the dictionary may match said assembled groups of characters. In this case, said words may be presented to the user (e.g. in a list printed at the display) and the user may select one of them by for example pressing a "select" key. Also, if the system comprises enough memory and processing speed, a speech recognition system may be used to select one of said selected word according to, for example, the corresponding phrase context.

If a word/portion-of-a-word comprises many phonemes but its speech comprises a single syllable, according to one method, a phoneme-set/model comprising/considering all of said phonemes of said word/portion-of-a-word may be assigned to said word. For example, to enter the word "thirst", a phoneme set constituting of all of the phonemes of said world may be assigned to said word and to the (key of) letter "t" (e.g. positioned-on/assigned-to the key 3301). For example, the user presses the key 3301 and says "thirst". As explained before, the system selects the character set(s) (in this example, only one, "thirst") of sub-speech(es) (in this example, one sub-speech) of the word, and assembles them (in this example, no assembly). The system, then, may compare said characters set with the words of the dictionary of the word of the system and if said character set matches one of said words in the dictionary, then it selects said word as the final selection. In this case, the word "thirst" will be finally selected.

In some cases, specially when words are comprised of only one syllable, more than one key press for a syllable may be necessary for disambiguation of a word. For this purpose, different user-friendly methods may be implemented. For example, the word "fire", which originally comprises one syllable may be pronounced in two syllables comprising phoneme sets, "fi", and "re", respectively. The user in this case may first press the key corresponding to the letter "f" while saying "fi". He then, may press the key corresponding to the letter "r", and may say "re".

Also, for example, the word "times", may be pronounced in two syllables, "t" and "mes", or "t m" and "es". Also a word such as "listen", may be pronounced in two syllables, "lis", and "ten" which may require the key presses corresponding to letters "l' and "t", respectively. Also according to this principle, the word "thirst", may be divided in three portions, "thir", "s", and "t". For example, by considering that the phoneme set "thir" may already been assigned to the key comprising the letter "t" (e.g. key 3301), the user may press the key 3301, and say "thir', then he may press the key 3306 corresponding to the letter "s" and pronounce the sound of the phoneme "s" or speak said letter. He then, may press the key 3301 corresponding to the letter "t" and pronounce the sound of the phoneme "t' or speak said letter.

At the end of the word, the user may press an end-of-the-word key such as a space key 3307.

Also for better disambiguation and also for reducing the number of phoneme-sets necessary for words having for example, the same speech at their beginning (e.g. "bring" and "brings"), in addition to pressing the first key of a syllable, and speaking said syllable, in some cases one or more character such as the last character(s) (e.g. "s", in this example) of a word/syllable may be pressed and spoken. For example, a user may press a key corresponding to the character "b" and say "bring" (e.g. phoneme-set "bring" was assigned to the key "3302). He then, may press the key corresponding to the letter "s", and either pronounces "s" or speaks the sound of the phoneme "s'. After providing an end-of-the-word signal such as pressing the "space" key, the system will considers the two data input sequences, and provides the corresponding word "brings" (e.g. its phoneme set was not assigned to the key 3302). It is understood that entering one or more single character(s) by using the method here, may be possible in any position (such as in the beginning, in the middle, or at the end) within a word. For not confusing the system, when a user enters a portion (of a word) comprising a letter, by the word/part-of-a-word entry system of the invention, he preferably may speak the sound of said letter. For example, instead of saying "em", the user may pronounce the sound of the phoneme "m". Also in a similar case, speaking saying "t", may be related by the system to the chain of characters "tea', "tea" and the letter "t", while pronouncing the sound of the phoneme "t', may be related to only the letter As described before, for better disambiguation, a word/portion-of-a-word/syllable-of-a-word/sub-speech-of-a-word (such as "thirst" or "brings") having substantial number of phoneme sets may be divided into more than one portion wherein some of said portions may contain one phoneme/character only, and entered according to the data entry system of the invention. Also as mentioned, according to this approach, multiple phoneme-sets wherein each comprising fewer number of phonemes may replace a single phoneme-set comprising substantial number of phonemes, for representing a portion of a word (e.g. a syllable). Also as described before, dividing the speech of a long portion (e.g. long syllable comprising substantial number of phonemes) of a word into shorter sub-speech/phoneme-set portions, will reduce the total number of phoneme-sets necessary for recognition of all of the words available in a dictionary data base. As also described before, this will permit to assign less phoneme-sets to each key of the keyboard/keypad.

According to one embodiment of the invention, based on the above-mentioned principles, to each key of a keyboard/keypad, short phoneme-sets comprising few phonemes may be assigned. For this purpose, for example, if a phoneme-set starts with a consonant it may comprise following structures/phonemes:

only said consonant said consonant at the beginning, and at least one vowel after that said consonant at the beginning, at least one vowel after said consonant, and one consonant after said vowel(s) If the phoneme-set starts with a vowel, it may have the following structures:

at least one vowel at the beginning said vowel(s) at the beginning, and one consonant after that FIG. 40 shows some examples of the phoneme-sets 4001 for the constant "t" 4002 and the vowel "u' 4003, according to this embodiment of the invention. Columns 4004, 4005, 4006, show the different portions of said phoneme-sets according to the sound groups (e.g. consonant/vowel) constituting said phoneme-set. Column 4007 shows corresponding exemplary words wherein the corresponding phoneme-sets constitute part of the speech of said words. For example, phoneme set "t ar" 4008 constitutes portion 4009 of the word "stair". Column 4010 shows an estimation exemplary of the number of key presses for entering the corresponding words (one key press corresponding to the first character of each portion of the word according to this embodiment of the invention). For example, to enter the word 'until" 4011, a user will first press the key 3301 (see FIG. 33) corresponding to the letter "u" and preferably simultaneously, says "un". He then presses again the key 3301 corresponding to the letter "t", and also preferably simultaneously, says "til". To end the word, the user then informs the system by an end-of-the-word signal such as pressing a space key. The word until was entered by two key presses (excluding the end-of-the-word signal) along with the user's speech. According to the current embodiment based on the principles described before, a consonant phoneme which has not a vowel, immediately, before or after it, may be considered as a separate portion of the speech of a word. For example, the "s" at the beginning of the word "study" 4012, and the "s" in the middle of the word "understood" 4013 may follow this rule. This will extremely reduce the number of phoneme-sets necessary for entering most of the words available in a dictionary (e.g maybe around one hundred phoneme-sets per the beginning phoneme/character of a portion of a word may be enough for recognition of most of the words in for example, the English language, when using a telephone-type keypad). FIG. 40 shows as example, other beginning phonemes/characters such as "v" 4014, and "th" 4015 assigned to the key 3301 of a telephone-type keypad. For each of said beginning phonemes/characters, phoneme-sets according to the above-mentioned principles may be considered.

It is understood that if needed/desired longer sub-speech portions of a word, having more phonemes may also be considered with the short phoneme-sets of the system. Also for examples, phoneme sets representing more than one syllable of a word may also be considered and assigned, to a corresponding key as described. Also for easier recognition, as described in previous embodiments, to permit better recognition of the speech pronounced by the users that, in many cases, may be natives of non English spoken regions, character-sets corresponding to phoneme sets (such as "t o" and "to") having ambiguously similar pronunciation, may be assigned to all of said phoneme-sets.

Same predefined (preferably, short) phoneme-sets/speech-models may permit the recognition and entry of words in many languages. For example, the phoneme set "sha", may be used for recognition of words such as:

"shadow", in English,

"chaleur", in French,

"shalom', in Hebrew,

"shabab", in Arabic,

"Geisha", in Japanese, Etc.

To each of said phoneme sets, corresponding character-sets in a corresponding language may be assigned. As mentioned before, by doing so, a powerful multi-lingual data entry system based on phoneme-set recognition may be provided. For this purpose one or more data bases in different languages may be available within the system. Different methods to enter different text in different languages may be considered.

According to one method, by having a common phoneme-sets data base and the corresponding character-sets database in many languages, for entering text in a desired language, a user may select a language mode by informing the system by a predefined means. For example, said user may press a mode key to enter into a desired language mode. In this case after entering a word by entering the portions of a said word according to a corresponding embodiment of the invention, the system will compare the selected corresponding groups/chains of assembled character-sets with the words of a dictionary of words corresponding to said selected desired language. After matching said group of characters with one or more words of said dictionary, the system selects said matched word(s) as the final selection to be inputted/outputted. If the selection contains one word, said word may become the final selection. If the selection comprises more than one word, then said words may be presented to the user (e.g. in a list printed at the display) and the user may select one of them by for example using a "select" key.

According to another method, all data bases in different languages available with the system will be used simultaneously, permitting to enter an arbitrary word entry in different languages (e.g. in a same document). For example, after entering a word by entering the portions of a said word according to one embodiment of the invention, the system may compare the selected corresponding groups of characters with the words of a all of the dictionaries of words available with the system. After matching said group of characters with the words available in different dictionaries available with the system, the system selects said matched word(s) as the final selection to be inputted/outputted. If the selection contains one word, said word may become the final selection. If the selection comprises more than one word, then said words may be presented to the user (e.g. in a list printed at the display) and the user may select one of them by for example using a "select" key.

In some languages such as Hebrew or Arabic, wherein most of the vowels are not presented by separate characters, the system may even work with higher accuracy.

Non Comparison with the Dictionary of Words

The system may also work without the step of comparison of the assembled selected character-sets with a dictionary of word. This is useful for entering text in different languages without worrying about their existence in the dictionary of the words of the system. For example, if the system does not comprise a Hebrew dictionary of words, a user may enter a text in Hebrew language by using the roman letters. To enter the word "Shalom", the user will use the existing phoneme sets "sha" and "lom" and their corresponding character sets available within the system. A means such as a mode key may be used to inform the system that the assembled group of characters will be inputted/outputted or presented to the user for confirmation without said comparison with a dictionary database. If more than on assembled group of characters has been produced, they will be may be presented to the user (e.g. in a list printed at the display) and the user may select one of them by for example pressing a "select" key.

In the word/part-of-a-word entry embodiments of the invention, if the inputted/outputted word is not the one desired by the user, a word-erasing function may be assigned to a key. Similar to a character erasing function (e.g. delete, backspace) keys, pressing a word-erase-key will erase, for example, the word before the cursor on the display.

According to another embodiment of the invention, most phoneme-sets of the system may preferably, have only one consonant. FIG. 41 shows some of them as example.

According to this embodiment, for example, to enter the word "teabag" 4101, the user first presses the key 3301 while saying "t e". He then presses the key 3302 while saying "ba". He finally presses the key 3303 while saying "g" (or pronouncing the sound of the phoneme "g"). As in other embodiments, at the end of the word he may press a key such as space key.

For better response and to augment the accuracy of the system, an auto-correction software may be combined with the embodiments of the invention. Auto correction software are known by the people skilled in the art. For example, (by considering the keypad of FIG. 33) when a user tries to enter the word "network", he first presses the key 3308 of the keypad to which the letter "n" is assigned and simultaneously says "net". To the same key 3308 the letter "m" is also assigned. In some situations, the system may misrecognize the user's speech as "met" and select a character set such as "met" for said speech. The user proceeds to entering the next syllable by pressing the key 3304 corresponding to the first letter, "w", of said syllable and says "work". The system recognizes the phoneme set "work" pronounced by the user and selects a corresponding character set "work". Now the system assembles the two selected character sets and gets the word "metwork". By comparing this word with the words existing in the dictionary of the words database of the system, the system may not match said assembled word with any of said words of said database. The system then will try to match said assembled word with the most resembling word. In this case, according to one hypothesis the system may replace the letter "m" by the letter "n", providing the word "network", which is available in said dictionary. According to another hypothesis, by considering that "m", and "n" may be misrecognized by the voice recognition system and both are located on a same key, the system may replace the phoneme set "met' by the "phoneme set "net' and select the character set "net' assigned to the phoneme set "net". Then, by replacing the character set "met" by the character set "net', the word "network" will be assembled. Said word is available in the dictionary of the words of the system. It will finally be selected.

In another example, entering "that" may be recognized as "vat" by the system. Same procedure will disambiguate said word and will provide the correct word, "that".

In another example, if the system does not match an assembled group of characters with a word of the dictionary, the auto-correction software of the system may evaluate the position of the characters of said assembled character-set (relating to each other) in a corresponding portion (e.g. syllable) and/or within said assembled group of characters, and tries to match said group of characters to a word of the dictionary. For example, if a character is missing within said chain/group of characters, by said comparison with the words of the dictionary, the system may recognize the error and output/input the correct word. For example, if a user entering the word "un-der-s-tand" (e.g. in 4 portions), forgets to enter the portion "s" of said word, one of the assembled group of characters may be the chain of characters "understand". By considering the characters of said chain of characters and their position relating to each other in said chain, and comparing said chain of characters with the words of the dictionary, the system may recognize that the intended word is the word "understand" and eventually either will input/output said word or may present it to the user for user's decision. The auto-correction software of the system may, additionally, include part of, or all of the functionalities of other auto-correction software known by the people skilled in the art.

Words such as "to', "too", or "two", having the same pronunciation (e.g. and assigned to a same key), may follow special treatments. For example, the most commonly used word among these words is the word "to". This word may be entered according to the embodiments of the invention. The output for this operation may be the word "to" by default. The word "too', may be entered (in two portions "to" and "o") by pressing the key corresponding to the letter "t", while saying "t o o". Before pressing the end-of-the-word key, the user may also enter an additional character "o", by pressing the key corresponding to the letter "o", and saying "o". Now he may press the endpoint key. The word "too" will be recognized and inputted. To enter the word "two", the system may either enter it character by character, or assign a special speech such as "tro" to said word and enter it using this embodiment. Also for example, to enter "two", the user may press the key 3301 and pronounce a long "t o o". To enter the digit "2", the user presses the corresponding key 3302, and pronounces said digit. It is understood that examples shown here are demonstrated as samples. other methods of entry of the words having substantially similar pronunciations may be considered by the people skilled in the art.

A very interesting issue has just been mentioned. For example, by saying "f v" and pressing the key 3309 corresponding to the first letter of the word "five", the word "five" will be entered. Interestingly, by saying "f v" and pressing the key 3305 corresponding to the digit "5", the digit "five" will be entered. By saying a word corresponding to two different symbols, and using key presses, the user intention is clarified. This is one of the shortcomings of the data entry by the speech alone wherein the user intention may not be considered by the voice/speech recognition system. Also for example, to a same digit, more than one speeches may be assigned. For example, to the digit "4", two speeches, "four", and "forty", may be assigned. A user may produce the number "45", by either saying "four", "five" while pressing the corresponding keys, or he may say "forty five" while pressing the same keys. Also when a user presses the key 3306 and says "seven", the digit "7" will be inputted. This is because to enter the word "seven", the user may press the key 3306, and say "se". He then may press the key 3301 and say 'ven".

In other languages such as French, wherein the speech of the digit "7", comprises one syllable, for disambiguation purpose, a custom made speech having two syllables may be assigned to the character set "sept". For example, the word "septo" may be created by a user and added to the dictionary of the words. This word may be pointed to the word "sept" in the dictionary. When a user enters the word "septo" (according to the current embodiment of the invention) the system will find said word in the dictionary of the words of the system. Instead of inputting/outputting said word, the system will input/output the word pointed by the word "septo". Said word is the word "sept". The created symbols pointing to the words of the dictionary data base may be arranged in a separate database.

According to another method, a digit may be assigned to a first mode of interaction with a key, and a character-set representing said digit may be assigned to another mode of interaction with said key. For example, the digit "7" may be assigned to a single pressing action on the key 3306 (e.g. while speaking it), and the chain of characters "sept" may be assigned to a double pressing action on the same key 3306 (e.g. while speaking it).

It must be noted that the sub-speech-level data entry system of the invention is based on the recognition of the speech of at least part of a word (e.g. sub speech of a word). Considering that many words in one or more languages may have common sub-speeches, by slightly modifying/adding phoneme sets and assign the corresponding characters to said phoneme sets, a multi-lingual data entry system may become available. For example, many languages such as English, German, Arabic, Hebrew, and even Chinese languages, may comprise words having portions/syllables with similar pronunciation.

It is understood that a user may add new standard or custom-made words and corresponding speech to the dictionary database of the system. Accordingly, the system may produce corresponding key press values and speech models and add to corresponding databases.

As mentioned before, to enter a word, a user may press a key corresponding to the first character/letter of a first portion of a word and speak (the phonemes of) said portions. If said word is spoken in more than one portions, the user may repeat this procedure for each of the remaining portions of said word.

According to one embodiment of the invention, when the user presses a key corresponding to the first letter of a portion (such as a syllable) of a word and speaks said portion, the voice/speech recognition system hears said user's speech and tries to match at least part (preferably, at least the beginning part) of said speech to the phoneme sets assigned to said key. The best matched phoneme sets are selected and the corresponding character sets may be selected by the system. After entering the entire word by repeating the same procedure for each portion (e.g. syllable) of said word, one or more character sets for each portion (e.g. syllable) of said word may be selected, respectively. The system now, may have one or more character sets for each portion (e.g. syllable) of a word wherein each character set may comprise at least part of the (preferably, the beginning) characters of said syllables. The system then, will try to match each of said characters sets to the (e.g. beginning) characters of the corresponding syllables of the words of a dictionary of the words data base of the system. The best matched word(s) will be selected. In many cases only one word of the dictionary will be selected. Said word will be inputted/outputted. If more than one word available is selected, said words may be presented to the user (e.g. in a list printed at the display) and the user may select one of them by for example pressing a "select" key.

For example, by using the table of the FIG. 37, and the keypad of the FIG. 33, to enter the word "trying" (e.g. phonemes-sets "tr -ing), the user may first press the key 3301 and say "tr". The system matches the user's speech to the corresponding phoneme set assigned to the key 3301 and selects the corresponding character sets (e.g. in this example, "try", "tri"). The user then presses the key 3303 corresponding to the character "i" and says "ing". In this case, the system matches the beginning of the user's speech to the phoneme set "in" assigned to the key 3303 (e.g. phoneme set "ing" does not exist in the exemplary data base, therefore it is not assigned to said key) and selects the corresponding character set "in". The user now has finished to enter the word and he enters an endpoint (e.g. end of the word) symbol such as pressing a space key or pressing any key without speaking (e.g. pressing a key and not speaking may be assigned to characters such as punctuation marks, PC functions, etc. This matter has already been explained in the PCT applications that have already been filed by this inventor). The system now may create different groups of characters each comprising possible characters of at least part of the beginning characters of each portion/syllable of the desired word. In this example, two group of characters may be created. Said groups of characters are:

"tri-in"

and;

"try-in" Only the second group of characters (e.g. "try in") corresponds to an existing word in the English dictionary wherein said word comprises the letters "try" at the beginning of its first syllable, and also comprises the letters "in" at the beginning of another (e.g. second) syllable of said word. Said word is the word "trying".

In this system the quantity of phoneme sets/speech models necessary for recognition of many entire words may dramatically be reduced. On the other hand the number of the sets of character representing said phoneme sets may be augmented but will not have a significant impact on the amount of memory needed.

In many cases only one of said assembled characters may match a word in the dictionary. Said word will be inputted/outputted. If more than one assembly of character sets correspond to words available in the dictionary, said words may be presented to the user (e.g. in a list printed at the display) and the user may select one of them by for example pressing a "select" key.

As mentioned before, the system may select a word according to one or more of said selected character/phoneme sets corresponding to speech/sub-speech of said word.

In some cases, the system may not consider one or more of said selected character/phoneme sets, considering that they were erroneously selected by the system. Also, according to the needs, the system may consider only part of (preferably, beginning) the phonemes/characters of a phoneme-set/character-set selected by the system. For example, if the user attempts to enter the word "demonstrating", in four portions "de-mons-tra-ting", and the system erroneously selects the character sets, "des-month-tra-ting", according to one recognition method (e.g. comparison of said character-sets with the words of the dictionary), the system may not find a word corresponding to assembly of said sets of characters. The system then, may notice that by considering the letters "de" (e.g. few begging letters) of the first selected character-set and the letters "mon" (few begging letters) of the second character-set, also considering the third and forth character sets, the intended word may be the word "demonstrating". Also as needed, the system may add characters to an assembled (of the selected character sets) chain of characters or delete characters from said chain of characters to match it to a best matching word of the dictionary. For example, if the user attempts to enter the word "sit-ting", in two portions, and the system erroneously selects the character sets, "si-ting", according to a recognition method (e.g. comparison of said character/phoneme sets with the words of the dictionary), the system may decide that a letter "t" must be added after the letter "i", within said chain of characters to match it to the word "sitting". In another example, if the user attempts to enter the word "mee-ting", in two portions, and the system erroneously selects the character sets, "meet-ting", according to a recognition method (e.g. comparison of said character/phoneme sets with the words of the dictionary), the system may decide that a letter "t" must be deleted after the letter "e", in said chain of characters to match it to the word "meeting".

Having a same phoneme at the end of a portion of a word (e.g. said word having more than one portion/syllable) and at the beginning of the following portion of said word may permit better recognition accuracy by the system.

According to one embodiment of the invention, for example, to phoneme-sets (assigned to a key) terminating with a phoneme such as a vowel, additional phoneme-sets comprising said phoneme-set and an additional phoneme such as a consonant at its ends may be considered and assigned to said key. This may augment the recognition accuracy. For example, by referring to FIG. 33, when entering the word "coming" comprising two portions "co-ming", the user may press the keys 3302 and say "co", then he may immediately press the key 3308 and say "ming" Because the first portion of the sub-speech is too short, if the phoneme-set "com" is not assigned to the same key 3302 wherein the phoneme-set "co" is assigned, while pressing said key and saying "co", it may happen that the system may misrecognize the speech of said portion by the user and select an erroneous phoneme-set such as "col" (e.g. to which the character-set "call" is assigned). On the other hand if the phoneme-set "com" is also assigned to said key, the beginning phoneme "m" of the portion "ming" would be similar to the ending phoneme "m" of the phoneme-set "com". In this case the system may select two phoneme-sets "com-ming" and their corresponding character-sets, (e.g. "com/come", and "ming" as example). After comparing the assembled character-sets with the words of the dictionary, the system may decide to eliminate one "m" in one of said assembled character-set and match said assembled character-set it to the word "coming" of the dictionary database.

To permit better recognition of the speech pronounced by the users that, in many cases, may be natives of non English spoken regions, character sets correspondingly assigned to phoneme sets (such as "vo" and "tho") having ambiguously substantially similar pronunciation, may be assigned to all of said phoneme sets. For example, to each of the phoneme sets "vo" and "tho", same (e.g. common) character-sets "tho", "vo", and "vau", etc., may be assigned, wherein in case of selection of said character-sets by the system and creation of different groups of characters accordingly, the comparison of said groups with the words of the dictionary database of the system may result in selection of a desired word of said dictionary.

Entering data such as text through a small keypad severely reduces the data entry speed. The data entry systems of the invention based on pressing a single key for each portion/syllable of a word, while speaking said portion/syllable dramatically augments the data entry speed. The system has also many other advantages. One advantage of the system is that it may recognize (with high accuracy) a word by pressing maybe a single key per each portion (e.g. syllable) of said word. Another great advantage of the system is that the users do not have to worry about misspelling/mistyping a word (e.g. by typing the first letter of each portion) which, particularly, in word predictive data entry systems result in misrecognition/non-recognition of an entire word. Also another great advantage of the system is that when a user presses the key corresponding to the first letter of a portion of a word, he speaks (said portion) during said key press. At the end of a word, the user may enter a default symbol such as a punctuation mark (assigned to a key) by pressing said key without speaking. As mentioned before, this key press may also be used as the end-of-the-word signal. For example, a user may enter the word "hi", by pressing the key 3303 and simultaneously say "h". He then may press the key 3306 without speaking. This will inform that the entry of the word is ended and the symbol "," must be added at the end of said word. The final input/output will be the character set "hi,".

The data entry system described in this invention is a derivation of the data entry systems described in the PCTs and US patent applications filed by this inventor. The combinations of a character by character data entry system providing a full PC keyboard function as described in the previous applications and a word/portion-of-a-word level data entry system as described in said PCT application and here in this application will provide a complete fast, easy and natural data entry in mobile (and even in fix) environments permitting quick data entry through keyboards having reduced number of keys (e.g. keypads) of small electronic devices.

Figure 42:
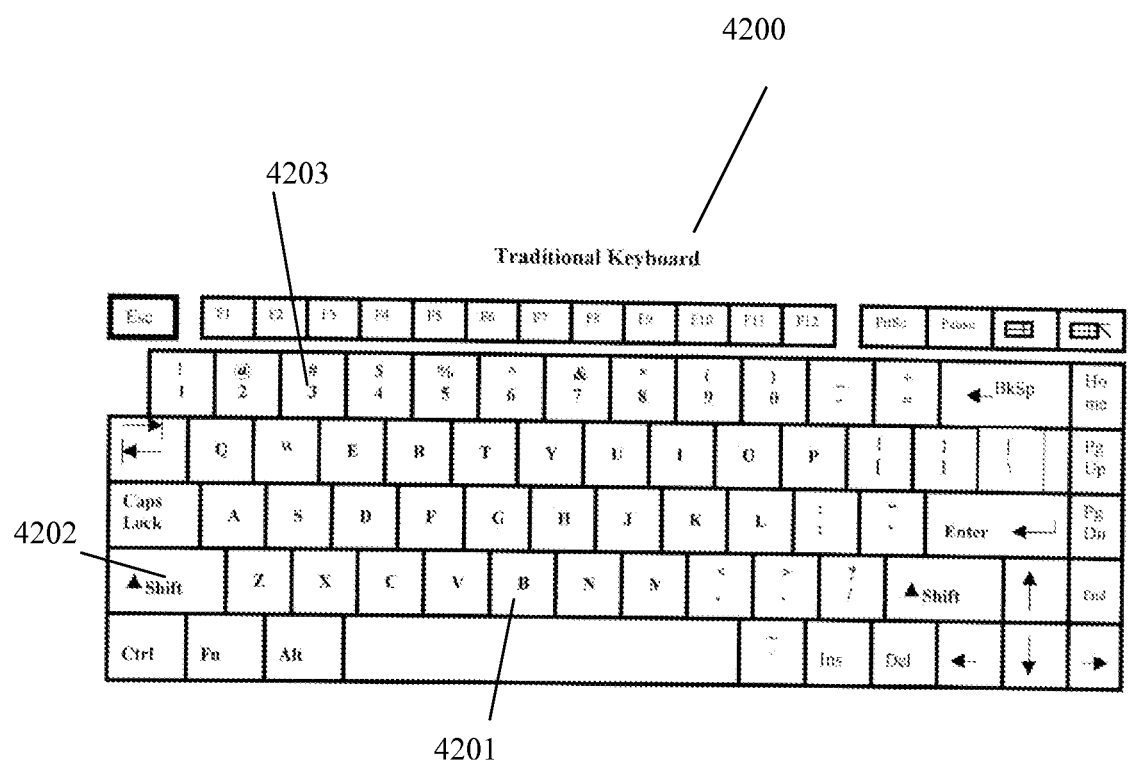
FIG. 42 illustrates a traditional keyboard, in accordance with one embodiment of the present invention.

As mentioned before, the data entry system of the invention may use any keyboard such as a PC keyboard. Also as mentioned, according to the data entry system of the invention, a symbol on a key of a keyboard may be entered by pressing said key without speaking. The data entry system of the invention may optimally function with a keyboard such as a standard PC keyboard wherein a single symbol is assigned to a predefined pressing action on one or more keys. As is known by people using computer keyboards such as the one shown in FIG. 42, for example, by pressing a key 4201 of a PC keyboard 4200, the letter "b" may be entered. Also for example, by pressing, simultaneously, the shift key 4202 and the key 4203, the symbol "#" may be entered.

By combining the data entry system of the invention with such a keyboard, on one hand a user may use said keyboard as usual by pressing the keys corresponding the desired data without speaking said data (this permits to enter single letters, punctuation characters, numbers, commands, etc., without speaking), and on the other hand, said user may enter a desired data (e.g. word/part-of-a-word) by speaking said data and pressing (preferably simultaneously) the corresponding key(s). For example, by using a keyboard such as a PC keyboard, to enter the letter "b", the user may press the key 4201 without speaking. To enter the word/syllable "band", the user may press the key 4201 and (preferably, simultaneously) say "band". Without the necessity of additional manipulation for changing modes, this, on one hand permits the user to work with the keyboard as usual, and on the other hand enables said user to enter a macro such as a word/part-of-the-word by speaking said macro and (preferably, simultaneously) pressing the corresponding one or more key. Also, for example, to enter the word "bible" constituting of two portions (e.g. two syllables) "bi" and "ble", a user (according to the principles of the data entry system of the invention, as described) may press the key 4201 and say "b". He, then, may press the key 4201 and say "bel".

As mentioned before, the combinations of a character by character data entry system providing a full PC keyboard function as described in the previous applications and a word/portion-of-a-word level data entry system as described in said PCT application and here in this application will provide a complete fast, easy and natural data entry system.

Speech of a word may be comprised of one or more sub-speeches also corresponding to single characters. For example, by referring to FIG. 33, when a user presses the key 3302 of the keypad 3300 and says "b", said data entered, may correspond to the letter "b", the word "be", and the word "bee". According to one embodiment, the system may assign the highest priority to the character level data, considering (e.g. in this example, the letter "b") as the first choice to eventually being inputted/presented to the user. If this is not what the user intended to enter, he then may either continue to enter the rest of the word, character by character, or he, for example, may press an end key to finish the entry of said word and then for example, manipulate a select-key to navigate between the other choices (e.g. "be", and "bee", in this example) and select the one he desires.

According to this method, also for example, while entering a word/chain-of-characters starting with a sub-speech corresponding to a single character and also eventually corresponding to the speech of a word/part-of-a-word assigned to said key, said character may be given the highest priority and eventually being printed on the display of a corresponding device, even before the end-of-the-word signal is inputted by the user. If the next part-of-the-speech/sub-speech entered, may still correspond/also-correspond to a single letter, this procedure may be repeated. If an end-of-the-word signal such as a space key occurs, said chain of characters may be given the highest priority and may remain on the display. Proceeding to a next task, such as entering the next word, will be considered as confirmation of acceptance of said chain of characters by the user. If the same data entered also corresponds to one or more words matched by the system, said words may also be available/presented to the user. If said printed chain of single characters is not what the user intended to enter, the user may, for example, use a select key to navigate between said words and select the one he desires.

With continuous description of this embodiment of the invention, if one of the data (speech/part-of-the-speech and/or key press) entered during entering a word/part-of-a-word, does not correspond to a single character and at the end-of-the-word signal has been inputted, then said displayed characters may be erased and instead, the word (corresponding to said data) with highest priority may be presented to the user. If the same data entered also corresponds to more words, said words may also be presented to the user, if he desires. In this case, the user may, for example, use a select key to navigate between said words and select the word he desires.

By using a standard telephone keypad and the data entry of the system of the invention, there may be noticed that in English language there are no words with more than one syllable wherein the speech of all of said syllables also correspond to single letters on the corresponding keys.

There are several one-syllable words which correspond to a character on a corresponding key (e.g. "b, be, bee", or "t, tea, tee"). As mentioned, in those cases, said single letters may be given the highest priority. According to the above-mentioned principles, for example:

to enter "b", the user presses the key corresponding to said letter and says "b"

to enter "bmx", the user presses the corresponding keys while pronouncing the corresponding letters to enter "bmx95", the user presses the corresponding keys and pronounces the corresponding characters to enter the word "before", the user may either press the corresponding keys while pronouncing the corresponding letters (e.g. character by character data entry), or for example, he first may press the key corresponding to letter "b" and (preferably, simultaneously) says "b e" and then he presses the key corresponding to the letter "f" and says "for". At the end he enters an end-of-the-word signal such as pressing a space key (e.g. word/portion-of-a-word data entry system).

The advantage of this method is in that the user may combine character by character data entry of the invention with the word/part-of-the-word data entry system of the invention, without switching between different modes.

The data entry system of the invention is a complete data entry system enabling a user at any moment to either enter arbitrary chain of characters comprising symbols such as letters, numbers, punctuation characters, (PC) commands, or enter words existing in a dictionary database.

According to one embodiment of the invention, the character-sets (corresponding to the speech of a word/part-of-a-word) selected by the system may be presented to the user before the procedure of assembly and comparison with the word of the dictionary database is started. For example, after each entry of a portion of a word, the character-sets corresponding to said entered data may immediately be presented to the user. The advantage of this method is in that immediately after entering a portion of a word, the user may verify if said portion of the word was misrecognized by the system. In this case the user may erase said portion and repeat (or if necessary, enter said portion, character by character) said entry until the correct characters corresponding to said portion are entered. Instead of erasing one by one the characters corresponding to an entered portion of a word, a key permitting to erase the entire characters corresponding to said portion may be provided. According to one embodiment of the invention, a same key may be used to erase an entire word and/or a portion of a word. For example, a single press on said key may result the erasing an entered portion of a word (e.g. a cursor situated immediately after said portion by the system/user indicates the system that said portion will be deleted). Obviously, each additional same pressing action may erase an additional portion of a word before said cursor. Also for example, a double press on said key may result in erasing all of the portions entered for said word (e.g. a cursor may be situated immediately after the portions to be deleted to informs the system that all portions of a word situated before said cursor must be deleted).

It may happen that a user desires to enter a chain of characters such as "systemXB5" comprising entire word(s) and single character(s).

According to one embodiment, after each entry of the data corresponding to a portion of said chain of characters or at the end of the entry of said entire chain of characters, the system may recognize that there is no word in the dictionary that corresponds to the selected character-sets corresponding to each portion of the word. In other hand the system may recognize that the assembly of some of consecutive selected character-sets, correspond to a word in the dictionary database while the others correspond to single characters. In this case the system will form an output comprising of said characters and words in a single chain of characters. In the example above, the word "systemXB5" may be entered in five portions, "sys-tem-x-b-5".

For example, by using a telephone keypad such as the one shown in FIG. 33, the selected character-sets corresponding to the key press and speech of each portion may be as follow:
TABLE-US-00002 portion sys tem x b 5 character-set sis/sys tem/theme x b/be/bee 5

After assembling and comparing said character-sets with the words of a dictionary, the system may recognize that there is no word in the database matching the assemblies of said selected character-sets. Then the system may recognize that there are on one hand some portions corresponding to a single character, and on the other hands a single character-set or combination of successive other character-sets correspond to the word(s) in said database. The system then inputs/outputs said combination. In this example, the system may recognize that the assembly of a first and a second character-set "sys" and "tem", matches the word "system". The third and fifth character-sets correspond to the letter "x" and the number "5" respectively. The forth portion may correspond either to the letter "b", or to the words "be" and "bee".

The system may present to the user the following choices according to their priority:
"systemxb5"
"systemxbe5"
"systemxbee5"

It is understood that for easing the recognition procedure of chain of characters comprising single characters and an entire word, the user may signal the start/end of said words/characters in said chain by a predefined signal such as pressing a predefined key.

According to one embodiment of the invention, a word being divided into more than one portions for being inputted, may preferably, be divided in a manner that, when possible, the speech of said portions start with a vowel. For example, the word "merchandize" may be divided in portions "merch-and-ize". Also for example, the word "manipulate" may be divided into "man-ip-ul-ate".

Also for better results, the selected character-sets corresponding to a phoneme-set corresponding to the speech of a portion of a word may consider the corresponding phoneme-sets when said character-sets are compared with the words of the dictionary database. For example, in English language, the corresponding character-sets for the phoneme-set "ar" may be character-sets such as "air", "ar", and "are". The corresponding character-sets for the phoneme-set "ar" may be "are", and "ar". In this example, both phoneme-sets have similar character-sets, "are", and "ar". In case of misrecognition of the input, the system may attempt for a (e.g. reverse) disambiguation or correction procedure. Knowing to which phoneme-set a character-set is related, may help the system to better proceed to said procedure. For example, if the user intends to enter the word "ar", and the system erroneously recognizes said speech as "ab" (e.g. no meaning in this example). Relating character-sets for said erroneously recognized phoneme-set may be character-sets such as "abe", "ab". By considering said phoneme-set, the system will be directed towards the words such as "aim", "ail", "air", etc. (e.g. relating to the phoneme "a"), rather than the words such as "an", "am" (e.g. relating to the phoneme "a").

As mentioned before, phoneme sets representing more than one syllable of a word may also be considered and assigned to a key and entered by an embodiment of the invention (e.g. a phoneme-set corresponding to a portion of a word having two syllables may be entered by speaking it and pressing a key corresponding to the first character of said portion). Also as mentioned before, an entire word may be entered by speaking it and simultaneously pressing a key corresponding to the first phoneme/character of said word. Even a chain of words may be assigned to a key and entered as described. It may happen that the system does not recognize a phoneme-set (e.g. sub-speech), of a word having more than one sub-speech (e.g. syllable). In this case, two or more consecutive sub-speeches (e.g. syllables) of said word may be assigned to a key. Referring to FIG. 33, for example, the word "da-ta" (e.g. wherein for example, the system misrecognises the phoneme-set "ta"), may be assigned to the key 3309. To enter said word, the user may press the key 3309 and say "data".

Press and speak data entry system of the invention permits to enter words, therefore an end-of-the-word procedure may automatically or manually being managed by the system or by the user, respectively.

As described before, there are different kinds of words being entered such as the:

Words being entered in one portion by a single sub-speech/speech (e.g. words having one syllable) combined with the corresponding key press(es)

Words being divided into more than one portion (e.g. words having more than one syllable, or words having one syllable but comprising multiple consecutive consonants or vowels) and being entered by sub-speech/speech corresponding to each portion combined with the corresponding key press(es) for each portion.

According to one embodiment of the invention, when an entire word corresponding to an existing word in a database of the words of a language is entered and the user enters an end-of-the-word signal such as pressing an "End-of-a-Word" key, then said word may be considered as the result of said data entered for being inputted/outputted. According to predefined system design/mode, the system may consider to add or not to add a character such as a space character at the end of said result. If the system or the user, do not enter a symbol such as a space character or an enter-function after said word, the next entered word/character will may be attached to the end of said word.

Example

"FOR" followed by an "End-of-the-Word" key (no spacing), results "FOR"

According to another embodiment of the invention, when an entire word corresponding to an existing word in a database of the words of a language is entered and the user enters additional symbols such as at least a space character, at least a punctuation mark, or at least an "enter" function at the end of said word, then said word and said additional symbols are entered.

EXAMPLES

"FOR" followed by an " " results "FOR "
"FOR" followed by a "," results "FOR,"
"FOR" followed by an "." results "FOR."

According to one embodiment of the invention, when a user enters a word corresponding to an existing word in a dictionary database of the words of a language and then said user enters a next word (without entering an end-of-the-word signal such as a space character between said two consecutive words) also corresponding to an existing word in the dictionary, but the assembly of said two words does not correspond to a word in a dictionary of words database, then the system may automatically add a space character between said two words.

Example: "FOR" followed by "SOME" results "FOR SOME"

According to one embodiment of the invention, when a user enters a word corresponding to an existing word in a dictionary database of the words of a language and then said user enters a next word (without entering an end-of-the-word signal such as a space character between said two consecutive words) also corresponding to an existing word in the dictionary, and the assembly of said two words also correspond to a word in a dictionary of words database, then the system may present two choices to the user. A first choice may be the assembly of said two words (without a space character between them), and the second choice will be said two words comprising one (or more) space character between them. According to factors such as predefined system design, meaning of assembled and separate meaning of said words, phrase concept, etc., the system may give a higher priority to one of said choices and may print it on the display of the corresponding device for user confirmation. The user, then, will decide which one to select. For example, proceeding to the entry of the next word/character may inform the user that the first choice was confirmed.

Example 1

"FOR" followed by "GIVE" may result a first choice "FORGIVE"
"FOR" followed by "GIVE" may result a second choice "FOR GIVE"

Example 2

"WORK" followed by "MAN" may result "WORKMAN"
"WORK" followed by "MAN" may also result "WORK MAN"

The above-mentioned procedure may apply to words such as the following word(s) also corresponding to the same principles.

Example

"WORKMAN" followed by "SHIP" may results "WORKMANSHIP"
"WORKMAN" followed by "SHIP" may also result "WORKMAN SHIP"

According to one embodiment of the invention, when a first word corresponding to an existing word in a database of the words of a language is entered and the user enters a next word/portion-of-a-word to the end of said first word (with no space character between them) and said next word/portion does not corresponds to an existing word in the dictionary, but said next word/portion assembled with said first word corresponds to a word in the dictionary, then the system will automatically attach said first word and said second word/portion to provide a single word.

Example

"FOR" followed by "CING" results "FORCING"
"FORGIVE" followed by "NESS" results "FORGIVENESS"

According to one embodiment of the invention, when a first entered word/portion-of-a-word does not exist in a database of the words of a language and the user enters a next word/portion-of-a-word, the system will assemble said first and next portions and compares said assembly with the words in a dictionary. If said assembly corresponds to a word in said dictionary, then the system selects said word and eventually presents it to the user for confirmation.

Example

"SYS" followed by "TEM" results "SYSTEM"

It is understood, that for better results, also for reducing the ambiguity, automatic end-of-the-word procedure may be combined with user intervention. For example, pressing a predefined key at the end of a portion, may inform the system that said portion must be assembled with at least one portion preceding it. If defined so, the system may also place a space character at the end of said assembled word.

Example 1: Without User Intervention, the Following Situation May Occur

"FOR" followed by "GIVE" may result a first choice, "FORGIVE"
"FOR" followed by "GIVE" may result also a second choice, "FOR GIVE"

Example 2: With User Intervention, the Following Situation May Occur

"FOR" followed by "GIVE" followed " " may result one choice, "FORGIVE

Entering the system into a manual/semi-automatic/automatic end-of-the-word mode/procedure may be optional. A user may inform the system by a means such as a mode button for entering into said procedure or exiting from it. This is because in many cases the user may prefer to manually handle the end-of-the-word issues.

As mentioned in a previous embodiment, the user may desire to, arbitrary, enter one or more words within a chain of characters. This matter has already been described in one of the previous embodiments of the invention.

Example: "91 SYSTEMep7"

According to one embodiment of the invention, the system may present to the user, the current entered word/portion-of-a word (e.g. immediately) after its entry (e.g. speech and corresponding key press) and before an "end-of-the-word" signal has been inputted. The system may match said portion with the words of the dictionary, relate said portion to previous words/portions-of-words, current phrase context, etc., to decide which output to present to the user. The system may also, simply present said portion, as-it-is, to the user. This procedure may also enable the user to enter words without spacing between them. For example, after a selected result (e.g. word) presented to the user has been selected by him, the user may proceed to entering the following word/portion-of-a-word without adding a space character between said first word and said following word/portion-of-a word. The system will attach said two words.

Example

"PRESS" followed by "SPEAK" results "PRESSSPEAK"

In addition to standard words in a dictionary, the word database of the system may also comprise abbreviations, words comprising special characters (e.g. "it's"), user's-made word, etc.

Referring to FIG. 33, for example, when a user presses the key 3303 and says "its", the system may select the words, "its", and "it's" assigned to said pressing action with said key and said (portion of) speech. The system may either itself select one of said words (e.g. according to phrase concept, previous word, etc.) as the final selection or it may present said selected words to the user for final selection by him. In this case the system, for example, may print the word with highest priority (e.g. "its") at the display of the corresponding device. If this is what the user desired to enter, then the user may use a predefined confirmation means such as pressing a predefined key or proceeding to entering the following data (e.g. text). Proceeding to entering the following data (e.g. text) may be considered by the system as the confirmation of the acceptance of the current proposed word. If said printed/proposed word is not what the user intended to enter, then the user may select the other selected words (e.g. "it's") by a selecting means provided within the system. According to another embodiment, when two words have a similar pronunciation, a phoneme-set representing of one of said words (e.g. the word "its" in the above-mentioned example) may be assigned to a first kind of interaction (e.g. a single press) with a key, and a similar phoneme-set representing the other word (e.g. the word "it's") may be assigned to a second kind of interaction (e.g. a double-press) with said key.

As mentioned previously, symbols (e.g. speech/phoneme-sets/character-sets/etc.) may be assigned to a mode/action such as double-pressing on for example, a key, combined with/without speaking. According to one embodiment of the invention, an ambiguous word(s)/part-of-a-word may be assigned to said mode/action. For example, the words "tom" and "tone" (e.g. assigned to a same key 3301) may cause ambiguity when they are pronounced by a user. One solution to disambiguate them may be in assigning each of them to a different mode/action with said key. For example, a user may single press (e.g. pressing once) the key 3301 and say "tom" (e.g. phoneme-set "tom" is assigned to said mode of interaction with said key) to enter the character-set "tom" of the example. Also said user may double-press the key 3301 and say "ton" (e.g. phoneme-set "ton" is assigned to said mode of interaction with said key) to enter the character-set "tone" of the example.

Also for example, a first phoneme-set (e.g. corresponding to at least part of the speech of a word) ending with a vowel may cause ambiguity with a second phoneme-set which comprises said first phoneme-set at the beginning of it and includes additional phoneme(s). Said first phoneme-set and said second phoneme-set may be assigned to two different modes of interactions with a key. This may significantly augment the accuracy of voice/speech recognition, in noisy environments. For example, the phoneme-set corresponding to the characters set "mo" may cause ambiguity with the phoneme-set corresponding to the characters set "mall" when they are pronounced by a user. For better disambiguation, each of them may be assigned to a different mode. For example, the phoneme-set of the chain of characters "mo" may be assigned to a single-press of a corresponding key and the phoneme-set of the chain of characters "mall" may be assigned to a double-press on said corresponding key.

According to another embodiment of the invention, the symbols (e.g. phoneme-sets) causing ambiguity may be assigned to different corresponding modes/actions such as pressing different keys. Although obviously it is not convenient, in the example above, the first phoneme-set (e.g. of "mo") may, for example, be assigned to a first key such as 3308, and the second phoneme-set (e.g. of "mall") may be assigned to another key.

Also, according to one embodiment of the invention, a first phoneme-set represented by a at least a character representing the beginning phoneme of said first phoneme-set may be assigned to a first action/mode (e.g. with a corresponding key), and a second phoneme-set represented by at least a character representing the beginning phoneme of said second phoneme-set may be assigned to a second action/mode, and so on. For example, the phoneme-sets starting with a representing character "s" may be assigned to a single press on the key 3301, and the phoneme-sets starting with a representing character such as "sh", may be assigned to a double press on, the same key 3301, or another key.

According to one embodiment of the invention, single letters (e.g. "a" to "z") may be assigned to a first mode/action (e.g. with a corresponding key) and words/portion-of-words may be assigned to a second action/mode. For example, a single letter may be assigned to a single press on a corresponding key (e.g. combining with user's speech of said letter), and a word/portion-of-a-word may be assigned to a double press on a corresponding key (e.g. combining with user's speech of said word/portion-of-a-word). According to this example, a user may combine a letter-by-letter data entry and a word/part-of-a-word data entry. For this purpose, on one hand, said user may provide a letter-by-letter data entry by single presses on the keys corresponding to the letters to be entered while speaking said letters, and on the other hand, said user may provide a word/part-of-a-word data entry by double presses on the keys corresponding to the words/part-of-words to be entered while speaking said words/part-of-words.

According to one embodiment of the invention, a means such as a button press may be provided for the above-mentioned purpose. For example, by pressing a mode button the system may enter into a character-by-character data entry system and by re-pressing the same button or pressing another button, the system may enter into a word/part-of-a-word data entry system. According to this embodiment, in a corresponding mode, a user may for example, enter a character or a word/part-of-a-word by a single pressing action on a corresponding key and speaking the corresponding character (e.g. letter) or word/part-of-a-word.

Also words/portion-of-words (and obviously, their corresponding phoneme-sets) having similar pronunciation may be assigned to different modes, for example, according to their priorities either in general or according to the current phrase context. In this case, for example, a first word/portion-of-word may be assigned to a mode such as a single press, and a second word/portion-of-word may be assigned to a mode such as a double press on a corresponding key, and so on. For example, words "by" and "buy" have similar pronunciations. A user may enter the word "by" by a single press on a key assigned to the letter "b" and saying "b". Said user may enter the word "buy" (e.g. having lower priority, in general) by applying a double press on a key corresponding to the letter "b" and saying "b". Also for example, the syllable/character-set "bi" (also pronounced "b"), may be assigned to a third mode such as a triple tapping on a key, and so on. It is understood that at least one of said words/part-of-a-words may be assigned to a mode of interaction with another key (e.g. and obviously combined with the speech of said word/part-of-a-word).

As mentioned before, the different assembly of selected character-sets relating to the speech of at least one portion of a word may correspond to more than a word in a dictionary data base. Also as mentioned before, a selecting means such as a "select-key" may be used to select an intended word among those matched words. A higher priority (when there are more than one selected words) may be assigned to a word according to the context of the phrase to which it belongs. Also, higher priority (when there are more than one selected words) may be assigned to a word according to the context of at least one of the, previous and/or the following portion(s)-of-words/words.

According to one embodiment of the invention, each of said words/part-of-words may be assigned to a different mode (e.g. of interaction) of the data entry system of the invention. For example, when a user presses a key corresponding to the letter "b" and says "b e", two words "be" and "bee" may be selected by the system. To avoid the use of, for example, a "select-key", according to this embodiment, for example, a first word "be" may be assigned to a mode such as a single-press mode and a second word "bee" may be assigned to another mode such as a double-press mode. According to this embodiment, in the example above, a user may single-press the key corresponding to "b" and say "b e" to provide the word "be". He also, may double-press the same key and say "b e" to provide the word "bee".

According to one embodiment of the invention, some of the spacing issues may also be assigned to a mode (e.g. of interaction with a key) such as a single-press mode or a double-press mode. For example, in an automatic spacing procedure, the attaching/detaching (e.g. of portions-of-words/words) functions may be assigned to a single-press or double-press mode. According to this embodiment, for example, a to-be-entered word/portion-of-a-word assigned to a double-press mode may be attached to an already entered word/portion before and/or after said already entered word/portion. For example, when a user enters a word such as the word "for" by a single press (e.g. while speaking it), a space character may automatically be provided before (or after, or both before and after) said word. If same word is entered by a double-press (e.g. while speaking it), said word may be attached to the previous word/portion-of-word, or to the word/portion-of-word entered after it.

In the example above, also for example, a double press after the entry of a word/portion-of-a-word may cause the same result.

According to one embodiment of the invention, for automatic spacing purposes, some of the words/part-of-the-words assigned to corresponding phoneme-sets, may include at least one space character at the end of them. In this case, when said space is not required, it may, automatically, be deleted by the system. Characters such as punctuation marks, entered at the end of a word may be located (e.g. by the system) before said space. For example:

"word" followed by "," results "word,

According to another embodiment of the invention, for automatic spacing purposes some of the words/part-of-the-words assigned to corresponding phoneme-sets, may include at least one space character at the beginning of them. In this case, when said space is not required (e.g. for the first word of a line), it may be deleted by the system. Because the space character is located at the beginning of the words, characters such as single letters or the punctuation marks may, as usual, be entered at the end of a word (e.g. attached to it).

According to one embodiment of the invention, during data entry including automatic spacing procedure, an action such as a predefined key press for attaching the current portion/word to the previous/following portion/word may be provided. For example, if a space is automatically provided between two (e.g. current and precedent) words/portions, a predefined action such as a key press may eliminate said space and attach said two words/portions. Example:

"for"+"give"+a predefined key-press, results "forgive"

According to another embodiment of the invention, a longer duration of pronunciation of a vowel of a word/syllable/portion-of-a-word, ending with said vowel, may cause a better disambiguation procedure by the speech recognition of the invention. For example, pronouncing a more significant laps of time, the vowel "o" when saying "vo" may inform the system that the word/portion-of-a-word to be entered is "vo" and not for example, the word/portion-of-a-word "vol".

According to one embodiment of the invention, by using a predefined means such as a predefined key pressing action, the data to be inputted may be capitalized. For example, by pressing a "Caps Lock" key the letters/words/part-of-words to be entered after that may be inputted/outputted in upper-case letters Another pressing action on said "Caps Lock" key may switch back the system to a lower-case mode. It is understood that said function (e.g. "Caps Lock") may be assigned to a spoken mode. For example, to provide the beginning of capitalization procedure a user may press the key corresponding to "Caps Lock" symbol and pronounce a corresponding speech (such as "caps" or "lock" or "caps lock" etc.) assigned to said symbol.

According to one embodiment of the invention, a letter/word/part-of-word in lowercase may be assigned to a first mode such as a single press on a corresponding key (e.g. combined with/without the speech of said letter/word/part-of-word) and a letter/word/part-of-word in uppercase may be assigned to a second mode such as a double press on a corresponding key (e.g. combined with/without the speech of said letter/word/part-of-word). For example, to provide the word (e.g. character-set) "thought", a user may single press the key 3301 and say "thought". To produce the word (e.g. character-set) "THOUGHT", said user may double press the key 3301 and say "thought". This may permit to locally capitalize an input.

Also, according to a similar principle, a word/part-of-word having its first letter in uppercase and the rest of it in lowercase, may be assigned to a mode such as a single-press mode, double-press mode, etc.

According to one embodiment of the invention, as described in previous applications for character-by-character data entry, a letter/word/part-of-a-word may be assigned to more than one single action, such as pressing two keys simultaneously. For example, a word/part-of-a-word starting with "th", may be assigned to pressing simultaneously, two different keys assigned to the letters "t" and "h" respectively, and (eventually) speaking said word/part-of-a-word. Same principles may be assigned to words/parts-of-words starting with "ch", "sh", or any other letter of an alphabet (e.g. "a", "b", etc.).

According to one embodiment of the invention, words/part-of-a-words starting with a phoneme represented by a character may be assigned to a first mode such as a single press on a corresponding key, and words/part-of-a-words starting with a phoneme represented by more than one character may be assigned to a second mode such as a double-press on a corresponding key (which may be a different key). For example, words/part-of-words starting with "t" may be assigned to a single-press on a corresponding key (e.g. combined with the speech of said words), and words/part-of-words starting "th" may be assigned to a double-press, on said corresponding key or another key (e.g. combined with the speech of said words).

As mentioned before, depending on different embodiments of the invention, in different categories different dictionaries such as dictionary of words in one or more languages, dictionary of syllables/part-of-words (character-sets), dictionary of speech models (e.g. of syllables/part-of-words), etc., may be used. If necessary, two or more dictionaries in each or in whole categories may be merged. For example, a dictionary of words and a dictionary of part-of-words may be merged.

As described before, the data entry system of the invention may use any keyboard and may function with many data entry systems such as the "multi-tap" system, word predictive systems, virtual keyboards, etc. For example, on one hand, a user may enter text (e.g. letters, words) using said other systems by pressing keys of the corresponding keyboards, without speaking (e.g. as habitual in said systems) the input, and on the other hand, said user may enter data such as text (e.g. letters, words/part-of-words), by pressing corresponding keys and speaking said data (e.g. letters, words/part-of-words, and if designed so, other characters such as punctuation marks, etc.).

As mentioned before, the data entry system of the invention may use any voice/speech recognition system and method for recognizing the spoken symbols such as characters, words-part-of words, phrases, etc. The system may also use other recognition systems such as lip-reading, eye-reading, etc, in combination with user's actions recognition systems such as different modes of key-presses, finger recognition, fingerprint recognition, finger movement recognition (e.g. by using a camera), etc. These recognition systems and user's actions have been described in previous patent applications filed by this inventor. All of the features in said previous applications (e.g. concerning the symbol-by-symbol data entry) may also be applied to macros (e.g. word/portion-of word by word/portion-of-word) data entry system of the invention.

According to another embodiment of the invention, (as described in previous applications concerning the character-by-character entry level) the system may be designed so that to input a text a user may speak words/part-of-words without pressing the corresponding keys. On the other hand, said user may press a key to inform the system of the end/beginning of a speech (e.g. a character, a part-of-a-word, a word, a phrase, etc.), a punctuation mark, a function, etc.

The data entry system of the invention may also be applied to the entry of macros such as more-than-a-word sequences, or even to a phrase entry system. For example, a user may speak two words (e.g. simultaneously) and press a key corresponding to the first letter of the first word of said two words.

Although in many paragraphs in this application and in the previous applications, for data entry purposes, key presses combined with voice/speech of the user have been mentioned as examples, the data entry system of the invention may be applied to other data entry means (e.g. objects such as user's fingers to which characters, words/part-of-words, etc. may be assigned) and may use other use's behaviors and corresponding recognition systems. For example (as have already been described in previous patent applications filed by this inventor), instead of (or in combination with) analyzing pressing actions on keyboard keys, the system (by for example, using a camera) may recognize the movements of the fingers of the user in the space. For example, a user may tap his right thumb (to which for example, the letter "m, n, o", are assigned) on a table and say "milk" (e.g. the word "milk" is predefinitly assigned to the right thumb). In this example, said user's finger movement combined with said user's speech may be used to enter the word "milk".

In another example and according to same principles, said other data entry means may be a user's handwritten symbol (e.g. graffiti) such as a letter, and said behavior may be user's speech. For example, by using a pen-based device (e.g. PDA, stylus, etc.) using a hand-writing recognition system, a user may write a symbol such as a letter and speak said letter to enhance the accuracy of the recognition system of the system. In another example, said user may write at least one letter corresponding to at least a first phoneme of the speech of a word/part-of-a-word, and speak said word/part-of-a-word. When said user writes said letter, the handwriting recognition system of the device recognizes said letter and relates it to the words-part-of-the-words and/or phoneme-sets assigned to said at least one letter (or symbol). When the system hears the user's voice, it tries to match it to at least one of said phoneme-sets. If there is a phoneme-set among said phoneme-sets which matches to said speech, then the system selects the character-sets corresponding to said phoneme-set. The rest of the procedure (e.g. the procedure of finding final words) may be similar to the ones described in different embodiments of this application and the applications filed before by this inventor.

According to one embodiment, the data entry system of the invention as described in this application and previous applications filed by this inventor, may be summarized as follow:

A predefined number of symbols representing at least the alphanumerical characters and/or words and/or part-of-a-words of at least one language, punctuation marks, functions, etc, may be assigned to a predefined number of objects, generally keys, said symbols are used in a data such as text entry system wherein a symbol may be entered by providing a predefined interaction with a corresponding objects in, the presence of at least an additional information corresponding to said symbol, said additional information, generally, being provided without an interaction with said object, wherein said additional information being, generally, the presence of a speech corresponding to said symbol or, eventually, the absent of said speech. and wherein, said objects may also be objects such as a user's fingers, user's eyes, keys of a keyboard, etc., and said user's behavior may be behaviors such as user's speech, directions of user's finger movements (including no movement), user's fingerprints, user's lip or eyes movements, etc.

Contrary to other data entry systems wherein many key presses are used to input few characters, the data entry system of the invention may use few key presses to provide the entry of many characters.

A Method of Configuration of Symbols on a Keypad

Figure 43:
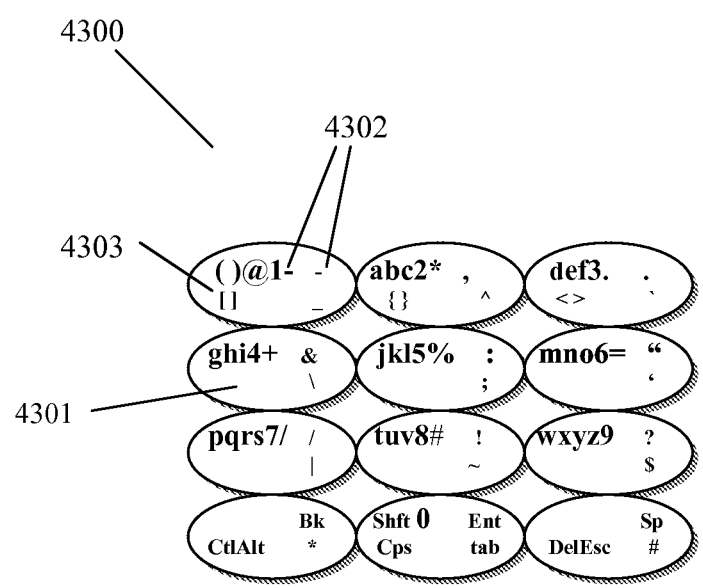
FIG. 43 illustrates a keypad, in accordance with one embodiment of the present invention.

Different methods of configuration of symbols have been proposed in prior patent applications filed by this inventor. FIG. 43 shows a method of assignment of symbols to the keys of a keypad 4300.

As before, Letters a-z, and digits 0-9 are positioned on their standard position on a telephone-type keypad and may be inputted by pressing the corresponding key while speaking them.

Also as before, many punctuation characters and functions are assigned to the keys of said keypad and may be inputted by pressing (or double pressing) the corresponding keys without speaking them.

In this configuration, some of the punctuation marks such as "+" sign 4301, which are naturally spoken by the users, are assigned to some keys and may be inputted by pressing a the corresponding key and speaking them.

Also according to this arrangement some symbols such as the "-" sign 4302, which may have different meaning and according to a context, may be pronounced or not pronounced according to the context of the data, are positioned in a key, in two locations. They are once grouped with the symbols requiring speaking while entering them, and also grouped with the symbols which may not be spoken while entering them. To a symbol requiring speech, more than one speech may be assigned according to the context of the data. For example, the sign "-" 4302 assigned to the key 4303, may be inputted in different ways.

Figure 43A:
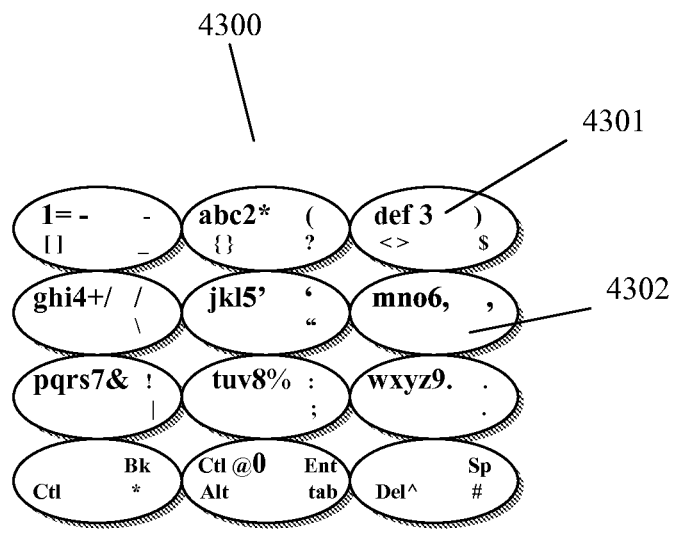
FIG. 43a illustrates a keypad, in accordance with one embodiment of the present invention.
Figure 43B:
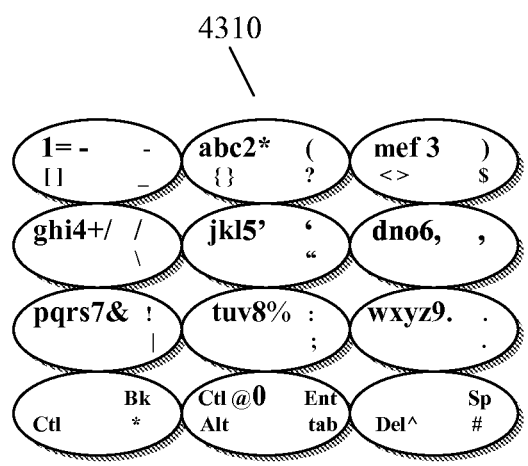
FIG. 43b illustrates a keypad, in accordance with one embodiment of the present invention.

A user may press the key 4303 and say "minus"
A user may press the key 4303 and say "dash"
A user may press the key 4303 without speaking Interchanging Ambiguous Symbols on the Keys of a Keypad As mentioned before, some symbols such as the letters assigned to a same key of a keypad/keyboard may have substantially similar pronunciations. This may cause ambiguity for the voice/speech recognition system of the invention. FIG. 43a shows a standard telephone-type keypad 4300. Pair of letters, "d" and "e", assigned to the key 4301 may cause ambiguity to the voice/speech recognition system of the invention when said key is presses and one of said letters is pronounced. Pair of letters, "m" and "n" assigned to the neighboring key 4302 may also cause ambiguity between them when one of them is pronounced. On the other hand, letters "e" or "d" may easily be distinguished from the letters "m" or "n". By interchanging the assignment of one of the letters of each pair to the corresponding key of the other pair, the recognition problem of said four letters (e.g. by using the press and speak data entry system of the invention) will be solved. This may slightly modify the alphabetical order configuration of a keypad, but will dramatically augment the accuracy of the data entry. FIG. 43b shows a keypad 4310 after said modification.

Automatic Spacing Method

As previously mentioned, an automatic spacing procedure for attaching/detaching of portions-of-words/words may be assigned to a mode such as a single-press mode or double-press mode. As already described, a user may enter a symbol such as at least part of a word (e.g. without providing a space character at its end), by speaking said symbol while pressing a key (e.g. to which said symbol is assigned) corresponding to the beginning character/phoneme of said symbol (in the character by character data entry system of the invention, said beginning character is generally said symbol). According to said procedure, also for example, a user may enter a symbol such as at least part of a word (e.g. including a space character at its end), by speaking said symbol while double-pressing said key corresponding to the beginning character/phoneme of said symbol. In data entry systems requiring many key presses to enter a word, automatic spacing may be particularly beneficial.

According to the above-mentioned principles, for example, in a character-by-character data entry system of the invention, a character may be entered and attached to the previous character, by speaking/not-speaking said character while, for example, single pressing a corresponding key. Same action including a double-pressing action may cause to enter said character and attach it to said previous character, but also may add a space character after the current character. The next character to be entered will be positioned after said space character (e.g. will be attached to said space character). For example, to enter the words "see you", a user may first enter the letters "s" and "e" by saying them while single pressing their corresponding keys. Then he may say "e" while double pressing its corresponding key. The user then may enter the letters "y" and "o" by saying them while single pressing the corresponding keys. He, then, may say "u" while double pressing the corresponding key.

According to another embodiment of the invention, instead of locating said space character after said current character, the system may locate said space character before said current character.

It is understood that instead of a space character, any other symbol (or group of symbols) may be considered after said character or before it. Of course, considering that a letter is part of a word, as previously described, same procedure may apply to part-of-a-word/word level of the data entry system of the invention. Again for example, a user may enter the words "prepare it", by first entering the portion "pre" by saying it while for example, single pressing the key corresponding to the letter "p". Then he may enter "pare" (e.g. including a space at the end of it) by saying "pare" while double pressing the key corresponding to the letter "p". The user then, may enter the word "it" (e.g. also including a space at the end of it) by saying it while double pressing the key corresponding to the letter "i".

QWERTY Configuration on a Keypad Having Reduced Number of Keys

According to one embodiment of the invention, the configuration and/or assignment of letters on a keypad may be according to the configuration of the letters on a QWERTY keyboard. This may attract many people who do not use a telephone-type keypad for data entry simply because they are not familiar with the alphabetical order configuration of letters on a standard telephone keypad. According to one embodiment of the invention, using such keypad combined with the data entry system of the invention may also provide better recognition accuracy by the voice/speech recognition system of the invention.

Figure 44A:
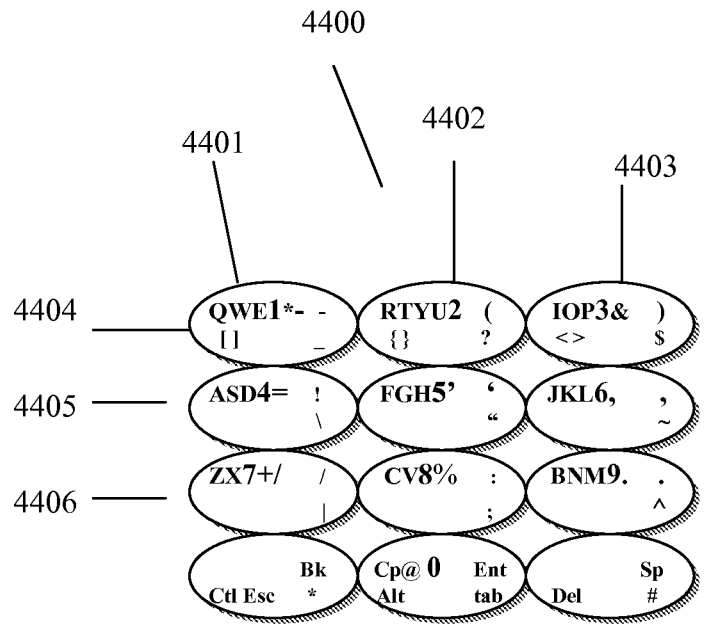
FIG. 44a illustrates a keypad, in accordance with one embodiment of the present invention.

FIG. 44a shows as an example, a telephone-type keypad 4400 wherein alphabetical characters are arranged-on/assigned-to its keys according to the configuration of the said letters on a QWERTY keyboard. As shown, the letters on the upper row of the letter keys of a QWERTY keyboard are distributed on the keys 4401-4403 of the upper row 4404 of said keypad 4400, in the same order (relating to each other) of said letters on said QWERTY keyboard. The letters positioning on the middle letter row of a QWERTY keyboard are distributed on the keys of the second row 4405 of said keypad 4400, in the same order (relating to each other) that said letters are arranged on a QWERTY keyboard. And finally, Letters on the lower letter row of a QWERTY keyboard are distributed on the keys of a third row 4406 of said keypad 4400, in the same order (relating to each other) that they are positioned on a QWERTY keyboard.

Figure 44B:
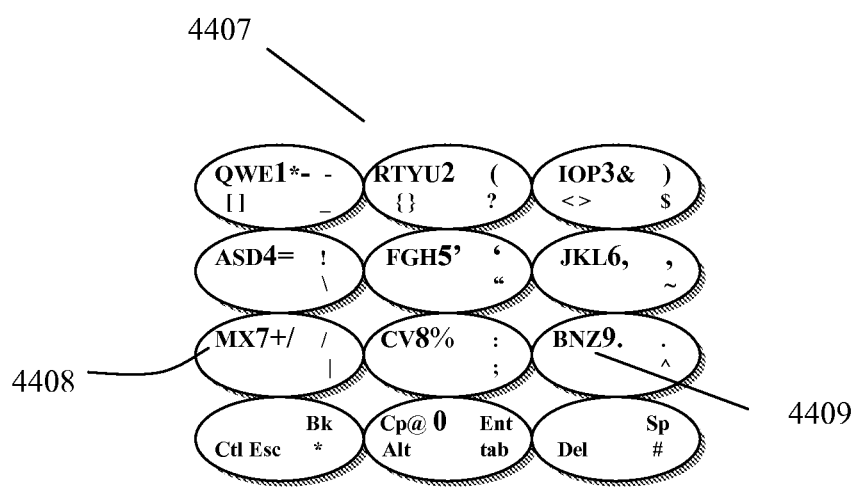
FIG. 44b illustrates a keypad, in accordance with one embodiment of the present invention.

With continuous reference to this embodiment, said alphabetical letters may be distributed on the keys of said keypad in a manner to locate ambiguous letters on different keys. FIG. 44b shows as an example, a QWERTY arranged keypad 4407 with minor modifications. In said keypad, the key assignment of the letters "M" 4408 and "Z" 4409, are interchanged in a manner to eliminate the ambiguity between the letters "M" and "N". In this example, the QWERTY configuration has been slightly modified but by using said keypad with the data entry system of the invention, the recognition accuracy may be augmented. It is understood that any other letter arrangement and modifications may be considered.

As shown, the QWERTY keypad of the invention may comprise other symbols such as punctuation characters, numbers, functions, etc. They may be entered by using the data entry system of the invention as described in this application and the previous applications filed by this inventor.

It must be noted that alphabetical letters having a QWERTY (or any other) arrangement may be assigned to the keys of any keyboard having reduced number of keys. Said keyboard may be combined and used with the data entry system of the invention. It is understood that for better accuracy, any standard arrangement may be modified.

QWERTY Arrangement on Six Keys

According to one embodiment of the invention, the data entry systems of the invention may use a keyboard/keypad wherein alphabetical letters having a QWERTY arrangement are assigned to six keys of said keyboard/keypad. Obviously, words/part-of-words may also be assigned to said keys according to the principles of the data entry system of the invention.

Figure 45:
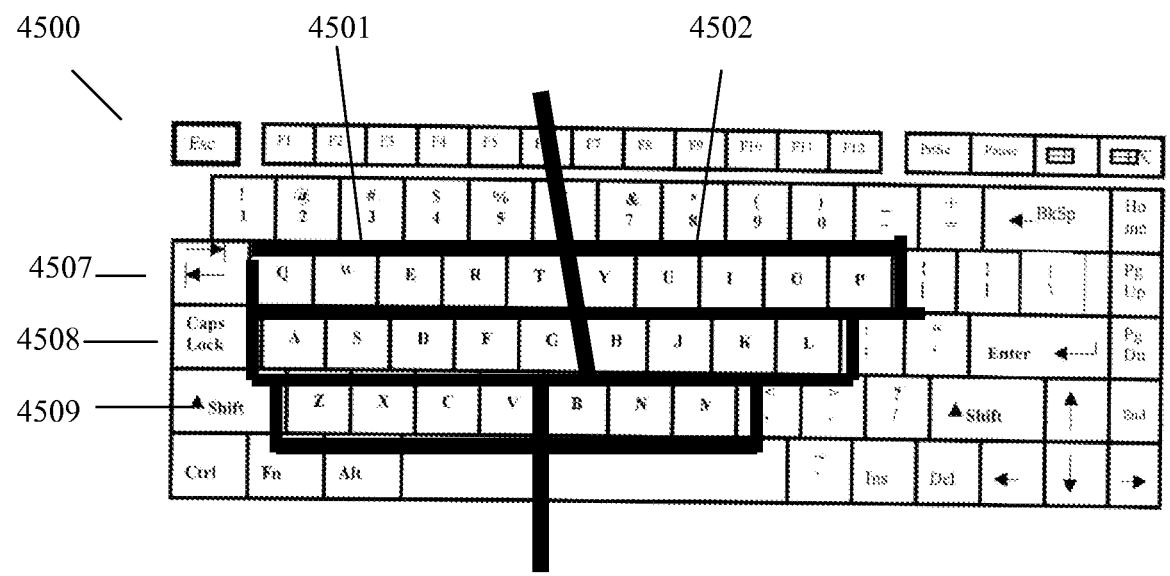
FIG. 45 illustrates a keyboard, in accordance with one embodiment of the present invention.

As known, alphabetical letters are arranged on the keys of three rows of keys a PC keyboard according to a configuration order called QWERTY. FIG. 45 shows a QWERTY keyboard 4500 wherein the letters A to Z are arranged on three rows of the keys 4507, 4508, 4509 of said keyboard. Usually, a user uses the fingers of his both hand for (touch) typing on said keyboard. By using the fingers of his left hand, a user for example, types the alphabetical keys as shown on the left side 4501 of said keyboard 4500, and by using the fingers of his right hand, a user for example, types the alphabetical keys situated on the right side 4502 of said keyboard 4500. According to these principles, it may be considered that the alphabetical keys of a QWERTY keyboard are arranged according to a three-row 4507, 4508, 4509 by two-column 4501-4502 table.

Figure 45A:
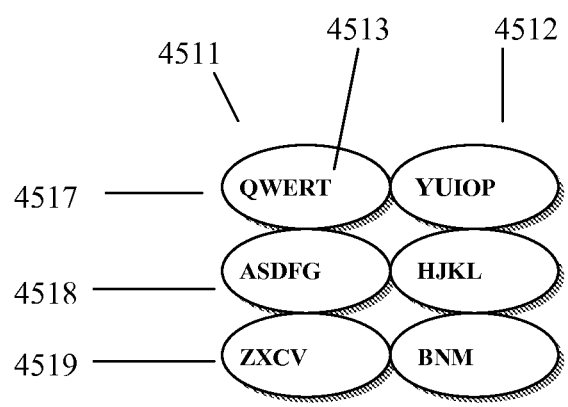
FIG. 45a illustrates a keypad, in accordance with one embodiment of the present invention.

According to one embodiment of the invention, a group of six keys (e.g. 3 by 2) of a reduced keyboard may be used to duplicate said QWERTY arrangement of a PC keyboard on them and used with the data entry system of the invention. FIG. 45a shows as an example, six keys preferably arranged in three rows 4517-4519 and two columns 4511-4512 for duplicating said QWERTY arrangement on them. As an example, the upper left key 4513 contains the letters "QWERT", corresponding to the letters situated on the keys of the left side 4501 of the upper row 4507 of the QWERTY keyboard 4500 of the FIG. 45. The Other keys of said group of six keys follow the same principle and contain the corresponding letters situated on the keys of the corresponding row-and-side of said PC keyboard.

A user of a QWERTY keyboard usually knows exactly the location of each letter. A motor reflex permits him to type quickly on a QWERTY keyboard. Duplicating a QWERTY arrangement on six keys as described here-above, permits the user to touch-type (fast typing) on a keyboard having reduced number of keys. Said user may, for example, use the thumbs of both hands (left thumb for left column, right thumb for right column) for data entry. This looks like keying on a PC keyboard permitting fast data entry.

It is understood that the left side and right side characters definition of a keyboard described in the example above is shown only as an example. Said definition may be reconsidered according to user's habitudes. For example, the letter "G" may be considered as belonging to the right side rather than left side.

According to one embodiment of the invention, a keypad having at least six keys containing alphabetical letters with QWERTY arrangement assigned (as described above) to said keys, may be used with the character-by-character/at least-part-of a word by at least-part-of a word data entry system of the invention. In addition to already-described advantages, said arrangement also comprises other benefits such as:

letters situated on a same key are usually distinguishable by the voice/speech recognition system of the invention high accuracy of the data entry, extremely reduced number of letter keys, and the extremely familiar arrangement (e.g. QWERTY) of said letters on said keypad permit a user a fast data entry system without the need of frequently looking at the keypad or at the display unit of the corresponding device.

Figure 45B:
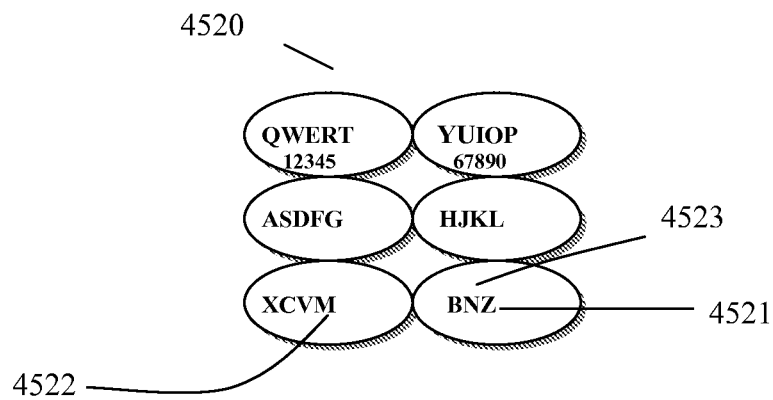
FIG. 45b illustrates a keypad, in accordance with one embodiment of the present invention.

For better accuracy, modifications to this arrangement may be considered. For example, FIG. 45b, shows a keypad 4520 having at least six keys with QWERTY letter arrangement as described before, wherein letters "Z" 4521 and "M" 4522 have been interchanged in order to separate the letter "M" 4522 from the letter "N" 4523. It is understood that this is only an example, and that other forms of modifications may also be considered.

It must be noted that the QWERTY arrangement assigned to few number of keys as described above, is shown and described only as an example. Other configurations of alphabetical letters (in any language) may be assigned to any number of keys arranged in any key arrangement form on a any shape of keyboard (e.g. any keypad) and used with the press and speak data entry system of the invention. Also, it is understood that other symbols such as punctuation marks, numbers, functions, etc., may be distributed among said keys or other keys of a keypad comprising said alphabetical keys or other keys of said keypad and be entered according to the data entry system of the invention as described in this application and the applications filed before by this inventor.

Figure 45C:
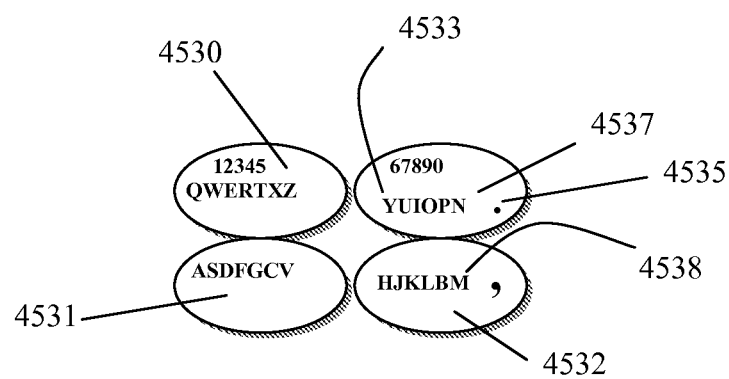
FIG. 45c illustrates a keypad, in accordance with one embodiment of the present invention.

According to one embodiment of the invention, still fewer number of keys may be used to contain alphabetical letters (and other symbols as described before) and being used with the press and speak data entry systems of the invention. FIG. 45c shows as an example, four keys 4530-4533 having English alphabetical characters assigned to them. To keep this arrangement familiar, the QWERTY arrangement of the letters of the top two rows of the keypad 4520 of the FIG. 45b are maintained and the letters of the lowest row of said keypad 4520 of the FIG. 45b are distributed within the keys of the corresponding columns (e.g. left, right) of said four keys 4530-4533 in a manner to maintain the familiarity of an "almost QWERTY" keyboard along with high accuracy of the voice recognition system of the invention. For example, letters "n" 4537 and "m" 4538 which have been located on the lowest right key of the keypad 4520 of the FIG. 45b, are here separated and assigned, respectively, to the right keys 4533 and 4532 of the keypad 4530. It is understood that other symbols such as punctuation marks, numbers, functions, etc., may be distributed among said keys or other keys of a keypad comprising said alphabetical keys and be entered according to the data entry system of the invention as described in this application and the applications filed before by this inventor.

Figure 45D:
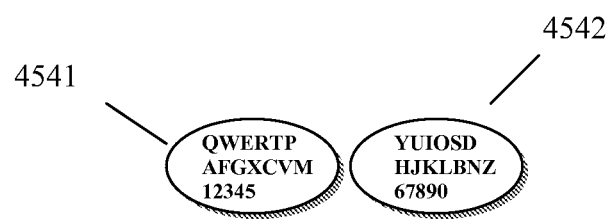
FIG. 45d illustrates a keypad, in accordance with one embodiment of the present invention.

It is also understood that as far as the recognition accuracy is not affected, even fewer keys may be used to contain all alphabetical characters and be used with the press and speak data entry system of the invention. FIG. 45d shows two keys 4541-4542 (e.g. of a keypad) to which the English Alphabetical letters are assigned. Said keypad may be used with the press and speak data entry systems of the invention but ambiguity may arise for letters on a same key having substantially similar pronunciations.

Theoretically, all of the alphabetical letters may be assigned to a single key but this may extremely reduce the recognition accuracy.

Although, pressing a key and speaking a desired symbol assigned to said key may be enough for the entry of said symbol, for some reasons such as not desiring to speak some symbols, several methods such as the ones described in this application and in the previous applications concerning the data entry system of the invention may be provided. As described, a symbol may be entered by pressing a key without speaking said symbol. For example, by referring to the FIG. 45c, a user may press the key 4530 without speaking to provide the space character. According to another method, a symbol may be entered by pressing a first key, keeping said key pressed and pressing a second key, simultaneously. According to another method, a special character such as a space character may be provided after a symbol such as a letter, by pressing a predefined key (e.g. corresponding to said special character) before releasing the key corresponding to said symbol.

When having few keys for data entry, for faster data entry, the entry of a frequently used non-spoken symbol such as a space character may be assigned to a double press action of a predefined key without speaking. This may be efficient, because if the space character is assigned to a mode such as a single-pressing a button to which other spoken characters such as letters are assigned in said mode, after entering a spoken character, (for not confusing the voice/speech recognition system) the user has to pause a short time before pressing the key (while not speaking) for entering said space character. Assigning the space character to the double-press mode of a key, to which no spoken symbol is assigned to a double-press action, resolves that problem. Instead of pausing and pressing said key once, the user simply double-presses said key without said pause. As mentioned previously, another solution is to assign the spoken and non-spoken symbols to a different keys, but this may require more keys.

Also, it is understood that the QWERTY arrangement of the letters on a group of keys as described here-above, is provided as an example. Other configuration of symbols such as the alphabetical orders, other number of keys, or any key arrangements, may be considered. For example, according one embodiment of the invention, a keypad may contain two keys for assigning the most frequently used letters, and it may have other two keys to which less frequently used letters are assigned.

Today most electronic devices permitting data entry are equipped with a telephone-type keypad. The configuration and assignment of the alphabetical letters as described before may be applied to the keys of a telephone-type keypad.

Figure 46A:
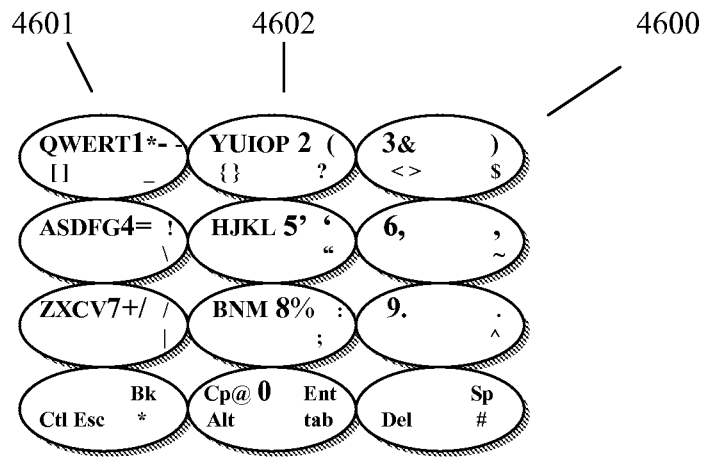
FIG. 46a illustrates a keypad, in accordance with one embodiment of the present invention.

FIG. 46a shows as an example, a telephone-type keypad 4600 wherein alphabetical letters having QWERTY configuration are assigned (e.g. as described before) to six keys of two neighboring columns 4601, 4602 of said keypad. By being on neighboring columns, entry of the letters by (the thumb of) a single hand becomes easier. Also as mentioned before, the user may use his both thumbs (e.g. left thumb for left column, right thumb for right column) for quick data entry. It is understood that other symbols such as punctuation marks, numbers, functions, etc., may be distributed among the keys of said keypad and be entered according to the data entry system of the invention as described in this application and the applications filed before by this inventor.

Figure 46B:
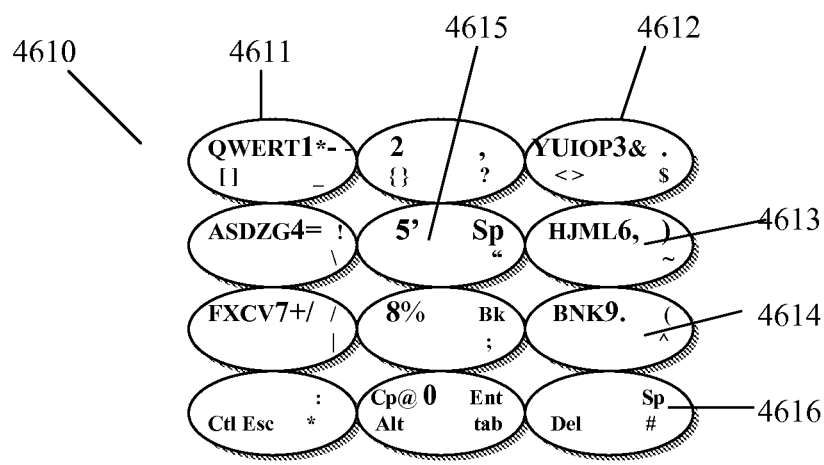
FIG. 46b illustrates a keypad, in accordance with one embodiment of the present invention.

FIG. 46b shows another telephone-type keypad 4610 wherein alphabetical letters having QWERTY configuration are assigned (e.g. as described before) to six keys of two exterior columns 4611, 4612 of said keypad. By being on two exterior columns, entry of the letters by (the thumbs of) two hands becomes easier. Also as mentioned before, the user may use a single hand for data entry. In this example, minor modifications have been applied for augmenting the accuracy of the voice/speech recognition system of the invention. For example, letters "m" and "k" have been interchanged on the corresponding keys 4613, 4614 to avoid the ambiguity between the letters "m" and "n". Also, letters "f" and "z" have been interchanged on the corresponding keys to avoid the ambiguity between the letters "f" and "s". It is understood that other changes in the configuration may be considered. For faster data entry some characters such as the space character may be assigned to several keys 4615, 4616.

Figure 46C:
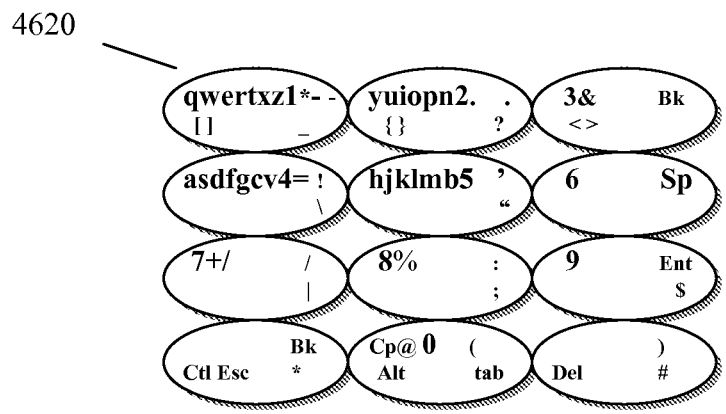
FIG. 46c illustrates a keypad, in accordance with one embodiment of the present invention.

FIG. 46c shows another telephone-type keypad 4620 wherein alphabetical letters arrangement based on principles described before and showed in FIG. 45c are assigned to four keys of said keypad.

It is understood that the QWERTY arrangement of letters on few (e.g. 6, 4, 2. etc.) keys of a keyboard such as a keypad is described as example. Other kind of letter arrangements such as alphabetical order may also be considered and assigned to few keys such as two/three/four/five/six, etc., keys.

Obviously, all of the data entry systems (and their corresponding applications) of the invention such as a character by character data entry and/or word/part-of-a-word by word/part-of-a-word data entry systems of the invention may use the above-mentioned keypads just described (e.g. having few numbers of keys such as 4 to six keys).

A Personal Mobile Computer/Telecommunication Device

A mobile device must be small to provide easy portability. An ideal mobile device requiring data (e.g. text) entry and/or data communication must have small data entry unit (e.g. at most, only few keys) and a large (e.g. wide) display.

The arrangement of alphabetical letters (and other symbols) on few keys and the capability of quick and accurate complete data entry provided by the data entry systems of the invention through said few keys, may permit to reconsider the design of some of the current products for making them more efficient.

One of those products is the mobile phone which is now used for the tasks such as text messaging and the internet, and is predicted to become a mobile computing device. The actual mobile phone is designed contrary to the principles described here-above. This is because the (complicated) data entry systems of the mobile phones require the use of many keys, using a substantial surface of the phone, providing slow data entry, and leaving a small area for a small (e.g. narrow) display unit.

One of the most commonly used applications of a computer is the word processing procedure. Along with the use of the Internet, writing letters will also become the most commonly used application of a mobile computer/communication device. Said application requires a wide display to permit drafting, formatting, and viewing the document preferably in its entire width. For example, while editing a letter, the user must see said document in its entire width, without being obliged to scroll it to the left or to the right.

Figure 47A:
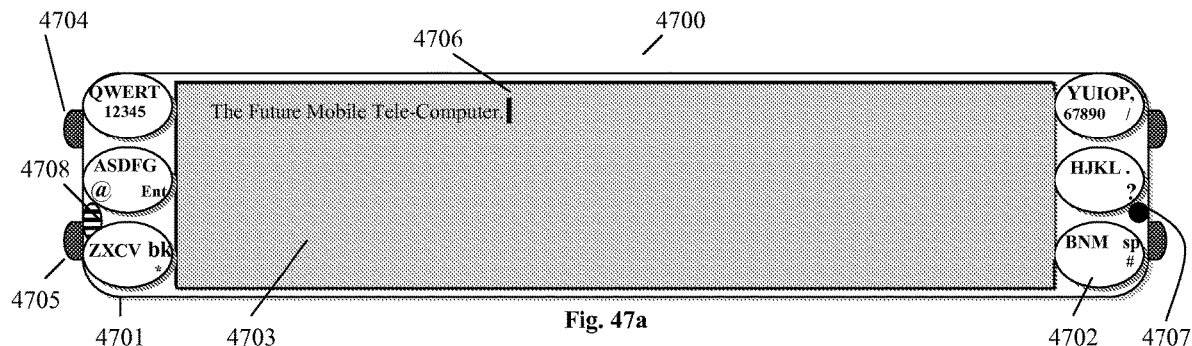
FIG. 47a illustrates a keypad with display, in accordance with one embodiment of the present invention.

According to one embodiment of the invention, an electronic device such as a mobile computing/communication device comprising a wide display and small data entry unit having quick data entry capability may be provided. FIG. 47a shows a mobile computing/communication device 4700 having two rows of keys 4701, 4702 wherein the alphabetical letters (e.g. preferably, having QWERTY arrangement as described before) are assigned to them. Other symbols such as numbers, punctuation marks, functions, etc. may also be assigned to said keys (or other keys), as described before. Said keys of said communication device may be combined with the press and speak data entry systems of the invention to provide a complete quick data entry. Use of few keys (e.g. in two rows only) for data entry, permits to integrate a wide display 4703 within said device. The width of said mobile device (and obviously, said display unit) may be approximately the width of an A4 paper to provide an almost real size (e.g. width) document for viewing. Said mobile computing/communication device may also have other buttons such as the buttons 4704, 4705 for functions such as scrolling the document to upward/downward, to left/right, navigating a cursor 4706 within said display 4703, send/end functions, etc. Also said device may comprise a mouse (e.g. a pointing device) within, for example, the backside or any other side of it. In several patent applications (such as "stylus Computer", and "Features to Enhance Data Entry") filed by this inventor mouse/browsing issues on a display and other data entry enhancement means have been described. All of said issues/features of said applications may be combined between them and/or combined with the data entry system and data communication devices of this invention.

With continuous description of FIG. 47a, the arrangement of the keys in two rows 4701, 4702 on left and right side of said communication device 4700 permits the user to thumb-type with his two hands while holding said device 4700. It is understood that other configuration of letters and other symbols on other arrangement of keys on said device may be considered. For example, the device may comprise only few keys arranged in only one row wherein said symbols (e.g. letters) are assigned to them.

Also as mentioned before and described in corresponding patent application, by providing a mouse (not shown) in the backside of said device wherein the key(s) of said mouse being preferably, in the opposite side (e.g. front side) of said electronic device, the user may use for example, his forefinger, for operating said mouse while pressing a relating button with his thumb.

Also, as mentioned, said device may be used as a telephone. It may comprise at least one microphone 4707 and at least a speaker 4708. The distance between the location of said microphone and said speaker on said device may correspond to the distance between mouth and ear of a user.

Figure 47B:
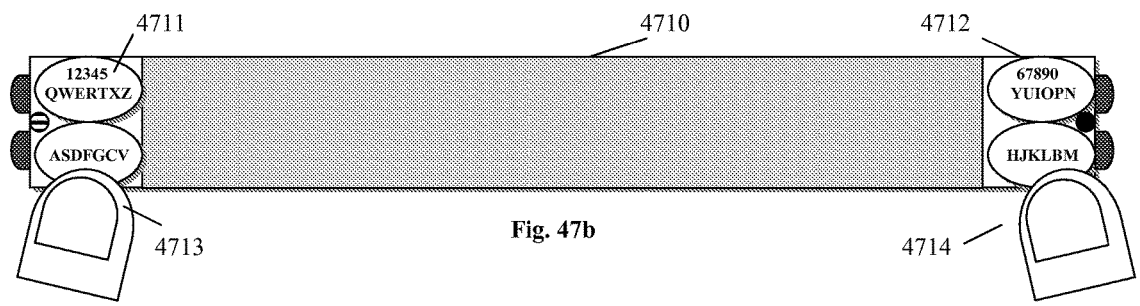
FIG. 47b illustrates a keypad with display, in accordance with one embodiment of the present invention.

FIG. 47b shows as an example, a device 4710 similar to that of the FIG. 47, wherein its input unit comprises four keys only, arranged in two rows 4711, 4712 wherein the alphabetical letters and generally numbers are assigned to said keys according to principles already described. Other symbols and functions (not shown) may also be assigned to said keys and/or other keys according to the principles already described. A user may use his two thumbs 4713, 4714 for typing.

Figure 47C:
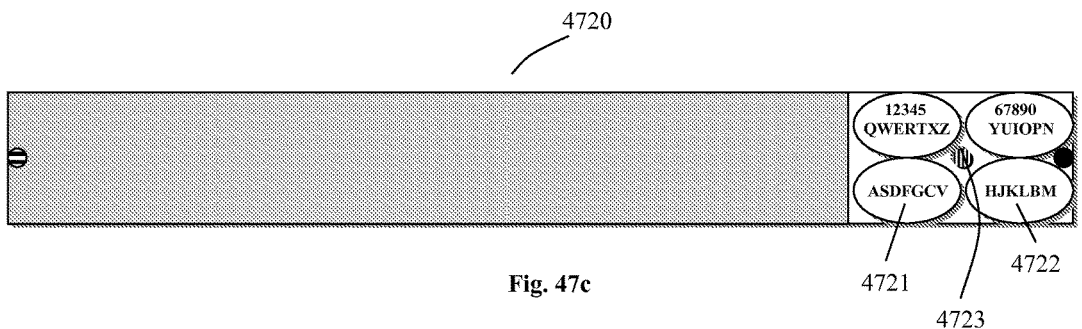
FIG. 47c illustrates a keypad with display, in accordance with one embodiment of the present invention.

FIG. 47c shows as an example, a device 4720 similar to that of the FIG. 47b, wherein its input unit comprises four keys only arranged in two rows 4721, 4722 located on one side of said electronic device, wherein the alphabetical letters and generally numbers are assigned to said keys according to principles already described. Other symbols and functions (not shown) may also be assigned to said keys and/or other keys according to the principles already described. A user may use one hand (or two hands) for data entry. A nub 4723 may be provided in the center of arrangement of said four keys to permit data entry without looking at the keypad.

Figure 47D:
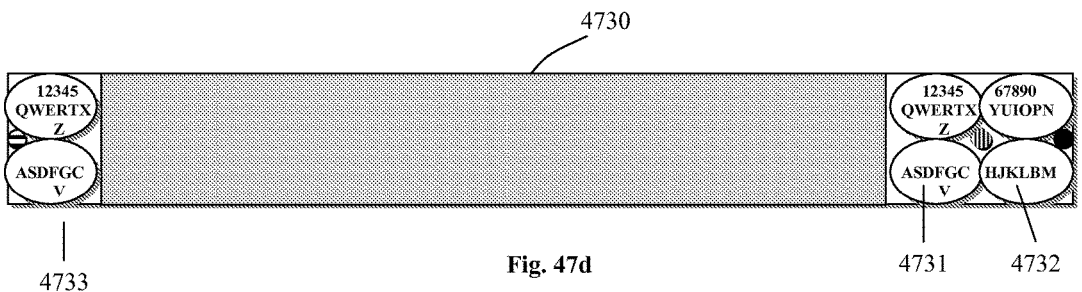
FIG. 47d illustrates a keypad with display, in accordance with one embodiment of the present invention.

FIG. 47d shows as an example, a device 4730 similar to that of the FIG. 47c, wherein its input unit comprises four keys arranged in two rows 4731, 4732 located on one side of said electronic device, wherein the alphabetical letters and generally numbers are assigned to said keys according to principles already described. A third row of keys 4733 duplicating one of said first two rows of keys (in this example, 4731), is positioned at the opposite end of said electronic device 4730. This arrangement of keys permits the user to enter data with one or two hands at his choice. Other symbols and functions (not shown) may also be assigned to said keys and/or other keys according to the principles already described.

Figure 47E:
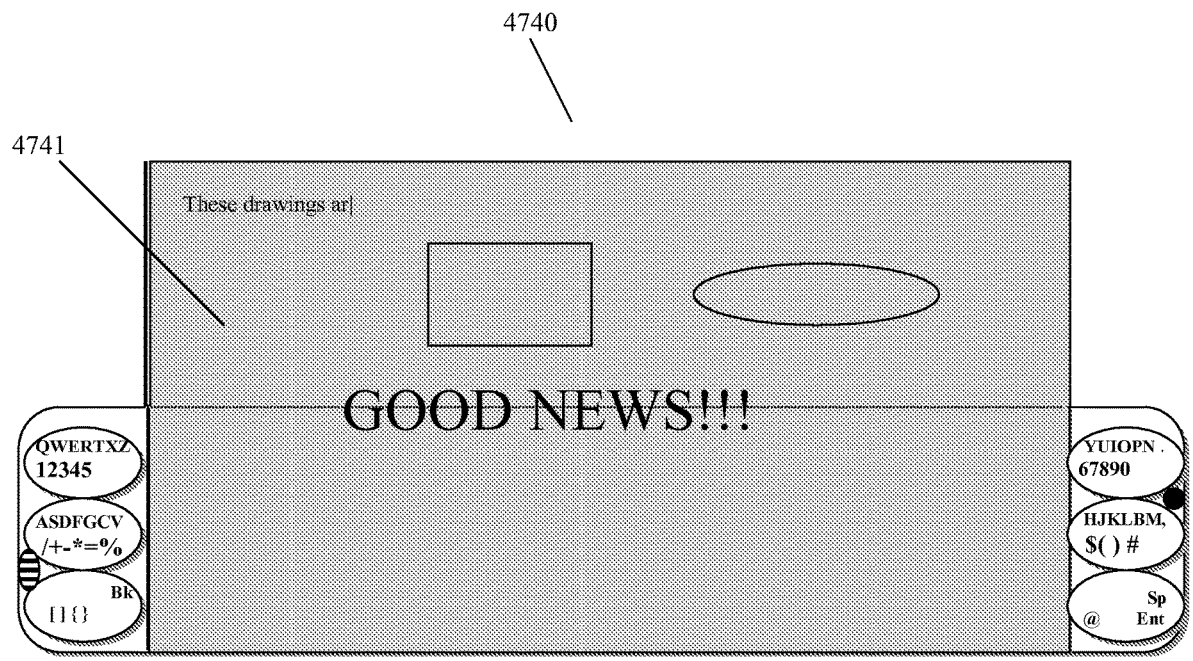
FIG. 47e illustrates a keypad with display, in accordance with one embodiment of the present invention.

FIG. 47e shows as an example, an electronic device 4740 designed according to the principles described in this application and similar to the preceding embodiments with the difference that here an extendable/retractable/foldable display 4741 may be provided within said electronic device to permit a large display while needed. For example, by using an organic light-emitting diode (OLED) display, said electronic device may be equipped with a one-piece extendable display. It is understood that said display may be extended as much as desired. For example, said display unit may be unfolded several times to provide a large display. It may also be a rolling/unrolling display unit so that to be extended as much as desired. It is understood that the keys of said data entry system of the invention may be soft keys being implemented within a surface of said display unit of said electronic device.

Figure 47F:
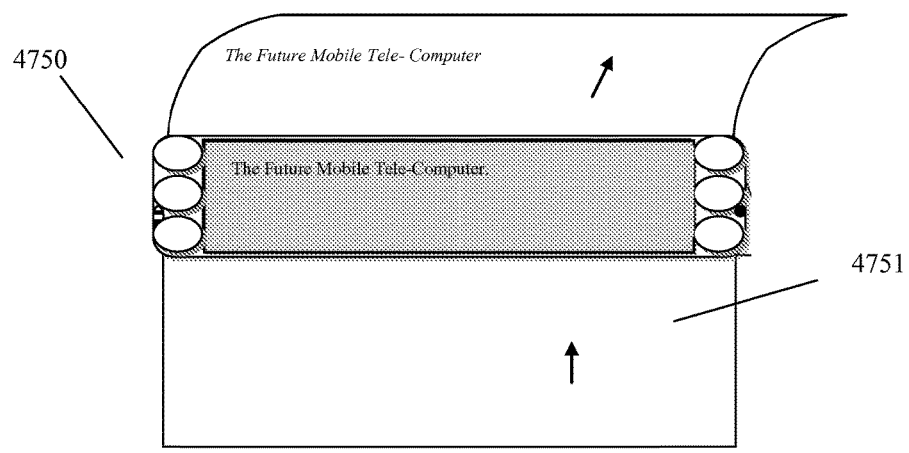
FIG. 47f illustrates a keypad with display, in accordance with one embodiment of the present invention.

According to one embodiment of the invention, as shown in FIG. 47f, an electronic device 4750 such as the one described before, may comprise a printing unit (not shown) integrated within it. Although said device may have any width, preferably, the design of said electronic device (e.g. in this example, having approximately the width of an A4 paper) may be such that a printing/scanning/copying unit using for example, an A4 paper may be integrated within said device. For example, a user may feed an A4 paper 4751 to print a page.

Providing a complete solution for a mobile computing/communication device may be extremely useful in many situations. For example, a user may edit documents such as a letter and print them immediately. Also for example, a salesman may edit a document such as an invoice in client's promises and print it for immediate delivery.

To permit reducing the size of said mobile computing/communication device and still being capable of printing a standard size paper such as an A4 paper, a device corresponding to the size of half of said standard size paper may be provided.

Figure 47G:
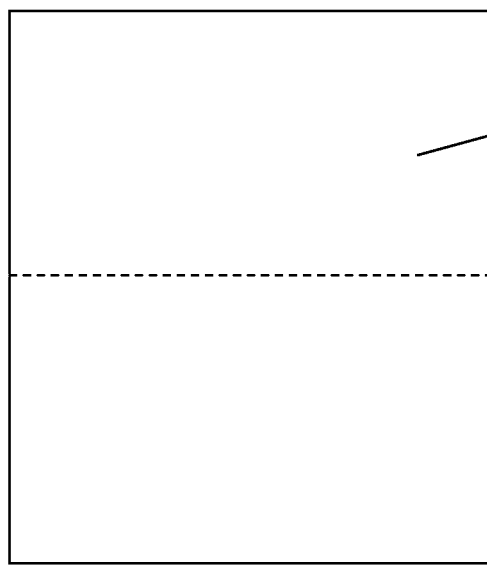
FIG. 47g illustrates a standard folded paper, in accordance with one embodiment of the present invention.
Figure 47H:
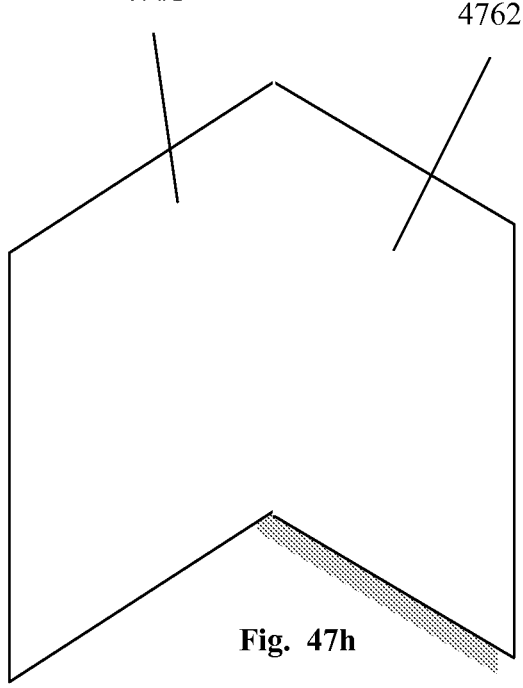
FIG. 47h illustrates a standard folded paper, in accordance with one embodiment of the present invention.
Figure 47I:
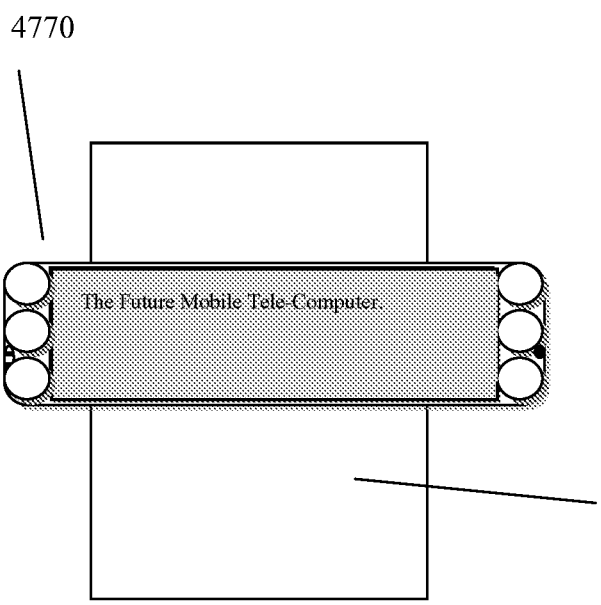
FIG. 47i illustrates a standard folded paper with a keypad and display printer, in accordance with one embodiment of the present invention.

FIG. 47g shows a standard blank document 4760 such as an A4 paper. As shown in FIG. 47h, said paper may be folded at its middle, providing two half faces 4761, 4762. As shown in FIG. 47i said folded document 4771 may be fed into the printing unit of an electronic device 4770 such as the mobile computing/communication device of the invention to print a page of a document such as an edited letter, on its both half faces 4761, 4762 providing a standard sized printed letter. This will permit manufacturing of a small sized mobile electronic device being capable of printing a standard size document.

Circular Keyboard

Figure 48:
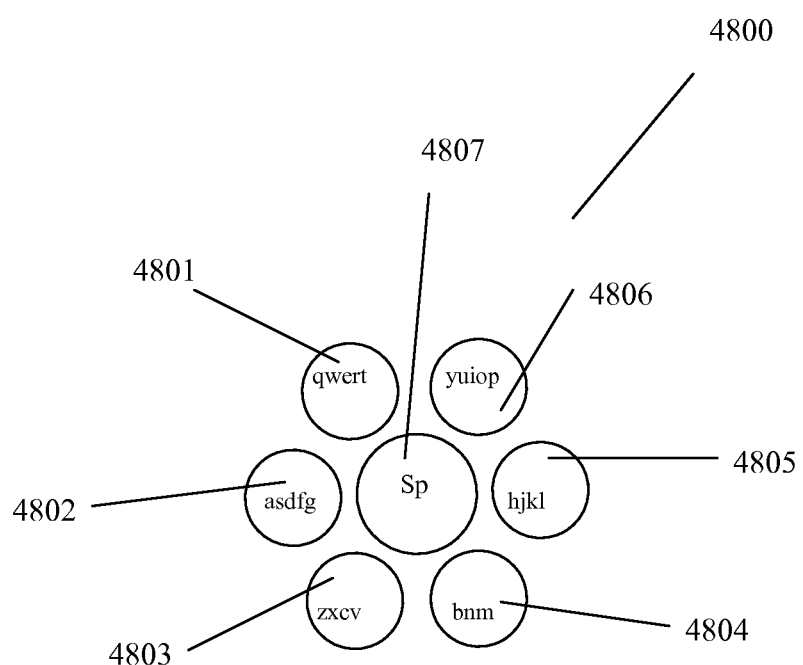
FIG. 48 illustrates a keypad, in accordance with one embodiment of the present invention.

According to one embodiment of the invention, at least part of the keys of a keypad may be positioned on said keypad in a manner to create a circular form. FIG. 48 shows as an example, a keypad 4800 comprising six keys 4801-4806 positioned around a centered key 4807. Said centered key 4807 may be physically different than said other six keys. For example, said key 4807 may be bigger than the other keys, or it may be have a nub on it. Alphabetical letters having, for example, QWERTY configuration may be distributed among said keys. A space character may be assigned to the key 4807 situated in the center. Of course said keys may also comprise other symbols such as numbers, punctuation marks, functions, etc as described earlier in this application and the applications before and be used by the data entry systems of the invention. The advantage of this kind (e.g. circular) of key arrangement on a keypad is that, by recognizing said centered, key by touching it, a user may type on said keys without looking at the keypad.

A Wrist Communication Device

Figure 49:
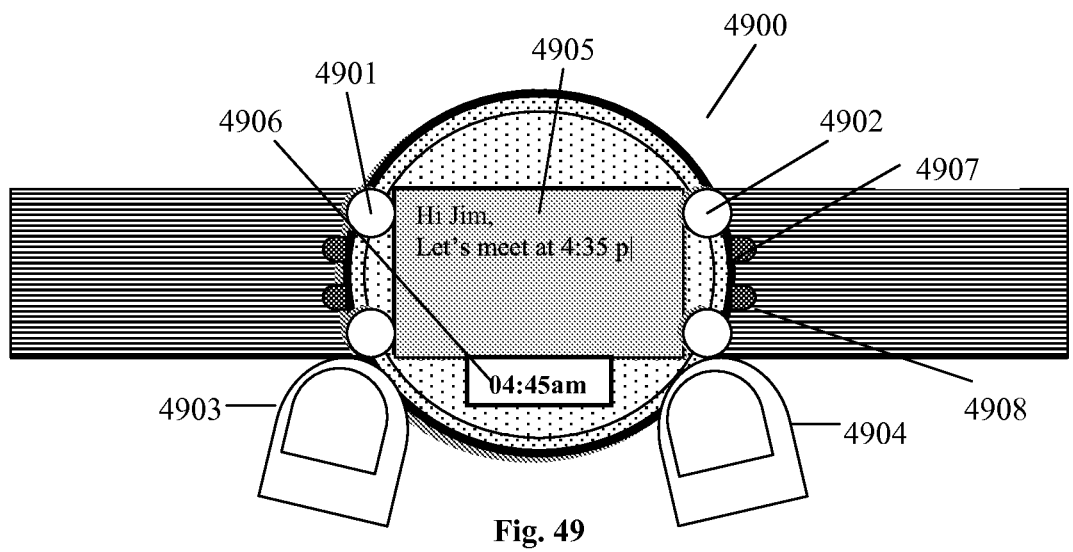
FIG. 49 illustrates a watch with keypad and display, in accordance with one embodiment of the present invention.

The data entry systems of the invention may permit to create small electronic devices with capability of complete, quick data entry. One of the promising future telecommunication devices is a wrist communication device. Many efforts have been provided to create a workable wrist communication/organizer device. The major problem of such device is workable relatively quick data entry system. Some manufacturers have provided prototypes of wrist phones using voice/speech recognition technology for data entry. Of course, hardware and software limitation of such devices provide poor data entry results. The data entry system of the invention combined with use of few keys as described in this application and the applications filed before by this inventor may resolve this problem and permit quick data entry on very small devices. FIG. 49 shows as an example, a wrist electronic device 4900 comprising few keys (e.g. in this example, four keys arranged in two rows 4901, 4902) wherein symbols such as alphabetical letters, numbers, punctuation marks, etc., are assigned to said keys according to the principles of the data entry systems of this invention. Said electronic device also comprises a data entry system of the invention using at least said keys. Said keys may be of any kind such as resembling to the regular keys of a mobile phone, or being touch-sensitive, etc. Touch sensitive keys may permit touch-typing with two fingers 4903, 4904 of one hand. A display unit 4905 may also be provided for viewing the data entered, the data received, etc. A watch unit 4906 may also be assembled with said wrist device. Said wrist device may also comprise other buttons such as 4907, 4908 for functions such as send/end, etc. It must be noted that for faster data entry, a user my remove the wrist device from his wrist and use the thumbs of both fingers, each for pressing the keys of one row of keys. It is understood that other number of keys (e.g. 6 keys as described before) and other key arrangements (e.g. such as the circular key arrangement described before) may be considered.

Figure 49A:
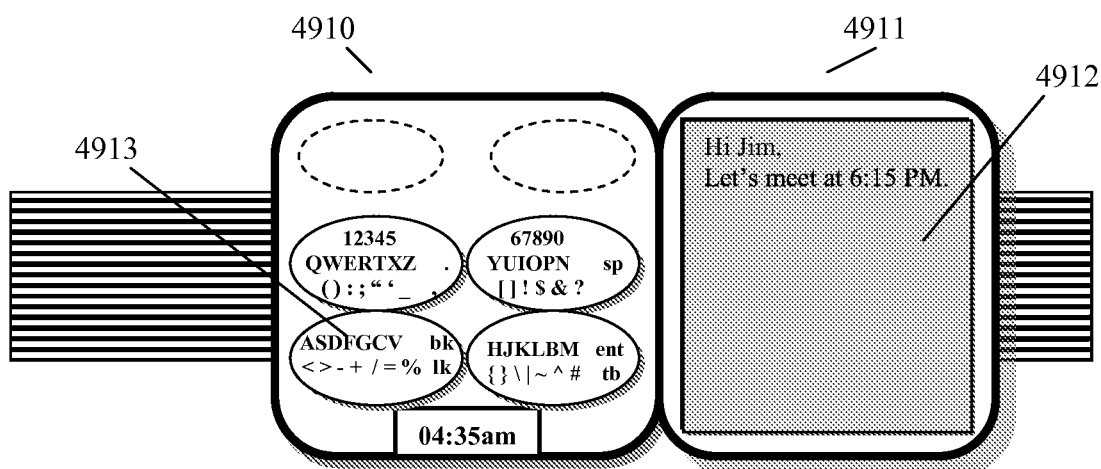
FIG. 49a illustrates a watch with folded keypad and display, in accordance with one embodiment of the present invention.
Figure 49B:
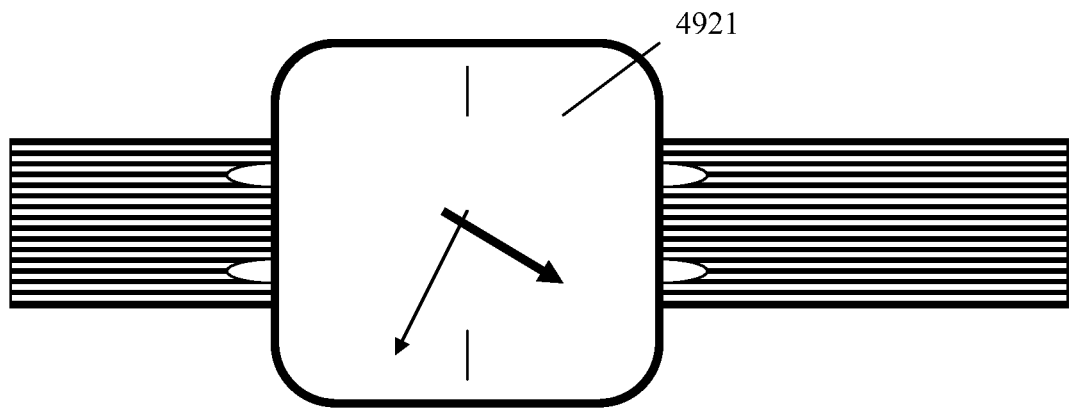
FIG. 49b illustrates a closed watch with keypad and display, in accordance with one embodiment of the present invention.

It is also understood that other kinds of designs for a wrist communication/organizer device may be considered. For example, as shown in FIG. 49a, a flip cover portion 4911 may be provided with a wrist device 4910. Said device 4910 may for example, comprises most of the keys 4913 used for data entry, and said flip cover 4911 may comprise a display unit 4912 (or vise versa). As shown in FIG. 49b, on the other side of said flip cover, a display unit 4921 of a watch unit may be installed. In closed position, said wrist device may resemble, and be used as, a wristwatch.

Figure 50A:
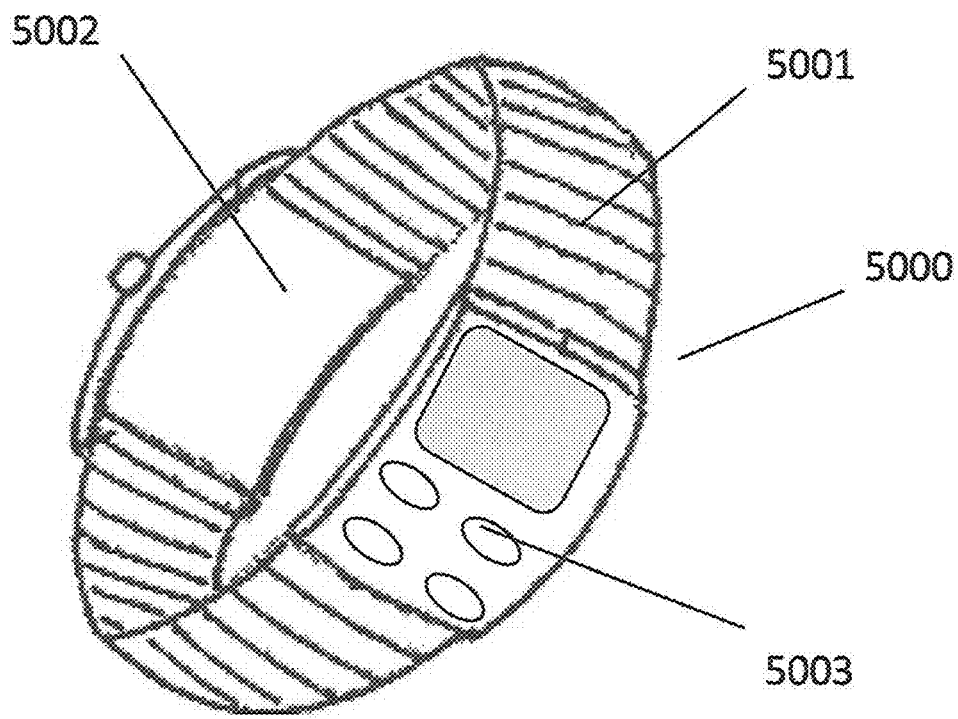
FIG. 50a illustrates a closed folded watch face with keypad, in accordance with one embodiment of the present invention.
Figure 50B:
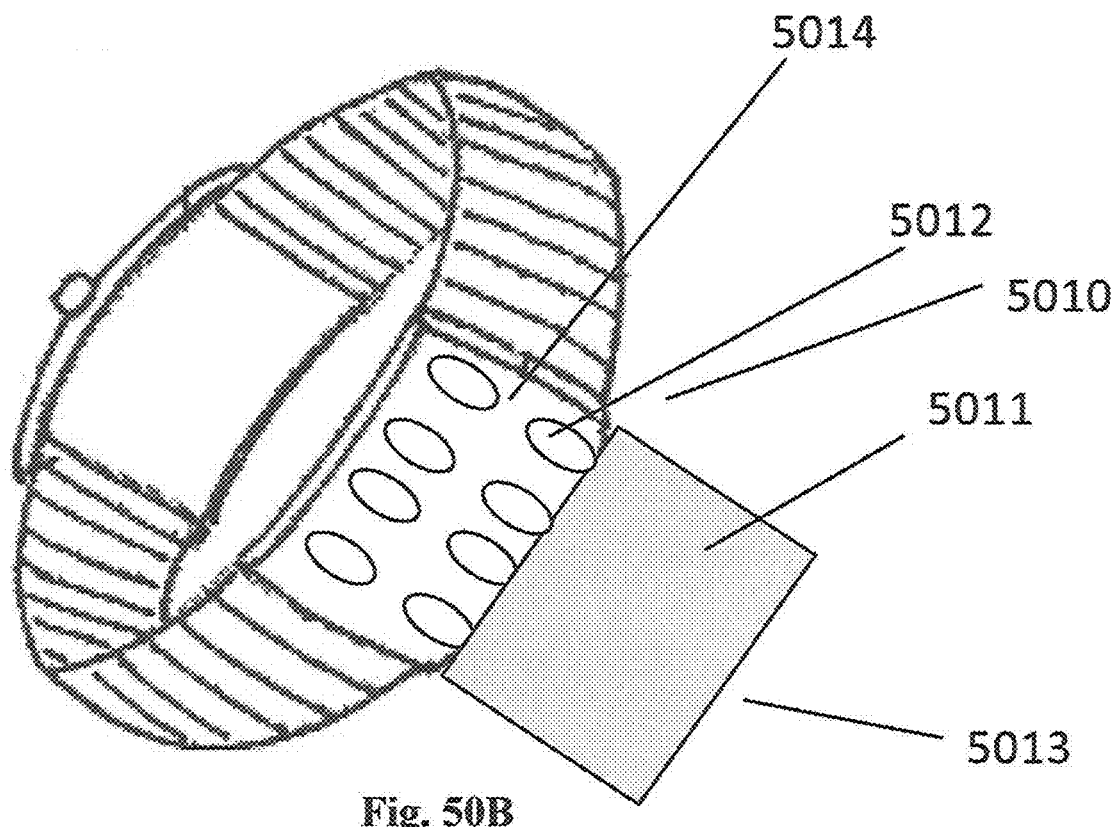
FIG. 50b illustrates an open folded watch face with keypad, in accordance with one embodiment of the present invention.

It is understood that the wrist devices shown and described here above are shown only as examples. Other types of wrist devices may be considered with the press and speak data entry system of the invention requiring the use of only few keys. For example, as shown in FIG. 50a, a wrist communication device 5000 comprising the data entry system of the invention using few numbers of keys 5003, may be detachably-attached-to/integrated-with the bracelet 5001 of a watch unit 5002. FIG. 50b shows a wrist device 5010 similar to the one 5000 of the FIG. 50a with the difference that here the display unit 5011 and the data entry keys 5012 are separated and located on a flip cover 5013 and the device main body 5014, respectively (or vise versa). It is noted that said keys and said watch unit may be located in opposite relationship around a user's wrist.

As mentioned, the data entry systems of the invention may be integrated within devices having few numbers of keys. A PDA is an electronic organizer that usually uses a handwriting recognition system or miniaturized virtual QWERTY keyboard wherein both methods have major shortcoming providing slow and frustrating data entry procedure. Usually most PDA devices contain at least four keys. The data entry system of the invention may use said keys according to principles described before, to provide a quick and accurate data entry for PDA devices. Other devices such as Tablet PCs may also use data entry system of the invention. Also, for example, according to another method, as mention, few large virtual (e.g. soft) keys (e.g. 4, 5, 6, 8, etc) such as those shown in FIG. 49a, may be designated on a display unit of an electronic device such as a PDA, Tablet PC, etc. and used with the data entry system of the invention. As an example, the arrangement and configuration of the keys on a large display such as the display unit of a Tablet PC may resemble to those shown in FIGS. 47a-47d.

Movement-Tracking for Data Entry

Dividing a group of symbols such as alphabetical letters, numbers, punctuation marks, functions, etc., in few subgroups and using them with the press and speak system of the invention may permit the elimination of use of button pressing action by, eventually, replacing it with other user's behavior recognition systems such as recognizing his movements. Said movements may be the movements of for example, fingers, eyes, face, etc., of a user. This may be greatly beneficial for user's having limited motor ability, or in environments requiring more discrete data entry system. For example, instead of using four keys, four movement directions of a user's body member such as one or more fingers, or his eye may be considered.

According to one embodiment of the invention, and by referring to FIG. 45c and considering that symbols of a data entry system are arranged on four zones as an example, a user may move his eyes (or his face, in case of face tracking system, or his fingers in case of finger tracking system) to the upper right side and say "Y" for entering said letter. Same movement without speaking may be assigned to for example, the punctuation mark "." 4535. To enter the letter "s", the user may move his eyes towards lower left side and say "S". By using only few clearly/easily recognizing movements of a user assigned to few sub-group of symbols combined with a feature (of the data entry system of the invention) such as speaking a desired symbol, the data entry system of the invention will provide quick and accurate data entry without requiring hardware manipulations (e.g. buttons). As noticed, in this embodiment a predefined movement of user's body member may replace a key press in other embodiments. The rest of the procedures of the data entry systems of the invention may remain as they are.

It is understood that as described in previous applications instead of keys other objects such as a sensitive keypad or user's fingers may be used for assigning said subgroups of symbols to them. For example, for entering a desired symbol, a user may tap his finger (to which said symbol is assigned) on a desk and speak said letter assigned to said finger and said movement. Also instead of recognizing the voice (e.g. of speech) of the user other user's behavior and/or behavior recognition systems such as lip reading systems may be used.

One of the major problems for the at-least-part-of-a-word level (e.g. syllable-level) data entry of the invention is that if there is an outside noise and the speech of said part-of-the-word ends with a vowel, the system may misrecognize said speech and provide an output usually corresponding to the beginning of the desired portion but ending with a constant. for example, if a user says "mo" (while pressing the key corresponding to the letter "m"), the system may provide an output such as "mall". To eliminate this problem some methods may be applied with the data entry system of the invention.

According to one embodiment of the invention, as proposed previously, words/portion-of-a-words ending with a vowel pronunciation may be grouped with the words/portions having similar beginning pronunciation but ending with a consonant. After said words/portions are entered, the dictionary comparison and phrase structure will decided what was is the desired portion to be inputted. For example, word/portion-of-a-word "mo" and "mall" which are assigned to a same key may also be grouped in a same category, meaning that when a user presses said key and either says "mo" or "mall" in each of said cases the system considers the corresponding character-sets of both phoneme-sets. This is because there should be considered that the pronunciation of said two phoneme-sets "mo" and "mall" (specially, in noisy environments) are substantially similar and may be misrecognized by the voice recognition system.

According to one embodiment of the invention, a keypad wherein the alphabetical letters are arranged on for example, two columns of its keys may be used for at least the at-least-part-of-a-word level (e.g. syllable-level) data entry system of the invention.

Figure 51:
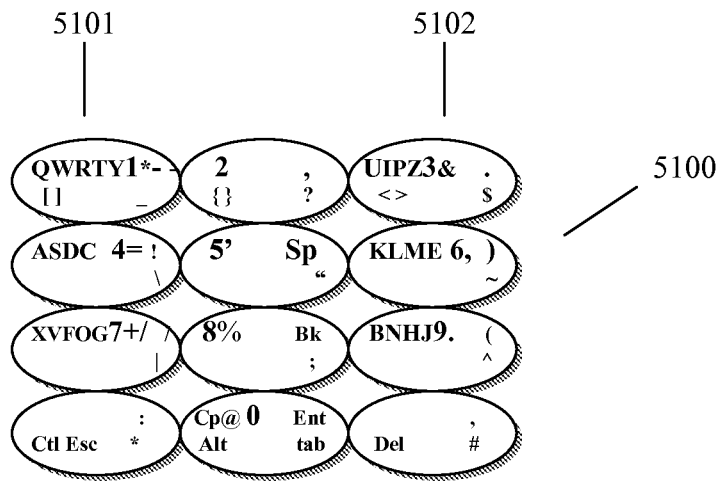
FIG. 51 illustrates a keypad, in accordance with one embodiment of the present invention.

FIG. 51 shows as an example, a keypad 5100 wherein the alphabetical letters are arranged on two columns of keys 5101 and 5102. Said arrangement locates letters/phonemes having closed pronunciation on different keys. Said arrangement also reminds a QWERTY arrangement with some modifications. In this example, the middle column does not contain letter characters. Different methods of at-least-part-of-a-word level (e.g. syllable-level) data entry system of the invention as described earlier may use said type of keypad or other keypads such as those shown in previous figs. having few keys, such the FIGS. 45a to 45d.

As described earlier, according to one embodiment of the invention, if a word/portion-of-a-word ends with a vowel, a user may press a key of said keypad corresponding to the beginning phoneme/letter of said word/portion-of-a-word and speak said word/part-of-a-word, for entering it. If necessary, for providing more information about said portion, a user may press additional keys corresponding to at least part of the letters constituting said portion. For example, if said word/part-of-a-word ends with a consonant phoneme, the user may press an additional key corresponding to said consonant.

To permit the system to distinguish between a key press corresponding to the beginning letter/phoneme of a word/portion-of-a-word and a key press corresponding to for example, the last letter/phoneme of said word/portion-of-a-word, different methods such as the ones described hereafter, may be provided.

According to one embodiment of the invention, when a user presses a first key corresponding to the beginning phoneme/letter of a word/portion-of-a-word while speaking it, he may keep said key pressed, and press at least an additional key corresponding to another letter (preferably the last consonant) of said word/portion-of-a-word.

If said another letter is located on a same beginning key, the user may double-press said key while speaking said word/part-of-a-word.

Figure 51A:
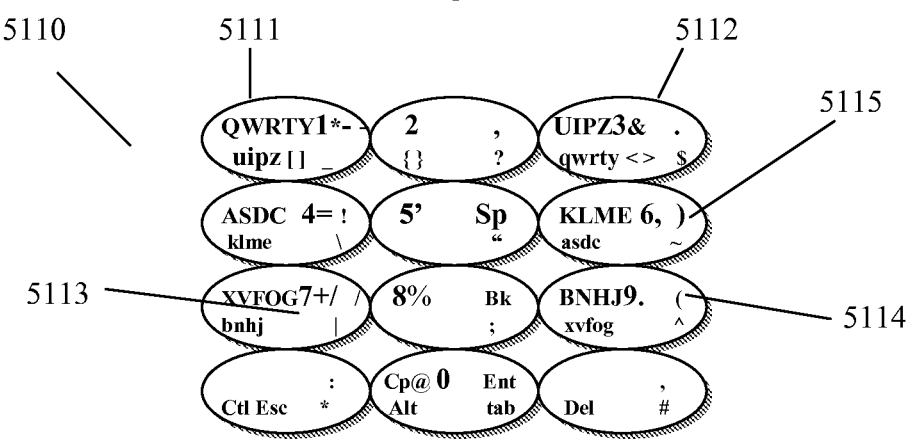
FIG. 51a illustrates a keypad, in accordance with one embodiment of the present invention.

FIG. 51a shows a keypad 5110 wherein alphabetical characters (shown in uppercase) are arranged on two columns of its keys 5111, 5112. Each of said keys containing said alphabetical characters also contains the alphabetical characters (shown in lowercase) as assigned to the opposite key of the same row. According to one embodiment of the invention, When a user attempts to enter a word/part-of-a-word, he presses the key corresponding to the beginning character/phoneme of said word/part-of-a-word printed in uppercase (e.g. printed in uppercase on said key) and speaks said word/part-of-a-word. If said user desires to provide more information such as pressing a key corresponding to an additional letter of said word/part-of-a-word, (while keeping said first key pressed) said user may press a key situated on the opposite column corresponding to said additional letter (e.g. printed in uppercase or lowercase on a key of said opposite column) of said word/part-of-a-word. For example, if a user desires to enter the word "fund", he first presses the key 5113 and says said word, and (while keeping said key 5113, pressed) said user presses consecutively, for example, two additional keys 5114 and 5115 corresponding to the consonants "n", and "d".

Figure 51B:
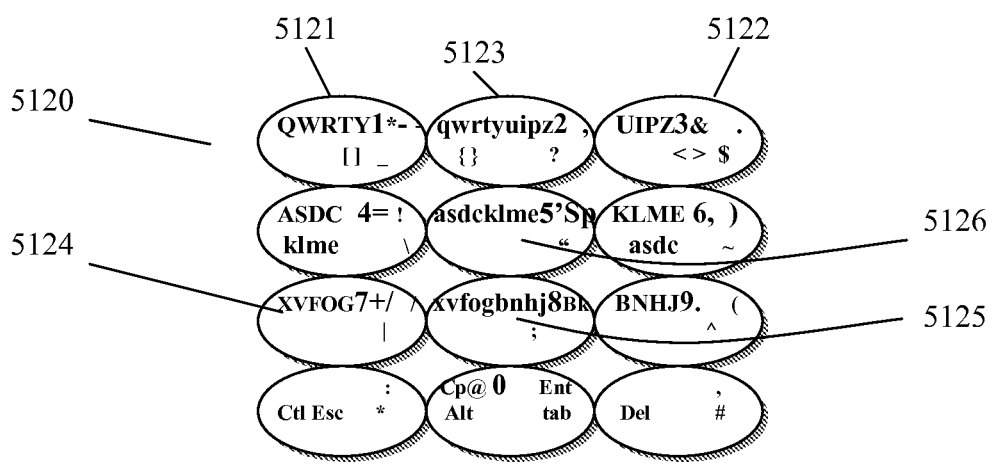
FIG. 51b illustrates a keypad, in accordance with one embodiment of the present invention.

FIG. 51*b* shows a keypad 5120 similar to the keypad of the FIG. 51*a* with the difference that, here two columns 5121 and 5122 are assigned to the letters/phonemes corresponding to a beginning phoneme/letter of a word/part-of-a-word, and an additional column 5123 is used to provide more information about said word/part-of-a-word by pressing at least a key corresponding to at least a letter other than the beginning letter of said word/part-of-a-word. This may permit a data entry using one hand only. For example, if a user desires to enter the word "fund", he first presses the key 5124 and says said word, and (after releasing said key 5124) said user presses consecutively, for example, two additional keys 5125 and 5126 corresponding to the consonants "n", and "d".

According to another embodiment of the invention, as mentioned above, symbols requiring a speech (for entering them), may be assigned to a first predefined number of objects/keys, and symbols to be entered without a speech, may be assigned to another predefined number of keys, separately from said first predefined number of keys.

According to another embodiment of the invention, if the keys providing letters comprise only spoken symbols, then the user may press a key corresponding to a first letter/phoneme of said word/part-of-a-word and, preferably simultaneously, speaks said word/part-of-a-word. He then may press additional key(s) corresponding to additional letter(s) constituting said word/part-of-a-word without speaking. The system recognizes that the key press(es) without speech corresponds to the additional information regarding the additional letter(s) of said word/part-of-a-word. For example, by referring to the FIG. 51 and considering that to the keys providing letters, of said keypad, only spoken symbols are assigned, if a user desires to enter the word "fund", he first presses the key corresponding to the letter "f" while saying "fund", and after releasing said key said user presses consecutively, for example, two additional keys corresponding to the letters "n", and "d" without speaking As mentioned before, the word/portion-of-a-word data entry system of the invention may also function without the step of comparing the assembled selected character-sets with a dictionary of words/portions-of-words. A user may enter a word, portion by portion, and have them inputted directly. As mentioned, this is useful for entering a-word/part-of-a word in different languages without worrying about its existence in a dictionary of words/portions-of-words. A means such as a mode key may be used to inform the system that the assembled group of characters will be inputted/outputted without said comparison. If more than one assembled group of characters has been produced they may be presented to the user (e.g. in a list printed at the display) and the user may select one of them by, for example, pressing a "select" key. In another embodiment, if more than one assembled group of characters has been produced, an assembled group of character having the highest priority may be inputted automatically by proceeding to, for example, the entry of a next word/portion-of-a word, a punctuation mark, a function such as "enter", etc.

Also, According to said principles described earlier in this application, a word may be inputted by entering it portion-by-portion with/without the step of comparison with a dictionary of words. Also as described before, said portion may be a character or a group of characters of a word (a macro).

According to one embodiment of the invention, in addition to the alphabetical letters, the character by character data entry system of the invention may use a limited number of frequently used portion-of-a-words (e.g. tion", "ing", "sion", "ment", "ship", "ed", etc.) and/or limited number of frequently used words (e.g. "the", "and", "will", etc.,) to provide a quick and accurate data entry system requiring small amount of memory and faster processing. Said limited number of words/portion-of-a-words may be assigned to the corresponding (interaction with the) keys of a keypad according to the principles of the data entry system of the invention as described in this application and the applications filed before. Also, obviously, the may inputted according to the principles of the data entry system of the invention as described in this application and the applications filed before. According to this embodiment, for example, a user may enter the word "portion", in four portions "p", "o", "r", and "tion". To do so, for example by using the keypad of the FIG. 45*c*, said user may first say "p" and press (preferably, almost simultaneously) the corresponding key 4533. He, then, may say "o" and press (preferably, almost simultaneously) the corresponding key 4533. Then, said user may say "r" and press (preferably, almost simultaneously) the corresponding key 4530. And finally, he may say "shen" (e.g. pronunciation of the portion-of-a-word, "tion") and press (preferably, almost simultaneously) the key 4530 (e.g. corresponding to the letter "t", the first letter of the portion-of-a-word, "tion") to which the portion "tion" is assigned.

As mentioned before, this embodiment of the invention may be processed with/without the use of the step of comparison of the inputted word with the words of a dictionary of words as described before in the applications. In case of not using said comparison step, the data may be inputted/outputted portion by portion.

As mentioned, this embodiment of the invention is beneficial for the integration of the data entry system of the invention within small devices (e.g. wrist-mounted electronic devices, cellular phones) wherein the memory size and the processor speed are limited. In addition to (or in replacement of) said list of frequently used words/portion-of-a-words, a user may also add his preferred words/portion-of-a-words to said list.

Figure 52:
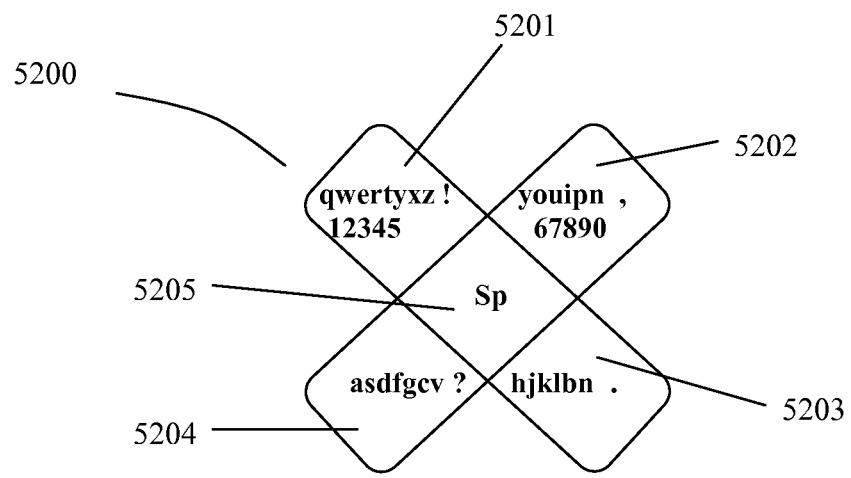
FIG. 52 illustrates a keypad, in accordance with one embodiment of the present invention.

As previously described, the data entry system of the invention may use few numbers of keys for a complete data entry. It is understood that instead of said few keys, a single multi-modal/multi-section button having different predefined sections wherein each section responding differently to a user's action/contact on said each of said different predefined sections of said multi-mode/multi-section button, may be provided wherein characters/phoneme-sets/character-sets as described in this invention may be assigned to said action/contact with said predefined sections. FIG. 52 shows, as an example, a multi-mode/multi-section button 5200 (e.g. resembling to a multi/mode button used in many electronic games, cellular phones, remote controllers of TVs, etc.) wherein five sections 5201-5205 of said button, each respond differently to user's finger action (e.g. pressing)/contact on said section. As an example, different alphanumeric characters and punctuations may be assigned to four 5201-5204 of said sections and the space character may be assigned to the middle section 5205. It is understood that said button 5200 may have a different shape such as an oval shape, and may have different number of sections wherein different configuration of symbols may be assigned to each of said portions.

Figure 53:
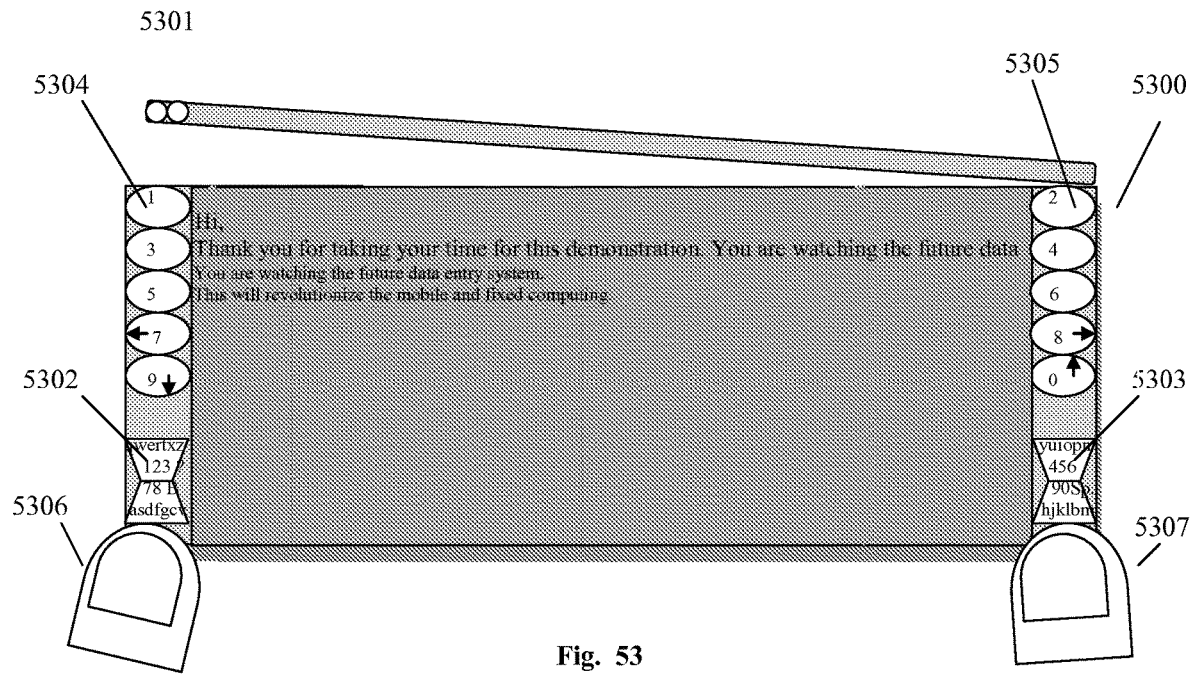
FIG. 53 illustrates a keypad and display, in accordance with one embodiment of the present invention.

As described before and shown as example in FIGS. 47a to 47i, an electronic device such as a mobile computing/communication device comprising a wide display and small data entry unit having quick data entry capabilities due to data entry system of the invention, may be provided. Also as mentioned previously, said electronic device may comprise additional buttons. FIG. 53, shows an electronic device 5300 comprising keys 5302, 5303 (in this example, bi-directional keys) for entering text and corresponding functions, and additional rows of buttons 5304, 5305 for entering other functions such as dialing phone numbers (e.g. without speaking said numbers), navigating within the display, sending/receiving a call, etc. A group of symbol for at least text entry, as described in this invention, may be assigned to pressing each side of a bi-directional key such as the keys 5302-5303. A bi-directional key may correspond to two separate keys. Manipulating a bi-directional key may be easier than manipulating two separate keys. In the example of this embodiment, a user may enter the data by using the thumbs 5306, 5307 of his two hands.

As mentioned in different paragraphs of this patent application and the previous ones filed by this inventor, it is understood that other kinds of keys such as virtual (soft) keys may be used with the data entry system of the invention. Also, at least part of the additional data entry features described in this patent application and the previous ones applied by this inventor may be integrated within the computer/telecommunication device of the invention. For example, an extendable (e.g. detachable) microphone/cameral antenna 5301, and a mouse (not shown) within the backside of said device (e.g. to be manipulated by the user's forefinger) wherein its corresponding keys being on the front side or on any other side of said computer/telecommunication device, as described earlier, may be implemented.

Figure 54:
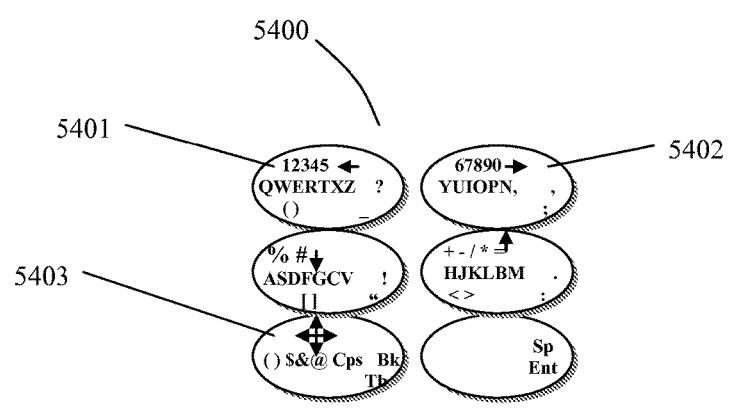
FIG. 54 illustrates a keypad, in accordance with one embodiment of the present invention.

As mentioned before, part/all of the symbols available for a complete data entry may be assigned to few keys and be used with the data entry system of the invention to provide a complete quick and easy data entry. Said few keys may be part of the keys of a keypad. FIG. 54 shows another example of the assignments of the symbols of a PC keyboard to few keys 5400. In this example, the arrows for navigation of a cursor (e.g. in a text) on a display, may be assigned to a spoken mode. For example, a user may single-press the key 5401 and say "left" to move the cursor (e.g. in a text printed on the display) one character left. To move the cursor several characters left, said user may press the key 5401 while saying "left" and keep said key pressed. The cursor may keep moving left until the user releases said key 5401. To move said cursor to the right, the user may press the key 5402 while saying, for example "right", and using the procedure which just described. Similar procedures may be used for moving the cursors up and down in a text by pressing the corresponding keys and saying corresponding words.

According to one embodiment of the invention, moving the cursor in several directions (such as left, right, up, and down) may be assigned to at least one key. With continuous reference to FIG. 54, as an example, moving the cursor in different directions may be assigned to a single key 5403. For example, a user may press the key 5403 and say "left" to move said cursor to the left. To move the cursor to the right, up, or down, said user may press the key 5403 and say "right", "up", or "down", respectively.

It is understood that in this example, the number of keys (to which part/all symbols available for a complete data entry may be assigned) are demonstrated only as an example. Said number of keys may be different according to the needs such as the design of an electronic device.

According to one embodiment of the invention, a keypad/data-entry-unit of the invention having a few keys may comprise additional features such as a microphone, a speaker, a camera, etc. Said keypad may be a standalone unit being connected to a corresponding electronic device. Said standalone keypad may permit to integrate a display unit covering substantially a whole side of said electronic device. FIG. 55a shows a standalone keypad 5500 of the invention having at least few keys (or at least a multi-directional key corresponding to said few keys) 5501, 5507, 5508, 5509 to which part/all of the symbols available for a complete data entry may be assigned for data (e.g. text) entry. Said keypad may also comprise additional features such as a microphone 5502, a speaker 5505, a camera 5503, etc. Said additional features may be integrated within said keypad, or being attached/connected to it, etc. As shown in FIG. 55b, said keypad 5500 (shown by its side view) may also comprise attaching means 5504 to attach said keypad to another object such as a user's finger/wrist. Said keypad may be connected (wirelessly or by wires) to a corresponding electronic device. FIG. 55c, shows a standalone keypad 5510 according to the principles just described. As mentioned before, by using few keys combined with the data entry system of the invention for a complete data entry, after a short period of exercise, a user may enter complete data such as text through said few keys without looking at said keys. Based on this principle, a user may hold said keypad 5510 in (e.g. the palm of) his hand 5511, position it closed to his mouth (by bringing his hand closed to his mouth), and press the desired keys while not-speaking/speaking-the-symbols (e.g. characters, letters, words/part-of-words, functions corresponding to said key presses) according to the principles of the data entry system of the invention, without looking at the keys. As mentioned, said keypad may be, wirelessly or by wires, connected to a corresponding electronic device. In this example, the keypad is connected by a wire 5512 to a corresponding device (not shown). Also in this example, a microphone 5513 is attached to said wire 5512. Holding said keypad 5510 in (e.g. the palm) of a hand closed to the mouth for data entry has many advantages such as:

a user does not have to wear a head-worn microphone
  said user may speak very closed to the microphone, therefore he may speak discretely
  the cavity of the user's palm may accentuate the user's voice for better reception by the microphone
  the (e.g. palm of) the hand of the user substantially eliminates the outside noise while speaking
  the (e.g. palm of) the hand of the user prevents the user's voice to be spread (e.g. not disturbing the others). It is understood that the standalone keypad/data-entry-unit of the invention may also comprise part/all of the features described in this application and the previous applications filed by this inventor. For example, said standalone keypad/data-entry-unit may comprise a camera to, for example, be used with the lip-reading system of the invention. It also may comprise a means based on the denture recognition system of the invention. Said keypad may also comprise other features such as a battery, wireless means to connect said keypad to a corresponding device. An antenna may also be implemented with said keypad. In case of wired connection, said wire may also comprise an antenna system of the keypad and/or the corresponding electronic device.

Figures 55D, 55E:
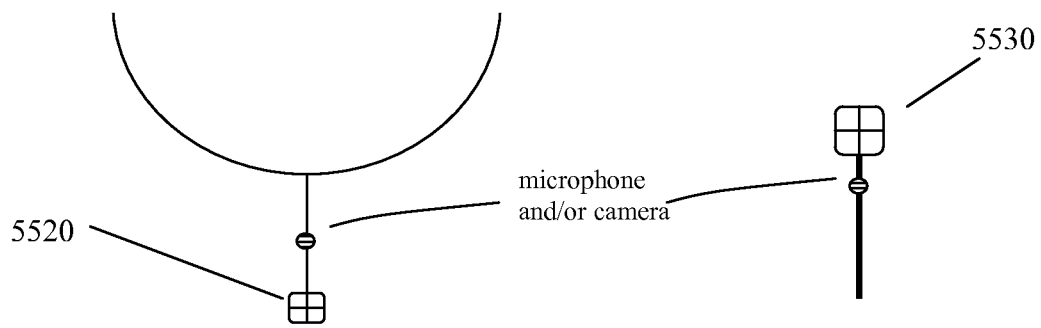
FIG. 55d illustrates a microphone and camera, in accordance with one embodiment of the present invention.
FIG. 55e illustrates a microphone and camera, in accordance with one embodiment of the present invention.

According to one embodiment of the invention, as shown in FIG. 55d, the standalone keypad 5520 of the invention may be used as a necklace/pendent. This permits easy and discrete, portability and use, of the keypad/data-entry-unit of the invention.

According to one embodiment of the invention, as shown in FIG. 55e, the standalone keypad 5530 of the invention may be attached-to/integrated-with a pen of a touch sensitive display such as the display of a PDA/TabletPC. This permits easy and discrete, portability and use, of the keypad/data-entry-unit of the invention.

Figure 55F:
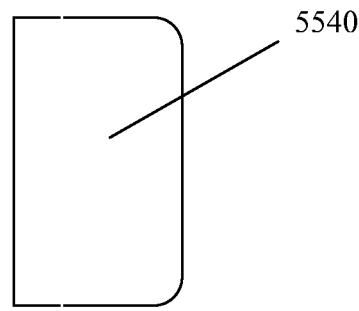
FIG. 55f illustrates a folded keypad, in accordance with one embodiment of the present invention.

According to one embodiment of the invention, as shown in FIG. 55f, the keypad of the invention having few keys may be a multi-sectioned keypad 5540 (shown in closed position). This will permit to still more reduce the size of said keypad permitting to provide an extremely small sized keypad through which a complete data entry may be provided. A multi-sectioned keypad has already been invented by this inventor and patent applications have been filed. Some/all of the descriptions and features described in said applications may be applied to the multi-sectioned keypad of the invention having few number of keys.

Figure 55G:
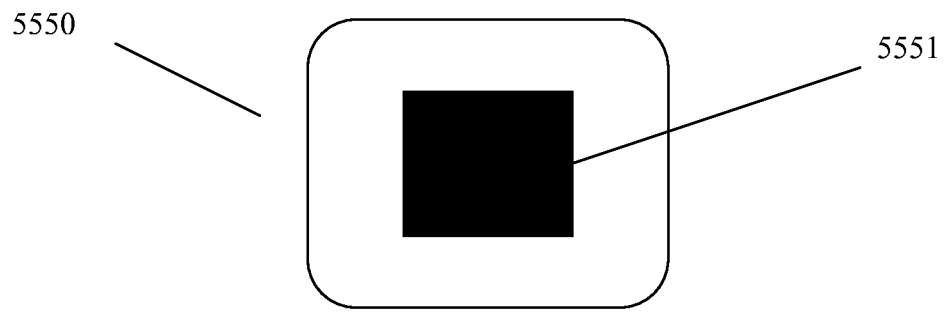
FIG. 55g illustrates a key for a keypad, in accordance with one embodiment of the present invention.

According to one embodiment of the invention, as shown in FIG. 55g, the keypad/data-entry-unit of the invention having few number of keys 5550, may comprise a pointing unit (e.g. a mouse) within the backside (or other sides) of said keypad. Said pointing unit may be of any type such as a pad-type 5551 or a balled-type (not shown). The keys of said pointing unit may be unit may be located on the front side of said data entry unit. A point-and-click (e.g. mouse) unit located in a side such as the backside of a data-entry-unit has already been invented by this inventor and patent applications have been filed accordingly. Some/all of the descriptions and features described in said applications may be applied to the multi-sectioned keypad of the invention having few keys. For example, at least one of the keys of said keypad may function also as the key(s) of said pointing unit which is located at the backside of said keypad.

Figure 55H:
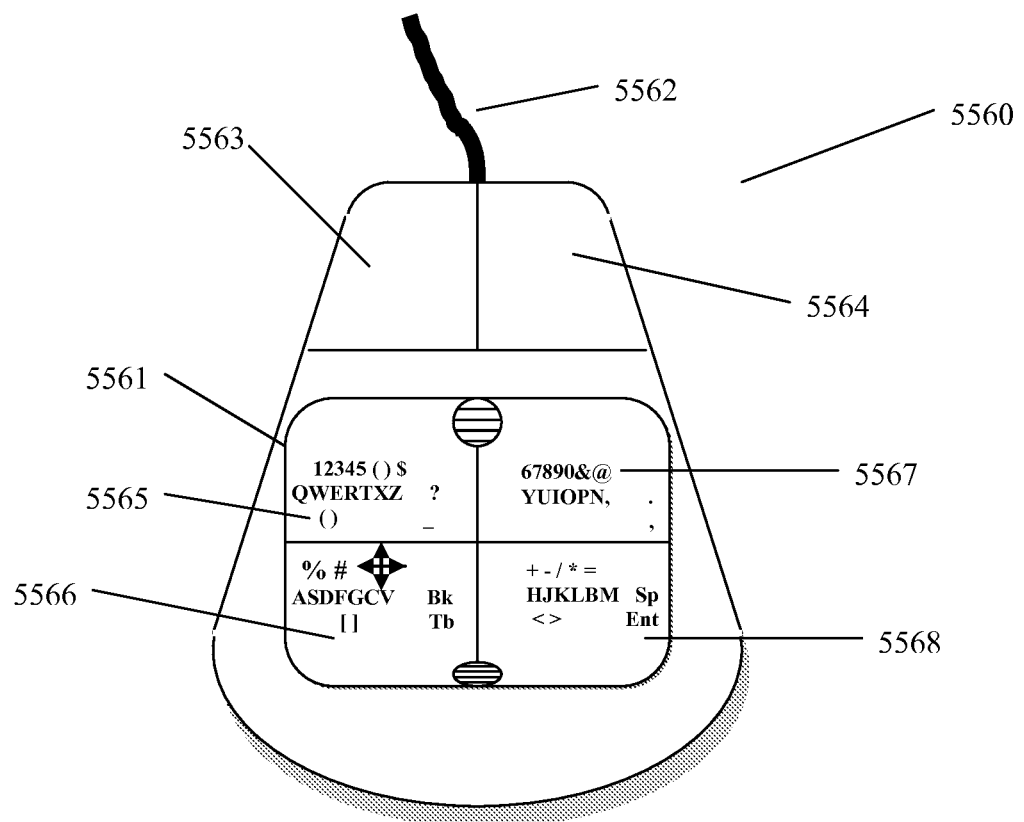
FIG. 55h illustrates a keypad on a mouse, in accordance with one embodiment of the present invention.
Figure 55I:
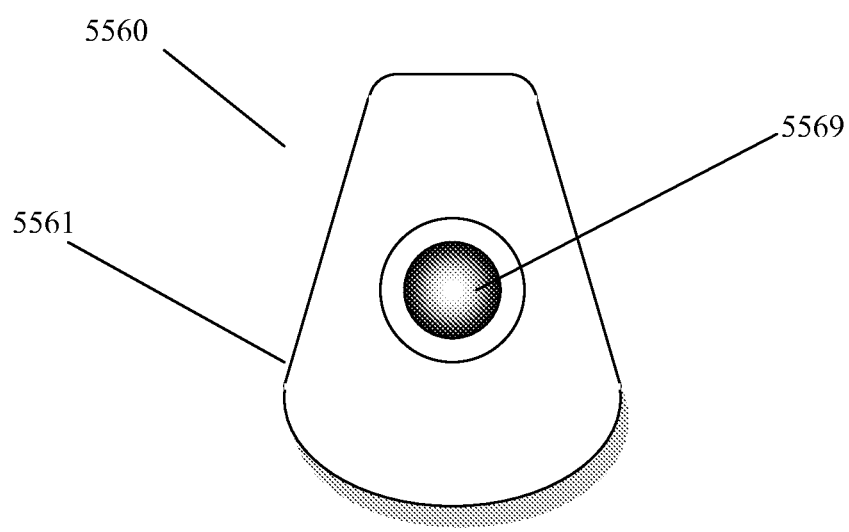
FIG. 55i illustrates the underside of a mouse on a keypad, in accordance with one embodiment of the present invention.

FIG. 55h shows data entry device 5560 of the invention having a data entry unit 5561 comprising few keys 5565-5568. Said device also has a point-and-click (e.g. mouse) unit to work in combination with said data entry unit for a complete data entry and manipulation of data. Said device and its movements on a surface may resemble to a traditional computer mouse device. Said integrated device may be connected wirelessly or be wires 5562 to a corresponding electronic instrument such as a computer. As shown in FIG. 55i, a pointing (e.g. mouse) unit 5569 may be located in a side such as the backside of said data-entry-unit 5561 (not shown here, located on the other side of said device) of said. Said pointing (e.g. mouse) unit 5569 may be a track-ball-type mouse. A user may manipulate/work-with a computer using said integrated data entry device 5560 combined with the data entry system of the invention, replacing the traditional PC keyboard and mouse. Keys of the mouse may be the traditional keys such as 5563, 6664 (see FIG. 55h), or their functions may be assigned to said few keys (5565-5568, in this example) of said data entry unit 5561.

According to one embodiment of the invention, as mentioned in this patent application and the previous patent applications filed by this inventor, the data entry system of the invention may be combined with a word predictive software. For example, a user may enter at least one beginning character of a word by using the data entry system of the invention (e.g. speaking a part-of-a-word corresponding to at least one character) while pressing corresponding key(s), and continue to press the keys corresponding to the rest of said word without speaking them. The precise entry of the beginning letters of said word (due to accurate data entry system of the invention) along with the pressing of the keys (without speaking) corresponding to the remaining letters of said word may permit an accurate data entry system also permitting less speech. It is understood that in this embodiment, symbols other than letters, may preferably be assigned to separate keys or to separate interactions with the same keys.

Figure 55J:
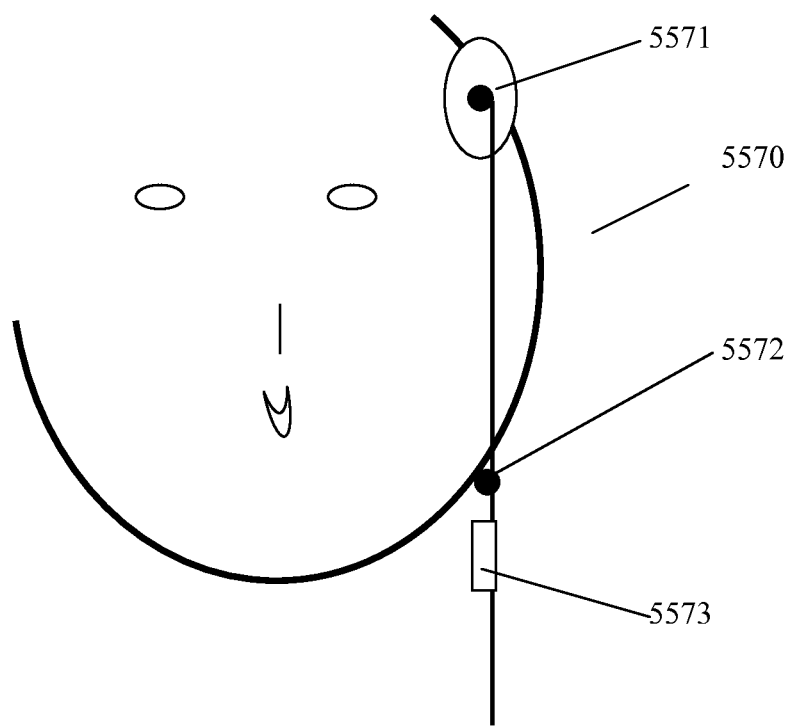
FIG. 55j illustrates an earphone, and microphone with a keypad, in accordance with one embodiment of the present invention.

According to one embodiment of the invention, the keypad/data entry unit of the invention having few keys, may be attached/integrated with a traditional earbud of an electronic device such as a cell phone. FIG. 55j shows a traditional earbud 5570 used by a user. The earbud may comprise a speaker 5571, a microphone 5572 and a keypad/data entry unit of the invention 5573 (multi-sectioned keypad, in this example). it is understood that the keypad/data entry unit of the invention may be used with a corresponding electronic device for entering key presses while a separate head microphone is used for entering a user's corresponding speech.

Sweeping Procedures Combined with the Data Entry System of the Invention

As mentioned before, the data entry system of the invention may use any kind of objects such as few keys, one or more multi-mode (e.g. multi-directional) keys, one or more sensitive pads, user's fingers, etc. Also as mentioned, said objects such as said keys may be of any kind such as traditional mobile-phone-type keys, touch-sensitive keys, keys responding to two or more levels of pressure on them (e.g. touch level and more pressure level), soft keys, virtual keys combined with optical recognition, etc.

As mentioned before, when entering a portion of a word according to the data entry systems of the invention, for better recognition, in addition to providing information (e.g. key press and speech) corresponding to a first character/phoneme of said portion, a user may provide additional information corresponding to more characters such as the last character(s), and/or middle character(s) of said portion.

Figure 56:
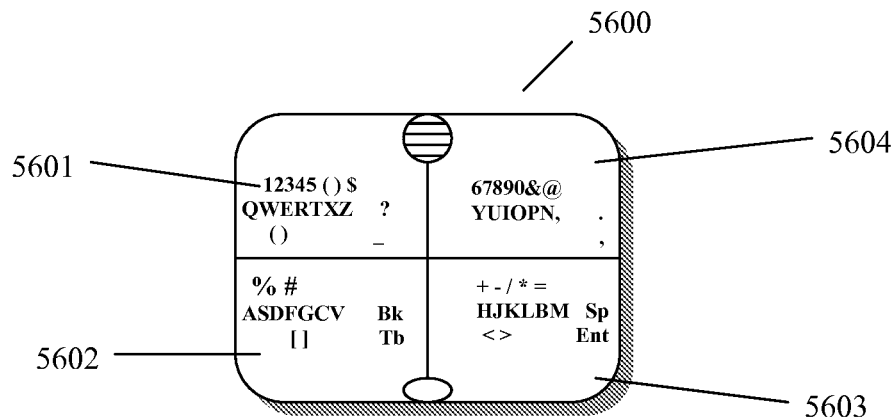
FIG. 56 illustrates a keypad, in accordance with one embodiment of the present invention.

According to one embodiment of the invention, as shown in FIG. 56, a touch sensitive surface/pad 5600 having few predefined zones/keys such as the zones/keys 5601-5604 may be provided and work with the data entry system of the invention. To each of said zones/keys a group of symbols according to the data entry systems of the invention may be assigned. The purpose of this embodiment is to enhance the word/portion-of-a-word (e.g. including the character-by-character) data/text entry system of the invention. According to this embodiment, to provide a single character data entry, a user may for example, single/double press a corresponding zone/key combined-with/without speech (according to the data entry systems of the invention, as described before). To enter a word/portion-of-a-word having at least two characters, while speaking said word/portion-of-a-word, the user may sweep, for example, his finger or a pen, over at least one of the zones/keys of said surface, relating to at least one of the letters of said word/portion-of-a-word. The sweeping procedure may, preferably, start from the zone corresponding to the first character of said word/portion-of-a-word, and also preferably, end at a zone corresponding to the last character of said word/portion-of-a-word, while eventually, (e.g. for helping easier recognition) passing over the zones corresponding to one or more middle character of said word/portion-of-a-word. The entry of information corresponding to said word/portion-of-a-word may end when said user removes (e.g. lifts) said finger (or said object) from said surface/sensitive pad. It is understood that the speech of the user may end before said corresponding sweeping action ends, but the system may consider said whole corresponding sweeping action.

Figure 56A:
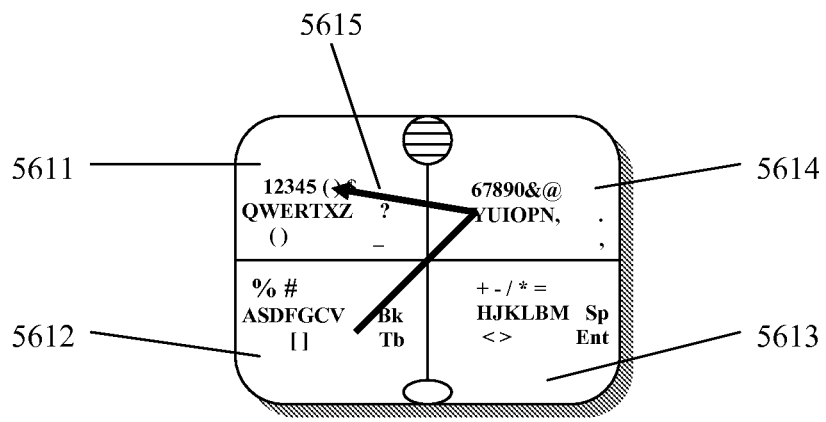
FIG. 56a illustrates a keypad, in accordance with one embodiment of the present invention.

According to another embodiment of the invention, for entering a word/part-of-a-word, while speaking it, a user may sweep his finger over the zones/keys (if more then one consecutive characters are represented by a same zone/key, accordingly, sweeping in several different directions on said same zone/key) corresponding to all of the letters of a said word/part-of-the-word to be entered. With reference to the FIG. 56a, for example, to enter the word/portion-of-a-word "for", while saying it, a user may sweep his, for example finger or a pen, over the zones/keys 5612, 5614, and 5611, corresponding to the letters "f", "o", and "r", respectively (demonstrated by the multi-directional arrow 5615). The user, then, may lift his finger from said surface (e.g. sensitive pad) informing the system of ending the entry of the information corresponding to said word/portion-of-a-word.

Figure 56B:
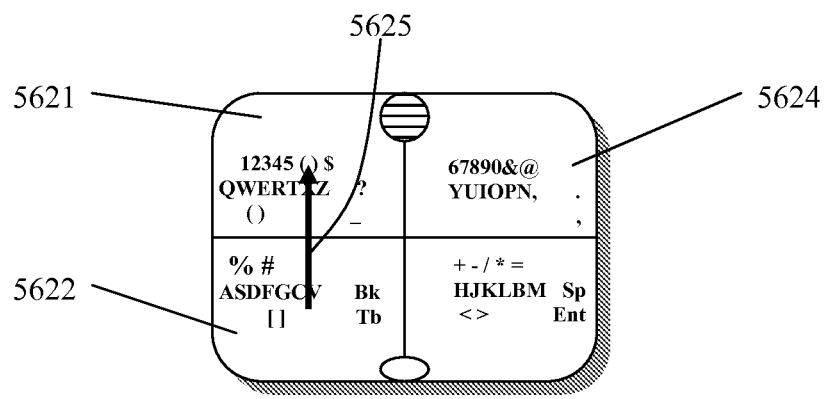
FIG. 56b illustrates a keypad, in accordance with one embodiment of the present invention.

According to another embodiment of the invention, for quicker interaction, to enter a word a user may sweep his finger over the zones corresponding to some of the letters of said word/part-of-a-word to be entered. With reference to the FIG. 56b, for example, to enter the word/portion-of-a-word, "for", while saying it a user may sweep his, for example finger or a pen, over the zones 5622, 5621 (demonstrated by the arrow 5625) starting from the zone 5622 (e.g. corresponding to the letter "f") and ending at the zone 5621 (e.g. corresponding to the letter "r") without passing over the zone 5624 corresponding to the letter "o".

The advantage of a sweeping procedure on a sensitive pad over pressing/releasing action of conventional non-sensitive keys (e.g. keys of a conventional telephone keypad) is that when using the sweeping procedure, a user may lifts his finger from said sensitive surface only after finishing sweeping over the zones/keys corresponding to several (or all) of the letters of a word-part-of-a-word. Even if the user ends the speech of said portion before the end of the corresponding sweeping action, the system considers the entire corresponding sweeping action (e.g. from the time the user first touches a first zone/key of said surface till the time the user lifts his finger from said surface). Touching/sweeping and lifting the finger from said surface may also inform the system of the start point and endpoint of a corresponding speech (e.g. said speech is preferably approximately within said time limits.

In conclusion, according to one embodiment of the invention, a trajectory of a sweeping interaction (e.g. corresponding to the words having at least two characters) with a surface having a predefined number of zones/keys responding to said interaction may comprise the following points (e.g. trajectory points) wherein each of said points correspond to a letter of said word/part-of-a-word:

1) Starting point, corresponding to the first character of a word/part-of-a-word 2) Sweeping direction changing points (e.g. not obligatory, does not exist for the words having two characters only), usually corresponding to a middle character (if there exist any) of said word/part-of-a-word 3) Ending point corresponding to an additional character (preferably, the last (preferably, pronounceable)) of said word/part-of-a-word p271

Figure 57:
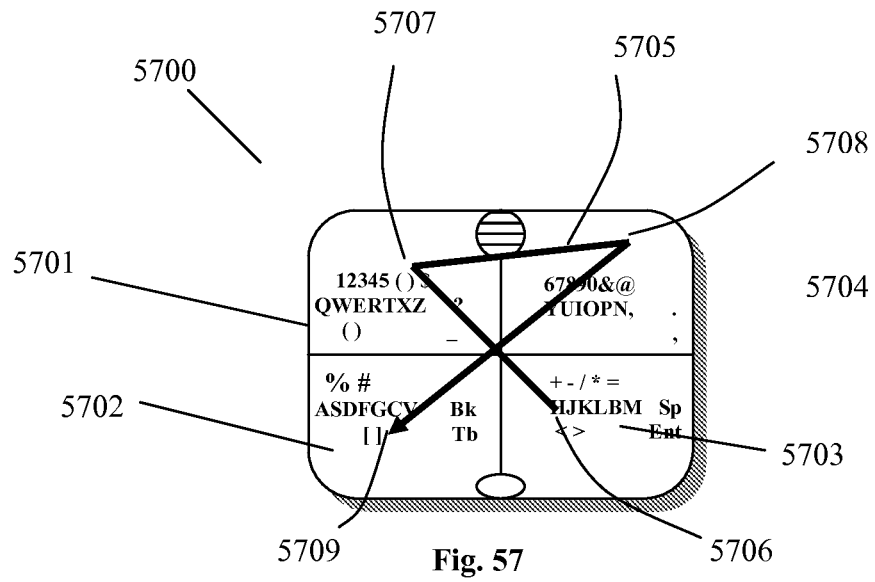
FIG. 57 illustrates a keypad, in accordance with one embodiment of the present invention.
Figure 57A:
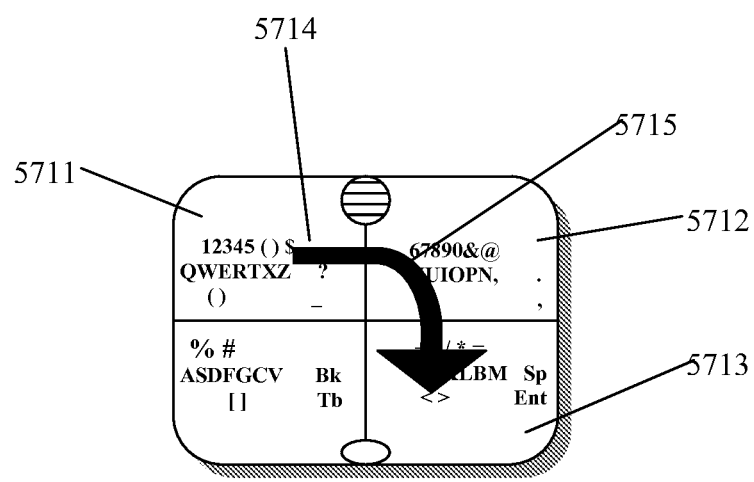
FIG. 57a illustrates a keypad, in accordance with one embodiment of the present invention.

FIG. 57 shows as an example, a trajectory 5705 of a sweeping action corresponding to the word "bring", on a surface 5700 having four zones/keys 5701-5704. The starting point 5706 informs the system that the first letter of said word is located on the zone/key 5703. The other three points/angles 5707-5709 corresponding to the change of direction and the end in the sweeping action, inform the system that said word comprises at least three more letters represented by the one of the characters assigned to the zones 5701, 5704, and 5702. Preferably, the order of said letters in said word (e.g. "bring, in this example) corresponds to the order of said trajectory points. It is understood that said angles corresponding to the change of direction may be less accentuated and have formed such as a curved form. FIG. 57a shows as an example, a sweeping trajectory (shown by the arrow 5714 having a curved angle 5715) corresponding to the word "time". In this example, the sweeping action has been provided according to the letters "t" (e.g. presented by the key/zone 5711), "i", (e.g. presented by the key/zone 5712), and "m" (e.g. presented by the key/zone 5713). It is understood that the user speaks said word (e.g. "time", in this example) while sweeping.

Figure 58A:
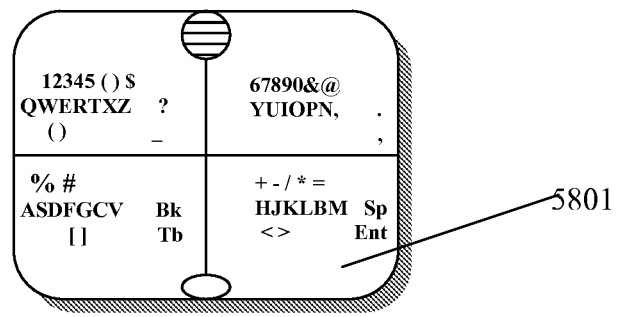
FIG. 58a illustrates a keypad, in accordance with one embodiment of the present invention.
Figure 58B:
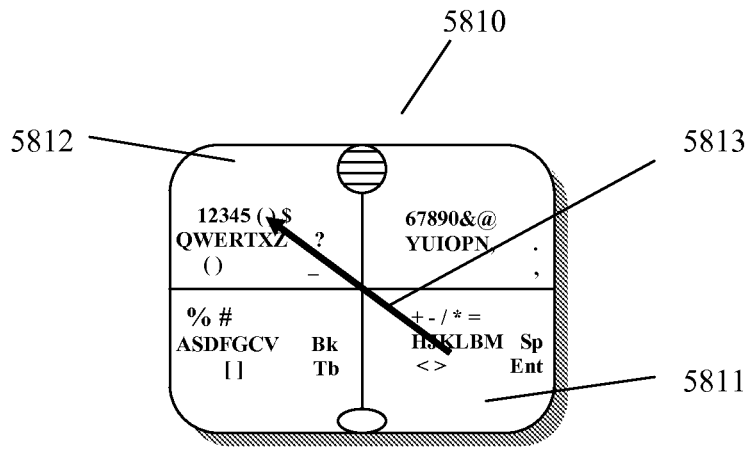
FIG. 58b illustrates a keypad, in accordance with one embodiment of the present invention.
Figure 58C:
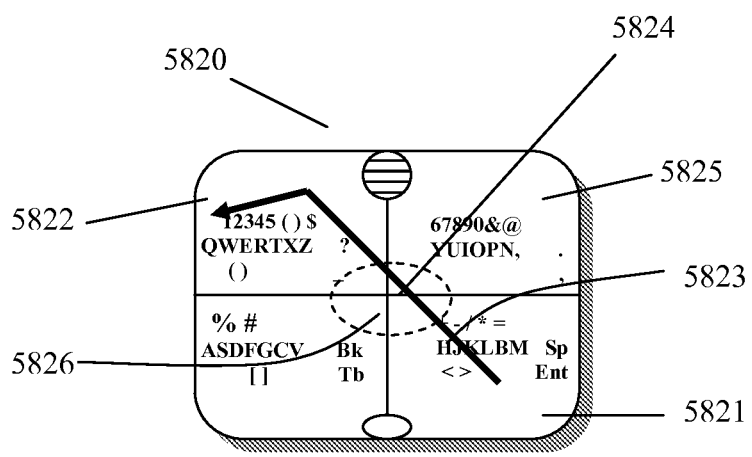
FIG. 58c illustrates a keypad, in accordance with one embodiment of the present invention.

The tapping/pressing and/or sweeping data entry system of the invention will significantly reduce the ambiguity between a letter and the words starting with said letter and having a similar pronunciation. Based on the principles just described, for example, to enter the letter, "b", and the words/part-of-a-words, "be" and "bee", the following procedures may be considered:

to enter the letter "b", as shown in FIG. 58a, a user, as usual, may single press/touch (without sweeping) a sensitive-zone/key (e.g. the zone/key 5801 in this example) corresponding to the letter "b" while pronouncing said letter.

to enter the word/part-of-a-word, "be", as shown in FIG. 58b and described earlier, while pronouncing said word/part-of-a-word, a user may sweep on the sensitive surface 5810 starting from the zone 5811 corresponding to the letter "b" and passing/ending at the zone 5812, corresponding to the letter "e". The arrow 5813 demonstrates the corresponding sweeping path/trajectory.

to enter the word/part-of-a-word "bee", as shown in FIG. 58c and described earlier, while pronouncing said word/part-of-a-word, a user may sweep on the sensitive surface 5820 starting from the zone 5821 corresponding to the letter "b", passing/sweeping on the zone 5822, corresponding to the (e.g. first) letter "e", and changing sweeping direction on the same zone 5822, corresponding to the (e.g. second) letter "e". Having two trajectory points (e.g. middle and end point in this example) on a same zone/key may inform the system that at least two letters of said word/part-of-a-word are located-on/assigned-to said zone/key and are located after the letter corresponding to the previous zone/key in said word/part-of-a-word. The arrow 5823 demonstrates the corresponding sweeping path.

It must be noted that, as shown, each change in sweeping direction may correspond to an additional corresponding letter in a word. While sweeping from one zone to another, there user may pass over a zone that he is not intending to. The system may not consider said passage if, for example, either the sweeping trajectory over said zone is not significant (e.g. see the sweeping path 5824 in the zone/key 5825 of the FIG. 58c), and/or there has been no angles (e.g. no change of direction) in said zone, etc. Also to reduce and/or eliminate the confusability, a traversing (e.g. neutral) zone such as the zone 5826 may be considered.

As mentioned before, the character by character data entry system of the invention and the word/portion-of-a-word by word/portion-of-a-word data entry system of the invention may be combined. Also, sweeping and pressing embodiments of the invention may be combined. For example, to write a word such as "stop", a user may enter it in two portions "s" and "top". To enter the letter "s", the user may (single) touch/press, the zone/key corresponding to the letter "s" while pronouncing said letter. Then, to enter the portion "top", while pronouncing said portion, the user may sweep (e.g. drag), for example, his finger over the corresponding zones/keys according to principles of the sweeping procedure of the invention as described.

To reduce or eliminate the ambiguity of an accidental contact with a zone/key of a sensitive surface, in addition to touch sensitive feature another feature such as a click/heavier-pressure system (such as the system provided with the keys of a conventional mobile phone keypad) may be provided with each zone/key. In this case, for example, to enter a single symbol (e.g. according to the character by character data entry system of the invention) rather than a slight touching, the user may more strongly press a corresponding zone/key to enter said symbol. To proceed to the word/part-of-a-word by word/part-of-a-word data entry system of the invention, the user may use the sweeping procedures as described earlier, by sweeping, for example, his finger, slightly (e.g. using slight pressure) over the corresponding zones/keys.

Figure 59A:
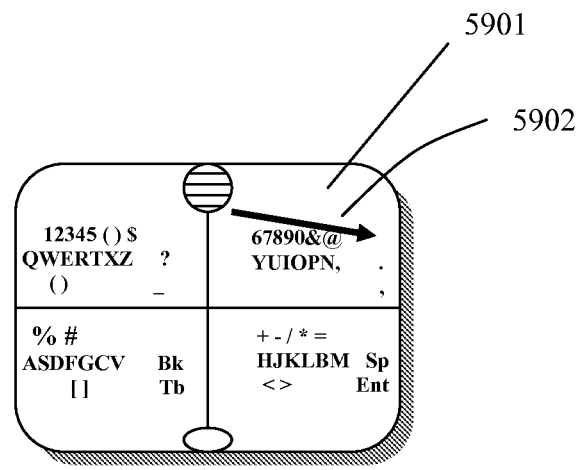
FIG. 59a illustrates a keypad, in accordance with one embodiment of the present invention.
Figure 59B:
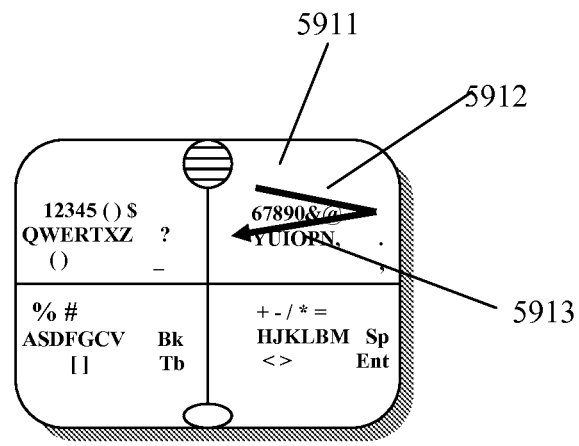
FIG. 59b illustrates a keypad, in accordance with one embodiment of the present invention.

If a word/part-of-a-word contains letters represented on a single zone/key, while speaking said word/part-of-a-word, a user may sweep, for example, his finger over said zone/key, in several consecutive different directions (e.g. at least one direction, and at most the number of directions equivalent to the number of letters (n) constituting said word/part-of-a-word, minus one (e.g., n–1 directions)). For example, to enter the word, "you", as shown in FIG. 59*a*, in addition to speaking said word, a user may sweep his finger once (e.g. preferably, in a single straight/almost straight direction 5902) on the zone/key 5901 to inform the system that at least two letters of said word/part-of-a-word are assigned to said zone/key (according to one embodiment of the invention, entering a single character is represented by a tap over said zone/key). To enter the same word by providing more information to the system, as shown in FIG. 59*b*, said user may sweep, for example, his finger, in two consecutive different directions 5912, 5913 (e.g. two straight/almost straight direction) on the zone/key 5911 corresponding to at least three letters (e.g. in this example, all of the letters constituting the word "you") of said a word/part-of-a-word, without removing (e.g. lifting) his finger from said zone/key (e.g. in this example, providing three trajectory points, 1 begin, 1 middle, 1 end).

As mentioned, to enter a word/part-of-a-word, a user may speak said word/part-of-a-word and sweep an object such as his finger over at least part of the zones/keys representing the corresponding symbols (e.g. letters) of word/part-of-a-word. According to one embodiment of the invention, preferably, the user may sweep over the zone(s)/key(s) representing the first letter, at least one of the middle letters (e.g. if exist any), and the last letter of said word/part-of-a-word. Preferably, the last letter considered to be swap may be the last letter corresponding to the last pronounceable phoneme in a word/part-of-a-word. For example, the last letter to be swap of the word, "write", may be considered as the letter "t" (e.g. pronounceable) rather than the letter "e" (e.g. in this example, the letter "e" is not pronounced). It is understood that if desired, the user may sweep according to both letters "t" and "e".

According to another example, a user may sweep according to the first letter of a word/part-of-a-word and at least one of the remaining consonants of said word/part-of-a-word. For example, to enter the word "force", the user may sweep according to the letters "f", "r", and "c".

To enter a word in at least two portions, according to one embodiment of the invention, the user first sweeps (for example, by using his finger) on the zones/keys according to the first portion while speaking said portion. He then, may lift (e.g. remove) his finger from the sensitive surface to inform the system that the entry of said (e.g. in this example, first) portion has ended. The user then proceeds to entering the next portion (and so on) according to the same principles. At the end of the word, the user may provide an action such as pressing/touching a space key.

To enter a word in at least two portions, according to another embodiment of the invention, the user first sweeps (for example, by using his finger) on the zones/keys according to the first portion while speaking it. He then, (without lifting/removing his finger from the sensitive surface) proceeds to entering the next portion (and so on) according to the same principles. At the end of the word, the user may lift (e.g. remove) his finger from the sensitive surface to inform the system that the entry of said whole word has ended. The user, then, may provide an action such as pressing/touching a space key. In this embodiment, as described, lifting the finger from the writing surface may correspond to the end of the entry of an entire word. Accordingly, a space character may automatically be provided before/after said word.

It is understood that, preferably, the order of sweeping zones/keys and, if necessary, different directions within said zones/keys may correspond to the order of the location of the corresponding letters in the corresponding word/part-of-a-word (e.g. from left to right, from right to left, from up to down, etc.). For example, while entering a word/portion-of-a-word in English language, a user may sweep on the zones/keys corresponding and/or according to the letters situated from left to right in said word/portion-of-a-word. In another example, while entering a word/portion-of-a-word in for example, Arabic or Hebrew language, a user may sweep on the zones/keys corresponding and/or according to the letters situated from right to left in said word/portion-of-a-word. As mentioned and demonstrated before, it is understood that a user may sweep zones (and direction) either according/corresponding to all of the letters of said word/portion-of-a-word or according/corresponding to some of the letters of said word/portion-of-a-word.

As mentioned before, part or all of the systems, methods, features, etc. described in this patent application and the patent application filed before by this inventor may be combined to provide different embodiments/products. For example, after entering a word portion by portion (e.g. by using the sweeping data entry of the invention), as described previously, to each entry of a portion, more than one related chain of letters may be selected by the system. In this case, as previously described, different assembly of said selections may be provided and compared to the words of a dictionary of words. If said assemblies correspond to more than one word of said dictionary then they may be presented to the user according to their frequency of use starting from the most frequent word to the least frequent word. This matter have been described in detail, previously.

The automatic spacing procedures of the invention may also be applied to the data entry systems using the sweeping methods of the invention.

As described before, different automatic spacing procedures may be considered and combined with the data entry systems of the invention. According to one embodiment of the invention (as described before) each word/portion-of-a-word may have special spacing characteristics such as the ones described hereunder:

a portion-of-a-word may be of a kind to, preferably as default, be attached to the previous word/portion-of-a-word (Examples, "ing", "ment", "tion", etc).

a portion-of-a-word may be of a kind, to preferably, be attached to the previous word/portion-of-a-word and may also require the next word/portion-of-a-word to be attached to it (e.g. "ma" in the word "information")

a portion-of-a-word may be an independently meaningful word that may not be attached to the previous word/portion-of-a-word As default, a space character before or after said word may automatically be provided, unless, for example, the user or the phrase context require it to be attached to said previous/next word/portion-of-a-word (e.g. "for", "less").

single characters such as the letters, digits, punctuation marks, may be considered to be (e.g. as default) automatically attached to the previous/next word/portion-of-a-word, unless otherwise decided.

According to one embodiment of the invention, based on the character-by-character data entry systems of the invention, the entry of a single character such as a letter may be assigned to pressing/tapping a corresponding zone/key of a the touch-sensitive surface combined with/without speech, and a word/portion-of-a-word entry may be assigned to speaking said word/portion-of-a-word while providing a single-direction sweeping action (e.g. almost straight direction) on a zone/key to which the beginning character of said word is assigned. For example, to enter the letter "z", while pronouncing said letter, a user may press/touch (without sweeping) a key to which said letter "z" is assigned. To enter the word/portion-of-a-word "zoo", while pronouncing said word/portion-of-a-word, a user may sweep a zone/key to which said letter "z" (e.g. corresponding to the beginning letter of the word "zoo") is assigned. This may permit to the system to easily understand the user's intention of, either a character entry procedure or a word/portion-of-a-word entry procedure.

As described and/or shown, the data entry systems of the invention may provide many embodiments based on the principles described in patent applications filed by this inventor. Based on said principles and according to different embodiments of the invention, for examples, different keypads having different number of keys, and/or different key maps (e.g. different arrangement of symbols on a keypad) may be considered. An electronic device may comprise more than one of said embodiments which may require some of said different keypads and/or different key maps. To permit providing said keypads and/or key maps within a same electronic device, physical and/or virtual keypads and/or key maps may be provided.

According to one embodiment of the invention, different keypads and/or key maps according to a current embodiment of the invention on an electronic device, may automatically, be provided on the display unit of said electronic device. A user, according to, for example, the needs or his preference may select an embodiment from a group of different embodiment existing within said electronic device. For this, a means such as a mode (e.g.) may be provided within said electronic device which may be used by said user for selecting one of said embodiments and accordingly a corresponding keypads and/or key-map.

According to another embodiment, for example, instead of using the display unit of an electronic device for printing a keypad and/or a key-map, the keys of a keypad of said device (for example, if said electronic device is a telephone, the keys of its keypad) may be used to display different key maps on at least some of the keys of said keypad. For this purpose, said keys of said keypad may comprise electronically modifiable printing keycaps (e.g. key surface).

Figure 60:
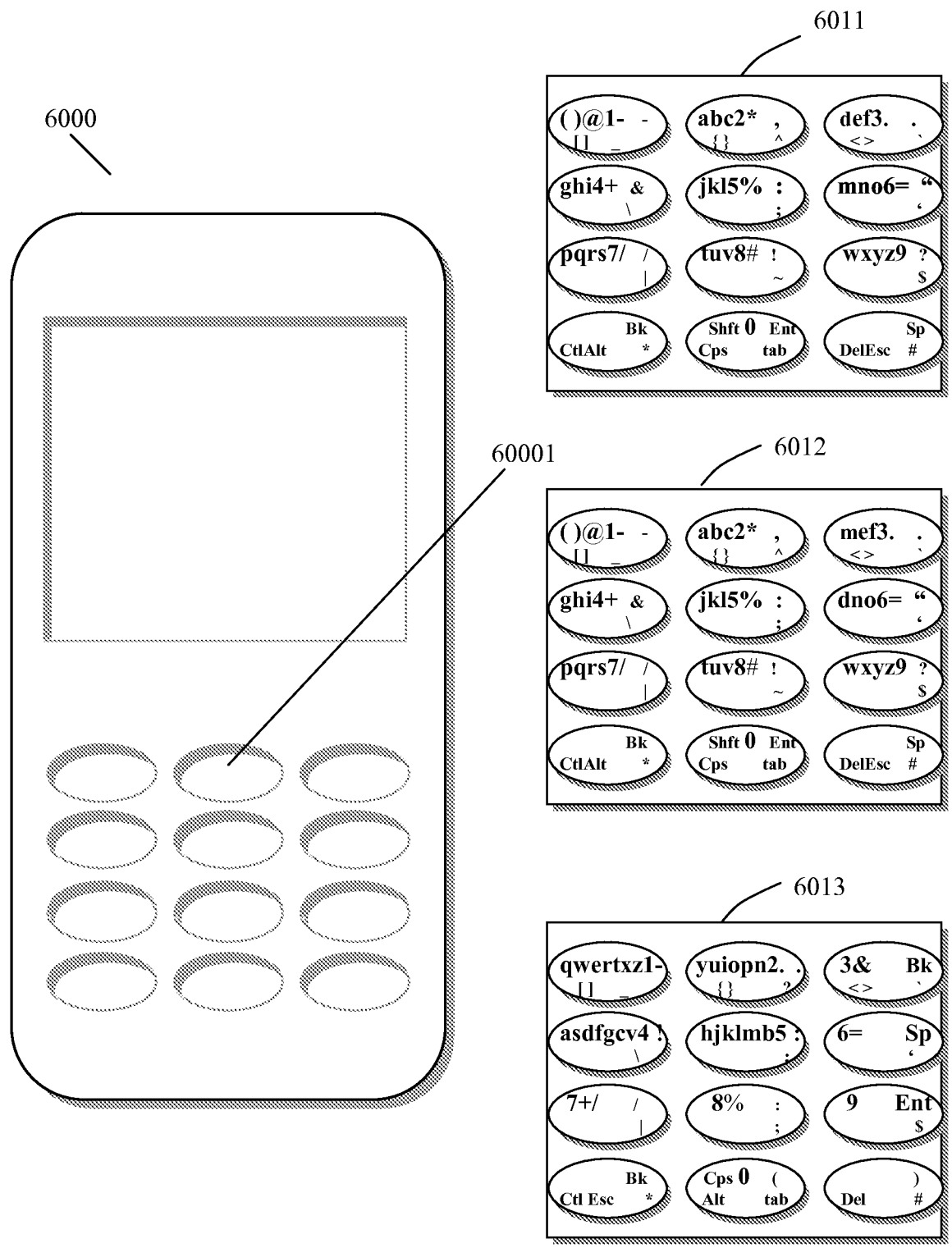
FIG. 60 illustrates a keypad and display cover, in accordance with one embodiment of the present invention.

Still, according to another embodiment and by referring to the previous embodiment, instead of using a keypad having electronically modifiable printing keycaps, different hard key maps according to corresponding data entry embodiments may be provided and delivered with said electronic device. FIG. 60, shows as an example, an exchangeable (e.g. front) cover 6000 of a mobile phone, having a number of hollow holes (e.g. such as the hole 6001) corresponding to a physical keycap (usually made in rubber material by the manufacturers of the mobile phones). With said mobile phone and the exchangeable cover, also different replaceable hard (e.g. physical) key maps (e.g. such as the key maps 6011-6013) corresponding to the relating embodiments of the invention, may be provided. After selecting a desired embodiment of the date entry system, a user may, manually, replace a corresponding key map within said cover (and said phone).

It is understood that instead of a single pad having different predefined zones, different predefined pads, touch and/or press-sensitive-keys, etc., corresponding to each of said zones may be provided. Also fingers of a user may be used to assign said groups of symbols and said sweeping movements to said fingers combined with touch sensitive surface(s) or any other finger recognition systems (such as an optical scanning) as described in this application and the applications filed before. It must be noted that for example, any kind of technology and interaction such as two levels of pressure may be used instead of the sweeping data entry method of the invention, to provide the same results. Also any kind and number of objects such as keys may be used. These matters have already been described in this patent application, and previous patent applications filed by this inventor.

According to one embodiment of the invention, instead of few keys and the manners of manipulation of said keys, the symbols and configuration of them (e.g. as described in different applications) may be assigned to other objects such as few fingers of a user and the user's manipulations of said fingers. Said fingers of said user may replace the keys of a keypad and said movements of said fingers may replace different modes such as single and/or double press, sweeping procedure, etc. Said fingers and said manipulations of said finger may be used with the user's behaviors such as voice and/or lip movements. Different recognition system for recognizing said objects (e.g. fingers, portions of fingers, fingerprint recognition systems, scanning systems, optical systems, etc.) and different recognition system for recognizing said behaviors (e.g. voice and/or lip recognition systems) may be used to provide the different embodiments of the invention as described before and may be described later.

According to one embodiment of the invention and by referring to the embodiment of the system using four keys for data entry, instead of four keys, four finger of a user may be used to assign the symbols which were assigned to said keys. Also, for example, a means such as an optically recognition system and/or a sensitive surface may be used for recognizing the interactions/movements of said fingers. For example, to enter the letter "to", a user may tap (e.g. single tap) one of his fingers to which the letter "t" is assigned on a surface while pronouncing said letter. Still based on the data entry systems of the invention, an additional recognition means such as a voice recognition system may be used for recognizing the user's speech and helping the system to provide an accurate output.

Use of Multi-Directional Button or Trackball, for Word/Part-of-a-Word Data Entry Instead of using a touch sensitive surface/pad having few predefined zones/keys combined with the sweeping procedure of the invention for entering words/part-of-a-words, other means such as a trackball, or a multi-directional button having few (e.g. four) predefined pressing zones/keys may be provided with the data entry system of the invention. The principles of such systems may be similar to the one described for said sweeping procedure, and other data entry systems of the invention.

Figure 61A:
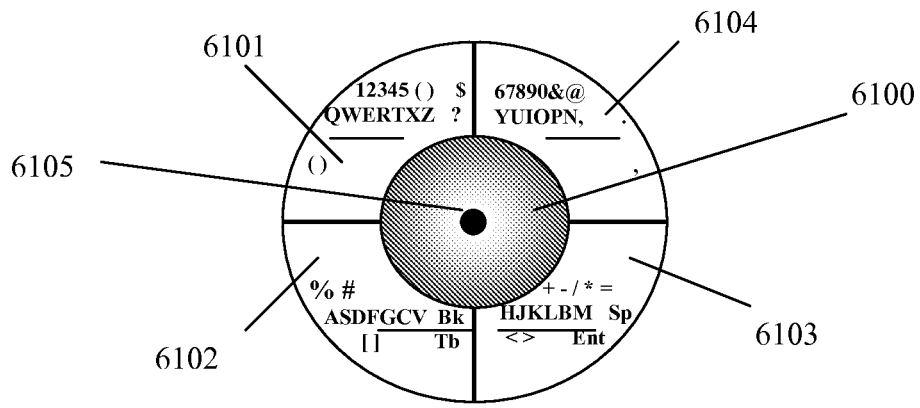
FIG. 61a illustrates a keypad, in accordance with one embodiment of the present invention.

According to one embodiment of the invention, a trackball having rotating movements which may be oriented toward a group of predefined points/zones around said trackball, and wherein to each of said predefined points/zones, a group of symbols according to the data entry systems of the invention may be assigned, may be used with the data entry system of the invention. As mentioned, the principles of said system may be similar to those described for the sweeping procedure using a touch sensitive surface/pad having few predefined zones/keys. The difference between the two systems is that, here, the trackball replaces said touch sensitive surface/pad, and the rotating movements of said trackball towards said predefined points/zones replace the sweeping/pressing action on said predefined zones/keys of said touch sensitive surface/pad. All of the descriptions of the data entry systems of the invention using the sweeping procedures on a touch sensitive surface/pad having few predefined zones/keys as described before, may be applied to said data entry system using said trackball. FIG. 61*a*, shows as example, a trackball system 6100, that may be rotated towards four predefined zones 6101-6104, wherein to each of said zones a predefined group of symbols such as alphanumerical characters, words, part-of-a-words, etc., according to different data entry systems of the invention as described in this application and the previous applications filed by this inventor, may be assigned and used with the principles of the pressing/sweeping combined with speaking/not-speaking data entry systems of the invention. For better interaction with said trackball, said zones and said symbols assigned to them may be printed on a display unit, and said trackball may manipulate a pointer on said display unit and said zones. According to another method, said trackball may position in a predefined position, before and after each usage. the center of said trackball may be marked by a point sign 6105. To enter a symbol a user may at first put his finger (e.g. thumb) on said point and the start moving in direction(s) according to a the symbol to be entered.

Figure 61B:
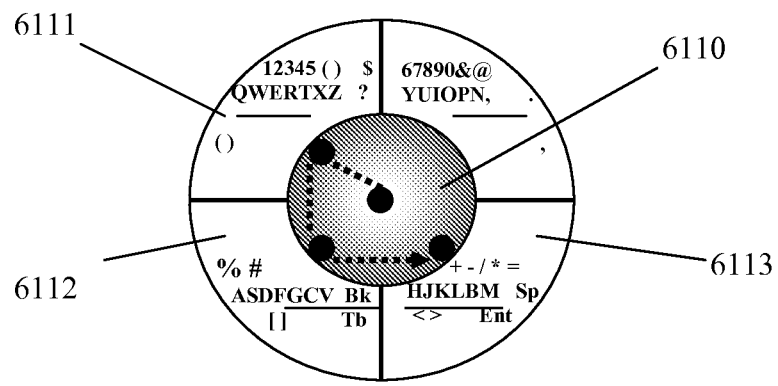
FIG. 61b illustrates a keypad, in accordance with one embodiment of the present invention.

With continuous reference to the current embodiment, as shown in FIG. 61*b*, for example, in order to enter the word/part-of-a-word "ram", the user may rotate the trackball 6110 towards the zones 6111, 6112, and 6113, corresponding to the characters, "r", "a", and "m", and preferably, simultaneously, speak the word/part-of-a-word, "ram".

Figure 61C:
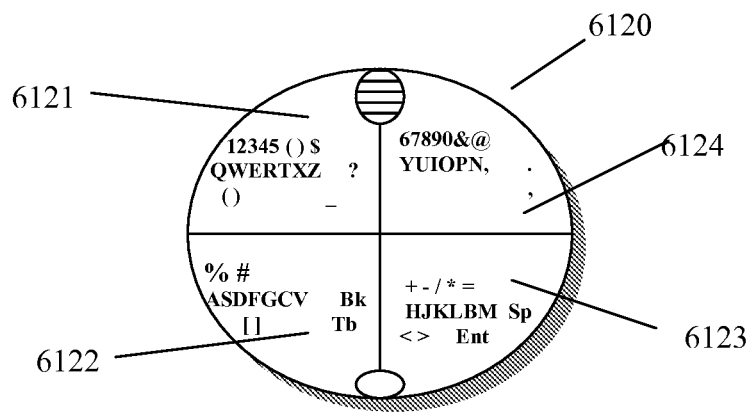
FIG. 61c illustrates a keypad, in accordance with one embodiment of the present invention.

According to another embodiment of the invention, a multi-directional button having few (e.g. four) predefined pressing zones/keys, and wherein to each of said zones/keys a group of symbols according to the data entry systems of the invention is assigned, may be used with the data entry system of the invention. Said multi-directional button may provide two type of information to the data entry system of the invention. A first information corresponding to a pressing action on said button, and a second information corresponding to the key/zone of said button wherein said pressing action is applied. A user may, either press on a single zone/key of said button corresponding to (e.g. first character of) said symbol, and speak/not-speak said symbol, or he may press on a zone/key of said button corresponding to a first character of said symbol, and sweep his finger on different zones/keys of said button (e.g. as described for sweeping embodiments, for providing more information about the characters constituting said symbol, when said symbols comprises more that one character) while continuously keeping said key in pressing position, and preferably, simultaneously, speak said symbol. At the end of the entry procedure of said symbol, the user may release said continuous pressing action on said key. As mentioned, the principles of this embodiment the invention may be similar to those described for the sweeping procedure using a touch sensitive surface/pad having few predefined zones/keys. The difference between the two systems is that, here, the multi-directional button replaces said touch sensitive surface/pad, and single/continuous pressing actions on said predefined zones/keys of said multi-directional button replace the sweeping/pressing actions of said predefined zones/keys of said sensitive surface/pad. All of the descriptions of the data entry system of the invention using the sweeping procedures on a touch sensitive surface/pad having few predefined zones/keys as described before, may be applied to the current data entry system of the invention using said multi-directional button. FIG. 61*c*, shows as an example, a multi-directional button 6120, as described here, wherein said button comprises four predefined zones/keys 6121-6124, wherein to each of said zones/keys a predefined group of symbols such as alphanumerical characters, words, part-of-a-words, etc., according to different data entry systems of the invention (as described in this application and the previous applications filed by this inventor) may be assigned and used with the principles of the press and speak data entry system of the invention.

A Computing/Communication Device Having Multiple User-Interfaces

Figure 62A:
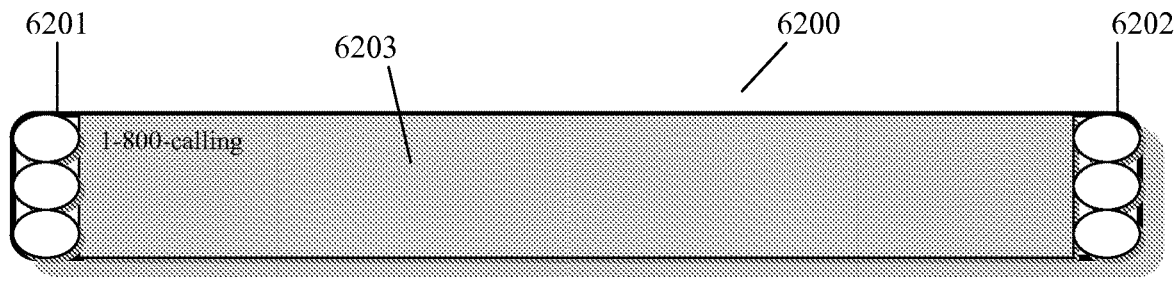
FIG. 62a illustrates a keypad and display, in accordance with one embodiment of the present invention.
Figure 62B:
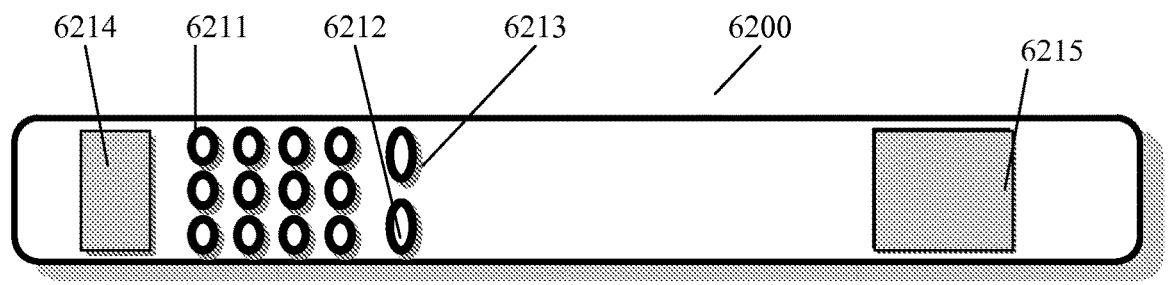

According to one embodiment of the invention, a computing communication device such as the one described earlier in this application and shown as example in several drawings such as FIGS. 47*a*-47*i*, may comprise a keypad in one side of it, for at least dialing phone numbers. Said keypad may be a standard telephone-type keypad. FIG. 62*a* shows a mobile communication device 6200 comprising a data/text entry system of the invention using few keys (here, arranged in two rows 6201-6202), as described before, along with a relating display unit 6203. In order to, discretely, dial a number, a telephone-type keypad located at another side of said device may be considered. FIG. 62*b* shows the backside of said device 6200 wherein a telephone-type keypad 6211 is integrated within said backside of said device. A user may use the keypad 6211 to for example, conventionally, dial a number, or provide other telephone functionalities such as selecting menus. Other telephone function keys such as send/end keys 6212-6213, may also be provided at said side. A display unit 6214, disposed separately from the display unit of said data/text entry system, may also be provided at this side to print the telephony operations such as dialing or receiving numbers. A pointing device 6215 being related to the data/text entry system of the invention implemented within said device (as described earlier), may also be integrated at this side. As previously described in this and prior patent applications filed by this inventor, the (clicking) key(s) relating to said pointing device may be located at another side such as the opposite side of said electronic device relating to said pointing device.

A Computing/Communication Device Equipped with Handwriting Data Entry System

Figure 63A:
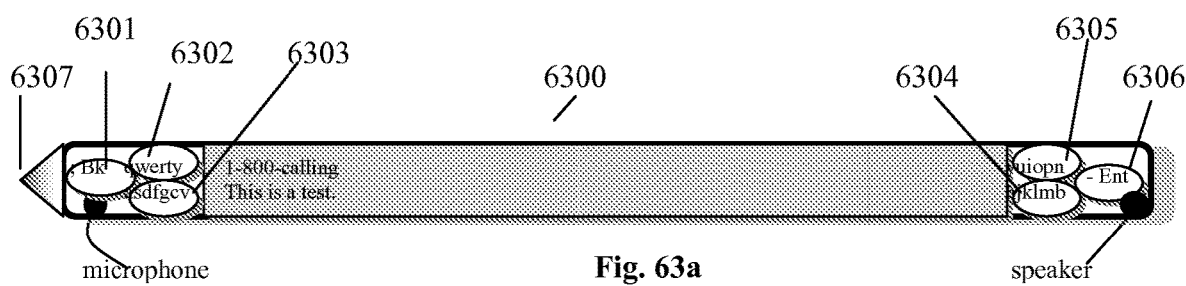

According to one embodiment of the invention, in addition to the data entry system of the invention, a computing and/or communication device of the invention may comprise a handwriting recognition system for at least dialing a telephone number. Said handwriting system may be of any kind such as a handwriting system based on the recognition of the sounds/vibrations of a writing tip of a device on a writing surface. This matter has been described in detail in a PCT application titled "Stylus Computer", which has been filed on Dec. 26, 2001. A data entry based on a handwriting recognition system is slow. On the other hand said data entry is discrete. A handwriting recognition system may, preferably, be used for short discrete data entry tasks in devices comprising the press and speak data entry system of the invention. FIG. 63a shows a computing and or communication device 6300 such as the one described earlier and shown as example in several drawings such as FIGS. 47a-47i. In this example, said device uses six keys 6301-6306 wherein, as described earlier, to four of said keys 6302-6305 (2 at each end), at least the alphabetical (also, eventually the numerical) characters of a language may be assigned. The two other keys 6301 and 6306, may comprise other symbols such as, at least, some of the punctuation marks, and/or functions (e.g. for editing a text).

As described before, the data entry system of the invention using few keys is a very quick and accurate system. In some conditions, generally, when requiring a short effort such as dialing a telephone number, a user may prefer to use a discrete data entry system. Usually, a handwriting data entry system requires a touch-sensitive surface (e.g. display/pad) not being very small. It also requires a pen for writing on said surface. The handwriting data entry and recognition system invented by this inventor, generally, does not require said sensitive surface and said pen. It may be implemented within any device, and may be non-replaceable by other handwriting recognition systems in devices having a small size.

With continuous reference to FIG. 63a, the handwriting recognition system invented by this inventor, may be implemented within said device 6300. For this purpose, a writing tip 6307 may be provided at, for example, one end of said device. Other features such as at least a microphone, as required by said handwriting recognition system, may be implemented within said device 6300. It is understood that other handwriting recognition systems such as a system based on the optical sensors or using accelerometers may be used with said device. A user, at his/her convenience, may use said data entry systems, separately and/or combined with each other. For example, said user may dial a number by using the handwriting data entry system, only. On the other hand, said user may write a text by using the press and speak data entry system of the invention. Said systems may also be combined during a data entry such as writing a text. For example, during writing a text, a user may write part of said text by using the press and speak data entry systems of the invention and switch to a handwriting data entry system (e.g. such as said handwriting system using writing sounds/vibrations, as invented by this inventor). The user may switch from one data entry system to another by, either, writing with the pen tip on a surface, or speaking/not-speaking and pressing corresponding keys.

Figure 63B:
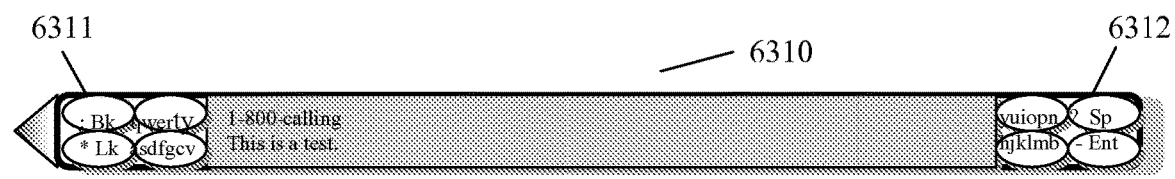

As mentioned previously, it is understood that different key arrangements and different configurations of symbols assigned to said keys may be considered with the different embodiments based on the press and speak/not-speak data entry systems of the invention. FIG. 63b, shows as an example, according to another embodiment of the invention, a device 6310 resembling to the device 6300 of the FIG. 63a, with the difference that, here, the data entry system of the inventions may use four keys at each side 6311, 6312 (one additional key at each side, wherein to each of said additional keys a group of symbols such as punctuation mark characters and/or functions may be assigned). Having additional keys may help to consider more symbols within the data entry system of the invention. It also may help to provide better input accuracy by assigning some of the symbols assigned to other keys, to said additional keys, resulting to assign less symbols to the keys used with the system.

Figure 63C:
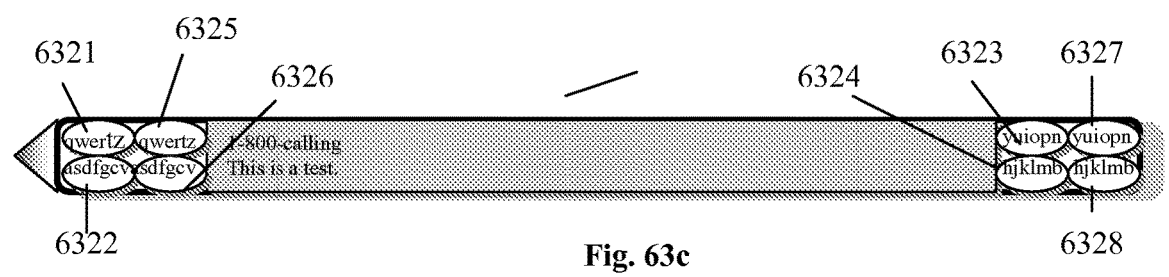

According to another embodiment of the invention, for easily distinguishing between a character by character data entry system of the invention, and a word/part-of-a-word data entry system of the invention, the alphabetical characters may be assigned to a group of keys different from another group of keys to which the words/part-of-a-words are assigned. This may significantly enhance the accuracy of the data entry. FIG. 63c, shows as an example, a device 6320 resembling to the device 6310 of the FIG. 63b, having two sets of four keys (2.times.2) at each side. In this example, the keys 6321-6324 may, accordingly, correspond to alphabetical characters printed on said keys, and the keys 6325-6328 may, accordingly, correspond to words/part-of-a-words starting with the characters printed on said keys. For example, for entering a single letter such as the letter "t", a user may press the key 6321 and speak said letter. Also for example, for entering a part-of-a-word "til", a user may press the key 6325 and speak said part-of-a-word.

It is understood that, as described and shown previously, said keys in their arrangement, may be separately disposed from said electronic device, for example, within one or more keypads wherein said keypads may, wirelessly or by wires, be connected to said electronic device. Also as mentioned and will be mentioned in different paragraphs, in any embodiment of this invention, said few number of keys, their arrangement on a device, said assignment of symbols to said key and to an interaction with said keys, said device itself, etc., are shown only as examples. Obviously, other varieties may be considered by the people skilled in the art.

It must be noted, that, as shown in the FIGS. 63a-63c, and the FIGS. 47b-47d, according to one embodiment of the invention, the data entry system of the invention may have the shape of a stylus. Also, as mentioned before, a stylus shaped computer/communication device and its features have been invented and described in a PCT application titled "Stylus Computer", which has been filed on Dec. 26, 2001. The stylus-shaped device of this invention may comprise some, or all, of the features and applications of said "Stylus Computer" PCT patent application. For example, the stylus-shaped device of this invention may be a cylinder-shaped device, having a display unit covering its surface. Also, for example, the stylus-shaped device of this invention may comprise a point and clicking device and a handwriting recognition system similar to that of said "stylus computer" PCT.

Figure 63D:
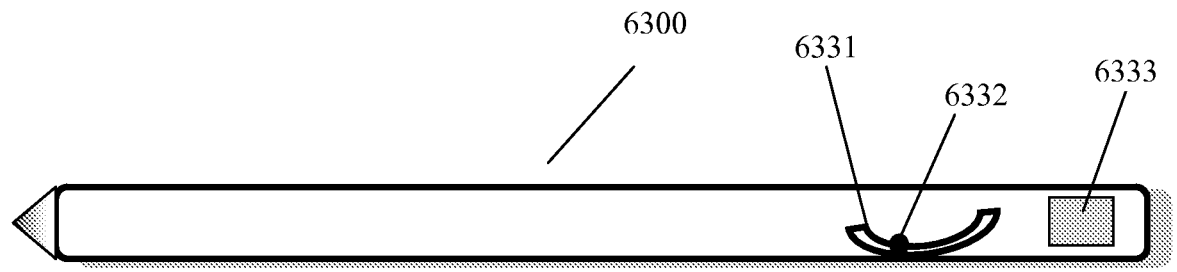

According to on e embodiment of the invention, the stylus-shaped device of this invention, may comprise attachment means to attach said device to a user, by attaching it, for example, to its cloth or it's ear. FIG. 63d shows as an example, the backside of an electronic device such as the device 6300 of the FIG. 63a. As shown, an attachment means, 6331 may be provided within said device for attaching it to, for example, a user's pocket or a user's ear. Also a speaker 6332 may be provided within said attachment means for providing said speaker closed to the cavity of said user's ear. Also a pointing unit 6333 such as the ones proposed by this inventor may be provided within said device.

Figure 63E:
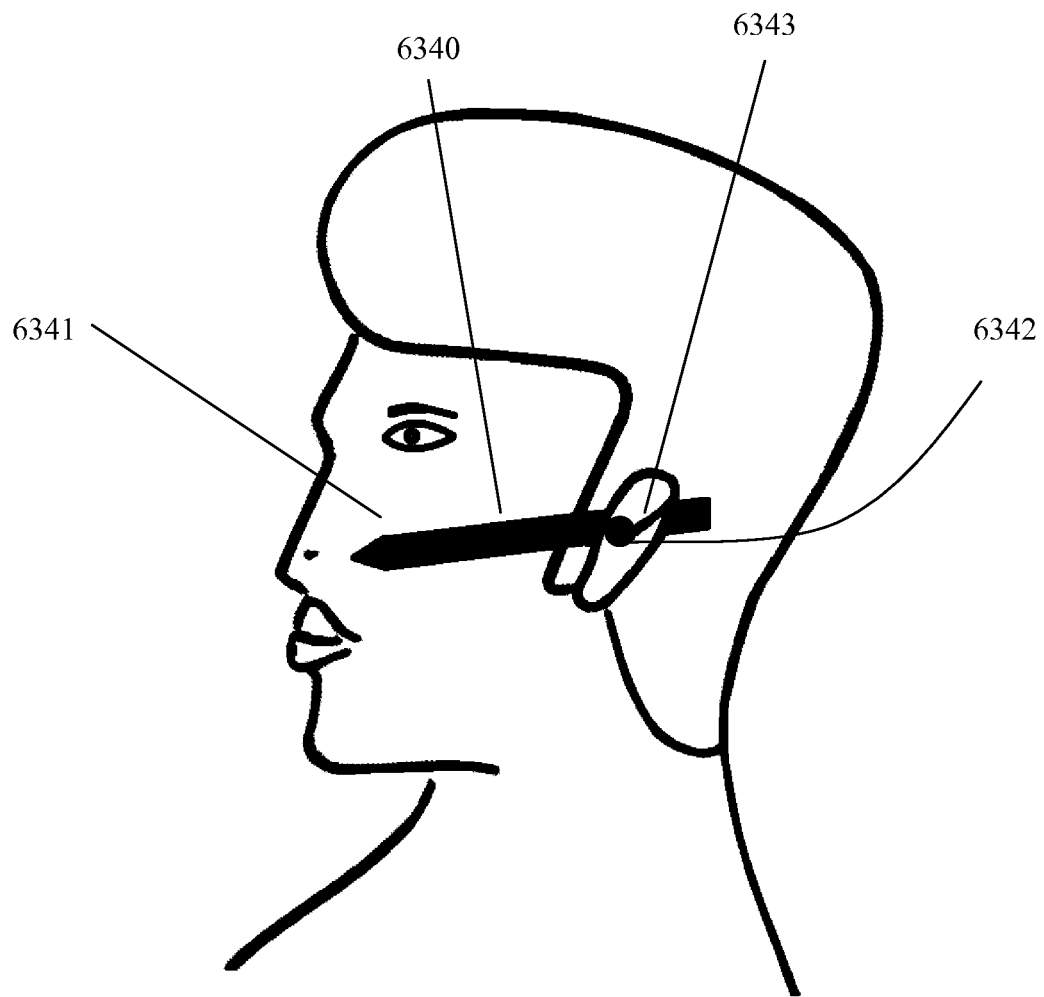

With continuous reference to the current embodiment, as shown in FIG. 63e, as an example, said device 6340 may also be attached to a user's ear to permit hands-free conversation, while, for example, said user is walking or driving. The stylus-shaped of said device 6340 and the locations of said microphone 6341 and said speaker 6342 within said device and its attachment means 6343, respectively, may permit to said microphone and said speaker, to be near the user's mouse and ear, respectively. It is understood that said microphone, speaker, or attachment means may be located in any other locations within said device.

Figure 64A:
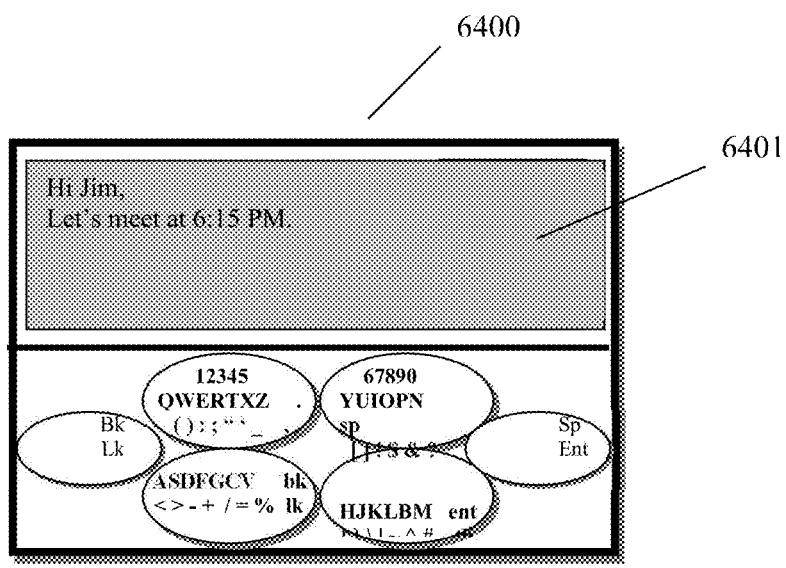
Figure 64B:
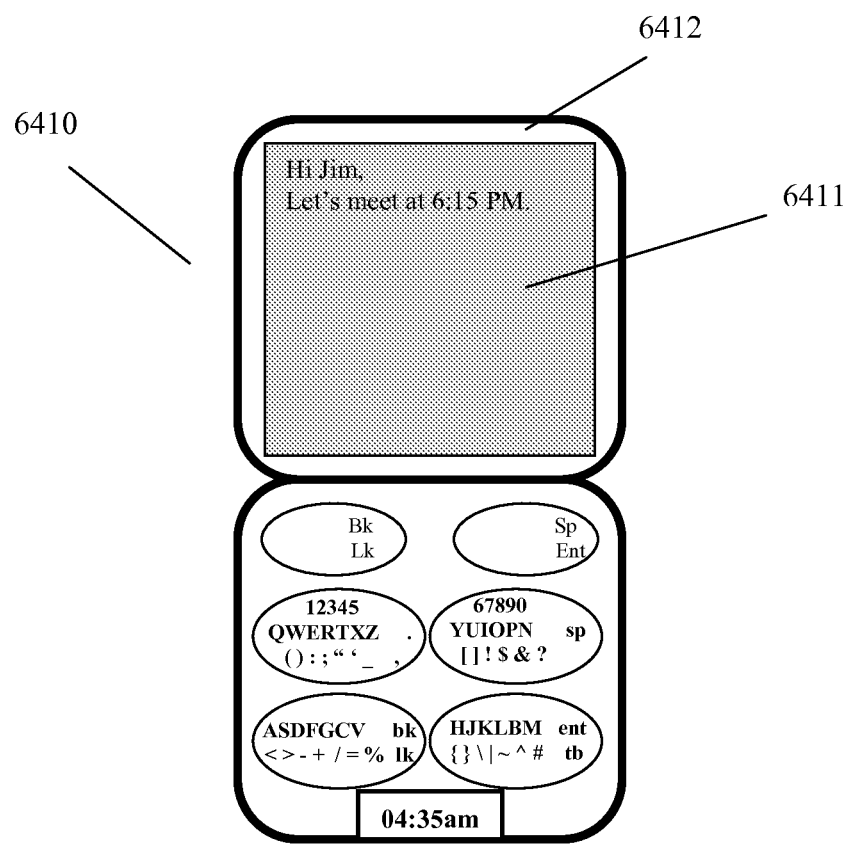

A Standalone-Data Entry Unit of the Invention Having Few Keys, to Comprise a Display Unit According to one embodiment of the invention, a standalone data entry unit of the invention having at least few keys, as described and shown in FIGS. 55a-55j, may comprise a display unit and be connected to a corresponding electronic device. FIG. 64a shows as an example, a standalone data entry unit 6400 based on the principles described earlier which comprises a display unit 6401. The advantage of having a display within said unit (specially, when said unit is carried as a pendent) is that, for example, a user may, insert said electronic device (e.g. a mobile phone), in for example, his pocket, and use said data entry unit for entering/receiving data via said device. By being connected to said device, a user may see the data that he enters (e.g. a sending SMS) or receives (e.g. an incoming SMS), by seeing it on the display unit of said data entry unit. It is understood that said display unit may be of any kind and may be disposed within said unit according to different systems. For example, as shown in FIG. 64b, a display unit 6411 of a standalone data entry unit of the invention 6410 may be disposed within an interior side of a cover 6412 of said data entry unit. It is understood that a standalone data entry unit of the invention may comprise some, or all of the features (e.g. such as an embedded microphone), as described earlier in the corresponding embodiments.

Figure 65A:
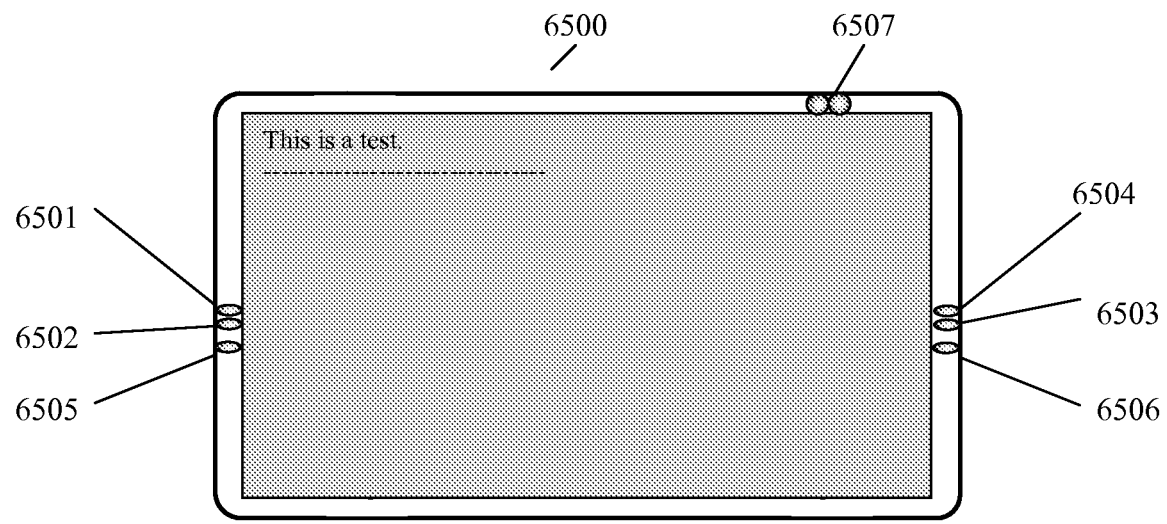
Figure 65B:
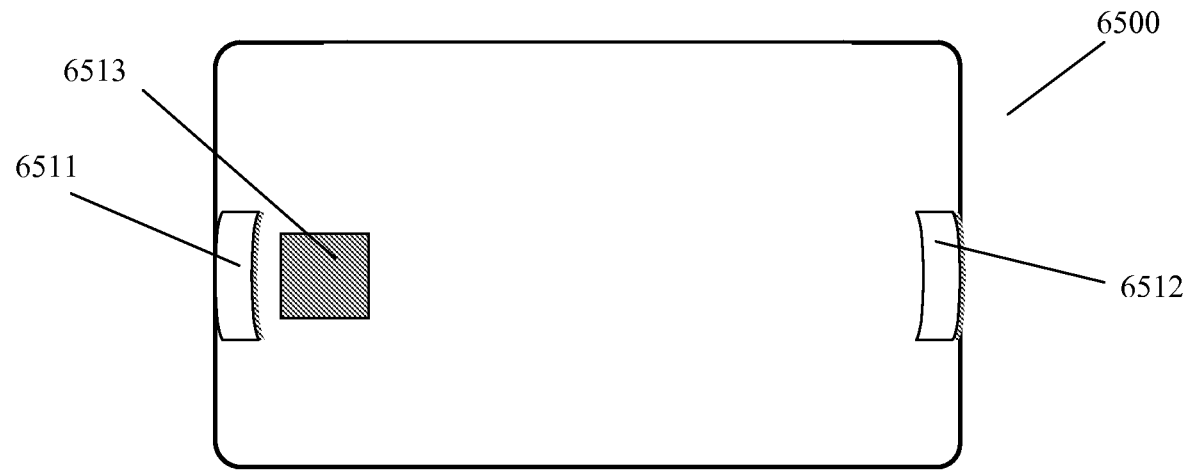

As described earlier, the data entry system of the invention using few keys may be implemented within any device such as a PDA or a Tablet PC. FIG. 65a shows as an example, an electronic device such as a Tablet PC device 6500 comprising the data entry system of the invention using few key. A key arrangement and symbol assignment based on the principles of the data entry systems of the invention may have been provided within said device. In this example, said tablet PC 6500 may comprise four keys 6501-6504 to which, at least, the alphabetical and eventually the numerical characters of a language may be assigned. In addition to said four keys, said device may comprise additional keys such as the keys 6505-6506, to which, for example, symbols such as, at least, punctuation marks and functions may be assigned. It is understood that instead of physical keys (e.g. 6501-6506), virtual (e.g. soft) keys may be defined on a display unit of said Tablet PC, and used with the data entry system. The data entry system of the invention, the key arrangements, and the assignment of symbols to said keys has already been described in detail. Same keys, or additional keys provided within said device, may be used in combination with a pointing device being integrated, for example, within the backside of said device. This matter has already been described in detail in different patent applications filed by this inventor. Said Tablet PC may comprise other keys 6507 for other purposes such as on/off functions, etc. FIG. 65b shows as an example, the backside of the tablet PC 6500 of the FIG. 65a. As shown, for better stability during, for example, a data entry, said tablet PC may comprise one or more handling means 6511-6512 to be used by a user while for example, entering data. It is understood that said handles may be of any kind and may be placed at any location (e.g. at different sides) within said device. As mentioned before, said device may comprise a at least a pointing and clicking system, wherein at least one pointing unit 6513 of said system may be located within the backside of said device. As described before, the keys corresponding to said pointing may be located on the front side of said TabletPC (at a convenient location) to permit easy manipulation of said point and clicking device (with a left or right hand, as desired). According to one design, said Tablet PC may comprise two of said point and clicking devices, locating at a left and right side, respectively, of said Tablet PC and the elements of said pointing and clicking devices may work in conjunction with each other. It is understood that any kind of microphone such as a built-in microphone or a separate wired/wireless microphone may be used to perceive the user's speech during the data entry. These matters have already been described in detail. Also a standalone data entry unit of the invention may be used with said electronic device.

Figure 65C:
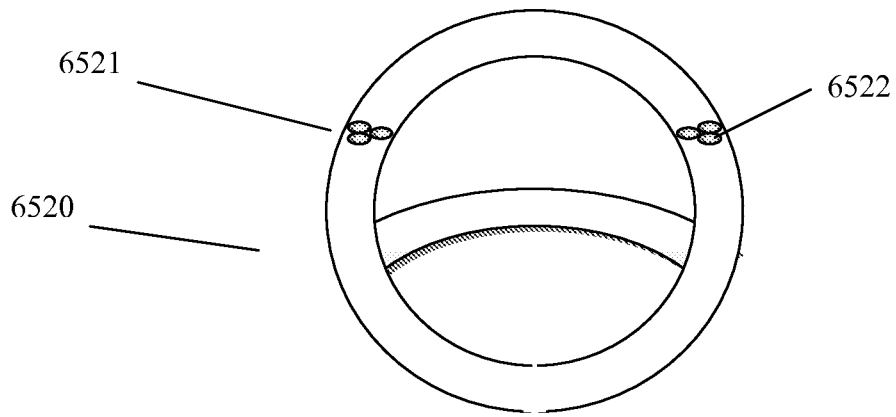

Also, the data entry system of the invention using few keys may be used in many environments such as automotive, simulation, or gaming environments. According to one embodiment of the invention, the keys of said system may be positioned within a vehicle such as a car. FIG. 65c shows a steering wheel 6520 of a vehicle comprising few keys, (in this example, arranged on opposite sides 6521-6522 on said steering wheel 6520) which are used with a data entry system of the invention. The data entry system of the invention, the key arrangements, and the assignment of symbols to said keys has already been described in detail. As shown here, a user may enter data such as text while driving. For this purpose, while holding said steering wheel 6520 with his hands, for example, during driving, a driver may use the press and speak data entry system of the invention by pressing said keys and speaking/not-speaking accordingly. It is understood that any kind of microphone such as a built-in microphone or a wired/wireless microphone such as a Bluetooth microphone may be used to perceive the user's speech during the data entry. Also any key arrangement and symbol assignment to said keys may be considered in any location within any kind of vehicle such as an aircraft.

As mentioned before, the great advantage of the data entry system of the invention, in general, and the data entry system of the invention using few keys, in particular (e.g. wherein the alphabetical and eventually the numerical characters are assigned to four keys arranged in two pairs of adjacent keys, and wherein a user may position each of his two thumbs on each of said pair of keys to press one of said keys), is in that a user may provide a quick and accurate data entry without the necessity of looking (frequently) at neither the keys, nor at the display unit.

It is understood that in the environments (e.g. darkness) and situations (e.g. while driving) that looking at a corresponding display for input verification is not possible/permitted, an informing system may be used to inform the user of one or more last symbols/phrases that were entered. Said system may be a text-to-speech TTS system wherein the system speaks said symbols as they were recognized by the data entry system of the invention. The user may be required to confirm said recognized symbols, by for example, not providing any action. Also for example, if the recognized symbol is an erroneous symbol, the user may provide a predefined action such as using a delete key for erasing said symbol. He then may repeat the entry of said symbol.

Networking Implementation

Figure 66:
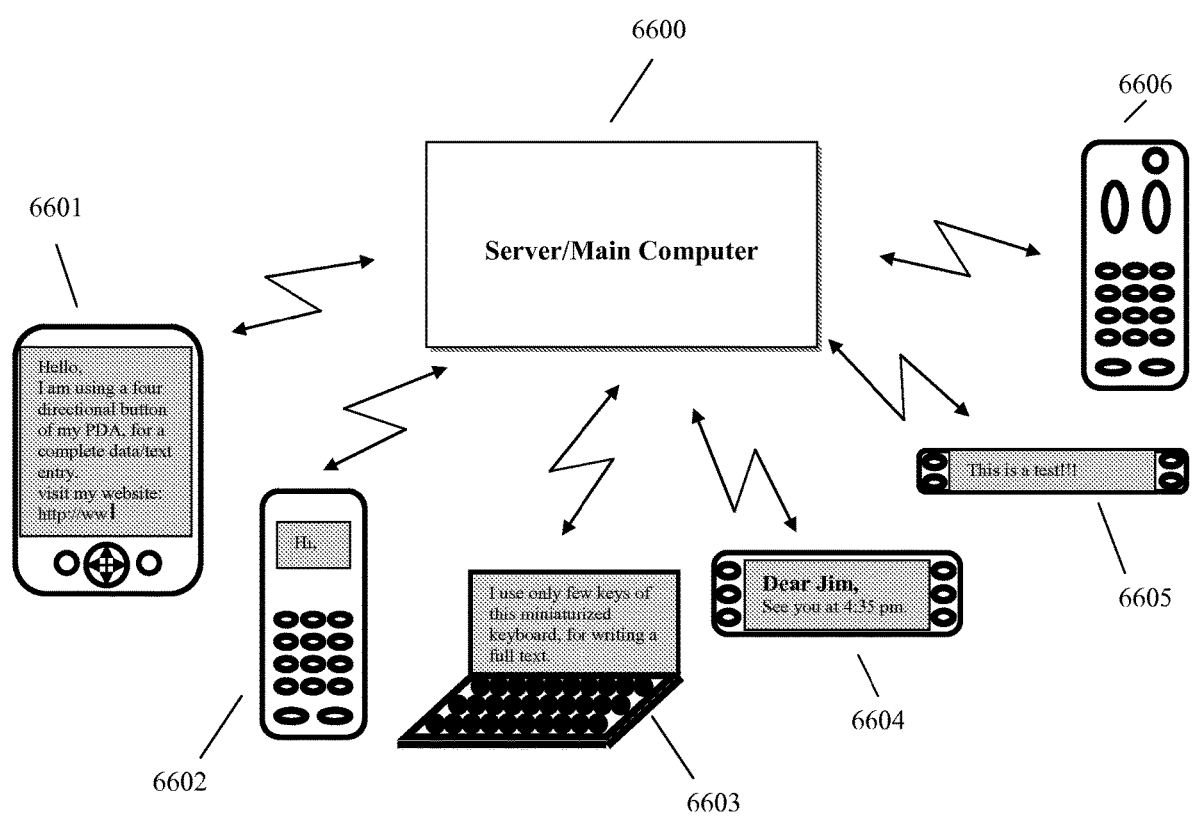

As mentioned in the previously filed patent applications relating to the data entry systems of the invention, the data entry system of the invention may be implemented within a networking system such as a local area networking system comprising client terminals connected to a server/main-computer. According to one embodiment of the invention, in said networking system, said terminals, generally, may be, either small devices with no processing capabilities, or devices with at most limited processing capabilities. In contrast, the server computer may have powerful processing capabilities. In this case the server computer may process information transmitted to it by a terminal of said networking system. By using a terminal, a user, may, according to the principles of the data entry system of the invention, input information (e.g. key press, speech) concerning the entry of a symbol to said server. After processing said information and recognizing a corresponding symbol, the server computer may transmit the result to the display unit of said terminal. It is understood that said terminal may comprise all of the features of the data entry systems of the invention (e.g. such as key arrangements, symbols assigned to said keys, at least a microphone, a camera, etc.), necessary for inputting and transmitting said information to said server computes. FIG. 66 shows as an example, terminals/data entry units 6601-6606 connected to a central server/computer 6600, wherein the results of part of different data/text entered by different data entry units/terminals are printed on the corresponding displays.

The above-mentioned embodiment may be used in many environments such as in an airline aircraft. In the recent passenger aircrafts, each passenger seat comprises a remote control unit having limited number of keys which is connected to a display unit usually installed in front of said seat (e.g. usually situated at the backside of the front seat). Said remote controls may be combined with a built-in or separate microphone, and may be connected to a server/main computer in said aircraft. Instead of said remote control, other personal computing or data entry devices may be used by connecting them to said server/main computer (e.g. via a USB port installed within said seat). As mentioned, said device may, for example, be a data entry unit of the invention, a PDA, a mobile phone, or even a notebook, etc. This may become the most attractive entertainment service supplied by airlines to their passenger during a flight. Passengers may edit letters, send messages, use the internet, or chat with other passengers in said aircraft. A similar system may be implemented within a networking system of organizations, or businesses (e.g. the point-of-sales of chain stores), wherein data entry units comprising necessary features (e.g. keys, microphone) for inputting data/text based on the data entry systems of the invention, may be used in connection with a server computer. The above-mentioned data/text entry system of the invention permits a quick and accurate data entry system through terminal equipments, generally, with no processing capabilities, or, having limited processing capabilities.

The data entry system of the invention using few keys (e.g. including four keys, wherein at least the alphabetical characters are assigned to said keys), may be useful in many circumstances. As mentioned before, instead of using keys, a user may use, for example, his face/head/eyes movements combined with his voice for a data/text entry based on the principles of the data entry systems of the invention. According to one embodiment of the invention, for this purpose, instead of being assigned to few key, symbols (e.g. at least, substantially, all of the alphabetical characters of a language) as described in this application and previous applications, may be assigned to the movements of, for example, a user's head in, for example, four directions (e.g. left, right, forward, backward). The symbol configuration assignments may be the same as described for the keys. For example, if the letters "Q", "W", "E", "R", "T", and "Y", are assigned to the movement of the user's head to the left, for entering the letter "t", a user may move his head to the left and say "T". Same principles may be assigned to the movements of a use's eye (e.g. left, right, up, down). By referring to the last mentioned example, for entering the letter "T", a user may move his eye to the left and say "T". The head, eye, face, etc., movements may be detected by means such as a camera or sensors provided on the user's body.

The above-mentioned embodiments, which do not use keys, may be useful for data entry by people having limited motor-capabilities. For example, a blind person, may use the movements of his/her head combined with his voice, and a person who is not be able to use his fingers for pressing keys, may use his eye/head movements combined with his voice.

According to another embodiment of the invention, as mentioned before, instead of assigning the symbols to few keys, said symbols may be assigned to the movements of a user's fingers. As an example, FIG. 67, shows a user's hands 6700 wherein to four fingers 6701-6704 (e.g. two fingers in each hand) of said user's hands a configuration of symbols based on the configuration of symbols assigned to few key of the invention, may be assigned. For example, to a predefined movement or gesture of the finger 6701, the letters "Q", "W", "E", "R", "T", and "Y", (or words/part-of-a-words, starting with said letters), may be assigned. As an example, said movement may be moving said finger downward. Also, for example, for entering the letter "T", a user may move the finger 6701 downward, and, preferably, simultaneously, say "T". It is understood that any configuration of symbols may be considered and assigned to any number of a user's finger, based on the principles of the data entry systems of the invention as described in this application and the applications filed before.

With the continuous description of the above-mentioned embodiment, many systems may be considered for detecting the movements/gestures of said user's fingers. For example, the movements of a user's finger may be detected by a position of said finger relative to another finger. According to one method, as shown in FIG. 67, sensors 6705-6706 (e.g., here, in form of rings) may be provided with the fingers 6701-6702, used for data entry. According to one embodiment, a movement of a user's finger may be recognized based on for example, vibrations perceived by said sensors based on the friction of said adjacent rings 6705-6706 (e.g. it is understood that the surface of said rings may be such that the friction vibrations of a downward movement and an upward movement of said finger, may be different).

According to another method, sensors 6707, 6708, may be mounted-on ring-type means (or other means mounted on a user's fingers), and wherein positions of said sensors relating to each other, may define the movement of a finger.

It is understood that finger movement/gesture detecting means, described here, are only described as examples. Other detecting means such as optical detecting means may be considered.

Word Categories

According to one embodiment of the invention, the word/part-of-a-word level data entry system of the invention may be used in predefined environments, such as a medical or ajuridical environment. In this case, instead of using a large database of words/part-of-a-words with said system, limited database of words/part-of-a-words relating to said environment may be considered. This will significantly augment the accuracy and speed of the system. Out-of-said-database words/part-of-a-words may be entered, character by character.

A Mode Key for Temporary Character by Character Data Entry

According to one embodiment of the invention, in the data entry system of the invention combining character by character data/text entry and word/part-of-a-word data entry, a predefined key may be used to inform the system that, temporarily, a user is entering single characters. For example, during a text entry, a user, may enter a portion of a text according to principles of the word/part-of-a-word data entry system of the invention, by not pressing said predefined key. The system, in this case, may not consider the letters assigned to the keys that said user presses. The system, may only consider the words/part-of-a-words assigned to said key presses. If said predefined key is pressed for example, simultaneously with other key presses relating to said text entry, then the system may only considers the single letters assigned to said key presses, and ignores the word/part-of-a-word data entry assigned to said key presses.

Phrase Entry

According to another embodiment of the invention, as mentioned before, the data entry system of the invention may comprise a phrases-level text entry system. For example, after entering a whole phrase, by for example, using the data entry system of the invention combining character by character data/text entry and/or word/part-of-a-word data entry system of the invention, the system may analyze the recognized words of said phrase, and based on the linguistically characteristics/models of said language and/or the sense of said phrase, the system may correct, add, or replace some of the words of said phrase to provide an error-free phrase. For example, if a user enters the phrase "let's meet at noon", and the recognized words are "lets meet at noon", by analyzing said phrase, the system may replace the word "lets", by the word "let's" and provide the phrase "let's meet at noon". The advantage of this embodiment is that because the data entry system of the invention is a highly accurate system, the user may not have to worry about correcting few errors occurred during the entry of a phrase. The system may, automatically, correct said errors. It is understood that some symbols such as ".", or a return command, provided at the end of a phrase, may inform the system about the ending point of said phrase.

Phrase Entry

According to one embodiment of the invention, a symbol assigned to an object such as a key, may represent a phrase. For example, a group of words (e.g. "Best regards") may be assigned to a key (e.g. preferably, the key representing also the letter "b"). A user may press said key and provide a speech such as speaking said phrase or part of said phrase (e.g. saying "best regards" in this example), to enter said phrase.

Different Modes, to Single Characters, and to Words/Part-of-a-Words

As previously mentioned, the data entry system of the invention may use different modes (e.g. different interactions with an object such as a key) wherein to each of said modes a predefined group of symbols, assigned to the object, may be assigned. Also as mentioned, for example, said modes may be a short/single pressing action on a key, a long pressing action on a key, a double pressing action on a key, short/long/double gesture with a finger/eye etc.

According to one embodiment of the invention, single characters, words, part-of-a-words, phrases, etc. comprising more than character, or phrases, may be assigned to different modes. For example, single characters such as letters may be assigned to a single/short pressing action on a key, while words/part-of-a-words comprising at least two characters may be assigned to a double pressing action or a longer pressing action on a key (e.g. the same key or another key,), or vise versa (e.g. also for example, words/part-of-a-words comprising at least two characters may be assigned to a single pressing action on a different key). Also for example, as mentioned before, part of the words/part-of-a-words causing ambiguity to the speech (e.g. voice, lip) recognition system may be assigned to a double pressing action on a key. Also different single characters, words, etc., may be assigned to slight, heavy, or double pressing actions on a key. Also for example, words/portions-of-words which do not provide ambiguity with single letters assigned to a mode of interaction with a key may be assigned to said mode of interaction with said key. Different modes of interactions have already been described earlier in this application and in other patent applications filed by this inventor.

It is understood that different predefined laps of time/pressure levels may be considered to define a pressing action/mode. For example, a short time pressing (e.g. up to 0.20 second) action on a key may be considered as a short pressing action (to which a first group of symbols may be assigned), a longer time pressing action (e.g. greater than 0.20 to 0.40 second) may be considered as a long pressing action (to which a second group of symbols may be assigned), and a still longer pressing action (e.g. greater than 0.40 second) may be considered as another mode to which the repeating procedure (e.g. described before) may be assigned. For example, to input the letter "a", a user may short-press a key (wherein the letter "a" is assigned to said key and said interaction with said key), and say "a". He may longer-press said key and say "a" to, for example, get the word/part-of-a-word "ai" (e.g. wherein the word/part-of-a-word "ai" is assigned to said key and said interaction with said key). The user may press said key and say "a", and keep said key in pressing position as much as needed (e.g. still longer period of time) to input, repeatedly, the letter "a". The letter "a" will be repeated until the user releases (stops said pressing action on) said key.

As mentioned before, words comprising a space character (e.g. before/after said word) may be assigned to a mode of interaction of the invention with an object such as a key. According to one embodiment of the invention, said mode of interaction with a key may be said longer/heavy pressing action of said key as just described.

As mentioned before, any combination of objects, modes of interaction, groups of characters, etc., may be considered and used with the data entry systems of the invention.

Backspace

A backspace procedure erasing the word/part of the word already entered, have been described before in this application. According to different embodiments, at least one kind of backspace procedure may be assigned to at least one mode of interaction. For example, a backspace key may be provided wherein by pressing said key, at least one desired utterance, word/part-of-a-word, phrase, etc. may be erased. For example, each single-pressing action on said key may erase an output corresponding to a single utterance before a cursor situated after said output. For example, if a user has entered the words/parts-of-a-word "call", and "ing", according to one procedure, he, for example, may erase the last utterance "ing", by single-pressing said key one time. Another single-pressing action on said key may erase the output "call", corresponding to another utterance. According to predefined procedure, for example, a single/double-pressing action on said key may erase the whole word "calling". Thus based on the principles of backspace procedure of the invention, obviously, many predefined erasing procedures may be considered by the people skill in the art.

Miniaturized Keyboards

Miniaturized keyboards are used with small/mobile electronic devices. The major inconvenience of use of said keyboards is that because the keys are small and closed to each other pressing a key with a user's finger may cause mispressing said key. That's why, in PDAs, usually, said keyboards are pressed with a pen. The data entry system of the invention may eliminate said shortcoming. The data entry system of the invention may use a PC-type miniaturized/virtual keyboard. By targeting a key for pressing it, even if a user misspresses said key (by for example, pressing a neighboring key), according to one embodiment of the invention and based on the principles of the date entry system of the invention, the user may speak a speech corresponding to said key. If the speech of the user does not correspond to the key being pressed, then the system may suggest that the said key was mistakenly pressed. the system, then, may consider that neighboring keys and correspond said speech to one of said keys. By using this embodiment, miniaturized keyboards may easily be used with normal user fingers, easing and speeding up the data entry through those keyboards. It is understood that all of the features and systems based on the principles of the data entry systems of the invention may be considered and used with such keyboard. For example, the word/part-of-the-word data entry system of the invention may also be used with this embodiment.

Also, as mentioned and demonstrated through different embodiments, a principle of the data entry system of the invention, is to select (e.g. candidate) a predefined smaller number of symbols among a larger number of symbols by assigning said smaller number of symbols to a predefined interaction with a predefined object, and selecting a symbol among said smaller number of symbols by using/not-using a speech corresponding to said symbol.

Also as mentioned, said object and said interaction with said object may be of any kind. As described before, for example, said object may be parts of a user's body (such as fingers, eyes, etc.), and said predefined interaction may be moving said object to different predefined directions such as left, right, up, down, etc.

According to one embodiment of the invention, said object may be an electronic device and said interaction with said object may be tilting said electronic device in predefined directions. For example, each of said different smaller groups of symbols containing part of the symbols of a larger group of symbols such as letters, punctuation marks, words/part-of-a-words, functions, etc. (as described before) of a language, may be assigned to a predefined tilting/action direction applied to said electronic device. Then still based on principles of the data entry system of the invention (as described before), one of said symbols of said smaller group of symbols may be selected by providing/not providing a speech corresponding to said symbol. FIG. 68 shows, as an example, an electronic device such as a mobile phone 6800. As an example, four groups of symbols 6801-6804 may be assigned to four tilting directions (e.g. left, up, right, down) 6805-6808 being applied to said device. Still as an example, to enter the letter "t", a user may tilt the device to the right and pronounce a speech corresponding to said letter (e.g. saying said letter). One of the advantages of the tilting system of the invention is that the system may not use any key and may use one hand for data entry. It also permits to provide a large display within the device. FIG. 68a shows an electronic device 6810 using the tilting data entry system of the invention, and wherein a large display 6811 substantially covers the surface of at least one side of said electronic device. It is understood a mode such as a single/double pressing action on a key, here may be replaced by a single/double tilting direction/action applied to the device.

Treatment of Apostrophe

According to one embodiment of the invention, predefined words comprising an apostrophe may be created and assigned to one or more keys and be entered. For example, words such as "it's", "we're", "he'll", "they've", "isn't", etc., may be assigned to at least one predefined key. Each of said words may be entered by pressing a corresponding key and speaking said word.

According to another embodiment of the invention, for the same purpose, (e.g. abbreviated) words such as "'s", "'ll", "'ve", "'n't", etc., may be created and assigned to one or more keys. Said words may be pronounced by their original pronunciations. For example:

"'s" may be pronounced "s/is/has";
"'re" may be pronounced "are";
"'ve" may be pronounced "have";
"'n't" may be pronounced "not"; etc.

Said words may be entered to, for example, being attached to the end of a previous word/character already entered. For example, to enter the word "they've", a user may enter two separate words "they" and "'ve" (e.g., entering according to the data entry systems of the invention) without providing an space between them. As mentioned, the speech assigned to a word comprising an apostrophe (e.g. an abbreviated word such as "'n't" of the word "not") may be the same as the original word. For example, words "'n't" and "not", both, may be pronounced "not". In this case each of said words may be assigned to a different mode of interaction with a same key, or each of them may be assigned to a different key. For example, the user may single-press a corresponding key (e.g. a predefined interaction with said key to which the word "not" is assigned) and say "not" to enter the word "not". To enter the word "'n't", the user may, for example, double-press the same key (e.g. a predefined interaction with said key to which the word "'n't" is assigned) and say "not". According to another embodiment of the invention, part/all of the words comprising an apostrophe may be assigned to the key that the apostrophe punctuation mark itself is assigned.

According to one embodiment of the invention, a part-of-a-word such as "'s", "'d", etc., comprising an apostrophe may be assigned to a key and a mode of interaction with said key and be pronounced as a corresponding letter such as "s", "d", etc. Said key or said mode of interaction may be different than that assigned to said corresponding letter to avoid ambiguity.

Configuration of Letters on Four Keys

As mentioned previously, to augment the accuracy of the speech recognition system, symbols having closed pronunciations (e.g. causing ambiguity to the speech recognition for selecting one of them) may be assigned to different keys. FIG. 69 shows another example of assignment of alphabetical characters to four keys 6901-6904 of a keypad 6900. Although, they may be assigned to any key, words/part-of-a-words comprising more that one character, preferably, may be assigned to the keys representing the first character of said words and/or said part-of-a-words. The arrangement of characters of this example not only eliminates the ambiguity of character by character text entry system of the invention using four keys comprising letters, but it also significantly reduces the ambiguity of the word/part-of-a-word data entry system of the invention. For example, letter "n", and words/part-of-a-words starting with "n" may be assigned to the key 6903, while the letter "i" and words/part-of-a-words starting with "n" may be assigned to the key 6901. This is because, for example, the word "in" (assigned to the key 6901), and the letter "n" (assigned to the key 6903) may have, ambiguously, substantially similar pronunciations. Obviously, as mentioned before, other configuration of symbols on the keys or any other number and arrangement of keys based on principles just described may be considered by the people skilled in the art.

Also, as mentioned earlier, according to another example, if the speech of two symbols have substantially similar pronunciations and said symbols are assigned to a same key and are inputted by a same kind of interaction (e.g. combined with the corresponding speech) with the key, to avoid ambiguity, to at least a first symbol of the symbols another speech having non-substantially similar pronunciation with the second symbol may be assigned. For example, if two symbols such a "I" and "hi" (e.g. respectively, a letter and a word, having substantially similar pronunciations), are assigned to a key and are inputted, by for example, a single pressing action with the key while speaking them, to avoid the ambiguity, for example, another speech such as "hey" (which is substantially differently pronounced than "i"), may be assigned to the symbol (e.g. word) "hi."

Fast Typing

One of the advantages of assignment of at least alphabetical characters to only four keys as shown previously and here in FIG. 69*a*, is that a user may lay each of two of his fingers (e.g. left, and right thumbs) 6915, 6916 on a corresponding column of two keys (e.g. two keys 6911-6912, and two keys 6913-6914, in this example) so that said finger, simultaneously, touches said two keys. This permits to not remove (or rarely remove) the fingers from the keys during text entry and therefore a user knows which key to press without looking at the keypad. This permits fast typing even while said user is in motion. It is understood that for this purpose, the size of the keys, the distance between them, and other parameters such as physical characteristics of said keys, may be such that to optimize the above-mentioned procedure.

As mentioned before, it is understood that according to needs, other configurations of keys may be considered. For example, said four keys may be configured in a manner that, when a user uses a single finger to enter said text, his finger may, preferably, be capable to simultaneously touch said four keys. Also different predefined number of keys to which said at least alphabetical characters are assigned, may be considered according to different needs.

As mentioned before and demonstrated in drawings such as FIG. 52, multi-directional keys may be used for the data entry system of the invention. Also, as mentioned, different number of keys, different types/configuration of keys may be considered to be used with the data entry system of the invention. Still as mentioned, alphabetical-letters or text-characters of a language may be assigned to, for example, four keys used with the data entry system of the invention. FIG. 69*b* shows as an example, an electronic device 6920 having two multidirectional (e.g. four directional, in this example) keys 6927-6928 wherein to four of their sub-keys 6921-6924, alphabetical characters of a language are assigned. An arrangement and use of four keys on two sides of an electronic device for data (e.g. text) entry has been described before and been shown by exemplary drawings such as FIG. 63*b*.

A Device Having an Extendable Flexible Display Unit

As described before, according to one embodiment of the invention, a device comprising a flexible display such as an OLED display and the data entry system of the invention and its features may be provided. FIG. 70*a* shows as an example a flexible display unit 7000. Said display unit may be retracted by for example, rolling it at, at least, one of its sides 7001. Said display may be extended by unrolling it. FIG. 70*b* shows an electronic device such as a computer/communication unit 7010 comprising a flexible display unit 7011. Said electronic device also may comprise the data entry system of the invention and a key arrangement of the invention. In this example, said device comprises two sections 7018-7019, on which said keys 7012-7013 are disposed. The components of said device may be implemented on at least one of said sections 7018, 7019 of said device 7010. Said two sections may be connected to each others by wires or wirelessly. Also, at least part of said display unit may be disposed (e.g. rolled) in at least one of said two sections 7018-7019 of said device. Said two sections of said device may be extended and retracted relative to each other at a predefined distance or at any distance desired by a user (e.g. the maximum distance may be a function of the maximum length of said display unit). In this examples, said two sections are, for example, in a moderate distance relative to each other. By extending said two sections relative to each other said display unit may also be extended (e.g. by unrolling). A user may keep each of said two sections 7018-7019 in each of his hands and use the keys 7012-7013 of each of said sections with a corresponding hand for entering data by, for example, the data entry system of the invention, into said device 7010 and said display unit 7011 of said device. FIG. 70*c*, shows, said device 7010 and said display unit 7011 in a more extended position. A means such as at least a button may be used to release, and/or fix, and/or retract said sections relative to each other. These functions may be automatically provided by means such as a button and/or a spring. Said functions are known by people skilled in the art. FIG. 70*d* shows said device 7010 in a closed position. As mentioned, said device may be a communication device. In this example, said device may be used as a phone unit. For this purpose, a microphone 7031, and a speaker 7032 may be disposed within said device, (preferably at its two ends) so that the distance between said microphone and said speaker correspond to a user's mouth and ear. Because said display is a flexible display, it may be fragile. As shown in FIG. 70*e*, to protect said display of said device in extended position, said device 7010 may comprise multi-sectioned, for example, substantially rigid elements 7041 also extending and retracting relative to each other while extending and retracting said two sections of said device, so that, in extended position said sections provide a flat surface wherein said display (not shown) may be lying on said surface. It is understood that said elements may be of ant kind and comprise any form and any retracting/extending system. Also, said display unit may be retracted/extended by different methods such as folding/unfolding or sliding/unsliding methods.

According to one embodiment of the invention, as shown in FIG. 70*f*, an electronic device 7010 such as the one just described, may comprise a printing/scanning/copying unit (not shown) integrated within it. Although the device may have any width, preferably, the design of said electronic device (e.g. in this example, having approximately the height of an A4 paper) may be such that a user may feed an A4 paper 7015 to print a page of a document such as an edited letter.

Providing a complete solution for a mobile computing/communication device may be extremely useful in many situations. For example, a user may draft documents such as a letter and print them immediately. Also for example, a salesman may edit a document such as an invoice in client's promises and print it for immediate delivery.

According to another embodiment, a foldable device comprising an extendable display unit and the data entry system of the invention may be considered. Said display may be a flexible display such as an OLED display. FIG. 70g shows said device 7050 in a closed position. FIG. 70h shows said device 7050 comprising said extendable display unit 7051, and the keys 7053-7054 of said data entry system. Said device may have communication abilities. In this example, a microphone 7055 and a speaker 7056 are provided within said device, preferably, each on a different section of said device.

It is understood that this embodiment and the relating drawings are described and shown as examples. Many other embodiments and drawings based on the principles of this invention may be considered by people skilled in the art. For example, by referring to FIG. 70b, when extending said display unit to a desired length, only said extended portion of said display unit may be used by said device. For example, a system such as the operating system of said device may manage and direct the output to said opened (e.g. extended) portion of said display unit. Also, said device may at least comprise at least part of the features of the systems described in this and other patent applications filed by this inventor.

A Attachable/Detachable Data Entry Unit

As described before, an electronic device such as a Tablet PC may comprise the data entry features of the invention, such as a key configuration of the invention disposed on a front side of said device, a pointing device disposed at its backside wherein said pointing device uses at least a key in on the front side of said device and vise versa. Also as mentioned before, said device may comprise an extendable microphone/camera extending from said device towards a user's mouth. As described and shown before, said features may constitute an external data entry unit for said device. FIG. 71a, shows as an example, a detachable data entry unit 7100 for an electronic device such as a Tablet PC. Said unit may comprise two sections 7101-7102 wherein each of said sections comprises the keys 7103-7104 of a key arrangement of the invention to provide signals to said device. In this example, Said sections 7101, 7102 are designed to attach to the two extreme sides of said electronic device. At least one of said sections may comprise a pointing device (e.g. a mouse, not shown) wherein when said detachable data entry unit is attached to said electronic device, said pointing device may situate within the backside of said device and at least a key (e.g. a key of said key configuration) relating to said pointing device will be situated at the front side of said device, so that a user may simultaneously use said pointing device, and said at least one related key and/or configuration of keys disposed on said section with at least a same hand. Said data entry unit may also comprise an extendable microphone 7105 and/or camera 7106 disposed within an extendable member 7107 to perceive a user's speech. The features of a data entry unit of the invention are, earlier, described in detail. The two sections 7101-7102 of said data entry unit may be attached to each other by means such as at band(s) (e.g. elastic bands) 71010 so that to fix said unit to said electronic device. Said data entry unit may be connected to said device by wires 7108. It may be connected through, for example, a USB element 7109 connecting to a USB port of said electronic device. Said data entry unit may also be, wirelessly, connected to said device. Also, sections 7101, 7102 may be separate sections so that instead of attaching them to the electronic device a user may for example hold each of them in one hand (e.g. his hand may be in his pocket) for data entry.

Other attachment means for attaching said data entry unit to said electronic device may be considered. For example, as shown in FIG. 71b, said device 7100 may comprise sliding and or attaching/detaching members 7111-7112 for said purpose.

It is understood that said data entry unit may comprise any number of sections. For example, said data entry unit may comprise only one section wherein the features such as the those just described (e.g. keys of the keypad, pointing device, etc. may be integrated within said section.

FIG. 71c shows said data entry unit 7100 attached/connected to an electronic device such as a computer (e.g. a tablet PC). As shown, the keys of said data entry unit 7103-7104 are situated at the two extremes of said device. a microphone is extended towards the mouth of a user and a pointing device 7105 (not shown, here in the back or on the side of said device) is disposed on the backside of said data entry unit (e.g. and obviously at the backside of said device). At least a key 7126 corresponding to said pointing device is situated on the front side of said data entry unit. Obviously, said pointing device and it's corresponding keys may be locates at any extreme side (e.g. left, right, down). Also, multiple (e.g. two, one at left, another at right) pointing and clicking devices may be used wherein the elements of said multiple pointing and clicking device may work in conjunction with each other. Using his two hands, a user may hold said device, and simultaneously use said keys and said microphone for entering data such as a text by using the data entry systems of the invention. Said user, may also, simultaneously, use said pointing device and its corresponding keys.

It is understood that said data entry unit may also, wirelessly, connected to a corresponding device such as Said Tablet PC. Also, said pointing device and/or its keys, together or separately, may be situated on any side of said electronic device.

According to one embodiment of the invention, a flexible display unit such as an OLED display may be provided so that, in closed position, said display unit has the form of a wrist band to be worn around a wearers wrist or attached to a wrist band of a wrist-mounted device and eventually be connected to said device. FIG. 72a shows an as example, a wrist band 7211 of an electronic device 7210 such as a wrist electronic device wherein to said band said display unit in closed position is attached. FIG. 72b shows said display unit 7215 in detached position. FIG. 72c shows said display unit 7215 in an open position.

According to one embodiment of the invention, to help the system to better distinguish between the speech of two symbols such as letters/words/part-of-a-words having substantially similar pronunciations, at least a different phoneme-set being substantially similar with a first symbol of said symbols but being less resembling to the other symbol, may be assigned to said first symbol, so that when user speaks said first symbol, the chances of recognition of said symbols by the voice recognition system augments. For example, if the letter "d" and the letter "b" are assigned to a same predefined interaction with a same key, to the speech of the letter "d" in addition to the phoneme-set "de", another resembling phoneme-set "t e" (in this example, letter "t" is assigned to another key) may also be assigned. On the other hand, in addition to in addition to the phoneme-set "b e", another resembling phoneme-set "p e" (in this example, letter "p" is assigned to another key) may also be assigned. Letters "b" and "d" have similar substantially similar pronunciations, but the pronunciations of the letters "t" (phoneme-set "t e") and "p" are more significantly different. For example, if a user presses the key corresponding to the letters "b" and "d" and says "d e", the system may erroneously recognize said speech as "t e". In this case the system will provide the character assigned to said speech combined with said key press and provides the letter "d". It is understood that examples provided here are only to demonstrate this embodiment. Various configuration and assignments of phonemes/phoneme-sets to any letters/words/part-of-a-words based on the principled described may be considered by the people skilled in the art.

The systems, features, enhancements, etc., described in this application and other applications filed by this inventor may apply to all of the embodiments of the invention. Also an embodiment of the invention may function separately or it may function combined with one or more other embodiments of the invention.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

For example, although, in different embodiments a telephone-type keypad was used to demonstrate different embodiments of the invention, obviously, any kind of keypad with any kind of configurations of symbols assigned to the keys of said keypad may be used with the embodiments of the invention.

For not frequently repeating the principles of the data entry system of the invention, in many paragraphs of this application there is mentioned that one or more symbol such as character/word/portion-of-a-word/function, etc., may be assigned (e.g. correspond) to a key (or an object other than a key). It is understood that, the symbols are supposed to be inputted by a predefined interaction with the key according to the principles of the data entry systems explained in many other embodiments. For example, unless otherwise mentioned, said symbols, may preferably be inputted by a predefined simplest interaction with said key which may be a single-pressing action on said key (as explained in many embodiments of the invention). Also, in many paragraphs after explaining the assignment of symbols such as letter/phoneme-sets/character (letter)-sets/chain-of-letters/etc (e.g. generally, symbols to be spoken) to a key, to avoid the repeating of the principles of the data entry system of the invention for inputting said symbols, said principles may not have been mentioned. In is understood that, unless otherwise mentioned, obviously, (as explained in many embodiments of the invention) said kind of symbols (e.g. generally, symbols to be spoken), are preferably intended to be entered by a corresponding pressing action on a corresponding key combined with, preferably simultaneously, the speech corresponding to said symbol.

It must be noted that in many paragraphs of this application the terms "character-set" or "character set" have been used to define a chain of characters.

Although in different embodiments of the invention, a voice recognition system have been mentioned or intended to be used to perceive and recognize a user's speech, a lip-reading system may be used instead-of or in-addition-to said voice recognition system to perceive and recognize said user's speech (and vice versa).

The invention claimed is:

1. A mobile phone device, comprising:
  a practically rectangular-shaped housing within which the components of a mobile phone are integrated, said housing having a front surface, a back surface and four side surfaces, wherein the length of the front surface approximately corresponds to the distance between the ear and the mouth of a user and wherein the width of the front surface is substantially shorter than the length and wherein the housing has a thin thickness; and
  a display unit integrated within the front surface of said housing wherein said display unit practically covers the entire front surface of said housing;
  wherein said mobile phone device does not include a physical key on the front surface, and
  wherein said components of the mobile phone are integrated within said housing such that none of said components is noticeably extended out from said housing.

2. The device of claim 1, wherein said practically rectangular shape has rounded corners.

3. device of claim 1, wherein plurality of icons corresponding to plurality of applications are displayed on said display unit, and wherein upon providing a sweeping action on said display unit, plurality of other icons corresponding to plurality of other applications are displayed on said display unit.

4. The device of claim 3, wherein upon providing a predefine interaction with an icon, said corresponding application is opened on the display unit.

5. The device of claim 1, wherein said device is adapted to display text entered through a keyboard in landscape direction and in portrait direction on said display unit when the device is used, respectively, in landscape position and in portrait position.

6. The device of claim 1, wherein at least one button is barely extended from at least one of the side surfaces of the housing.

7. The device of claim 1, wherein the width of the device is approximately half of said length.

8. The device of claim 1, wherein the thickness of the device is less than 20 percent of said width.

9. A mobile phone, comprising:
  a body having a practically rectangular shape, said body having a front surface, a back surface and four side surfaces, wherein the length of the front surface of the mobile phone corresponds to the distance between the ear and the mouth of a user and wherein the width of the front surface of the mobile phone is significantly shorter than the length, and wherein said body has a thin thickness;
  a touch sensitive display unit;
  a virtual keyboard to enter text; and
  a microphone and a speaker;
  wherein said display unit, practically occupying the entire front surface of the mobile phone, is integrated within said mobile phone and wherein said front surface of the mobile phone does not have a physical button and wherein said mobile phone does not have a physical keyboard to enter text, and wherein said display unit is adapted to display text, entered through the virtual keyboard, in landscape direction and in portrait direction when the mobile phone is used, respectively, in landscape position and in portrait position.

10. The mobile phone of claim 9, wherein the distance between said microphone and said speaker corresponds to the distance between the ear and the mouth of a user.

11. The mobile phone of claim 9, wherein said practically rectangular shape has rounded corners.

12. The mobile phone of claim 9, wherein plurality of icons corresponding to plurality of applications are displayed on said display unit, and wherein upon providing a sweeping action on said display unit, plurality of other icons corresponding to plurality of other applications are displayed on said display unit.

13. The mobile phone of claim 12, wherein upon providing a predefine interaction with an icon, the corresponding application is opened on the screen.

14. The mobile phone of claim 9, wherein said components of the mobile phone are integrated within the body such that none of said components is significantly extended out from the body.

15. A mobile phone device, comprising:
a body having a practically rectangular shape;
a processor; and
a display unit, said display unit occupying practically the entire surface of the front surface of said device is integrated within said device;
wherein plurality of icons corresponding to a plurality of applications are displayed by said processor on said display unit; and
wherein upon identifying an input corresponding to a sweeping action provided on a touch sensitive surface of said device, said processor displays plurality of other icons corresponding to plurality of other applications on said display unit.

16. The device of claim 15, wherein said display unit is touch sensitive and wherein said sweeping action is provided on said display unit.

17. The device of claim 15, wherein upon providing a predefined interaction with an icon, the corresponding application is opened on the screen.

18. The device of claim 15, wherein said device does not include a physical key on the front surface of the device.

19. The device of claim 15, wherein said components of the mobile phone are integrated within the body such that none of said components is noticeably extended out from said the body.

20. The device of claim 15, wherein said display unit is adapted to display text entered through a keyboard in landscape direction and in portrait direction on said display unit when the device is used, respectively, in landscape position and in portrait position.

* * * * *

UNITED STATES PATENT AND TRADEMARK OFFICE
CERTIFICATE OF CORRECTION

| | | |
|---|---|---|
| PATENT NO. | : 11,503,144 B2 | Page 1 of 1 |
| APPLICATION NO. | : 15/412023 | |
| DATED | : November 15, 2022 | |
| INVENTOR(S) | : Ghassabian | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this
Thirty-first Day of December, 2024

Derrick Brent
*Acting Director of the United States Patent and Trademark Office*